United States Patent
Kazacos et al.

(10) Patent No.: US 6,562,514 B1
(45) Date of Patent: May 13, 2003

(54) STABILIZED VANADIUM ELECTROLYTE SOLUTIONS FOR ALL-VANADIUM REDOX CELLS AND BATTERIES

(75) Inventors: Maria Skyllas Kazacos, New South Wales (AU); Michael Kazacos, New South Wales (AU)

(73) Assignee: Pinnacle VRB Limited, Armadale (AU)

(*) Notice: Subject to any disclaimer, the term of this patent is extended or adjusted under 35 U.S.C. 154(b) by 31 days.

(21) Appl. No.: 09/624,317

(22) Filed: Jul. 24, 2000

Related U.S. Application Data

(62) Division of application No. 08/649,612, filed as application No. PCT/AU94/00711 on Nov. 17, 1994, now Pat. No. 6,143,443.

(30) Foreign Application Priority Data

Nov. 17, 1993 (AU) ............................. PM2477
Oct. 11, 1994 (AU) ............................. PM8716

(51) Int. Cl.[7] .......................... H01M 6/24; H01M 8/08
(52) U.S. Cl. .................... 429/204; 429/188; 429/231.5; 429/326
(58) Field of Search .................... 429/204, 19

(56) References Cited

U.S. PATENT DOCUMENTS

| | | | |
|---|---|---|---|
| 3,279,949 A | 10/1966 | Schaefer et al. .............. 136/80 |
| 4,018,508 A | 4/1977 | McDermott et al. ..... 350/160 R |
| 4,181,777 A | * 1/1980 | Spaziante | |
| 4,410,606 A | 10/1983 | Loufy et al. .................. 429/17 |
| 4,786,567 A | * 11/1988 | Skyllas-Kazacos .......... 429/19 |
| 6,143,433 A | * 11/2000 | Kazacos ..................... 429/204 |

FOREIGN PATENT DOCUMENTS

| | | | |
|---|---|---|---|
| EP | 0 517 217 A1 | 4/1992 | ............ H01M/8/18 |
| FR | 2034755 | 12/1970 | |
| GB | 2113208 | 8/1983 | |
| JP | 54138502 A | 10/1979 | ............. C25B/3/02 |
| JP | 57009072 | 6/1980 | ............ H01M/8/18 |
| JP | 57009073 | 6/1980 | ............ H01M/8/18 |
| JP | 56042970 | 4/1981 | ............ H01M/8/20 |
| WO | WO 89/05363 | 6/1989 | ............. C25B/1/00 |
| WO | WO 89/05528 | 6/1989 | .......... H01M/10/44 |

OTHER PUBLICATIONS

Liu, Galasco and Savinell, *J. of Electrochem. Soc.* (1981) 128: (8) 1755–1757.
Chen et al., *J. of Electrochem, Soc. Energy Storage* (128) 1460–1467.
Chen et al. *J. of Electrochemn. Soc.* (1982) 129(1): 61–66.
Murthy et al. *J. of Power Sources* (1989) 27(2): 119–126.
Kazacos et al. *J. of Applied Electrochem* (1990) 20: 463–467.
6001 Chem. Abst. (1989) No. 22, 111:198495s.

* cited by examiner

*Primary Examiner*—Patrick Ryan
*Assistant Examiner*—Mark Ruthkosky
(74) *Attorney, Agent, or Firm*—Morgan & Finnegan, LLP

(57) ABSTRACT

A stabilized vanadium electrolyte solution for use in an all-vanadium redox cell or battery, the stabilized electrolyte solution comprising vanadium redox ions, an electrolyte and a stabilizing agent, wherein precipitation of vanadium redox ions from the electrolyte solution is prevented or reduced by the stabilizing agent when precipitation of the vanadium redox ions would otherwise occur and wherein the stabilizing agent is present in the electrolyte solution at a concentration of from 0.05 to 20% mol/mol of stabilizing agent to vanadium redox ions.

21 Claims, 24 Drawing Sheets

STABILIZED VANADIUM ELECTROLYTE SOLUTIONS FOR ALL-VANADIUM REDOX CELLS AND BATTERIES

This is a divisional of application Ser. No. 08/649,612 filed Oct. 23, 1997, now U.S. Pat. No. 6,143,443 filed Nov. 17, 1994 which is a 371 of PCT/AU94/00711.

TECHNICAL FIELD

The present invention relates to a method for stabilising an electrolyte for use in a redox cell, in particular for stabilising an electrolyte for use in an all-vanadium redox cell, a stabilised electrolyte, in particular an all-vanadium stabilised electrolyte, a redox cell, in particular an all-vanadium redox cell, comprising the stabilised electrolyte, a redox battery, in particular an all-vanadium redox battery, comprising the stabilised electrolyte, a process for recharging a discharged or partially discharged redox battery, in particular an all-vanadium redox battery, comprising the stabilised electrolyte, a process for the production of electricity from a charged redox battery, and in particular a charged all-vanadium redox battery, comprising the stabilised electrolyte, a redox battery/fuel cell and a process for the production of electricity from a redox battery/fuel cell.

BACKGROUND OF THE INVENTION

Since the energy density available from batteries based on oxidation/reduction reactions of ions in the electrolyte is directly proportional to the concentration of redox ions undergoing oxidation or reduction in the electrolyte, the energy density available from batteries based on redox electrolytes is limited generally by the maximum solubility of redox salts of the various oxidation states in the electrolyte, and in particular the redox component with the lowest solubility. It follows that if there was a way of increasing the solubility of the redox ions beyond their normally considered maximum solubility and if there was way of preventing or reducing precipitation of redox ions from the redox electrolyte, the maximum energy density available from the battery containing such an electrolyte would increase in proportion (which may be a linear proportion or a non linear proportion depending on the redox system) to the increase in solubility of the redox components. Consider for example the case of the all-vanadium redox battery. Vanadium can exist in aqueous solution in several oxidation states which are readily interconvertible under appropriate conditions. For this reason, and because of the relatively low atomic weight of vanadium, vanadium electrolyte systems have desirable properties for their use in batteries including redox batteries. Lithium/vanadium and all-vanadium batteries, for example, are known. Experiments conducted on the stability of V(V) solution have also shown that concentrated solutions (greater than 1.8M Vanadium) when subjected to temperatures greater than 40° C., slowly precipitate.

FUNDAMENTAL PRINCIPLE OF INVENTION

In the vanadium cell however, you cannot use normal chelating or complexing methods to increase the concentration of vanadium in a vanadium electrolyte since V(V) is strongly oxidizing and will oxidize most of these compounds eventually to $CO_2$, producing gas in the system which stops the pumps and can cause the whole stack to burst if not able to escape.

Surprisingly, however, it has been found by inventors that if used in lout concentrations. these type of compounds have a stabilising ability and inhibit precipitation in highly supersaturated solutions of vanadium by adsorbing on the nuclei and preventing ions from approaching the nuclei, therefore stopping crystal growth.

At such low concentrations, these additives do not have sufficient reducing power and can thus not be oxidized by the V(V) in the positive half cell electrolyte. The solutions are thus stable for long periods and over so much wider temperature range than unstabilised solutions.

For example if a 2M V(V) solution are exposed to temperatures of 30° C., a slight precipitate will start to form after 2 days, with heavy precipitation evident after only 4 days. At 40° C., a heavy precipitate will form after 2 days in a 2M V(V) solution. Even a 1.8 M V(V) solution will precipitate after 3 days at 40° C.

This problem in use can be avoided by reducing the vanadium ion concentration to less than 1.8 M for applications where the temperature is likely to exceed 40° C. and where the systems will be maintained in fully charged state for long periods. However in many applications it is not desirable to reduce the vanadium ion concentration below 2.0M since such a reduction effectively reduces the capacity and energy density of the battery. Thus, there is a general need for redox electrolytes which contain higher concentrations of redox ions. Thus, there is a need for a vanadium-based redox electrolyte which contains a higher concentration of vanadium ions. There is also a need for redox electrolytes in which the precipitation of redox species from the redox electrolyte is prevented or reduced. In particular, there is a need for a vanadium-based redox electrolyte in which the precipitation of vanadium species from the vanadium-based redox electrolyte is prevented or reduced.

OBJECTS OF INVENTION

Accordingly, it is an object of the present invention to provide a method for stabilising an electrolyte for use in a redox cell or redox battery, in particular for stabilising an electrolyte for use in an all-vanadium redox cell or all-vanadium redox battery.

Other objects include: (a) providing a stabilised electrolyte, in particular a redox electrolyte and more particularly an all-vanadium stabilised electrolyte; (b) a redox cell, in particular an all-vanadium redox cell, comprising the stabilised electrolyte; (c) a redox battery, in particular an all-vanadium redox battery, comprising the stabilised electrolyte; (d) a process for recharging a discharged or partially discharged redox battery, in particular an all-vanadium redox battery, comprising the stabilised electrolyte; (e) a process for the production of electricity from a charged redox battery, in particular an all-vanadium redox battery; (f) processes for producing a stabilized vanadium electrolyte, optionally highly supersaturated; (g) an all-vanadium redox charge cell; and (h) a process for charging a charge anolyte and a charge catholyte of an all-vanadium redox charge cell.

It is a further object of the present invention to provide an improved all-vanadium redox cell and all-vanadium redox battery.

Another object is to provide a redox battery/fuel cell and a process for the production of electricity from a redox battery/fuel cell.

DISCLOSURE OF THE INVENTION

In this specification when reference is made to the electrolytes of the all-vanadium redox charge cell the positive and negative electrolytes are referred to as the catholyte and anolyte respectively. This is opposite to normal convention used in electrolytic processes but for convenience and consistency with nomenclature relating to batteries and other all-vanadium redox battery patent applications by the present applicant, the former convention has been adopted.

The inventors have found surprisingly that one possible approach to enabling the increase of the upper concentration of redox ions in a redox electrolyte (such as increasing the upper concentration of metal ions in an aqueous solution) is the addition of an effective stabilising amount of one or more stabilising agents to the solution. The inventors have also found surprisingly that the stabilising agent may also reduce precipitation of redox species from the redox electrolyte.

Throughout the specification the expression "stabilising agent" refers to a substance that enables the upper concentration of redox ions in a redox electrolyte to be increased by adding an effective stabilising amount of the stabilising agent to the redox electrolyte. The stabilising agent may permit preparation of supersaturated solutions of redox ions in the redox electrolyte. The stabilising agent may also reduce or prevent precipitation of redox species from the redox electrolyte.

In particular, in the case of vanadium electrolyte systems, it has been found that it is possible to achieve a substantial increase in the concentration of vanadium ions (especially V(II), V(III), V(IV) and, in particular V(V) ions, up to and including supersaturated concentrations, or 0.1 to 15M or 2 to 10M and in particular 5.001 to 7.5M) in vanadium electrolytes, especially vanadium redox electrolytes, by the addition of relatively small amounts of one or more stabilising agents to a vanadium electrolyte. Stabilising agents have been found which are capable of stabilising $V^V$, $V^{IV}$, $V^{III}$ and $V^{II}$ species and increasing their solubility. Because they are used in low concentrations, the stabilising agents are not oxidised by V(V) at a significant rate.

THEORETICAL MODEL DEVELOPMENT

Of the stabilising agents tested, most carboxylic acids were found to slowly oxidize in the V(V) solutions, producing $CO_2$. When used at low levels, ammonium oxalate was found to oxidize only very slowly, while EDTA and malic acid oxidized quite rapidly, even at low concentrations. In the case of glycerine, reduction of V(V) was observed at relatively high levels of glycerine but at low concentrations, the rate of glycerine reduction was effectively stopped.

From the above observations, it can be concluded that in order to prevent oxidation of the stabilising agent by V(V) the best compounds should be alcohols with OH groups on secondary at tertiary carbon atoms as these are more stable to oxidation than carboxylic acids or primary alcohols. Polyhydric secondary and tertiary alcohols, either ring or chain compounds would thus be expected to be the best stabilising agents to use for the vanadium redox cell as these would offer the greatest resistance to oxidation by V(V).

Similarly organic compounds with 2 or more secondary or tertiary —SH or —$NH_2$ groups or mixtures of secondary or tertiary —OH, —SH, or —$NH_2$ groups can be selected as suitable stabilizing agents for highly concentrated vanadium solutions.

Alternatively a V/$O_2$ redox fuel cell using a stabilised V(II)/V(IV) electrolyte in the negative half cell and gaseous or liquid oxidant such as air, oxygen or hydrogen peroxide in positive half cell can be employed.

SUMMARY OF INVENTION

According to a first embodiment of the present invention there is provided a method for stabilising an electrolyte for use in a redox cell, the method comprising:

adding a stabilising amount of a stabilising agent to the electrolyte.

In particular there is provided a method of preparing a stabilised electrolyte solution for use in a redox cell, said solution containing an electrolyte, the method comprising:

(A) dissolving a first substance in the solution which first substance when dissolved in the solution produces redox ions in the solution;

(B) adding a stabilising amount of a stabilising agent to the solution to stabilise the redox ions in the solution.

The stabilising agent may be added to the solution before, at the same time, or after the first substance is dissolved in the solution.

The method may further comprise:

(C) reducing the redox ions in the solution to a lower oxidation state to generate a reductant capable of dissolving a second substance in the solution;

(D) adding a second substance in the solution which second substance when dissolved in the solution produces redox ions in the solution;

(E) if required, dissolving an additional stabilising amount of a stabilising agent in the solution in an amount capable of stabilising said more of the redox ions;

(F) dissolving the second substance in the solution;

(G) optionally reducing the redox ions in the solution to a lower oxidation state to generate a reductant capable of dissolving more of the second substance in the solution;

(H) optionally repeating steps (C)–(G) to obtain the required concentration of the redox ions in the solution.

The additional stabilising agent may be added to the solution before, at the same time, or after the second substance is added to the solution.

Alternatively there is provided a method of preparing a stabilised electrolyte solution for use in a redox cell, said solution containing an electrolyte, the method comprising:

(a) adding a first substance to the solution which first substance when dissolved in the solution produces redox ions in the solution;

(b) dissolving a stabilising amount of a stabilising agent to the solution capable of stabilising the redox ions in the solution;

(c) dissolving the first substance in the solution;

(d) optionally reducing the redox ions in the solution to a lower oxidation state to generate a reductant capable of dissolving a second substance in the solution which second substance when dissolved in the solution produces redox ions in the solution;

(e) optionally adding the second substance to the solution which second substance when dissolved in the solution produces redox ions in the solution;

(f) optionally dissolving more of a stabilising amount of a stabilising agent to the solution capable of stabilising the redox ions in the solution;

(g) optionally dissolving the second substance in the solution;

(h) optionally reducing the redox ions in the solution to a lower oxidation state to generate a reductant capable of dissolving more of the second substance in the solution;

(i) optionally repeating steps (e)–(h) to obtain the required concentration of the redox ions in the solution.

The stabilising agent in (b) may be dissolved in the solution before, at the same time, or after the first substance is added to or dissolved in the solution.

The stabilising agent in (f) may be dissolved in the solution before, at the same time, or after the second substance is added to or dissolved in the solution.

The first substance may be the same as the second substance. The first substance may be different from the second substance.

The stabilising amount of the stabilising agent is less (eg 50 molar % or lower, more typically less than 10 molar %) than that required to fully complex the redox ions in the electrolyte solution.

In steps (A) and (F) said dissolving may be selected from the group consisting of chemically dissolving, simply dissolving, electrolytically dissolving and a combination of chemically dissolving and electrolytically dissolving.

In step (c) and (g) said dissolving may be selected from the group consisting of chemically dissolving, simply dissolving, electrolytically dissolving and a combination of chemically dissolving and electrolytically dissolving.

A stabilised electrolyte solution produced by the method of the invention is included within the scope of the invention.

According to a second embodiment of the present invention there is provided a stabilised electrolyte solution for use in a redox cell, the stabilised electrolyte solution comprising redox ions, an electrolyte and a stabilising amount of a stabilising agent.

Generally the electrolyte solution contains redox ions which may or may not be present in the form of a redox couple(s). Typically the solution is an aqueous solution.

Included within the scope of the second embodiment an electrolyte for use in a vanadium redox cell comprising an aqueous solution of vanadium ions, an acid and a stabilising amount of a stabilising agent.

The vanadium ions may be in a concentration of up to and including a supersaturated concentration.

The redox ions may be metal ions including transition metal, ions (including the various forms of metal ions that exist in the solution under consideration) and the redox couple may be a metal ion redox couple (including the various forms of couples that exist in the solution under consideration). Examples of redox ions are vanadium ions, chromium ions, tin ions, titanium ions, iron ions, manganese ions, molybdenum ions, lead ions, nickel ions, copper ions, cobalt ions, cerium ions, bismuth ions, silver ions, gold ions, cadmium ions, mercury ions, platinum ions, palladium ions, iridium ions, osmium ions, rhenium ions, tungsten ions, tantalum ions, zirconium ions, hafnium ions, lanthanum ions, europium ions, samarium ions, neodymium ions, yttrium ions, zirconium ions, and niobium ions or any mixture thereof, for example (eg in a concentration range up to and including a supersaturated concentration, such as 0.25M to 10M, 2M to 10M, 2M to 9M, 2.5M to 9M, 2.8M to 8M, 3M to 7M, 3M to 6M, 4M to 6.5M, 5.001M to 10M, 5.001M to 7.5M, 5.001M to 10M, 5.001M to 7.0M, and 5.001M to 6M). Vanadium redox ions and vanadium redox couples are especially suitable to use in the invention (especially in a concentration range such as 0.25M to 10M, 2M to 10M, 2M to 9M, 2.5M to 9M, 2.8M to 8M, 3M to 7M, 3M to 6M, 4M to 6.5M, 5.001M to 10M, 5.001M to 7.5M, 5.001M to 10M, 5.001M to 7.0M, and 5.001M to 6M). A stabilised electrolyte solution wherein the redox ions are selected from the group consisting of pentavalent vanadium ions, tetravalent vanadium ions, trivalent vanadium ions, divalent vanadium ions, a mixture of divalent and trivalent vanadium ions, a mixture of divalent and tetravalent vanadium ions, a mixture of trivalent and tetravalent vanadium ions, a mixture of divalent, trivalent and tetravalent vanadium ions, a mixture of divalent, trivalent, tetravalent and pentavalent vanadium ions, a mixture of tetravalent and pentavalent vanadium ions is particularly useful.

According to another embodiment of the present invention there is provided a stabilised electrolyte for use in a redox cell comprising an aqueous solution of redox ions, an electrolyte and a stabilising amount of a stabilising agent.

According to a third embodiment of the present invention there is provided a redox cell or redox battery comprising an electrolyte produced by the method of the first embodiment.

According to another embodiment of the present invention there is provided a redox cell or redox battery comprising an electrolyte of the second embodiment.

Typically the redox cell is an all vanadium redox cell and the redox battery is an all vanadium redox battery.

According to a fourth embodiment of this invention there is provided a redox battery having a positive compartment containing a catholyte in electrical contact with a positive electrode, the catholyte comprising an electrolyte containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolytes having an effective stabilising amount of a stabilising agent for stabilising the redox ions in at least one of the electrolyte(s).

Also disclosed is a redox battery having a positive compartment containing a catholyte in electrical contact with a positive electrode, the catholyte comprising an electrolyte containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, the catholyte and/or anolyte having an effective stabilising amount of a stabilising agent for stabilising the catholyte and/or anolyte respectively.

The redox ions may be stabilised at up to and including a supersaturated concentration.

According to a fifth embodiment of this invention there is provided a process for recharging a discharged or partially discharged redox battery according to the fourth embodiment/invention which process comprises providing electrical energy to the positive and negative electrodes to derive reduced redox ions in the anolyte and oxidised redox ions in the catholyte.

According to a sixth embodiment of this invention there is provided an all-vanadium redox battery having a positive compartment containing a catholyte in electrical contact with a positive electrode, the catholyte comprising an electrolyte containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an anolyte in electrical contact with a negative electrode, the anolyte comprising an electrolyte containing vanadium ions selected from the group consisting of tetravalent vanadium ions, trivalent vanadium ions, divalent vanadium ions, and a mixture of at least two of divalent vanadium ions, trivalent vanadium ions, and tetravalent vanadium ions, and a separator or membrane disposed between the positive and negative compartments and in contact with the catholyte and anolyte to provide ionic communication therebetween and wherein at least one of the electrolytes has an effective stabilising amount of a stabilising agent for stabilising the at least one of the electrolytes.

In the all-vanadium redox battery of the invention the at least one of the electrolytes may be the catholyte, the anolyte or the anolyte and the catholyte.

Also disclosed is an all-vanadium redox battery having a positive compartment containing a catholyte in electrical contact with a positive electrode. the catholyte comprising an electrolyte containing trivalent and/or tetravalent vanadium ions and/or pentavalent vanadium ions, a negative compartment containing an anolyte in electrical contact with a negative electrode, the anolyte comprising an electrolyte containing tetravalent vanadium ions, trivalent vanadium ions and/or divalent vanadium ions, and a separator or membrane disposed between the positive and negative compartments and in contact with the catholyte and anolyte to provide ionic communication therebetween and wherein the catholyte and/or anolyte have an effective stabilising amount of a stabilising agent for stabilising the catholyte and/or anolyte respectively.

Also disclosed is a process for recharging an all-vanadium redox battery of the invention when said battery is discharged or partially discharged, which process comprises providing electrical energy to the positive and negative electrodes to derive divalent vanadium ions in the anolyte and pentavalent vanadium ions in the catholyte.

Also disclosed is a process for the production of electricity from an all-vanadium redox battery of the invention when said batter, is charged or partially charged, which process comprises withdrawing electrical energy from the redox battery by loading an external circuit in electronic communication with the positive and negative electrode.

The vanadium ions in the catholyte and/or anolyte may be stabilised at up to and including a supersaturated concentration.

According to another embodiment of this invention there is provided an all-vanadium redox battery having a positive compartment containing a catholyte in electrical contact with a positive electrode, the catholyte comprising an electrolyte containing up to and including a supersaturated concentration, 0.001 to 15M, 0.5 to 10M, optionally 3 to 9M, trivalent and/or tetravalent vanadium ions and/or pentavalent vanadium ions, a negative compartment containing an anolyte in electrical contact with a negative electrode, the anolyte comprising an electrolyte containing up to and including a supersaturated concentration, 0.001 to 15M, 0.5 to 10M, optionally 3 to 9M, tetravalent vanadium ions, trivalent vanadium ions and/or divalent vanadium ions, and a separator or membrane disposed between the positive and negative compartments and in contact with the catholyte and anolyte to provide ionic communication therebetween and wherein the catholyte and/or anolyte have an effective stabilising amount of a stabilising agent for stabilising the catholyte and/or anolyte respectively.

According to a seventh embodiment of this invention there is provided a process for recharging a discharged or partially discharged all-vanadium redox battery of the invention which process comprises providing electrical energy to the positive and negative electrodes to derive divalent vanadium ions in the anolyte and pentavalent vanadium ions in the catholyte.

According to a eighth embodiment of this invention there is provided a process for the production of electricity from a charged redox battery of the invention which process comprises withdrawing electrical energy from the redox battery by loading an external circuit in electronic communication with the positive and negative electrode.

According to a ninth embodiment of this invention there is provided a process for the production of electricity from a charged all-vanadium redox battery of the invention which process comprises withdrawing electrical energy from the redox battery by loading an external circuit in electronic communication with the positive and negative electrode.

An all-vanadium redox battery system is also provided consisting of a combination of the all-vanadium redox battery of the sixth embodiment and an anolyte reservoir for storing anolyte coupled to the negative compartment by anolyte supply and return lines via a pump and a catholyte reservoir for storing catholyte coupled to the positive compartment by catholyte supply and return lines via a pump.

Another all-vanadium redox battery is provided which consists of a combination of the all-vanadium redox battery of the sixth embodiment and an anolyte charge reservoir having anolyte charge supply and return line or lines for charging further anolyte which is to be delivered to the negative compartment and a catholyte charge reservoir having catholyte charge supply and return line or lines for charging further catholyte which is to be delivered to the positive compartment an anolyte storage reservoir having anolyte storage supply and return line or lines for storing anolyte from the negative compartment and a catholyte storage reservoir having catholyte storage supply and return line or lines for storing catholyte from the positive compartment and pumping means associated with the anolyte storage line or lines and/or the anolyte charge line or lines and with the catholyte storage line or lines and/or the catholyte charge line or lines for pumping:

(i) the catholyte through the catholyte storage line or lines, the positive compartment and the catholyte charge line or lines; and (ii) the anolyte solution through the anolyte solution storage line or lines, the negative compartment and the anolyte solution charge line or lines.

Discharging and charging of the catholyte and anolyte may be conducted in sealed air tight cells and can be conducted under an inert atmosphere such as nitrogen, argon, helium or neon or mixtures thereof although an inert atmosphere can be avoided in a sealed system. During discharging and charging the electrolyte may be stirred or agitated preferably by bubbling an inert gas and/or with a mechanical stirrer or by pumping through. To prevent air oxidation of the V(II) to V(III) in the anolyte, a blanket of an inert immiscible liquid such as paraffin oil or other hydrocarbon oil or a mineral oil, a vegetable oil eg arachis oil, olive oil, sesame oil, groundnut oil, peanut oil or coconut oil, a fish oil eg tuna oil, mackeral oil, sand eel oil, menhaden oil, anchovy oil, sardine oil, horse mackeral oil, salmon oil, herring oil, cod oil, capelin oil, pilchard oil, sprat oil, whale oil, Pacific oyster oil, Norway pout oil, seal oil and sperm whale oil or a plant oil eg pine oil, wheat germ oil and linseed oil or the like. can be used to cover the anolyte (e.g. 0.5 cm to 5 cm, typically about 1 cm in depth) and thus prevent the diffusion of air into the anolyte.

Also disclosed is an uncharged all-vanadium redox battery having a positive compartment containing a catholyte in electrical contact with a positive electrode, said catholyte comprising an electrolyte containing a stabilizing amount of a stabilizing agent, tetravalent vanadium ions, a negative compartment containing an anolyte in electrical contact with a negative electrode, said anolyte comprising an electrolyte optionally containing a stabilizing amount of a stabilizing agent, and containing tetravalent vanadium ions, and an ionically conducting separator disposed between said positive compartment and said negative compartment and in contact with said catholyte and said anolyte to provide ionic communication therebetween and wherein said anolyte and said catholyte includes vanadium ions in a concentration of up to and including a supersaturated concentration, 0.001 to 15M, 0.001 to 10.0M, optionally 2 to 9M or 3 to 7M or 5.001M to 10M or 5.001M to 7.5M or 5.001M to 6M.

Also disclosed is an uncharged all-vanadium redox battery having a positive compartment containing a catholyte in electrical contact with a positive electrode, said catholyte comprising an electrolyte containing a stabilizing amount of a stabilizing agent, tetravalent vanadium ions, a negative compartment containing an anolyte in electrical contact with a negative electrode, said anolyte comprising an electrolyte optionally containing a stabilizing amount of a stabilizing agent, and containing trivalent vanadium ions, and an ionically conducting separator disposed between said positive compartment and said negative compartment and in contact with said catholyte and said anolyte to provide ionic communication therebetween and wherein said anolyte and said catholyte includes vanadium ions in a concentration of up to and including a supersaturated concentration, 0.001 to 15M, 0.001 to 10.0M, 2 to 9M or 3 to 7M or 5.001M to 10M or 5.001M to 7.5M or 5.001M to 6M.

Also disclosed is an all-vanadium redox battery having a negative compartment containing an anolyte in electrical contact with a negative electrode, said anolyte comprising an electrolyte optionally containing a stabilizing amount of a stabilizing agent, and containing divalent vanadium ions, a positive compartment containing a stabilizing amount of a stabilizing agent, and containing a catholyte in electrical contact with a positive electrode, said catholyte comprising an electrolyte containing a stabilizing amount of a stabilizing agent and up to and including a supersaturated concentration, 0.001 to 15M, 0.001 to 10.0M, 2 to 9M or 3 to 7M or 5.001M to 10M or 5.001M to 7.5M or 5.001M to 6M. pentavalent vanadium ions; and an ionically conducting separator disposed between said positive compartment and negative compartments and in contact with said catholyte and said anolyte to provide ionic communication therebetween.

Further disclosed is an all-vanadium redox battery having a negative compartment containing an anolyte in electrical contact with a negative electrode, said anolyte comprising an electrolyte optionally containing a stabilizing amount of a stabilizing agent, and containing trivalent vanadium ions, a positive compartment containing a catholyte in electrical contact with a positive electrode, said catholyte comprising an electrolyte containing a stabilizing amount of a stabilizing agent, and containing up to and including a supersaturated concentration, 0.001 to 15M, 0.001 to 10.0M, optionally 2 to 9M or 3 to 7M or 5.001M to 10M or 5.001M to 7.5M or 5.001M to 6M, pentavalent vanadium ions: and an ionically conducting separator disposed between said positive and negative compartments and in contact with said catholyte and said anolyte to provide ionic communication therebetween.

In addition there is disclosed an all-vanadium redox battery having a positive compartment containing a catholyte in electrical contact with a positive electrode, said catholyte comprising an electrolyte containing a stabilizing amount of a stabilizing agent, and containing tetravalent vanadium ions in a concentration of up to and including a supersaturated concentration, 0.001 to 15M, 0.001 to 10.0M, optionally 2 to 9M or 3 to 7M or 5.001M to 10M or 5.001M to 7.5M or 5.001M to 6M, a negative compartment containing an anolyte in electrical contact with a negative electrode. said anolyte comprising an electrolyte optionally containing a stabilizing amount of a stabilizing agent, and containing divalent vanadium ions in a concentration of up to and including a supersaturated concentration, and an ionically conducting separator disposed between said positive compartment and said negative compartment and in contact with said catholyte and said anolyte to provide ionic communication therebetween.

In addition there is disclosed an all-vanadium redox battery having a negative compartment containing an anolyte in electrical contact with a negative electrode, said anolyte comprising an electrolyte optionally containing a stabilizing amount of a stabilizing agent, and containing tetravalent vanadium ions in a concentration of up to and including a supersaturated concentration, a positive compartment containing a catholyte in electrical contact with a positive electrode, said catholyte comprising an electrolyte containing a stabilizing amount of a stabilizing agent, and containing up to and including a supersaturated concentration, 0.001 to 15M, 0.001 to 10.0M, optionally 2 to 9M or 3 to 7M or 5.001M to 10M or 5.001M to 7.5M or 5.001M to 6M, pentavalent vanadium ions, and an ionically conducting separator disposed between said positive and said negative compartments and in contact with said catholyte and said anolyte to provide ionic communication therebetween.

According to another embodiment of this invention there is provided a redox battery/fuel cell having a positive compartment containing a catholyte in electrical contact with a catholyte contacting portion of a positive electrode, said catholyte contacting portion being disposed in said positive compartment, said positive electrode being selected from the group consisting of an oxidising gas electrode, an oxygen electrode and an air electrode, the catholyte comprising an electrolyte containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolytes having an effective stabilising amount of a stabilising agent for stabilising the redox ions in at least one of the electrolyte (s), said positive electrode having a gas contacting portion said gas contacting portion being disposed so as to be capable of contacting a gas selected from the group consisting of an oxidising gas, oxygen, an oxygen containing gas, and air.

According to another embodiment of this invention there is provided a redox battery/fuel cell having a positive compartment containing a catholyte in electrical contact with a positive electrode, the catholyte comprising an containing redox ions selected from the group consisting of an catholyte redox couple, catholyte redox ions and a mixture of an catholyte redox couple and catholyte redox ions, a negative compartment containing an anolyte in electrical contact with an anolyte contacting portion of a negative electrode, said anolyte contacting portion of said negative electrode being disposed in said negative compartment, said negative electrode being selected from the group consisting of a reducing gas electrode, a hydrogen gas electrode, the anolyte comprising an electrolyte containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolytes having an effective stabilising amount of a stabilising agent for stabilising the redox ions in at least one of the electrolyte(s), said negative electrode having a gas contacting portion said gas contacting portion being disposed so as to be capable of contacting a gas selected from the group consisting of a reducing gas, a hydrogen containing gas, and hydrogen.

Also disclosed is a process for the production of electricity from a redox battery/fuel cell of the invention when said battery/fuel cell is charged or partially charged, which process comprises withdrawing electrical energy from the redox battery/fuel cell by loading an external circuit in electronic communication with the positive and negative electrode.

The redox ions may be stabilised at up to and including a supersaturated concentration.

According to further embodiment of this invention there is provided an all-vanadium redox battery/fuel cell having a positive compartment containing a catholyte in electrical contact with a catholyte contacting portion of a positive electrode, said catholyte contacting portion being disposed in said positive compartment, said positive electrode being selected from the group consisting of an oxygen electrode and an air electrode, the catholyte comprising an electrolyte containing vanadium ions selected from the group consisting of trivalent vanadium ions, tetravalent vanadium ions, pentavalent vanadium ions, and a mixture of at least two of trivalent vanadium ions, tetravalent vanadium ions, pentavalent vanadium ions, a negative compartment containing an anolyte in electrical contact with a negative electrode, the anolyte comprising an electrolyte containing vanadium ions selected from the group consisting of tetravalent vanadium ions, trivalent vanadium ions, divalent vanadium ions, and a mixture of at least two of trivalent vanadium ions, tetravalent vanadium ions, divalent vanadium ions, and a separator or membrane disposed between the positive and negative compartments and in contact with the catholyte and anolyte to provide ionic communication therebetween, at least one of the electrolytes having an effective stabilising amount of a stabilising agent for stabilising the vanadium ions in at least one of the electrolyte(s), said positive electrode having a gas contacting portion said gas contacting portion being disposed so as to be capable of contacting a gas selected from the group consisting of oxygen, an oxygen containing gas, and air.

According to further embodiment of this invention there is provided an all-vanadium redox battery/fuel cell having a positive compartment containing a catholyte in electrical contact with a positive electrode, said positive electrode being disposed in said positive compartment, the catholyte comprising an electrolyte containing vanadium ions selected from the group consisting of trivalent vanadium ions, tetravalent vanadium ions, pentavalent vanadium ions, and a mixture of at least two of trivalent vanadium ions, tetravalent vanadium ions, pentavalent vanadium ions, a negative compartment containing an anolyte in electrical contact with an anolyte contacting portion of a negative electrode, said anolyte contacting portion being disposed in said negative compartment, said negative electrode being selected from the group consisting of a reducing gas electrode, a hydrogen gas electrode, the anolyte comprising an electrolyte containing vanadium ions selected from the group consisting of tetravalent vanadium ions, trivalent vanadium ions, divalent vanadium ions, and a mixture of at least two of trivalent vanadium ions, tetravalent vanadium ions, divalent vanadium ions, and a separator or membrane disposed between the positive and negative compartments and in contact with the catholyte and anolyte to provide ionic communication therebetween, at least one of the electrolytes having an effective stabilising amount of a stabilising agent for stabilising the vanadium ions in at least one of the electrolyte(s), said negative electrode having a gas contacting portion said gas contacting portion being disposed so as to be capable of contacting a gas selected from the group consisting of a reducing gas, a hydrogen containing gas, and hydrogen.

Also disclosed is a process for the production of electricity from an all-vanadium redox battery/fuel cell of the invention when said battery/fuel cell is charged or partially charged, which process comprises withdrawing electrical energy from the redox battery/fuel cell by loading an external circuit in electronic communication with the positive and negative electrode.

The vanadium redox ions may be stabilised at up to and including a supersaturated concentration.

Typically the negative and positive compartments are sealed air-tight.

Typically the negative and positive compartments are deaerated.

All-vanadium redox charge and discharge cells of the invention can be operated over a broad temperature range, e.g. $-5°$ C. to $99°$ C. but are typically operated in the temperature range $2°$ C. to $65°$ C., or $5°$ C. to $45°$ C., and even more typically $10°$ C. to $40°$ C.

The anolyte and the catholyte comprise an electrolyte which is typically an aqueous solution which includes at least one of $H_2SO_4$, trifluoromethanesulphonic acid, $Na_2SO_4$, $K_2SO_4$, $H_3PO_4$, $Na_3PO_4$, $K_3PO_4$. $HNO_3$, $KNO_3$, $NaNO_3$, sulphonic acid, $C_6$–$C_{14}$ arylsulphonic acid such as p-toluenesulphonic acid, benzenesulphonic acid, naphthalenesulphonic acid, $C_1$–$C_6$ alkylsulphonic acid such as methylsulphonic acid and ethylsulphonic acid, acetic acid or mixtures thereof in a concentration of from 0.01M to 20M, or 0.01M to 15M, 0.01M to 10M. It is especially preferred to use $H_2SO_4$ in a concentration of from 1.5M to 10M, more preferably 1.75M to 10M (other concentration ranges include 0.25M to 10M, 2M to 10M, 2M to 9M, 2.5M to 9M, 2.8M to 8M, 3M to 7M, 3M to 6M, 4M to 6.5M, 5.001M to 10M, 5.001M to 7.5M. 5.001M to 10M, 5.001M to 7.0M, and 5.001M to 6M). It is especially preferred to use $H_2SO_4$ in a concentration of from 2M to 8M, more preferably 4.5M to 8M.

The electrolyte typically has vanadium ions (V(II), V(III), V(IV) and/or V(V) ions in any form, (examples of forms include vanadate ions such as metavanadate, orthovanadate, pyrovanadate, as well as vanadyl ions such as vanadylous and divalent vanadyl ions) in sufficient concentration for high discharge capacity in the discharge battery, for example, up to and including a supersaturated concentration, 0.001 to 15M, 0.1M to 12M, 0.25M to 10M, 2M to 10M, 2M to 9M, 2.5M to 9M, 2.8M to 8M, 3M to 7M, 3M to 6M, 4M to 6.5M, 5.001M to 10M, 5.001M to 7.5M, 5.001M to 10M, 5.001M to 7.0M, and 5.001M to 6M are typical in the charge and discharge cells of the invention. The vanadium ions in the electrolyte are prepared by dissolving an oxide, sulphate, phosphate, nitrate, halogenide or other salt or complex of vanadium which is soluble or which can be solubilized in the electrolyte. Examples of suitable vanadium salts include ammonium metavanadate ($NH_4VO_3$); ammonium vanadium sulphate ($NH_4V(SO_4)_2$); barium pyrovanadate ($Ba_2V_2O_7$); bismuth vanadate ($Bi_2O_3 \ V_2O_5$); cesium vanadium sulphate ($VCs(SO_4)_2 \ 12H_2O$); iron metavanadate ($Fe(VO_2)_3$); lead metavanadate ($Pb(VO_5)_2$); potassium metavanadate ($KVO_3$); potassium vanadium sulphate ($KVSO_4$); rubidium vanadium sulphate ($RbV(SO_4)_2$); sodium meta vanadate ($NaVO_3$); meta vanadic acid ($HVO_3$); sodium orthovanadate ($Na_3VO_4$): potassium orthovanadate ($K_3VO_4$); ammonium orthovanadate; sodium pyrovanadate ($Na_4V_2O_7$); potassium pyrovanadate ($K_4V_2O_7$); ammonium pyrovanadate; sodium hexavanadate ($Na_4V_6O_{17}$); potassium hexavanadate ($K_4V_6O_{17}$); ammonium hexavanadate: thallium pyrovanadate ($Tl_4V_2O_7$); thallium metavanadate ($TlVO_3$); thallium pyrovanadate ($ThV_2O_7 6H_2O$); vanadium pentoxide ($V_2O_5$); vanadium sulphate ($V(SO_4)_2$); vanadium sulphate ($V_2(SO_4)_2$); vanadium oxide VO; and calcium and magnesium vanadates including calcium metavanadate and magnesium metavanadate. Other vanadium salts and complexes can also be dissolved and reduced in an electrolyte. Generally for an all-vanadium redox battery, the catholyte and anolyte include a solution of vanadium prepared from a salt selected from the group consisting of a salt of the formula $VO(X)_y$ where y is 2 and X is F, Br or Cl, a salt of the formula $VO(X)_y$ where y is 1 and X is $SO_4$ or O, $V_2O_5$, $V_2O_3$, $V_2O_4$, $VSO_4$, $V_2(SO_4)_3$, $(VO_2)_2SO_4$, and $NH_4VO_3$. Vanadium salts or complexes such as ammonium metavanadate ($NH_4VO_3$), $V_2O_5$, $V_2O_3$, $V_2O_4$, $VSO_4$, $V_2(SO_4)_3$, $VOSO_4$ and ammonium vanadium sulphate ($NH_4V(SO_4)_2$) are particularly advantageous since no additional ions other than vanadium sulphate and ammonium are introduced permitting higher concentrations of vanadium ions to be prepared and reducing further treatment of electrolyte to remove unwanted products. It is especially preferable to dissolve vanadyl sulphate in 0.5M to 10M, more typically 3 to 9M, and even more typically 4 to 8M and yet even more typically 5 to 7.5M $H_2SO_4$ or $V_2O_5$ or ammonium metavanadate in 0.5M to 10M, more typically 3 to 9M, and even more typically 4 to 8M and yet even more typically 5 to 7.5M $H_2SO_4$ by electrolytic dissolution or by chemical leaching with V(III) or other suitable reductant (see e.g. International Application No. PCT/AU88/00471 the contents of which are incorporated herein by cross reference).

The stabilising agent is selected in accordance with the types of redox ions involved. Depending on those ions the stabilising agent may be $KHC_2O_4 \cdot H_2O$, $K_2C_2O_4$, $Na_2C_2O_4$, $(NH_4)_2C_2O_4$, $NH_4HC_2O_4 \cdot H_2O$, $LiHC_2O_4 \cdot H_2O$, $NaHC_2O_4 \cdot H_2O$, $Li_2C_2O_4$, $H_2C_2O_4$. Other stabilising agents can be used. For example, in principle it should possible to use a reducing organic water-soluble compound such as a reducing organic water-soluble mercapto group-containing compound including SH-containing water-soluble lower alcohols (including SH-containing $C_1$–$C_{12}$ primary, secondary and tertiary alkyl alcohols), SH-containing $C_1$–$C_{12}$ primary, secondary and tertiary alkyl carboxylic acids, SH-containing $C_1$–$C_{12}$ primary, secondary and tertiary alkyl amines and salts thereof. SH-containing $C_1$–$C_{12}$ primary, secondary and tertiary alkyl amine acids and dior tripeptides such as 2-mercaptoethylamine hydrochloride, 2-mercaptoethanol. 2-mercaptopropionylglycine, 2-mercaptopropionic acid, cylstenylglycine, cysteine, carbamoyl cysteine, homocysteine, glutathione, cysteine hydrochloride ethyl ester and acetylcysteine. Other suitable stabilising agents include a β-diketone, aminomethylene phosphonates, N,N-bis(phosphononmethyl)cysteic acid and the Na, K and ammonium salts thereof, polyether polyamino methylene phosphonates, the salts of ethylenediamine tetraacetic acid (EDTA) such as ethylenediaminetetra-acetic acid disodium salt, ethylenediaminetetraacetic acid diammonium salt, ethylenediamine, ethylenediaminetetraacetic acid trisodium salt, triethylene tetramine, triethylene tetramine hexaacetic acid, ethylenediaminetetraacetic acid tetrasodium salt, ethylenediaminetetraacetic acid tetra-potassium salt, ethylenediaminetetraacetic acid tetrammonium salt, etc., EDTA (disodium calcium, barium or magnesium salt), EDTA (dipotassium calcium, barium or magnesium salt), EDTA (diammonium calcium, barium or magnesium salt, methyl EDTA, the salts of diethylenetriamine-pentaacetic acid (DTPA) such as diethylenetriamine-pentaacetic acid pentasodium salt, diethylenetri-aminepentaacetic acid pentapotassium salt, diethylenetriamine pentaacetic acid trisodium barium, calcium or magnesium salt, diethylenetriamine pentaacetic acid tripotassium barium, calcium or magnesium salt, etc., glycolether diamine tetraacetic acid, diaminopropanedioltetraacetic acid. the salts of (N-hydroxyethyl) ethylenediaminetriacetic acid (HEDTA) such as (N-hydroxyethyl) ethylenediamine-triacetic acid trisodium salt, (N-hydroxyethyl) ethyl-enediaminetriacetic acid tripotassium salt, etc., nitrilotriacetic acid, the salts of nitrilotriacetic acid (NTA) such as nitrilo-triacetic acid trisodium salt, humic acid, pyridine-2,6-dicarboxylic acid, pyridine carboxaldoxime, nitrilotriacetic acid tripotassium salt, stabilising agents such as triethanolamine, diethanolamine, monoethanolamine, organic carboxylic acid stabilising agents, organic aminopolycarboxylic acids, organic phosphoric acid stabilising agents, inorganic phosphoric acid stabilising agents, polyhydroxy compounds, phenanthroline, ethylenediamine diorthohydroxyphenylacetic acid, diaminopropanetetraacetic acid, nitrilotriacetic acid, dihydroxy-ethylglycine, ethylenediaminediacetic acid (EDDA), ethylene-diaminedipropionic acid, iminodiacetic acid, diethylenetriaminepentaacetic acid, hydroxyethylimino-diacetic acid, diaminopropanolteraacetic acid, transcyclohexanediaminetetraacetic acid, ethylenediaminetetraacetic acid, iminodiacetic acid, glycol ether diaminetetraacetic acid, ethylenediaminetetrakismethylenephosphonic acid, nitrilotrimethylenephosphonic acid, 1-hydroxyethylidene-1,1'-diphosphonic acid, 1,1'-diphosphonoethane-2-carboxylic acid, 2-phosphonobutane-1,2,4-tricarboxylic acid, hydroxyethyliminodiacetic acid, 1-hydroxy-1-phosphonopropane-1,2,3-tricarboxylic acid, catechol-3,5-disulfonic acid, sodium pyrophosphate, sodium tetrapolyphosphate, sodium hexametaphosphate, orthophosphoric acid, polyphosphoric acid, mono- and di-hydrogenphosphoric acid, aminopolycarboxylic acids, including the salts thereof, N-hydroxyethyl aminodiacetic acid and the poly-aminocarboxylic acids including N-hydroxyethylethylenediaminetriacetic acid, diethylenetriaminepentaacetic acid, cyclohexene diamine tetraacetic acid, triethylene tetraamine hexa-acetic acid and salts thereof and the like; aminophosphonate acids such as ethylene diamine tetra(methylene phosphonic acid), aminotri (methylene phosphonic acid), diethylenetriamine penta (methylene phosphonic acid); phosphonate acids such as 1-hydroxy ethylidene-1,1-diphosphonic acid, 2-phosphono acetic acid, 2-phosphono propionic acid, and 1-phosphono ethane 1,2-dicarboxylic acid; amino-polyphosphonates including nitrilotris phosphate ($N(CH_2PO_3H_2)_3$), the Dequest range generally, and, in particular, including Dequest 2000, 2054, 2010, 2016D, 2041, 2046, 2060S, 2066 or 2006; the Briquest range generally including BRIQUEST 221-60A, (2-Hydroxyethyliminobis(methylenephosphonic), $HOCH_2CH_2N(CH_2PO_3H_2)_2$, BRIQUEST 231-A, iso-Propyliminobis-(methylenephosphonic), i-$PrN(CH_2PO_3H_2)_2$, BRIQUEST 2N31-A, n-Propyliminobis-(methylenephosphonic), n-$PrN(CH_2PO_3H_2)_2$, BRIQUEST 2N41-A, n-Butyliminobis-(methylenephosphonic), n-$BuN(CH_2PO_3H_2)_2$, BRIQUEST 2N61-A, n-Hexyliminobis-(methylenephosphonic), n-$HexylN(CH_2PO_3H_2)_2$, BRIQUEST 2N71-A, n-Heptyliminobis (methylenephosphonic), n-$HeptylN(CH_2PO_3H_2)_2$, BRIQUEST 281-A, (2-Ethylhexyl) iminobis-(methylenephosphonic), (2-Ethylhexyl)$N(CH_2PO_3H_2)_2$, BRIQUEST 2N81-A, n-Octyliminobis-(methylenephosphonic), n-octyl$N(CH_2PO_3H_2)_2$, BRIQUEST 291-A, iso-Nonyliminobis-(methylenephosphonic), iso-nanyl$N(CH_2PO_3H_2)_2$, BRIQUEST 2121-A, Dodecyliminobis-(methylenephosphonic), dodecyl$N(CH_2PO_3H_2)_2$, BRIQUEST ADPA-60A, 1-Hydroxyethane-1,1-diphosphonic, $CH_3C(OH)(PO_3H_2)_2$, BRIQUEST 301-50A, Nitrilotris-(methylenephosphonic), $N(CH_2PO_3H_2)_3$, BRIQUEST 422-100A, Ethylenediaminetetrakis-(methylenephosphonic), $[CH_2N(CH_2PO_3H_2)_2]_2$, BRIQUEST 462-A, Hexamethylenediaminetetrakis-(methylenephosphonic), $[C_3H_6N(CH_2PO_3H_2)_2]_2$, BRIQUEST 543-45AS, Diethylenetriamine-pentakis (methylenephosphonic), $H_2O_3PCH_2N[C_2H_4N(CH_2PO_3H_2)_2]_2$, BRIQUEST 664-A, Triethylenetetramine-hexakis (methylenephosphonic), $C_{12}H_{36}N_4O_4O_{18}P_6$, BRIQUEST 785-A, Tetraethylenepentamine-heptakis (methylenephosphonic), $C_{15}H_{44}N_5O_{21}P_7$, BRIQUEST 8106-A, Pentaethylenehexamine-octakis (methylenephosphonic), $C_{18}H_{52}N_6O_{24}P_8$, as well as the sodium, potassium and ammonium salts of all these acids, aminophosphonate acids such as ethylene diamine tetra (methylene phosphonic acid), aminotri(methylene phosphonic acid), diethylenetriamine penta(methylene phosphonic acid), 1-hydroxy ethylidene (1,1-diphosphonic acid), ethylene diamine tetra (methylene phosphonic acid), heaxamethylene diamine tetra (methylene phosphonic acid), diethylene triamine penta (methylene phosphonic acid), as well as the sodium, potassium and ammonium salts of all these acids, substituted anilines, 2-phosphonobutane-1,2,4-tricarboxylic acid, nitrilotrimethylenephosphonic acid, 1-hydroxyethylidene-1,1'-diphosphonic acid, 1,1'-diphosphonoethane-2-carboxylic acid, 1-hydroxy-1-phosphonopropane-1,2,3-tricarboxylic acid, catechol-3,5-disulfonic acid, sodium pyrophosphate, sodium tetrapolyphosphate, phosphonate acids such as 1-hydroxy ethylidene-1,1-diphosphonic acid, 2-phosphono acetic acid, 2-phosphono propionic acid, and 1-phosphono ethane 1,2-dicarboxylic acid, sodium hexametaphosphate, aminopolycarboxylic acids, including the salts thereof, poly-hydroxy stabilising agents such as a saccharide including L- and D-isomers and α and β forms where appropriate, including monosaccharides in particular acid-soluble monosaccharides, such as glucose, fructose, mannose, L-streptose, an aldose including aldomonose, aldodiose, aldotriose, aldotetrose, aldopentose, aldohexose, aldoheptose, aldooctose, aldononose, and aldodecose, a ketose including ketomonose, ketodiose, ketotriose, ketotetrose, ketopentose, ketohexose, ketoheptose, ketooctose, ketononose, and ketodecose, idose, galactose, allose, arabinose, gulose, fucose, glycose, glycosulose, erythrose, threose, ribose, xylose, lyxose, altrose, idose, talose, erythrulose, ribulose, mycarose, xylulose, psicose, sorbose, tagatose, glucuronic acid, glucaric acid, gluconic acid, glucuronic acid, glyceraldehyde, glucopyranose, glucofuranose, aldehydo-glucose, arabinofuranose, galacturonic acid, manuronic acid, glucosamine, galactosamine and neuraminic acid, disaccharides, in particular acid-soluble disaccharides, such as sucrose, maltose, cellobiose, lactose, strophanthobiose, and trehalose, acid-soluble, branched or unbranched or cyclic, homo- or hetero-oligosaccharides, in particular acid-soluble oligosaccharides, including di-, tri-, tetra-, penta-, hexa-, hepta-, octa-, nona- and deca-saccharides, cyclodextrin, cycloheptaamylose, cyclomaltoheptaose, and acid-soluble, branched or unbranched or cyclic, homo- or hetero-polysaccharides in particular acid-soluble polysaccharides, such as a small starch molecules, as well as homo or heteropolymers thereof, glycosides such as ethyl glucopyranoside, an amino carboxylic acid, (typically containing $C_1$–$C_2$ and typically $C_1$–$C_{12}$ primary, secondary or tertiary alkyl), an amino polycarboxylic acid (having two or more carboxylic acids eg 2–10), (typically containing $C_1$–$C_{12}$ and typically $C_1$–$C_{12}$ primary, secondary or tertiary alkyl), a polyaminocarboxylic acid (having two or more amino groups eg 2–10), (typically containing $C_1$–$C_{12}$ and typically $C_1$–$C_{12}$ primary, secondary or tertiary alkyl), a polyamino-polycarboxylic acid (having two or more amino groups eg 2–10, and having two or more carboxylic acids eg 2–10), (typically containing $C_1$–$C_{12}$ and typically $C_1$–$C_{12}$ primary, secondary or tertiary alkyl), a polycarboxylic acid (having two or more carboxylic acids eg 2–10), (typically containing $C_1$–$C_{12}$ and typically $C_1$–$C_{12}$ primary, secondary or tertiary alkyl), a hydroxycarboxylic acid, (typically containing $C_1$–$C_{12}$ and typically $C_1$–$C_{12}$ primary, secondary or tertiary alkyl), a hydroxypolycarboxylic acid, (having two or more carboxylic acids eg 2–10), (typically containing $C_1$–$C_{12}$ and typically $C_1$–$C_{12}$ primary, secondary or tertiary alkyl), a polyhydroxycarboxylic acid, (having two or more hydroxy groups eg 2–12), (typically containing $C_1$–$C_{12}$ and typically $C_1$–$C_{12}$ primary, secondary or tertiary alkyl), a polyhydroxypolycarboxylic acid, (having two or more hydroxy groups eg 2–12 and having two or more carboxylic acids eg 2–10), (typically containing $C_1$–$C_{12}$ and typically $C_1$–$C_{12}$ primary, secondary or tertiary alkyl), a mercaptocarboxylic acid, (typically containing $C_1$–$C_{12}$ and typically $C_1$–$C_{12}$ primary, secondary or tertiary alkyl), a mercaptopolycarboxylic acid, (having two or more carboxylic acids eg 2–10), (typically containing $C_1$–$C_{12}$ and typically $C_1$–$C_{12}$ primary, secondary or tertiary alkyl), a polymercaptocarboxylic acid, (having two or more SH groups eg 2–12). (typically containing $C_1$–$C_{12}$ and typically $C_1$–$C_{12}$ primary, secondary or tertiary alkyl), a polymercaptopolycarboxylic acid, (having two or more mercapto groups eg 2–12 and having two or more carboxylic acids eg 2–10), (typically containing $C_1$–$C_{12}$ and typically $C_1$–$C_{12}$ primary, secondary or tertiary alkyl), a mercaptohydroxycarboxylic acid, (typically containing $C_1$–$C_{12}$ and typically $C_1$–$C_{12}$ primary. secondary or tertiary alkyl), a mercaptohydroxypolycarboxylic acid, (having two or more carboxylic acids eg 2–10), (typically containing $C_1$–$C_{12}$ and typically $C_1$–$C_{12}$ primary, secondary or tertiary alkyl), a polymercaptohydroxycarboxylic acid, (having two or more SH groups eg 2–12), (typically containing $C_1$–$C_{12}$ and typically $C_1$–$C_{12}$ primary, secondary or tertiary alkyl), a polymercaptohydroxypolycarboxylic acid, (having two or more mercapto groups eg 2–12 and having two or more carboxylic acids eg 2–10), (typically containing $C_1$–$C_{12}$ and typically $C_1$–$C_{12}$ primary, secondary or tertiary alkyl), mono- or poly-mercaptomono- or poly-hydroxymono- or poly-carboxylic acid, (having one or more mercapto groups eg 1–12, having one or more hydroxy groups eg 1–12 and having one or more carboxylic acids eg 1–10), (typically containing $C_1$–$C_{12}$ and typically $C_1$–$C_{12}$ primary, secondary or tertiary alkyl), a mercaptopolyhydric alcohol (having two or more OH groups eg 2–15, more typically 2–10), (typically containing $C_1$–$C_{12}$ and typically $C_1$–$C_{12}$ primary, secondary or tertiary alkyl), a polymercaptopolyhydric alcohol (having two or more SH groups eg 2–15, more typically 2–10, and having two or more OH groups eg 2–15, more typically 2–10), (typically containing $C_1$–$C_{12}$ and typically $C_1$–$C_{12}$ primary, secondary or tertiary alkyl), a polymercaptohydric alcohol (having two or more SH groups eg 2–15, more typically 2–10), (typically containing $C_1$–$C_{12}$ and typically $C_1$–$C_{12}$ primary, secondary or tertiary alkyl), a polyhydric alcohol (having two or more OH groups eg 2–15, more typically 2–10), (typically containing $C_1$–$C_{12}$ and typically $C_1$–$C_{12}$ primary, secondary or tertiary alkyl), such as —$CH_2$—CHOH—$CH_2$OH, —$CH_2$—$(CHOH)_2$—$CH_2$OH, —$CH_2$—$(CHOH)_3$—$CH_2$—OH, —$CH_2$—$(CHOH)_4$—$CH_2$OH, or mannitol, sorbitol, glycidol, inositol, pentaerythritol, galacitol, adonitol, xylitol, alabitol, or stabilising agents such as glycols, glycol ethers, polyethylene glycol, propylene glycol monostearate, propylene glycol distearate, ethylene glycol monostearate, diglycerol, ethylene glycol, ethylene glycol distearate, ammonium lauryl stearate, monothioglycerol, mono-, di and tri-glycerides, diethylene glycol, dipropylene glycol, hexamethylene glycol, cyclohexamethylenediol, 1,1,1-trimethylolpropane, pentaerythritol, urea, butylene glycol, dibutylene glycol, hexylene glycol, 1,3 propane diol, 1,2 propane diol, butenediol, 1,4 butane diol, 1,3 butane diol, butenediol, 1,4 cyclohexane dimethanol, 1,3 cyclopentane dimethanol, 2,3 butane diol, 2-methylenepropane-1,3-diol, 2-methylpropane-1,3-diol, 2-ethylenepropane-1,3-diol, 2-ethylpropane-1,3-diol, 1,2-cyclopentane diol, 1,2-cyclohexane diol, neopentyl glycol, bis-hydroxymethyl cyclohexane, cyclohexanol, hexane-diol, hexane-triol, cyclohexane-diol, cyclohexane-triol, cycloheptanol, cycloheptane-diol, cycloheptane-triol, cyclopentanol, cyclopentane diol, cyclopentane triol, 2-methyl-enepropane-1,3-diol, 2-methylpropane-1,3-diol, pinacol, 2-butoxyethanol, ethylene glycol monomethyl ether, ethylene glycol monoethyl ether, propylene glycol monomethyl ether, propylene glycol monoethyl ether, monomethyl ether, monoethyl ether, diethylene glycol monomethyl ether, diethylene glycol monoethyl ether, triethylene glycol, tripropylene glycol, ethylene glycol, benzyl benzoate, dioxolanes, glycerine formals, thiosorbital, tetrahydrofurfuryl alcohol, $C_2$–$C_{10}$ polyhydroxyalkanols, more typically $C_2$–$C_4$ polyhydroxyalkanols, $C_1$–$C_{12}$ alcohols including $C_1$–$C_{12}$ alkanols, monohydric and polyhydric aliphatic alcohols having 1 to 6 carbon atoms such as ethyl alcohol, isopropyl alcohol and hexanol, glycol ethers, 2-methoxyethanol, 2-butoxyethanol, 5-ethoxy-1-pentanol, diethyleneglycol monoethyl ether, propylene glycol, 1,2 propylene glycol, dipropylene glycol, tripropylene glycol, triols, polyols, lactates, glycerin, lecithin, polyoxyethylene sorbitan monoleate, sorbiton monoleate, albumin, glyconolactone, glucopyranose, mannopyranose, galactopyranose, fructopyranose, arabinopyranose, glucopyranoside, fructofuranoside, $(C_1$–$C_6$ alkyl)n glucopyranoside (where n=1–4), $(C_1$–$C_6$ alkyl)$_n$ fructofuranoside (where n=1–4), $(C_1$–$C_6$ alkyl)$_n$ glucose (where n=1–4) including methyl glucose, $(C_1$–$C_6$ alkyl)$_n$ glucoside (where n=1–4) including methyl glucoside, levulose, hydrogenated starch hydrolysates, maltitol, lecithin, ketones such as cyclohexanone, isophorone, diacetone alcohol, and methyl ethyl ketone. Any of the —OH functional groups in the above mentioned componds may be replaced with an —SH functional group. Also included are ammonium compounds such as ammonium bromide, ammonium chloride, ammonium hypophosphite, ammonium phosphate, ammonium phosphite, ammonium fluoride, acidic ammonium fluoride, ammonium fluoroborate, ammonium arsenate, ammonium aspartate, ammonium hydrogen fluoride, ammonium hydrogen sulfate, ammonium sulfate, ammonium iodide, ammonium nitrate, ammonium pentaborate, ammonium acetate, ammonium adipate, ammonium taurinetricarboxylate, ammonium benzoate, ammonium carbamate, ammonium citrate, ammonium diethyldithiocarbamate, ammonium formate, ammonium hydrogen malate, ammonium hydrogen succinate, ammonium hydrogen phthalate, ammonium hydrogen tartarate, ammonium lactate, ammonium malate, ammonium maleate, ammonium oxalate, ammonium phthalate, ammonium picrate, ammonium pyrollidinedithiocarbamate, ammonium salicylate, ammonium succinate, ammonium sulfanilate, ammonium tartarate, ammonium thioglycolate and ammonium 2,4,6-trinitrophenol as well as the sodium and potassium salts of all of the above ions, Other suitable ammonium compounds include lauryltrimethylammonium chloride, stearyltri(2-hydroxyethyl) ammonium chloride, lauryldimethylbenzyl-ammonium chloride, dilauryldimethylammonium chloride, cetyldimethylbenzylammonium chloride, dicetyldimethylammonium chloride, laurylpyridinium chloride, cetylpyridinium chloride, N-(soya alkyl)-N,N,N-trimethyl ammonium chloride, polydiallyldimethyl-ammonium chloride, diallyldimethyl ammonium salt copolymerized with acrylamide, guarhydroxypropyltrimonium chloride, copolymer of N-vinyl-pyrrolidone and N,N-dimethylaminoethyl-methacrylate, quaternized with dimethyl-sulfate, copolymer of acrylamide and N,N-dimethylaminoethyl methacrylate, quaternized with dimethyl sulfate, cationic hydroxyethyl-cellulosics, cationic hydroxyethyl-cellulosics, cetyltrim-ethylammonium chloride, decyldimethyloctylammonium chloride, myristyltrimethylammonium chloride, polyoxyethylene (2)-cocomonium chloride, methylbis(2-hydroxyethyl)cocoammonium chloride, methylpolyoxyethylene-(15)cocoammonium chloride, methylbis (2-hydroxyethyl) octadecyl ammonium chloride, methylpolyoxyethylene-(15) octadecylammonium chloride, methylbis(2-hydroxyethyl)-oleylammonium chloride and methylpolyoxyethylene-(15) oleylammonium chloride and any combination thereof.

Other suitable stabilising agents include glycerol, thioglycerol, sterols, glutathione, ascorbic acid, citric acid, oleic acid, stearic acid; palmitic acid, hexanediol, thiodiglycol, malic acid, citramalic acid, mucic acid, glycolic acid, hydroxyglutaric acid, syringin, turanose, validamycin A, B, C, D, E, or F, vanillin, vanilmandelic acid, vicianose, aloin, amygdalin, anthragallol, anthralin, anthrarufin, anthrarobin, apiose, arbutin, erythritol, D-erythrose, L-erythrose, L-erythrulose, D-erythrulose, fomeci A, fomecin B, frangulin A, frangulin B, fructose-6-phosphate, D-fucose, L-fucose, melezitose, melibiose, vanylglycol, methylglucoside, monotropein, mycarose, neopentyl glycol, orcinol, pantolactone, pentaerythritol, picrocrocin, pinacol, potassium glycerophosphate, sodium glycerophosphate, ammonium glycerophosphate, primeverose, protocatechualdehyde, pyrogallol, pyrocatechol, D-quercitol, L-quercitol, quinic acid, glutamic acid, raffinose, reductic acid, resorcinol, resorcylaldehyde, resorcylic acid, rhamnose, potassium salicylate, sodium salicylate, gallacetophenone, D-glucoascorbic acid, L-glucoascorbic acid, glucogallin, glucovanillin, glucuronolactone, D-gulose, L-gulose, hamamelose, helicin, D-manno-heptulose, L-manno-heptulose, 3-hydroxycamphor, inositol monophosphate, isoascorbic acid, kethoxal, 2-oxopentanedioic acid, 2-oxo-L or D-gulonic acid, lactulose, leucocyanidin, linamarin, 1,2,4-benzenetriol, glyceric acid, carminic acid, cellobiose, d-chalcose, 1-chalcose, chitin, chlorogenic acid, coniferin, cymarose, 2-deoxy-D or L-glucose, D-2-deoxyribose, digitalose, digitoxose, L-2-deoxyribose, dioscin, D-streptose, taxicatin, thevetose, 5-thio-D-glucose, hydroxybutyric acid, hydroxyvaleric acid, acetonic acid, erythorbic acid, glucuronic acid, gluconic acid, gluconolactone, L-cysteine, D-penicillamine, L-lactic acid, monosodium glutamate, 2-mercaptosuccinic acid, catechol acid, oxalic acid, succinic acid, L-malic acid, monosodium phosphate, Tiron (Sigma Chemical Company, St. Louis, Mo., USA), DFOA (Ciba-Geigy, Barcelona Spain), $NaH_2PO_4.2H_2O$, D-penicillamine, DFO (a trihydroxamic acid iron siderophore) 2,3-dimercapto-1-propanal, tartaric acid, salicyclic acid, adipic acid EDDHA, picolinic acid 2,4-pentanedione (acetylacetone), acetylacetone, aliphatic (aceto, glycine, alanine and sorbo-), aromatic (salicyl-) and heterocyclic (nicotinic and histidine) monohydroxamic acids and dihydroxoamic rhodotorulic acid, 3,4-LICAMS (a linear catecholcarboxamide), NaNMGDTC, BGDTC, MeOBGDTC, MeOBGD, MeOBGDTC, BLDTG, MeBLDTC, malonic acid, HBED, CDTA, rhodotorulic acid, dihydroxyethyl glycine, cyclohexanone, dimercaprol, edetate calcium disodium, acetylacetonato, N,N-Diethylthiocarbamate, 2,2'-Dipyridyl (dipy), deferoxamine mesylate, o-Phenylenebisdimethylarsine (diars), aminopyridine, diethylenetriamine (dien), iminodiacetic acid (and salts thereof), triethylenetetramine (trien), nitrilotriacetic acid, nitrilotripropionic acid, 1,8-Bis (salicylideneamino)-3,6-dithiaoctane pyridine, edetate disodium, trientine hydrochloride, dimercaptosuccinic acid (DMSA), nitrilotriacetic acid and salts thereof, ethyleneglycol-bis-(β-aminoethyl ether)-N,N-tetraacetic acid and salts thereof, EDTA-HEDTA, glucosaccharic acid and Na, K, and ammonium salts thereof, Coco imidazoline betaine, Coco imidazoline betaine dicarboxylate, lauryl imidazoline betaine, Cheelox B-13 (GAF Corp. mixed alkyldiaminepolyacetic acids, as sodium salts and alkanolamines), N(hydroxyethyl) ethylene diaminetriacetate trisodium salt, nitriloacetate trisodium salt, trisodium salt of hydroxyethylethylenediaminetriacetic acid, diethylenetriamine-penta-acetic acid, pentasodium diethylenetriaminepenta-acetic acid, acetic acid, hydroxy acetic acid, lactic acid, hydroxy lactic acid, potassium lactate, sodium lactate, tetrasodium ethylene-diaminetetraacetate, trisodium n-hydroxyethylenediaminetriacetate, diammonium ethylene-diaminetetraacetate, sodium acetate, potassium acetate, sodium ferric ethylene-diaminetetraacetate, ammonium ferric ethylene-diaminetetraacetate, trisodium magnesium diethylenetriaminepentaacetate, diethanolglycine sodium salt, ethanoldiglycine disodium salt. Hexol Q (GAF corporation, complex phosphate compound) Interstab CH-55, CH-55R (Interstab Chem. Inc.—organophosphites), Kalex (Hart Products Corp, organic amino acid type), disodium dihydroxyethyl ethylenediamine diacetate, pentasodium diethylenetriamine pentaacetate, Miranol CM Conc. (Miranol Chem. Co., Inc.—monocarboxylated cocoyl imidazoline derivative), Miranol HS Conc. (Miranol Chem. Co., Inc.—sulfonated lauric derivative, sodium salt) calcium salt of DTPA, 1,5-anhydro-glucitol, 1,4-sorbitan, isosorbide, cyclitols including myo-inositol (see W. W. Wells and F. Eisenberg, Jr., eds. "Cyclitols and Posphoinositides", Academic Press, New York, 1978, the contents of which are incorporated herein by cross reference), cladinose, glucal triacetate, 2-deoxy-ribofuranose, rhamnopyranose, ammonium gluconate, lithium gluconate, sodium gluconate, potassium gluconate, ammonium acid gluconate, lithium acid gluconate, sodium acid gluconate, potassium acid gluconate, ammonium D-gluconate, lithium D-gluconate, sodium D-gluconate, potassium D-gluconate, gluconic acid, gluconic D acid, gluconic L acid, ammonium L-gluconate, lithium L-gluconate, sodium L-gluconate, potassium L-gluconate, magnesium gluconate, magnesium acid gluconate, magnesium D-gluconate, magnesium L-gluconate, calcium gluconate, calcium acid gluconate, calcium D-gluconate, calcium L-gluconate, ammonium sorbate, lithium sorbate, sodium sorbate, potassium sorbate, ammonium acid sorbate, lithium acid sorbate, sodium acid sorbate, potassium acid sorbate, ammonium D-sorbate, lithium D-sorbate, sodium D-sorbate, potassium D-sorbate, ammonium L-sorbate, lithium L-sorbate, sodium L-sorbate, potassium L-sorbate, magnesium sorbate, magnesium acid sorbate, magnesium D-sorbate, magnesium L-sorbate, calcium sorbate, calcium acid sorbate, calcium D-sorbate, calcium L-sorbate, ammonium glucuronate, lithium glucuronate, sodium glucuronate, potassium glucuronate, lithium acid glucuronate, sodium acid glucuronate, ammonium acid glucuronate, potassium acid glucuronate, ammonium D-glucuronate, lithium D-glucuronate, sodium D-glucuronate, potassium D-glucuronate, glucuronic acid, glucuronic D acid, glucuronic L acid, ammonium L-glucuronate, lithium L-glucuronate, sodium L-glucuronate, potassium L-glucuronate, magnesium glucuronate, magnesium acid glucuronate, magnesium D-glucuronate, magnesium L-glucuronate, calcium glucuronate, calcium acid glucuronate, calcium D-glucuronate, calcium L-glucuronate, ammonium glucoheptonate, lithium glucoheptonate, sodium glucoheptonate, potassium glucoheptonate, lithium acid glucoheptonate, sodium acid glucoheptonate, ammonium acid glucoheptonate, potassium acid glucoheptonate, ammonium D-glucoheptonate, lithium D-glucoheptonate, sodium D-glucoheptonate, potassium D-glucoheptonate, glucoheptonic acid, glucoheptonic D acid, glucoheptonic L acid, ammonium L-glucoheptonate, lithium L-glucoheptonate, sodium L-glucoheptonate, potassium L-glucoheptonate, magnesium glucoheptonate, magnesium acid glucoheptonate, magnesium D-glucoheptonate, magnesium L-glucoheptonate, calcium glucoheptonate, calcium acid glucoheptonate, calcium D-glucoheptonate, calcium L-glucoheptonate, ammonium glyconate, lithium glyconate, sodium glyconate, potassium glyconate, ammonium acid glyconate, sodium acid glyconate, lithium acid glyconate, potassium acid glyconate, ammonium D-glyconate, lithium D-glyconate, sodium D-glyconate, potassium D-glyconate, glyconic acid, glyconic D acid, glyconic L acid, ammonium L-glyconate, lithium L-glyconate, sodium L-glyconate, potassium L-glyconate, magnesium glyconate, magnesium acid glyconate, magnesium D-glyconate, magnesium L-glyconate, calcium glyconate, calcium acid glyconate, calcium D-glyconate, calcium L-glyconate, DTPA HEDTA, NTA, Seqlene 190.270 and ES40 (Pfanstiehl Laboratories—Reaction mixture forming sodium-α-d-glucoheptonate, sodium-β-d-glucoheptonate, aldobionates and other complex carbohydrates), sodium-α-1-glucoheptonate, sodium-β-1-glucoheptonate, $Na_2EDTA$, $Na_2CaEDTA$, $(NH_4)_2EDTA$, $Na_2(CuEDTA)$, $Na(FeEDTA)$, $Na_3CaDTPA$ $(NH_4)_4$ EDTA, $H_4EDTA$, carboxymethyl mercaptosuccinic acid, L-dopa, meso-2,3-dimercapto-succinic acid, DL-Malic acid, picolinic acid, 2,4-pentandione, tetracycline, 3,4-LICAMS, 3-ethyl-3-hydroxypyr4-one, DMSA, DMPS, DMPA, trien, DF, gallic acid, 2-ethyl-3-hydroxypyr4-one, 1-ethyl-3-hydroxypyridin-2-one, 1,2-dimethyl-3-hydroxypyridin-4-one, 1-methyl-2-ethyl-3-hydroxypyridin-4-one, 1-ethyl-2-methyl-3-hydroxypyridin-4-one, 1,2-diethyl-3-hydroxypyridin-4-one, 1-propyl-2-methyl-3-hydroxypyridin-4-one, 1-butyl-2-methyl-3-hydroxypyridin-4-one, 1-[ethan-1'-ol]-2-methyl-3-hydroxypyridin-4-one, 1-methoxyethyl-2-methyl-3-hydroxypyridin-4-one, 1-ethoxypropyl-2-methyl-3-hydroxypyridin-4-one, acetohydroxamic acid, glycine hydroxamate, DL-Alanine hydroxamate, L-Histidine hydroxamate, Sorbohydroxamic acid, salicylhydroxamnic acid, nicotinic acid hydroxamate, Rhodotorulic acid, DFO, 3,4,3-LICAM, 3,4,3-LICAM(S), 3,4,3-LICAM(C), BAL (and analogs thereof see M. M. Jones, Critical Reviews in Toxicology (1991) 21, 209 the contents of which is incorporated herein by cross reference), DDTC, D-penicillamine, D,L-penicillamine, N-acetyl-D-penicillamine, DMSA, $Na_2DMSA$, meso DMSA, D,L-DMPS, DMPS, TRIEN or deferroxamine B or other like substances and any combination thereof. Other polyhydroxy stabilising agents including L- and D-isomers and α and β forms where appropriate, include Higher alditols, allo-Hexoses, altro-Hexoses, galacto-Hexoses, gluco-Hexoses, gulo-Hexoses, ido-Hexoses, manno-Hexoses, talo-Hexoses, Higher Aldoses, erythro-Pentuloses, threo-Pentuloses, fruto-Hexuloses, psico-Hexuloses, tagoto-Hexuloses, Miscellaneous ketoses, Higher ketoses, 6-Deoxyaltroses, 6-Deoxyalloses, 6-Deoxytaloses, 6-Deoxyglucoses, 6-Deoxyguloses, 6-Deoxyidoses, 6-Deoxymannoses, 6-Deoxygalactoses, Other 6-deoxy sugars, Glycosyl halides and other 1-halogenosugars, 2-Halogenosugars, 3-Halogenosugars, 4-Halogenosugars, 5-Halogenosugars, 6-Halogenosugars, Glycosylamines, 2-Amino-2-deoxysugars, 3-Amino-3-deoxysugars, 4-Amino-4-deoxysugars, 5-Amino-5-deoxysugars, 6-Amino-6-deoxysugars, Azido sugars, Thioglycosides and 1-thiosugars, other thiosugars, 1-Deoxy sugars, 2-Deoxy sugars, 3-Deoxy sugars, 3-Deoxy sugars, 4-Deoxy sugars, 5-Deoxy sugars, 2,6-Dideoxy sugars, 3,6-Dideoxy sugars, 4,6-Dideoxy sugars, Polydeoxy sugarsUnsaturated sugars; 1-ens, Unsaturated sugars; 2-enes, Unsaturated sugars; 3-enes, Unsaturated sugars; 4-enes, Unsaturated sugars; 5-enes, Other unsaturated sugars, Branched chain sugars, Dicarbonyl sugars; glycos-2-uloses, Nucleosides, 1,2-Anhydrosugars, 1,3-Anhydrosugars, 1,4-Anhydrosugars 1,5-Anhydrosugars, 1,6-Anhydrosugars 2,3-Anhydrosugars, 2,5-Anhydrosugars 2,6-Anhydrosugars, 3,4-Anhydrosugars 3,6-Anhydrosugars, 4,6-Anhydrosugars, 5,6-Anhydrosugars, Dianhydrosugars, Other anhydrosugars, Dicarbonyl sugars, Polysaccharides, glycos-3-uloses, Dicarbonyl sugars, Tetroses, glycos4-uloses, Dicarbonyl sugars; glycos-5-uloses, Diuloses, Dialdoses, Pentitols, arabino-Pentoses, lyxo-Pentoses, ribo-Pentoses, xylo-Pentoses, Aldonic acids, Hexitols, Ketoacids, Cyclitols, Sugar phosphates, Glycuronic acids, Aldaric acids, Oligosaccharides, Aminodeoxyalditols, Higher acids, Other acids, Glycerol derivatives, Tetritols, and Disaccharides (see Carbohydrates, P. M. Collins (editor), Chapman and Hall Ltd, New York 1987, CRC Handbook of Oligosaccharides, Volumes I and II, CRC Press, Inc., Boca Raton, Fla., 1990, and Modern Carbohydrate Chemistry, R. W. Binkley, Marcel Dekker, Inc., New York, 1988, the contents of all of which are incorporated herein by cross reference). Further examples of stabilising agents include 1,2-O-Isopropylidene-6-thio-α-D-glucofuranose, 1,2-O-Isopropylidene-5-thio-α-D-xylofuranoset Methyl 2-acetamido-2-deoxy-5-thio-D-glucopyranoside, Methyl 2-deoxy-arabino-hexopyranoside; α-D-form, 3-O-Methylgalactose; D-form, Di-Et dithioacetal, Methyl α-D-glucothia-pyranoside, Methyl β-D-glucothia-pyranoside, Methyl tetra-O-acetyl-α-D-glucothiapyranoside, Methyl tetra-O-acetyl-β-D-glucothiapyranoside, 5'-S-Methyl-5'-thioadenosine, 2-Methylthioadenosine 5'-(dihydrogen phosphate), Methyl 5-thio-α-D-ribo-pyranoside, Methyl 5-thio-β-D-ribo-pyranoside, 1,2,3,4,6-Penta-O-acetyl-5-deoxy-5-mercapto-L-ido-pyranose 2,3,4,5,6-Penta-O-acetyl-D-galactose diethyldithioacetal, 2,3,4,5,6-Penta-O-acetyl-D-glucose diethyldithioacetal, Phenyl 2,3,4,6-tetra-O-acetyl-6-thio-α-D-gluco-pyranoside, Phenyl 2,3,4,6-tetra-O-acetyl-6-thio-β-D-gluco-pyranoside, 7-Ribofuranosyladenine; β-D-form, 2-Methylthio, D-Ribothiafuranose, L-Ribothiafuranose, α-D-Ribothiapyranose, 2,3,4,6-Tetra-O-acetyl-5-thio-α-D-glucopyranosyl bromide, Tetra-O-acetyl-5-thio-β-D-ribopyranose, 1,2,3,4-Tetra-O-acetyl-5-thio-α-D-xylopyranose, 1,2,3,4-Tetra-O-acetyl-5-thio-β-D-xylopyranose, 3,4,5,6-Tetra-O-benzoyl-D-glucose diethyldithioacetal, 3'-Thioadenosine, 9-(4-Thioarabinofuranosyl)-adenine; β-D-form, 5-Thioarabinose; L-Furanose-form, 5-Thioclucose, α-D-Pyranose-form, Penta-Ac, 5-Thioglucose; α-D-Pyranose-form, Me glycoside, 6-phosphate, 5-Thioglucose; β-D-Pyranose-form, Penta-Ac, 5-Thioglucose; β-D-Pyranose-form, 1-Bromo, tetra-Ac, 6-Thioglucose; β-D-Pyranose-form, 1,2,3,4,6-Penta-Ac, 5-Thioribose; β-D-Pyranose-form, 2-Thioridine, 4-Thioridine, 9-(4-Thioxylofuranosyl)-adenine; α-D-Pyranose-form, 9-(4-Thioxylofuranosyl)-adenine; β-D-form, 5-Thioxylose, 2,3,4-Tri-O-acetyl-1,6-di-S-benzoyl-1,6-dithio-β-D-glucopyranose, 3,5,6-Tri-O-benzoyl-D-glucose diethyldithioacetal, 2,7-Anhydro-1-deoxy,4,5-O-isopropyliden-β-D-ribo-hepto-2,3-diulo-2,6-pyranose, 1,5-Anhydro-2,3,4,6-tetra-O-benzoyl-L-threo-hex-4-enitol, 1,O-Benzoyl-L-fucitol, 1,3-O-Butylidene-L-fucitol, 1-Deoxy-threo-pentulose; D-form, 1,5-Dideoxy-1,5-imino-D-glucitol, 1,5-Dideoxy-1,5-(methyl-imino)-D-glucitol, 2,3:4,5-Di-O-isopropylidene-L-fucitol, manno-2-Heptulose; D-form, 1-Deoxy, 1,2,3,4,5-Penta-O-acetyl-L-fucitol, 1,2,3,4,5-Penta-O-benzoyl-L-fucitol, Rhodeitol, 3-Acetamideo-2,3,6-trideoxy-D-arabino-hexopyranose, Acosamine, 5'-(9-Adeninyl)-2',dideoxy-ribofuranosyladenine, Δ2-Amino-9-(2-deoxy-β-D-erythro-pentoruranosyl)purin-6-one, 3-Amino-2,3,6-trideoxy-arabino-hexose, D-Pyranose-form, 1,6-Anhydro-2,3-dideoxy-β-D-glycero-hexopyranos-4-ulose, 3-Benzamido-4-O-benzoyl-2,3,6-trideoxy-3-C-methyl-α-L-xylo-hexopyranose, Δ5-Bromo-2'dexoyuridine, Δ2'-Deoxyadenosine, Δ2'-Deoxycytidine, 2'-Deoxy-5-diazouridine, Δ2'-Deoxy-5-fluorineidine, 2'-Deoxy-L-guanosine, 2-Deoxy-arabino-hexose; α-D-pyranose-form, 2-Deoxy-arabino-hexose; β-D-pyranose-form, 2-Deoxy-lyxo-hexose; 2-Deoxy-ribo-hexose, 2-Deoxy-xylo-hexose, Δ2'-Deoxy-5-iodouridine, 6-Deoxy-3-O-methylallose; D-form Δ2'-Deoxy-5-methylcytidine, 9-(2-Deoxy-erythro-pento-furanosyl)adenine; 9-(2-Deoxy-erythro-pento-furanosyl)adenine; α-D-form, 9-(2-Deoxy-erythro-pento-furanosyl)adenine; α-L-form, 2-Deoxy-threo-pentose;

D-form, 2-(Deoxy-threo-pentose; L-form, 3-(2'-Deoxyribofuranosyl)-adenine; α-D-form, 3-(2'-Deoxyribofuranosyl)-adenine; α-L-form; β-D-form, 2'-Deoxyribofuranosylguanine; α-D-form, 2'-Deoxyribofuranosylguanine; β-D-form, 2'-Deoxyribofuranosylguanine; α-L-form, 2-Deoxyribose; D-form 2-Deoxyribose; L-form 2-Deoxyribose;DL-form Δ2'-Deoxyuridene, 2',3'-Dideoxyadenosine, 2',5'-Dideoxyadenosine, 3-(Dimethylamino)-2,3,6-trideoxy-lyxo-hexopyranose; Ethyl 3,6-anhydro-2-deoxy-4,5-O-isopropylidene-D-allo-heptonate, Ethyl 3-benzamido-3-C-methyl-2,3,6-trideoxy-α-L-lyxo-hexopyranoside, Ethyl 6-O-benzoyl-2,3-dideoxy-α-D-glycero-hexopyranosid-4-ulose, Ethyl 2,3-dideoxy-α-D-glycero-hexopyranosid-4-ulose, Forosamine, Javose, Methyl 3-acetamido-2,3,6-trideoxy-α-D-arabino-hexo-pyranoside, Methyl 3-acetamido-2,3,6-trideoxy-β-D-arabino-hexo-pyranoside, Methyl 4-(acetamido)-2,4,6-trideoxy-3-O-methyl-α-D-xylo-hexopyranoside, Methyl 4-acetamido-2,4,6-trideoxy-3-O-methyl-β-D-xylo-hexopyranoside, Methyl 3-amino-3-C-methyl-2,3,6-trideoxy-α-L-lyxo-hexo-pyranoside, Methyl 3-amino-2,3,6-trideoxy-3-C-methyl-α-xylo-hexopyranoside, Methyl 4-amino-2,4,6-tri-deoxy-3-O-methyl-α-D-xylo-hexopyranoside, Methyl 3,6-anhydrous-4,5,7-tri-O-benzyl-2-deoxy-allo-heptonate, Methyl 3-benzamido4-O-benzoyl-2,3,6-trideoxy-3-C-methyl-α-L-xylo-hexo-pyranoside, Methyl 3-benzamido-4-O-benzyl-2,3,6-trideoxy-3-C-methyl-α-L-xylo-hexo-pyranoside, Methyl 3-benzamido-2,3,6-trideoxy-3-C-methyl-α-L-xylo-hexopyranoside, Methyl 4,6-O-benzyl-2-deoxy-α-D-arabino-hexopyranoside, Methyl 4,6-O-benzylidene-2-deoxy-β-D-arabino-hexo-pyranoside, Methyl 4,6-O-benzylidene-2-deoxy-α-D-eythro-hexo-pyranosid-3-ulose, Methyl 4,6-O-benzylidene-2-deoxy-threo-hexopyranos-3-ulose; α-D-form, Methyl 4,6-O-benzylidene-2-deoxy-threo-hexopyranos-3-ulose; β-D-form, Methyl 4,6-O-benzylidene-α-D-lyxo-hexopyranoside, Methyl 4,6-benzylidene-β-D-lyxo-hexopyranoside, Methyl 2-deoxy-3,4-O-cyclo-hexylidene-β-D-erythro-pento-pyranoside, Methyl 2-deoxy-α-D-arabino-hexofuranoside, Methyl 2-deoxy-arabino-hexopyranoside; β-D-form, Methyl 2-deoxy-α-D-lyxo-hexo-pyranoside, Methyl 6-deoxy-2-O-methyl-α-D-allopyranoside, Methyl 6-deoxy-2-O-methyl-β-D-allopyranoside, Methyl 6-deoxy-3-O-methyl-α-D-allopyranoside, Methyl 2-dexoy-erythro-pento-furanoside; α-D-form, Methyl 2-deoxy-erythro-pento-pyranoside; α-D-form, Methyl 2-deoxy-erythro-pento-pyranoside; α-L-form, Methyl 2-deoxy-erythro-pento-pyranoside; β-L-form, Methyl 2-deoxy-5-O-trityl-α-D-erythro-pentopyranoside; β-L-form, Methyl 2-deoxy-5-O-trityl-β-D-erythro-pentpyranoside Methyl 2,3-dideoxy-β-D-glycero-hexopyranosid-4-ulose, Methyl 2,6-dideoxy-L-erythro-hexopyranosid-3-ulose; α-L-form, Methyl 2,6-dideoxy-4-O-methyl-α-L-erythro-hexopyrano-sid-3-ulosee, Methyl 2,6-dideoxy-4-O-methyl-β-L-erythro-hexopyrano-sid-3-ulose, Methyl 3-(dimethylamino)-2,3,6-trideoxy-α-D-lyxo-hexopyranoside, Rhodosamine, 1,3,5,6-Tetra-O-acetyl-2-deoxy-α-D-arabino-hexo-furanose, 1,3,4,6-Tetra-O-acetyl-2-deoxy-β-D-arabino-hexo-pyranose, 1,3,4,6-Tetra-O-acetyl-2-deoxy-α-D-arabino-hexo-pyranose, 1,3,5-Tri-O-benzoyl-2-deoxy-α-D-erythro-pentofuranose, 1,3,5-Tri-O-benzoyl-2-deoxy-β-D-erythro-pentofuranose, 1,3,4-Tri-O-benzol-2-deoxy-α-D-erythro-pentopyranose, 1,3,4-Tri-O-benzoyl-2-deoxy-β-D-erythro-pentopyranose, 1,3,4-Tri-O-benzoyl-2-deoxy-erythro-pentose, 3-Deoxy sugars, 2-Amino-2,3-dideoxy-ribo-hexopyranose; D-form, 1,6-Anhydro-3-deoxy-β-D-erythro-hexopyranos-4-ulose, 1,6-Anhydro-3-deoxy-β-D-threo-hexopyranos-4-ulose, 1,6-Anhydro-2,3-dideoxy-β-D-glycero-hexopyranos-4-ulose, Benzyl 4,6-O-benzylidene-3-deoxy-α-D-erythro-hexo-pyranosid-2-ulose, ΔCordycepin, Cordycepose, 3-Deoxy-1,2:5,6-di-O-iso-propylidene-α-D-xylo-hexo-pyranose, 3-Deoxy-D-arabino-hexonic acid, 3-Deoxy-D-ribo-hexonic acid, 3-Deoxy-xylo-hexonic acid, 3-Deoxy-xylo-hexonic acid, 3-Deoxy-D-arabino-hexono-1,4-lactone, 3-Deoxy-D-ribo-hexono-1,4-lactone, 3-Deoxy-D-xylo-hexono-1,4-lactone, 3-Deoxy-D-ribo-hexopyranose; α-D-form, 3-Deoxy-D-ribo-hexopyranose; β-D-form, 3-Deoxy-arabino-hexose; D-form, 3-Deoxy-lyxo-hexose; D-form, 3-Deoxy-arabino-hexose; L-form, Dimethyl dithioacetal, 3-Deoxy-xylo-hexose; D-form, 3-Deoxy-enythro-hexos-2-ulose; D-form, 3-Deoxy-1,2-O-isopropylidene-ribo-hexafuronose; α-D-form, 3-Deoxy-1,2-O-isopropylidene-6-O-trityl-α-D-ribo-hexofuronose; 3-Deoxy-enthro-pentose; L-form, 3-Deoxy-2,4,6-tri-O-benzoyl-D-arabino-hexono-1,5-lactone 2,6-Diacetamido-2,3,4,6-tetradeoxy-D-erythro-hexose diethyl dithioacetal, 2,4-Di-O-acetyl- 1,6-anhydro-3-deoxy-β-D-ribo-hexo-pyranoside, 2',3'-Dideoxyadenosine, Ethyl 6-O-benzoyl-2,3-dideoxy-α-D-glycero-hexopyranosid-4-ulose, Ethyl 2,4-diacetamido-2,3,4,-6-tetradeoxy-β-D-arabino-hexo-pyranoside, Ethyl 2,6-diacetamide-2,3,4,-6-tetradeoxy-α-D-erythro-hexopyranoside, Ethyl 2,6-diacetamido-2,3,6-trideoxy-α-D-ribo-hexo-pyranoside, Ethyl 2,3-dideoxy-α-D-glycero-hexopyranoside-4-ulose, Forosamine, Methyl 2-acetamido-4,6-O-benzylidene-2,3-dideoxy-α-D-ribo-hexopyranoside, Methyl 2-amino-2,3-dideoxy-α-D-ribo-hexopyranoside, Methyl 2-benzamido-2,3-dideoxy-β-D-ribo-hexopyranoside, Methyl 4,6-O-benzylidene-3-deoxy-α-D-ribo-hexo-pyranoside, Methyl 4,6-O-benzylidene-3-deoxy-β-D-ribo-hexo-pyranoside, Methyl 4,6-O-benzylidene-3-deoxy-erythro-hexopyranosid-2-ulose, Methyl 4,6-O-benzylidene-3-deoxy-α-D-threo-hexo-pyranosid-2-ulose, Methyl 4,6-O-benzylidene-3-deoxy-β-D-threo-hexo-pyranosid-2-ulose, Methyl 3-deoxy-α-D-ribo-hexo-pyranoside, Methyl 3-deoxy-α-D-xylo-hexo-pyranoside, Methyl 3-deoxy-α-D-threo-hexopyranosid-2-ulose, Methyl 3-deoxy-β-D-threo-hexopyranosid-2-ulose, Methyl 3-deoxy-α-D-erythro-pentofuranoside, Methyl 3-deoxy-β-D-erythro-pentopyranoside, Methyl 3-deoxy-α-L-erythro-pentopyranoside, Methyl 3-deoxy-β-D-erythro-pentopyranoside, Methyl 2,4-diacetamido-2,3,-4,6-tetradeoxy-β-D-arabino-hexopyranoside, Methyl 2,6-diacetamido-2,3,-6-trideoxy-α-D-ribo-hexo-furanoside, Methyl 2,6-diacetamido-2,3,-6-trideoxy-α-D-ribo-hexo-pyranoside, Methyl 2,6-diamino-2,3,4,6,-tetradeoxy-α-D-erythro-hexopyranoside, Methyl 2,3-dideoxy-β-D-glycero-hexopyranosid-4-ulose, Methyl 3,6-dideoxy-α-L-threo-hexopyranosid-2-ulose, Methyl 3,4-dideoxy-4-C-methyl-6-O-trityl-α-D-threo-hexopyranosid-2-ulose, Phenyl 4,6-O-benzylidene-3-deoxy-β-D-threo-hexo-pyranosid-2-ulose, Phenyl 3-deoxy-β-D-ribo-hexopyranoside, Phenyl 3-deoxy-β-D-threo-hexopyranosid-2-ulose, 1,2,4,6-Tetra-O-acetyl-3-deoxy-α-D-xylo-hexo-pyranose, 1,2,4,6-Tetra-O-acetyl-3-deoxy-β-D-xylo-hexopyranose, 1,2,4,6-Tetra-O-acetyl-3-deoxy-α-D-ribo-hexo-pyranose, 4-Acetamido4-deoxy-α-D-glucopyranoside, 4-Amino-4-deoxyglucose; D-form, 1,6-Anhydro-3,4-dideoxy-β-D-glycero-hexopyranose-2-ulose, 4-Deoxy-xylo-hexose, 4-Deoxy-erythro-pentopyranose; L-form, 4-Deoxy-erythro-pento-pyranose; DL-form, 2,6-Diacetamido-2,3,4,6-tetradeoxy-D-erythro-hexose diethyl dithioacetal, Ethyl 4-deoxy-β-L-erythro-pentopyranoside, Ethyl 2,6-diacetamido-2,3,4,6-tetradeoxy-α-D-erythro-hexopyranoside, Ethyl 3,4,6-trideoxy-3-dimethylamino-α-

D-xylo-hexopyranoside, Ethyl 3,4,6-trideoxy-3-dimethylamino-β-D-xylo-hexopyranoside, Lyxosylamine, β-D-Pyranose-form, N-Ac, Lyxosylamine, β-D-Pyranose-form, N,2,3,4-Tetra-Ac, Methyl 4-deoxy-α-D-xylo-hexopyranoside, Methyl 4-deoxy-β-D-xylo-hexopyranoside, Methyl 4-deoxy-β-L-erythro-pentopyranoside, Methyl 2,6-diamino-2,3,4,6-tetradeoxy-α-D-erythro-hexopyranoside, Methyl 4,6-dideoxy-4-dimethylamino-α-D-gluco-pyranoside, Methyl 4,6-dideoxy-4-dimethylamino-β-D-gluco-pyranoside, Methyl 3,4-dideoxy-4-C-methyl-6-O-trityl-α-D-threo-hexopyranoside, Methyl 2,3,6-tri-O-acetyl-4-deoxy-α-D-xylo-hexo-pyranoside, 1,2,3,6-Tetra-O-acetyl-4-deoxy-α-L-threo-hex-4-enopyranose, 1,2,3,6-Tetra-O-acetyl-4-deoxy-α-L-threo-hex-4-enopyranose 1,2,3,6-Tetra-O-acetyl-4-deoxy-β-D-threo-hexo-pyranose 1,2,3,6-Tetra-O-acetyl-4-deoxy-α-L-threo-hex-4-enopyranose, 2,3,4-Tri-O-acetyl-β-D-lyxopyranosylamino, 3,4,6-Trideoxy-3-dimethylamino-xylo-hexose, 5'-(9-Adeninyl)-2',5'-dideoxyribofuranosyladenine; β-D-form, 5-Deoxyarabinose; L-form, 5'-Deoxy-5'-bromouridine, 5'-Deoxy-2-fluroadensine, 5-Deoxy-ribo-hexose, 5-Deoxy-xylo-hexose, 5-Deoxy-1,2-O-isopropylidene-α-D-xylo-hexofuranoside, 5-Deoxy-1,2-O-iso-propylidene-α-D-erythro-pentofuranos-3-ulose, 5-Deoxy-1,2-O-iso-propylidene-β-D-threo-pentofuranos-3-ulose, 5-Deoxy-1,2-O-iso-propylidene-α-D-threo-pentofuranos-3-ulose, 3,6-Di-O-benzoyl-5-deoxy-1,2-O-isopropylidene-α-D-ribo-hexofuranoside, 2',5'-Dideoxyadenosine, Methyl 2,3-anhydro-5-deoxy-α-D-ribofuranoside, Methyl 2,3-anhydro-5-deoxy-β-D-ribofuranoside, Methyl 2,3-anhydro-β-D-erythro-pentopyranoside, Methyl 2,3-anhydro-β-L-erythro-pentopyranosid-4-ulose, Methyl 5-deoxy-2,3-O-ispropylidene-β-D-ribo-hexofuranoside, Methyl 2-deoxy-5-O-trityl-α-D-glycero-pentofuranosid-3-ulose, Methyl 2-deoxy-5-O-trityl-β-D-glycero-pentofuranosid-3-ulose, Methyl 2,3-O-isopropylidene-β-L-erythro-pentopyranosid-4-ulose, Streptose, 3-Acetamido-2,3,6-trideoxy-D-lyxo-hexose, 3-O-Acetyl-2,6-dideoxy-lyxo-hexopyranose, ΔAklavine, 4-Amino-2,4,6-trideoxy-3-O-methyl-arabino-hexose, Aexonse, 3-Benzamido-2,3,6-trideoxy-D-lyxo-hexose, 3-Benzamido-2,3,6-trideoxy-L-lyxo-hexose, Cladinose, Curacin, Cymaronic acid,D-form, Cymaronic acid,D-form, 1,5-Lactone, 5-Me Cymaronic acid, D-form, 1,5-Lactone, 4-Me, Cymarose, Daunosamine, 2,6-Dideoxy-arabino-hexo-pyranose, D-form, 2,6-Didexoy-arabino-hexo-pyranose, L-form, 2,6-Didexoy-lyxo-hexose, 2,6-Didexoy-ribo-hexose, 2,6-Didexoy-xylo-hexose, 2,6-Didexoy-3-O-methyl-D-ribo-hexono-1,4-lactone, 2,6-Didexoy-4-O-methyl-lyxo-hexopyranose, 2,6-Didexoy-3-C-methyl-ribo-hexose, D-form, 2,6-Didexoy-3-C-methyl-ribo-hexose, DL-form, 2,6-Didexoy-3-C-methyl-lyxo-hexose, D-form, 2,6-Didexoy-3-C-methyl-lyxo-hexose, L-form, 2,6-Didexoy-3-O-methyl-ribo-hexose, D-form, 4-Dimethylamino-2,3,4,6-tetradeoxy-threo-hexose, 3-Dimethylamino-2,3,6-tetradeoxy-arabino-hexose, Ethyl 2,4,6-β-L-arabino-hexopyranoside, Evermicose, Kijanose, Methyl 4-acetamido-3-O-methyl-2,4,6-trideoxy-β-D-ribo-hexopyranoside, Methyl 4-acetamido-2,4,6-trideoxy-3-O-methyl-α-L-arabino-hexopyranoside, Methyl 4-acetamido-2,4,6-trideoxy-3-O-methyl-β-L-arabino-hexopyranoside, Methyl 4-acetamido-2,4,6-trideoxy-3-O-methyl-α-D-ribo-hexopyranoside, Methyl 3-O-acetyl-2,6-dideoxy-α-D-lyxo-hexo-pyranoside, Methyl 3-O-acetyl-2,6-dideoxy-α-D-xylo-hexo-pyranoside, Methyl 4-C-acetyl-2,6-dideoxy-β-L-xylo-hexopyranoside, Methyl 3-amino-2,3,6-trideoxy-α-L-lyxo-hexoside, Methyl 2,6-dideoxy-α-D-arabino-hexopyranoside, Methyl 2,6-dideoxy-β-D-arabino-hexopyranoside, Methyl 2,6-dideoxy-α-D-ribo-hexopyranoside, Methyl 2,6dideoxy-α-D-xylo-hexopyranoside, Methyl 2,6-dideoxy-3-C-methyl-α-D-ribo-hexo-pyranoside, Methyl 2,6-dideoxy-3-C-methyl-α-L-ribo-hexo-pyranoside, Methyl 2,6-dideoxy-3-C-methyl-α-L-xylo-hexo-pyranoside, Methyl 2,6-dideoxy-3-C-methyl-β-L-xylo-hexo-pyranoside, Methyl 2,6-dideoxy-3-C-methyl-α-L-lyxo-hexo-pyranoside, Methyl 2,6-dideoxy-3-O-methyl-α-D-ribo-hexo-pyranoside, Methyl 2,6-dideoxy-3-O-methyl-α-D-xylo-hexo-pyranoside, Methyl 2,6-dideoxy-3-O-methyl-β-D-xylo-hexo-pyranoside, Methyl 2,6-dideoxy-4-O-methyl-α-D-lyxo-hexo-pyranoside, Methyl 2,6-dideoxy-4-O-methyl-α-D-lyxo-hexo-pyranoside, Methyl 2,6-dideoxy-3-C-methyl-3-O-methyl-α-D-ribo-hexopyranoside, Methyl 2,6-dideoxy-3-C-methyl-3-O-methyl-α-L-ribo-hexopyranoside, Methyl 4-(dimethylamino)-2,3,4,6-tetradeoxy-α-D-threo-hexopyranoside, Methyl 4-(dimethylamino)-2,3,6-tetradeoxy-β-D-arabino-hexopyranoside, Methyl 4-(dimethylamino)-2,3,6-tetradeoxy-α-D-arabino-hexopyranoside, Methyl 2,3,6-trideoxy-4-C-benzoylmethylcarbonyl-α-D-threo-hexopyranoside, Methyl 2,3,6-trideoxy-4-C-benzoylmethylcarbonyl-α-L-threo-hexopyranoside, Mitiphyline, Mycarose, Mycosamine, v-Octose, v-Octose; 1,1'-Anhydro, Oleandrose, D-form, Oleandrose, L-form, Olivomycose, Ristosamine, Sarmentose, 3,6-Dideoxy-D-arabino-hexose, 3,6-Dideoxy-L-arabino-hexose, 3,6-Dideoxy-ribo-arabino-hexose, D-form, 3,6-Dideoxy-xylo-arabino-hexose, D-form, 3,6-Dideoxy-xylo-arabino-hexose, L-form, 3,6-Dideoxy-1,2-O-iso-propylidene-α-D-ribo-hexofuranose, 3,6-Dideoxy-1,2-O-iso-propylidene-xylo-hexo-furanoside, 4-Dimethylamino-2,3,4,6-tetradeoxy-threo-hexose; D-form, Methyl 3,6-dideoxy-α-D-arabino-hexopyranoside, Methyl 3,6-dideoxy-,-D-arabino-hexopyranoside, Methyl 3,6-dideoxy-D-xylo-hexopyranoside, Methyl 3,6-dideoxy-β-L-xylo-hexopyranoside, Methyl 3,6-dideoxy-α-L-threo-hexopyranosid-2-ulose, Methyl 4-(dimethylamino)-2,3,4,6-tetradeoxy-α-D-threo-hexopyranoside, AD 11, 4,6-Dideoxy-3-O-methyl-xylo-hexose; D-form, 4,6-Dideoxy-3-O-methyl-xylo-hexose; β-D-form, Amicetose, 2-Amino-2,3,4,6-tetradeoxy-6-methylamino-D-ribo-heptose, 4,5-Dihydroxyhexanal, Ethyl 2,3,6-trideoxy-D-erythro-hexopyranose, Methyl 2,6-diacetamido-2,3,4,6,7-pentadeoxy-α-DL-ribo-heptopyranoside, Methyl 2,3,6-trideoxy-D-erythro-hexopyranoside, Methyl 2,3,6-trideoxy-α-D-glycero-hexopyranosid-4-ulose, Methyl 2,3,6-trideoxy-α-L-glycero-hexopyranosid-4-ulose, Methyl 3,4,6-trideoxy-4-C-methyl-α-L-threo-hexo-pyranosid-2-ulose, Multistriatin, Purpurosamine B, Rhodinose, 2',3',5'-Trideoxyadenosine, 6-Deoxyallose; 6-Deoxy-2,3-di-O-methyl-allose; D-form, Methyl 2,3-anhydro-5-O-benzyl-6-deoxy-α-D-allofuranoside, Methyl-β-D-mycinoside, 6-Deoxyaltrose; D-form, 6-Deoxyaltrose; L-form, 6-Deoxy-3-O-methylaltrose; L-form, 6-Deoxy-4-O-methylaltrose; D-Pyranose-form, Methyl 6-deoxy-4-O-methyl-α-D-altropyranoside, Methyl 6-deoxy-4-O-methyl-β-D-altropyranoside, 1,2,4-Tri-O-acetyl-6-deoxy-3-O-methyl-α-L-altro-phyranoside, 4-Amino-4,6-dideoxygalactose; D-Pyranose-form, 4-Aminophenyl fucopyranoside; α-L-form, 4-Aminophenyl 1-thio-β-D-fucopyranoside, 4-Aminophenyl 1-thio-α-L-fucopyranoside, 4-Aminophenyl 1-thio-β-L-fucopyranoside, 6-Deoxy-3-O-methylgalactose; D-form, 6-Deoxy-3-O-methylgalactose; L-form, 6-Deoxy-4-O-methylgalactose; D-form, 2,4-Diacetamido-2,4,6-trideoxy-D-galactose, Fuconic acid, D-form, Fuconic acid, L-form, D-Fucose, D-Fucose; α-Pyranose-form, L-Fucose, 3,4-O-Isopropylidene-α-D-fucopyranose, 1,2-O-Isopropylidene-3-O-α-D-fucofuranoside, 1-O-N-Methylacetimidyl-2,3,4-tri-O-benzylfucopyranose; β-L-form, Methyl 4-amino4,6-dideoxy-α-D-galactopyranoside, Methyl 2-O-benzyl-3,4-O-isopropylidene-α-L-fucopyranoside, Methyl α-L-fucopyranoside, Methyl D-fucopyranoside; α-form, Methyl D-fucopyranoside; β-form, Methyl L-fucopyranoside; α-form, Methyl L-fucopyranoside; β-form, Methyl 3,4-O-isopropylidene-fucopyranoside; α-form, Methyl 3,4-O-isopropylidene-2-O-tosyl-α-L-fuco-pyranoside, Methyl 3-O-methyl-α-D-fuco-pyranoside, Methyl α-L-rhamnopyranoside, Methyl 2,3,4-tri-O-acetyl-α-D-fucopyranoside, Methyl 2,3,4-tri-O-acetyl-β-D-fucopyranoside Methyl 2,3,4-tri-O-acetyl-α-L-fucopyranoside, Methyl 2,3,4-tri-O-acetyl-β-L-fucopyranoside, Methyl 2,3,4-tri-O-acetyl-α-L-rhamnopyranoside, Methyl 2,3,4-tri-O-benzoyl-α-L-fucopyranoside, Methyl 2,3,4-tri-O-benzyl-α-L-fucopyranoside, 1,2,3,4-Tetra-O-acetyl-α-D-fucopyranose, 1,2,3,4-Tetra-O-acetyl-β-D-fucopyranose, 1,2,3,4-Tetra-O-acetyl-α-L-fucopyranose, 1,2,3,4-Tetra-O-acetyl-β-L-fucopyranose, 4-Acetamido-2-amino-2,4,6-trideoxy-D-glucose, 2-Acetamido-1,4-anhydro-2-deoxy-5,6-O-Isopropylidene-arabino-hex-1-enitol, D-form, 2-Amino-2,6-dideoxyglucose; D-form, 2-Amino-2,6-dideoxyglucose; L-form, 2-Amino-2,6-dideoxyglucose; L-form, N-Me, 3-Amino-3,6-dideoxyglucose; D-form 3-Amino-3,6-dideoxyglucose; L-form 4-Aminophenyl fucopyranoside; α-D-form, 6-(4-Azido-3,5-diiodo-2-hydroxybenzamido)-6-deoxy-glucose, D-form, Benzyl 2,4-diacetamido-2,4,6-trideoxy-α-D-glucopyranoside, Cerberose, 6-Deoxy-1,2:3,5-di-O-isopropylidene-α-D-gluco-furanose, 6-Deoxy-3,5-di-O-mesyl-1,2-α-isopropylidene-α-D-gluco-furanose, 6-Deoxy-2,4:3,5-di-O-methylene-D-glucitol, 6-Deoxy-2,4:3,5-di-O-methylene-L-glucitol, 6-Deoxyglucose; α-D-Pyranose-form, 6-Deoxy-1,2-O-isopropylidene-glucofuranose; α-D-form, 6-Deoxy-2,4-O-methylene-D-glucitol, 6-Deoxy-2,4-O-methylene-L-glucitol, 6-Deoxy-3-α-methylglucose; D-form, 2,4-Diacetamido-1,3-di-O-acetyl-2,4,6-trideoxy-D-glucopyranose, 6-Dideoxy-3-dimethylamino-glucose; β-L-Pyranose-form, 4,6-Dideoxy-4-methylamino-α-D-glucopyranoside, Methyl 3-acetamido-3,6-dideoxy-α-L-glucopyranoside, Methyl 3-acetamido-3,6-dideoxy-β-L-2glucopyranoside, 2,4-Diacetamido-2,4,6-tri-deoxy-D-glucose, 3,5-Di-O-1-enzyl-6-deoxy-1,2-O-isopropylidene-α-D-gluco-furanose, 3,6-Dideoxy-3-dimethylamino-glucose; β-D-Pyranose-form, 6-Deoxy-3-dimethylamino-glucose; β-L-Pyranose-form, 4,6-Dideoxy-4-methylamino-α-D-glucopyranoside, Methyl 3-acetamido-3,6-dideoxy-α-L-gluco-pyranoside, Methyl 3-acetamido-3,6-dideoxy-β-L-glucopyranoside, Methyl 3-acetamido-3,6-dideoxy-β-L-glucopyranoside, Methyl-3-amino-3,6-dideoxy-α-D-glucopyranoside, Methyl-3-amino-3,6-dideoxy-β-L-glucopyranoside, Methyl-3-amino-3,6-dideoxy-α-L-gluco-pyranoside, Methyl-3-amino-3,6-dideoxy-α-D-glucopyranoside, Methyl-6-dideoxy-α-D-gluco-pyranoside, Methyl-6-dideoxy-β-D-gluco-pyranoside, Methyl-6-dideoxy-3-O-methyl-α-D-gluco-pyranoside, Methyl-6-dideoxy-3-O-methyl-β-D-gluco-pyranoside, Methyl 3,6-dideoxy-3-dimethylamino-α-D-gluco-pyranoside, Methyl 3,6-dideoxy-3-dimethylamino-α-L-gluco-pyranoside, 1,2,3,4,5-Penta-O-acetyl-6-deoxy-D-glucitol, 1,2,3,4,5-Penta-O-acetyl-6-deoxy-L-glucitol, Pyolipic acid, 1,2,3,4-Tetra-O-acetyl-6-deoxy-α-D-glucopyranose, 1,2,3,4-Tetra-O-acetyl-6-deoxy-β-D-glucopyranose, 1,2,3,4-Tetra-O-acetyl-6-deoxy-α-L-glucopyranose, 1,2,3,4-Tetra-O-acetyl-6deoxy-β-L-glucopyranose, 1,2,4-Tri-O-acetyl-6-deoxy-3-O-methyl-α-D-glucopyranose, 1,2,4-Tri-O-acetyl-6-deoxy-3-O-methyl-β-D-glucopyranose, 1,2,4-Tri-O-acetyl-6-deoxy-3-O-methyl-α-L-glucopyranose, 1,2,4-Tri-O-acetyl-6-deoxy-3-O-methyl-β-L-glucopyranose, Viosamine, 6-Deoxyguloses; D-form, 6-Deoxyguloses; L-form, 6-Deoxy-1,2-O-isopropylidene-3-O-methyl-α-D-gulofuranose, 6-Deoxy-3-O-methylgulose, Methyl-4-O-acetyl-2,3-anhydro-6-deoxy-α-D-gulopyranoside, Methyl-4-O-acetyl-2,3-anhydro-6-deoxy-β-D-gulopyranoside, Methyl-2,3-anhydro-6-deoxy-α-D-gulopyranoside, Methyl-2,3-O-isopropylidene-α-D-gulopyranoside, 1,2,3,4-Tetra-O-acetyl-6-deoxy-β-D-gulopyranoside, 6-Deoxyidose; D-form, 6-Deoxyidose; L-form, 6-Deoxyidose; β-L-Furanose-form, 1,2-O-Isopropylidene, di-Ac, 6-Deoxy-1,2-O-isopropylidene-β-L-idofuranose, Methyl 6-deoxy-β-L-idopyranoside, 2-Acetamido-2,6-dideoxy-D-galactose, 2-Acetamido-2,6-dideoxy-L-galactose, 2-Amino-2,6-dideoxygalactose; L-form, 2-Amino-2,6-dideoxygalactose; D-form, 2-Amino-2,6-dideo~ygalactose; DL-form 2-Amino-2,6-dideoxcymannose; L-form, 4-Amino-4,6-dideoxcymannose; D-form, Benzyl 2,3-O-endo-benzylidene-α-L-rhamnoside, Benzyl 2,3-exo-benzylidene-α-L-rhamnoside, Benzyl rhamnoside; α-L-Pyranose-form, Benzyl 2,3,4-tri-α-acetyl-α-L-rhamnopyranoside, 6-Deoxymannonic acid; L-form, 6-Deoxy-3-O-methylmannose; L-form, 6-deoxy-2,3,4-tri-O-acetyl-α-L-mannopyranosyl chloride, 1,2:3,5-Di-O-methylene-rhamnofuranose; β-L-form, Ethyl rhamnofuranoside; α-L-form, Isodulcitol, 2,3-O-Isopropylidene-rhamnofuranose; α-L-form, 2,3-O-Isopropylidene-rhamnofuranose; β-L-form, 2,3-O-Isopropylidene-5-O-tosyl-β-L-rhamnofuranose, Methyl 3-acetamido-3,6-dideoxy-β-L-rhamnofuranose, Methyl 3-amino-3,6-dideoxy-α-D-mannopyranoside, Methyl 3-amino-3,6-dideoxy-α-D-mannopyranoside, Methyl 4-amino4,6-dideoxy-α-D-mannopyranoside, Methyl 4-amino-4,6-dideoxy-α-L-mannopyranoside, Methyl 2,3-anhydro-6-deoxy-α-D-mannopyranoside, Methyl 2,3-O-isopropylidene4-O-mesyl-α-L-rhamnoside, Methyl 2,3-O-isopropylidene-α-L-rhamnofuranose, Methyl 2,3-O-isopropylidene-α-D-rhamnopyranoside, Methyl 2,3-O-isopropylidene-α-L-rhamnopyranoside, Methyl 2,3-O-isopropylidene-5-O-tosyl-α-D-rhamno-furanoside, Methyl 2,3-O-isopropylidene-5-O-tosyl-α-L-rhamno-furanoside, Methyl 2,3-O-isopropylidene-5-O-tosyl-β-L-rhamno-furanoside, Methyl 2,3-O-isopropylidene-5-O-tosyl-α-L-rhamno-furanoside, Methyl rhamnofuranoside; α-L-form, Methyl α-D-rhamnofuranoside; Methyl β-L-rhamnofuranoside; Methyl 2,3,4-tri-O-acetyl-β-L-rhamnopyranoside; Phenyl 6-deoxy-α-L-mannopyranoside, Phenyl 6deoxy-β-L-mannopyranoside, L-Rhamnonamide, L-Rhamnono-1,4-lactone, L-Rhamnono-1,5-lactone, Rhamnose; D-form, Rhamnose; α-L-form, Rhamnose; α-L-Pyranose-form, Phenyl glycoside, tri-Ac, Rhamnosylamine; L-Pyranose-form, 1,2,3,4-Tetra-O-acetyl-6-deoxy-α-L-mannopyranose, 1,2,3,4-Tetra-O-acetyl-6-deoxy-β-L-mannopyranose, 3-Acetamido-3,6-dideoxy-D-talose, Acovenose, D-form, Acovenose, L-form, 2-Amino-2,6-dideoxytalose; D-form, 3-Amino-3,6-dideoxytalose; D-form, 3-Amino-3,6-dideoxytalose; L-form, 6-Deoxy-D-talitol, 6-Deoxy-L-talitol, 6-Deoxytalose, D-form, 6-Deoxytalose, L-form, 6-Deoxytalose, L-Pyranose-form, 1,4-Di-O-acetyl-6-deoxy-2-O-methyl-3-C-methyl-α-L-talopyranose, 1,4-Di-O-acetyl-6-deoxy-2-O-methyl-3-C-methyl-β-L-talopyranose, Methyl 3-acetamido-3,6-dideoxy-α-D-talopyranoside, Methyl 3-acetamido-3,6-dideoxy-α-L-talopyranoside, Methyl 6-deoxy-2,3-O-isopropylidene-α-L-talofuranoside, Methyl 6-deoxy-2,3-O-isopropylidene-α-L-talofuranoside, Methyl 6-deoxy-2-O-methyl-α-L-talofuranoside, Methyl 6-deoxy-α-L-talo-furanoside, Methyl 2,3,4-tri-O-acetyl 6-deoxy-α-D-talofuranoside, Methyl 2,3,4-tri-O-acetyl 6-deoxy-α-L-talofuranoside, Pneumosamine, Vinelose, ΔAmphotericin B, 1,5-Anhydro-2,6-dideoxy-D-ribo-hex-1-enitol, Benzyl 6-deoxy-2,3-O-isopropylidene-α-L-lyxo-pyranosid-4-ulose, 6-Deoxy-L-gulal, 6-Deoxy-arabino-hexos-5-ulose, D-form, 6-Deoxy-1,2-O-isopropylidene-β-D-arabino-hexofuranos-5-ulose, 6-Deoxy-4-O-methyl-L-gulal, 3,4-Di-O-acetyl-6-deoxy-D-allal, 5,6-Dideoxy-3-O-benzyl-1,2-O-isopropylidene-α-D-hex-5-enofuranose, 6',6'-Dideoxyhexabenzoyl-sucrose, 5',6'-Dideoxy-1,2-O-isopropylidene-α-D-xylo-hex-5-enofuranose, 5',6'-Dideoxy-1,2-O-isopropylidene-3-O-methyl-α-D-xylo-hex-5-enofuranose, Methyl 2,3-anhydro-6-deoxy-α-D-ribo-hexopyranosid-4-ulose, Methyl 3-bromo-3,6-deoxy-α-D-xylo-hexopyranosid-4-ulose, Methyl 6-deoxy-2,3-di-O-methyl-α-D-ribo-hexo-pyranosid-4-ulose, Methyl 6-deoxy-2,3-di-O-methyl-o-D-xylo-hexo-pyranosid-4-ulose, Methyl 3-C-methyl-6-deoxy-α-D-ribo-hexo-pyranosid-4-ulose, Noviose 2-Acetamido-3-O-(2-acetamido-2,3-dideoxy-5,6-O-iso-propylidene-D-erythro-hex-2-enofuranosyl)-1,4-anhydro-2-deoxy-5,6-O-isopropylidene-D-arabino-hex-1-enitol, 2-Acetamido-3-O-(2-acetamido-2,3-dideoxy-5,6-O-iso-propylidene-β-D-erythro-hex-2-enofuranosyl)-1,4-anhydro-2-deoxy-5,6-O-iso-propylidene-D-arabino-hex-1-enitol, 2-Acetamido-1,2-dideoxy-D-arabino-hex-1-enitol, 4-O-Acetyl-6-deoxy-3-O-methyl-D-glucal, 4-O-Acetyl-3-O-methyl-L-rhamnal, 2-Actamido-1,4-anhydro-2-deoxy-5,6-O-isopropylidene-D-arabino-hex-1-enitol, Allal; D-form, Allal; D-form, 4,6-O-Benzylidene, 1,5-Anhydro-2-azido-2-deoxy-D-ribo-hex-1-enitol, 2,6-Anhydro-1-deoxy-galacto-hept-1-enitol; D-form, 2,6-Anhydro-1-deoxy-gluco-hept-1-enitol; D-form, 1,4-Anydro-2-deoxy-arabino-hex-1-enitol; D-form, 5,6-O-Isopropylidene, 1,4-Anhydro-2-deoxy-5-O-methoxymethyl-D-erythro-pent-1enitol, 2,6-Anhydro-1-deoxy-3,4,5,7-tetra-O-acetyl-D-gluco-hept-1-enitol, 1,5-Anhydro-2,6-dideoxy-D-ribo-hex-1-enitol, 3,6-Anhydro-1,2-dideoxy-4,5-O-isopropylidene-D-arabino-hex-1-enitol, 3,7-Anydro-1,2-dideoxy-D-glycero-L-manno-1-octenitol; 5,6,8-Tribenzyl, Arabinal; D-form, Arabinal; L-form, 4,6-O-Benzylidene-1,2-dideoxy-threo-hex-1-enopyranos-3-ulose; D-form, 4,6-O-Benzylidene-1,2-dideoxy-2-C-methyl-ribo-hex-1-enopyranos-3-ulose; D-form, Cellobial, Daucic acid, 6-Deoxy-L-gulal, 6-Deoxy-4-O-methyl-L-gulal, 3,4-Di-O-acetyl-D-arabinal, 3,4-Di-O-acetyl-L-arabinal, 3,4-Di-O-acetyl-6-deoxy-D-allal, 3,4-Di-O-acetyl-L-fucal, 4,6-Di-O-acetyl-3-O-methyl-D-glucal, 3,4-Di-O-acetyl-L-rhamnal, 3,4-Di-O-acetyl-D-xylal, 2,6:3,4-Dianhydro-1-deoxy-talo-hept-1-enitol; 3,4-Di-O-benzoyl-D-arabinal, 3,5:4,6-Di-O-benzylidene-1,2-dideoxy-L-xylo-hex-1-enitol, 1,2-Dideoxy-3,5:4,6-di-O-ethylidene-L-xylo-hex-1-enitol, 1,2-Dideoxy-arabino-hex-1-enitol; D-form, 1,2-Dideoxy-arabino-hex-1-entiol; D-form, 3,4:5,6-Di-O-isopropylidene, 1,2-Dideoxy-xylo-hex-1-enitol; L-form, 1,2-Dideoxy-erythro-hex-1-enopyranos-3-ulose, D-form, 1,2-Dideoxy-erythro-hex-1-enopyranos-3-ulose; D-form, 4,6-O-Benzylidene, 1,2-Dideoxy-erythro-hex-1-enopyranos-3-ulose; D-form, 4,6-O-Isopropylidene, 1,2-Dideoxy-D-arabino-hex-1-ynitol, 1,2-Dideoxy-3,4,5,6-tetra-O-acetyl-L-xylo-hex-1-enitol, 1,2:4,5-Di-O-isopropylidene-3-O-methyl-arabino-hex-1-enitol, 3,4-Di-O-methyl-D-xylal, Δ2-Ethoxy-4-methyl-3,4-dihydro-2H-pyran, Fucal; L-form, Galactal; D-form, Galactal; D-form, 3,4-O-Isopropylidene, Galactal; D-form, 3,4-O-Isopropylidene, 6-mesyl, Galactal; D-form, 3,4-O-Isopropylidene, 6-tosyl, Galactal; D-form, Tri-Ac, Galactal; D-form, Tribenzoyl, Galactal; D-form, Tri-Me, Glucal; D-form, Glucal; D-form, Glucal; D-form, 3-O-β-D-glucosyl, Δ1,5-Hexadiene-3,4-diol, 5-Hexyne-1,2,3,4-tetrol; (2R,3S,4R)-form, 2-Hydroxy-2,3,4-tri-O-acetyl-D-xylal, 2-Hydroxy-2,3,4-tri-O-benzoyl-D-xylal, Lactal, 3-O-Methyl-D-rhamnal, 3-O-Methyl-L-rhamnal, Rhamnal; D-form, Rhamnal; L-form, Tetra-O-acetyl-2-hydroxy-D-glucal, Tetra-O-benzoyl-2-hydroxy-D-glucal, 3,4,6-Tri-O-acetyl-D-allal, 3,4,6-Tri-O-acetyl-D-glucal, 3,4,6-Tri-O-acetyl-D-gulal; 3,4,6-Tri-O-benzoyl-D-glucal, 3,4,6-Tri-O-benzoyl-D-glucal, Xylal; D-form, 2-Acetamido-4,6-O-benzylidene-2,3-deoxy-D-erythro-hex-2-enono-1,5-lactone, 2-Acetamido-2,3-dideoxy-D-threo-hex-2-enonic acid γ-lactone, 2-Acetamido-2,3-dideoxy-D-erythro-hex-2-enonolactone, 2-Acetamido-2,3-dideoxy-D-erythro-hex-2-enono-1,4-lactone, 2-Acetamido-2,3-dideoxy-D-threo-hex-2-enono-1,5-lactone, 2-Acetamido-2,3-dideoxy-5,6-O-isopropylidene-D-erythro-hex-2-enonic acid γ-lactone, 2-Acetamido-2,3-dideoxy-5,6-O-isopropylidene-D-threo-hex-2-enonic acid γ-lactone, 2-Acetamido-2,3-dideoxy-4,6-O-isopropylidene-D-erythro-hex-2-enono-1,5-lactone, 2-Acetamido-2,3-dideoxy-4,6-O-isopropylidene-D-threo-hex-2-enono-1,5-lactone, 1,6-Anhydro-2,3-dideoxy-β-D-glycero-hex-2-enopyranos-4-ulose, 4,6-O-Benzylidene-2,3-dideoxy-D-erythro-hex-δ-lactone, 3-Deoxy-1,2,4,6-tetra-O-acetyl-erythro-hex-2-enopyranose, 3-Deoxy-1,2,4,6-tetra-O-acetyl-erythro-hex-2-enopyranose; 4,6-Di-aacetyl-D-erythro-hex-2-enono-1,5-lactone, 2,3-Dideoxy-erythro-hex-2-enono-1,5-lactone; D-form, 4,6-Di-Ac, 2-Acetoxy, 2,3-Dideoxy-erythro-hex-2-enono-1,5-lactone; D-form, 4,6-Di-Ac, 2,3-diacetoxy, 2,3-Dideoxy-erythro-hex-2-enono-1,5-lactone; D-form, 4,6-Dibenzoyl, 2,3-Dideoxy-erythro-hex-2-enono-1,5-lactone; D-form, 4,6-Dibenzoyl, 2-Benzoyloxy, 2,3-Dideoxy-erythro-hex-2-enopyranose; α-D-form, Et glycoside, 4,6-di-Ac, 2,3-Dideoxy-erythro-hex-2-enopyranose; α-D-form, Et glycoside, 4,6-dimesyl, 2,3-Dideoxy-erythro-hex-2-enopyranose; α-D-form, Et glycoside, 4,6-dibenzyl, 2,3-Dideoxy-erythro-hex-2-enopyranose; α-D-form, Me glycoside, 4,6-dibenzoyl, 2,3-Dideoxy-erythro-hex-2-enopyranose; α-D-form, Me glycoside, 4,6-dibenzyl, 9-(2,3-Dideoxy-glycero-pent-2-enofuranosyl)adenine; β-D-form, 1-(2,3-Dideoxy-glycero-pent-2-enofuranosyl)cytosine; β-D-form, 1-(2,3-Dideoxy-glycero-pent-2-enofuranosyl)thymine; β-D-form, 2,3-Dideoxy-1,4,6-tri-O-acetyl-α-D-threo-hex-2-enopyranose, Ethyl 2,3-dideoxy-α-D-erythro-hex-2-enopyranose, Ethyl 2,3-dideoxy-D-glycero-hex-2-enopyranos-4-ulose, Maltal, Methyl 4-amino-2,3,4-trideoxy-α-D-erythro-hex-2-enopyranosiduronic acid, Methyl 2-azido-4,6-O-benzylidene-2,3-dideoxy-α-D-erythro-hex-2-enopyranoside, Methyl 4,6-O-benzylidene-2,3-dideoxy-erythro-hex-2-enopyranoside, α-D-form, Methyl 4,6-O-benzylidene-2,3-dideoxy-erythro-hex-2-enopyranoside, α-D-form, Methyl 4,6-O-benzylidene-2,3-dideoxy-α-D-threo-hex-2-enopyranoside, Methyl 4,6-O-benzylidene-2,3-dideoxy-,-D-threo-hex-2-enopyranoside, Methyl 4,6-O-benzylidene-2,3-dideoxy-2-C-methyl-3-nitro-α-D-threo-hex-2-enopyranoside, Methyl 4,6-O-benzylidene-2,3-dideoxy-2-C-methyl-3-nitro-β-D-erythro-hex-2-enopyranoside, Methyl 4,6-O-benzylidene-2,3-dideoxy-2-C-methyl-3-nitro-α-D-threo-hex-2-enopyranoside, Methyl 4,6-O-benzylidene-2,3-dideoxy-3-nitro-erythro-hex-2-enopyranoside, Methyl 4,6-O-benzylidene-2,3-dideoxy-3- nitro-erythro-hex-2-enopyranoside, β-D-form, Methyl 4,6-O-benzylidene-2,3-dideoxy-3-nitro-α-D-erythro-hex-2-enopyranoside, Methyl 4,6-O-benzylidene-2,3-dideoxy-3-nitro-β-D-erythro-hex-2-enopyranoside, Methyl 4,6-O-benzylidene-2,3-dideoxy-3-nitro-threo-hex-2-enopyranoside, Methyl 4,6-O-benzylidene-2,3-dideoxy-3-nitro-threo-hex-2-enopyranoside, β-D-form Methyl 4,6-O-acetyl-2,3-dideoxy-α-D-threo-hex-2-enopyranoside, Methyl 2,3-dideoxy-α-D-threo-hex-2-enopyranoside, 4,5,6,7-Tetra-O-acetyl-2,3-dideoxy-D-arabino-hept-2-enonic acid, 4,5,6,7-Tetrahydroxy-2-heptenoic acid; (2E,4R,-5S,6R)-form, 4,5,6,7-Tetrahydroxy-2-heptenoic acid; (2E,4S,-5R,6S)-form, Me ester, 4,5,6,7-tetra-Ac, 2,4,6-Tri-O-benzyl-3-deoxy-threo-hex-2-enono-1,5-lactone; L-form, 3-O-Acetyl-1,2:5,6-di-O-isopropylidene-α-D-erythro-hex-3-enofuranose, 1,6-Anhydrose-3,4-dideoxy-β-D-glycero-hex-3-enopyranos-2-ulose, 1,6-Anhydro-erythro-hex-3-enopyranose; β-D-form, 3-Deoxy-1,2:5,6-di-O-isopropylidene-erythro-hex-3-enofuranose; α-D-form, Methyl 2-O-acetyl-3-C-allyl-4,6-O-benzylidene-3-deoxy-α-D-erythro-hex-3-enopyranose, Methyl 2-O-acetyl-3-C-benzyl-4,6-O-benzylidene-3-deoxy-α-D-erythro-hex-3-enopyranose, Methyl 2-O-acetyl-4,6-O-benzylidene-3-deoxy-β-D-erythro-hex-3-enopyranose, Methyl 2-O-acetyl-4,6-O-benzylidene-3-deoxy-3-C-α-D-erythro-hex-3-enopyranose, Methyl 4,6-O-benzylidene-2-bromo-2,3-deoxy-threo-hex-3-enopyranose, α-D-form, Methyl 4,6-O-benzylidene-3-deoxy-erythro-hex-3-enopyranose, β-D-form, Methyl 3,4-deoxy-2,6-di-O-methanesulfonyl-α-D-erythro-hex-3-enopyranose, Methyl 3,4-deoxy-erythro-hex-3-enopyranose, Methyl 3,4-deoxy-α-D-glycero-hex-3-enopyranose-2-ulose, Methyl 3,4-dideoxy-6-O-trityl-α-erythro-hex-3-enopyranoside, Methyl 3,4-dideoxy-6-O-trityl-α-glycero-hex-3-enopyranosid-2-ulose, 3-O-Acetyl-5-deoxy-1,2-isopropylidene-β-threo-pent-4-enofuranose, 1,5-Anhydro-2,3,4,6-tetra-O-benzoyl-L-threo-hex-4-enitol, 1,5-Anhydro-2,3,6-tri-O-benzoyl4-deoxy-L-erythro-hex-4-enitol, 6-Deoxy-2,3-O-isopropylidene-threo-hex-5-enulofuranose; 4-Deoxy-1,2-O-isopropylidene-threo-pent-4-enopyranose; β-D-form, 4-Deoxy-1,2-O-isopropylidene-threo-pent-4-enopyranose; β-L-form 5-Deoxy-1,2-O-isopropylidene-3-O-tetrahydropyranyl-β-L-enofuranose, 1-(5-Deoxy-erythro-pent-4-enofuranosyl)cytosine; β-D-form, 1-(5'-Deoxy-erythro-pent-4-enofuranosyl)uracil; β-D-form, Δ3,4-Dihydro-2-ethoxy-2H-pyran, Ethyl 2,6-diacetamido-2,3,4,6-tetradeoxy-α-D-glycero-hex-4-enopyranoside, Methyl 5-deoxy-2,3-O-isopropylidene-β-D-erythro-pent-4-enofuranoside, Methyl 2,3-di-O-acetyl-4-deoxy-β-L-erythro-hex-4-enodialdo-1,5-pyranose, Methyl 2,3-di-O-benzyl-4,6-dideoxy-α-D-threo-hex-4-enopyranose, Methyl 4,6-dideoxy-2,3-di-methyl-β-D-erythro-hex-4-enopyranoside, Methyl 4,6-dideoxy-2,3-O-isopropylidene-β-D-erythro-hex-4-enopyranoside, Methyl 4,6-dideoxy-2,3-O-isopropylidene-β-L-erythro-hex-4-enopyranoside, Methyl (methyl 4-deoxy-α-L-threo-hex-4-enopyranosid)-uronate, Methyl (methyl 4-deoxy-β-L-threo-hex-4-enopyranosid)-uronate, 1,2,3,4,6-Penta-O-acetyl-α-L-threo-hex-4-enopyranose, 1,2,3,4,6-Penta-O-benzoyl-α-L-threo-hex-4-enopyranose, 1,2,3,6-Tetra-O-acetyl 4-deoxy-α-L-threo-hex-4-enopyranose, 1,2,3,6-Tetra-O-benzoyl-4-deoxy-α-L-threo-hex-4-enopyranose, 1,2,3-Tri-O-aceytl-4-dexoy-α-L-erythro-hex-4-enodialdo-1,5-pyranose, 1,2,3-Tri-O-aceytl-4-deoxy-β-L-erythro-hex-4-enodialdo-1,5-pyranose, 1,5-Anhydro-6-deoxy-lyxo-hex-5-enitol; D-form, 1,5-Anhydro-2,3,4-tri-)-benzoyl-6-deoxy-D-lyxo-hex-5-enitol; D-form, 6-Deoxy-1,2,:3,4-di-O-isopropylidene-arabino-hex-5-enopyranose; β-L-form, 5-Deoxy-1,2-O-isopropylidene-xylo-hex-5-enofuranose; α-L-form, 5-Deoxy-1,2-O-isopropylidene-xylo-hex-5-enofuranose; α-D-form, 5-Deoxy-1,2-O-isopropylidene-6-O-methyl-α-D-xylo-hex-5-enofuranose; 5,6-Dideoxy-3-O-benzyl-1,2-O-isopropylidene-α-D-xylo-hex-5-enofuranose; 5,6-Dideoxy-1,2-O-isopropylidene-α-D-xylo-hex-5-enofuranose; 5,6-Dideoxy-1,2-O-isopropylidene-3-O-methyl-α-D-xylo-hex-5-enofuranose; Δ1,5-Hexadiene-3,4-diol, Methyl 4-O-acetyl-6-deoxy-2,3-di-O-tosyl-β-D-xylo-hex-5-enopyranoside, Methyl 4-O-acetyl-6-deoxy-3-O-methyl-β-D-xylo-hex-5-enopyranoside, Methyl 3,4-anhydro-6-deoxy-arabino-hex-5-enopyranoside; α-L-form, Methyl 3,4-anhydro-6-deoxy-ribo-hex-5-enopyranoside; β-L-form, Methyl 6-deoxy-β-D-xylo-hex-5-enopyranoside, Methyl 6-deoxy-2,3-O-isopropylidene-α-D-lyxo-hex-5-enopyranoside, Methyl 6-deoxy-2,3,4-tri-O-acetyl-α-D-lyxo-hex-5-enopyranoside, Methyl 5,6-dideoxy-2,3-O-isopropylidene-D-lyxo-hex-5-enofuranoside, Methyl 5,6-dideoxy-2,3-isopropylidene-α-L-lyxo-hex-5-enofuranoside, Methyl 5,6-dideoxy-2,3-O-isopropylidene-β-D-ribo-hex-5-enofuranoside, Methyl 2,3,4-tri-O-acetyl-6-deoxy-α-D-xylo-hex-5-enopyranoside, Methyl 2,3,4-tri-O-acetyl-6-deoxy-β-D-xylo-hex-5-enopyranoside, 1,2,3,4-Tetra-O-acetyl-6-deoxy-α-D-xylo-hex-5-enopyranose, 1,2,3,4-Tetra-O-acetyl-6-deoxy-β-D-xylo-hex-5-enopyranose, 2,3,4-Tri-O-acetyl-1,5-anhydro-6-deoxy-D-xylo-hex-5-enitol, 2,3,4-Trihydroxy-5-hexenal, 1,2:5,6-Di-O-isopropylidene-3-deoxy-3-C-methylene-α-D-ribo-hexofuranose, Methyl 4,6-O-benzlidene-3-dexoy-3-C-methylene-α-D-ribohexopyranose, Methyl 5,6-dideoxy-2,3:8,-9:10,11-tri-O-iso-propylidene-L-lyxo-α-L-talo-undec-5-enodialdo-1,4-furanoside-11,7-pyranose; (E)-form, Methyl 5,6-dideoxy-2,3:8,-9:10,11-tri-O-iso-propylidene-L-lyxo-α-L-talo-undec-5-enodialdo-1,4-furanoside-11,7-pyranose; (Z)-form, 4-O-Acetylarcanose, Aldgarose; α-D-form, 1,2-O-Isopropylidene, Apiose- D-form, Apiose- D-form 2,3-Isopropylidene, Apiose; α-D-erythro-tetrofiranose-form, Apiose; β-D-erythro-tetrofiranose-form, Apiose, β-D-erythro-tetrofilranose-form, glycoside, 2,3,3'-Tri-Me Arcanose, Axenose, 3-Benzamido-4-O-benzoyl-2,3,6-trideoxy-3-C-methyl-α-L-xylo-hexopyranose, Benzyl 5-deoxy-3-C-(hydroxy-methyl)-α-L-lyxofuranoside, 4,6-O-Benzylidene-1,2-dideoxy-2-C-methyl-ribo-hex-1-enopyranose, 3-C-[1-(Carboxyoxy)ethyl]-4,6-dideoxy-D-ribo-hexose intramol, 1',3-ester(S), Chromose B, Cladinose, 3-Deoxy-2-C-hydroxymethyl-D-erythropentono-1,4-lactone, 5-Deoxy-3-C-hydroxymethyllyxose; β-L-Furanose-form, 1,2-O-Isopropylidene, 3-Deoxy-2-C-hydroxymethyl-D-erythro-pentonic acid, 3-Deoxy-2-C-hydroxymethyl-threo-pentonic acid; D-form, 3-Deoxy-2-C-hydroxymethyl-threo-pentono-1,4-lactone, 3-Deoxy-2-C-hydroxymethyl-2,2',4-5-tetra-O-acetyl-D-erythro-pentonic acid; 9-(3-Deoxy-3-C-hydroxymethyl-threofuranosyl) adenine; α-L-form, 9-(3-Deoxy-3-C-hydroxymethyl-threofuranosyl)adenine; β-L-form, 9-(3-Deoxy-3'-C-methylallfuranosyl)adenine; β-L-form, 9-(3-Deoxy-3-C-methylribo-furanosyl)adenine; β-L-form, 1,4-Di-O-acetyl-6-deoxy-2-O-methyl-3-C-methyl-α-L-talopyranose, 1,4-Di-O-acetyl-6-deoxy-2-O-methyl-3-C-methyl-β-L-talopyranose, 3,3'-Di-O-acetyl-1,2-O-isopropylidene-β-L-threo-tetrofuranose, 1,2:3,3'-Di-O-acetyl-1,2-O-isopropylidene-α-D-erythro-tetrofuranose, 3,3'-Di-O-benzyl-1,2-O-isopropylidene-α-L-erythro-tetrofuranose, 3,3'-Di-O-benzyl-1,2-O-isopropylidene-β-L-threo-tetrofuranose, 1,2:5,6-Di-O-cyclohexylidene-3-C-ethyl-α-D-allofuranose, 1,2:5,6-Di-O-cyclohexylidene-3-C-methyl-α-D-allo-furanose, 1,2:5,6-Di-O-cyclohexylidene-3-C- vinyl-α-D-allofuranose, 2,6-Dideoxy-3-C-methyl-ribo-hexose; D-form, 2,6-Dideoxy-3-C-methyl-ribo-hexose; DL-form, 4,6-Dideoxy-3-C-methyl-4(methylamino) mannose; D-form, 2,6-Dideoxy-3-C-methyl-3-O-methyl-ribo-hexose; D-form, 2,6-Dideoxy-3-C-methyl-3-O-methyl-xylo-hexose; D-form, 1,2:3,3'-Di-O-isopropylidene-α-D-erythro-tetrofuranose, 1,2:3,3'-Di-O-isopropylidene-β-L-threo-tetrofuranose, Ethyl 3-benzamido-3-C-methyl-2,3,6-trideoxy-α-L-lyxo-hexopyranoside, Evermicose, Everninonitrose, Evertetrose, Flambeurekanose, β-D-Fructofuranosyl α-D-arabino-hexopyranosid-2-ulose, Garosamine, Hamamelitannin, Hamamelose, 2-Hydroxyhymenoxone, 4-C-Hydroxymethyl-1,2:3,4-di-O-isopropylidene-D-glycero-pentose, 4-C-Hydroxymethyl-1,2:3,4-di-O-isopropylidene-L-glycero-pentose, 4-C-Hydroxyrmethyl-2,3:4,4'-di-O-isopropylidene-D-glycero-pentose, 4-C-Hydroxymethyl-2,3:4,4'-di-O-isopropylidene-L-glycero-pentose, 2-C-Hydroxymethylribose, 3-C-Hydroxymethylriburonic acid, Hymenolide, ΔHymenoxon, 1,2-O-Isopropylideneapoise; β-L-threo-form, 1,2-O-Isopropylideneapoise; β-L-threo-form, 3'-Thio, 3,3'-di-Ac, 1,2-O-Isopropylideneapoise; α-D-erythro-form, 1,2-O-Isopropylideneapoise; α-L-erythro-form, 2,3-O-Isopropylidene-2-C-methyl-D-ribonolactone, Kijanose, Methyl 2-O-acetyl-3-C-allyl-4,6-O-benzylidene-3-deoxy-α-D-erythro-hex-3-eno-pyranoside, Methyl 2-O-acetyl-3-C-4,6-O-benzylidene-3-deoxy-α-D-erythro-hex-3-enopyranoside, Methyl 2-O-acetyl-3-C-4,6-O-benzylidene-3-deoxy-3-C-α-D-erythro-hex-3-eno-pyranoside, Methyl 4-C-acetyl-2,6-dideoxy-α-L-xylo-hexo-pyranoside, Methyl 4-C-acetyl-2,6-dideoxy-β-L-xylo-hexo-pyranoside, Methyl aldgaroside A, Methyl aldgaroside B, Methyl 3-amino-3-C-methyl-2,3,6-trideoxy-α-L-lyxo-hexopyranoside, Methyl 3-amino-2,3,6-trideoxy-3-C-methyl-α-L-lyxo-hexopyranoside, Methyl 2,3-anhydro-6-deoxy-α-D-ribo-hexopyranosid-4-ulose, Methyl 3-benzamido-4-O-benzoyl-2,3,6-trideoxy-3-C-methyl-α-L-xylo-hexopyranoside, Methyl 3-benzamido-4-O-benzoyl-2,3,6-trideoxy-3-C-methyl-β-L-xylo-hexo-pyranoside, Methyl 3-benzamido-2,3,6-trideoxy-3-C-methyl-α-L-xylo-hexopyranoside, Methyl 4,6-O-benzylidene-3-deoxy-3-C-methyl-α-D-arabino-hexopyranosid-2-ulose, Methyl 4,6-O-benzylidene-2,3-dideoxy-2-C-methyl-3-nitro-α-D-erythro-hex-2-enopyranoside, Methyl 4,6-O-benzylidene-2,3-dideoxy-2-C-methyl-3-nitro-β-D-erythro-hex-2-eno-pyranoside, Methyl 4,6-O-benzylidene-2,3-dideoxy-2-C-methyl-3-nitro-α-D-erythro-hex-2-eno-pyranoside, Methyl 4,6-O-benzylidene-3-C-methyl-α-D-allopyranoside, Methyl 5-deoxy-3-C-(hydroxy-methyl)-α-L-lyxofuranoside, Methyl 5-deoxy-3-C-(hydroxy-methyl)-β-L-lyxofuranoside, Methyl 3-dexoy-4-C-methyl-3-(N-methylacetamido)-β-L-arabinopyranoside, Methyl 6-deoxy-2-O-methyl-3-C-methyl-α-L-talopyranoside, Methyl 2,6-dideoxy-3-C-methyl-α-D-ribo-hexo-pyranoside, Methyl 2,6-dideoxy-3-C-methyl-α-L-ribo-hexo-pyranoside, Methyl 2,6-dideoxy-3-C-methyl-α-L-xylo-hexo-pyranoside, Methyl 2,6-dideoxy-3-C-methyl-β-L-xylo-hexo-pyranoside, Methyl 2,6-dideoxy-3-C-methyl-3-O-methyl-α-D-ribo-hexopyranoside, Methyl 2,6-dideoxy-3-C-methyl-3-O-methyl-α-L-ribo-hexopyranoside, Methyl 2,6-dideoxy-3-C-methyl-3-O-methyl-α-D-xylo-hexopyranoside, Methyl 3,4-dideoxy-4-C-6-O-trityl-α-D-threo-hexo-pyranosid-2-ulose, 2-C-Methylerythritol; D-form, 2-C-Methyl-1,4-erythrono-lactone; D-form, Methyl 2-C-hyroxymethyl-3,4-O-ispropylidene-β-D-ribopyranoside, Methyl 2-C-hydroxymethyl-β-D-ribopyranoside, Methyl 3,4-O-isopropylidene-α-L-erythro-pentopyranosid-2-ulose, Methyl 3,4-O-isopropylidene-β-L-erythro-pentopyranosid-2-ulose, Methyl 3-C-methyl-6-deoxy-α-D-ribo-hexopyranosid-4-ulose, Methyl 3-C-methyl-2,3-O-isopropylidene-α-D-mannofuranoside, 2-C-Methylribonic acid; D-form, 2-C-Methylribonic acid; D-form, 1,4-lactone, 2-C-Methylribonolactone; D-form, 2-C-Methylribonolactone; L-form, Methyl α-sibrosaminide, Methyl β-sibrosaminide, Methyl 3,4,6-tri-O-benzyl-α-D-arabino-hexopyranosid-2-ulose, Methyl 2,3,6-trideoxy-4-C-benzoyloxymethylcarbonyl-α-D-threo-hexopyranoside, Methyl 2,3,6-trideoxy-4-C-benzoyloxymethylcarbonyl-α-L-threo-hexopyranoside, Methyl 3,4,6-trideoxy-4-C-methyl-α-L-threo-hexo-pyranosid-2-ulose, Moenuronic acid; 'α-Pyranose-form, Me glycoside, Mycarose, Neurotensin, Nogalose; D-form, Nogalose; L-form, Noviose, γ-Octose, γ-Octose; 1,1'-Anydro, Oleandrose; L-form, Olgose, Olivomycose, Phenyl 3,4-O-isopropylidene-β-L-erythro-pentopyranosid-2-ulose, Reflexin, Rubranitrose; D-form, Rubranitrose; L-form, Streptobiosamine, Streptose; L-form, 3,4,6-Tri-O-acetyl-α-D-arabino-hexopyranosyl-2-ulose chloride, 3,4,6-Tri-O-benzoyl-α-D-arabino-hexopyranosyl-2-ulose bromide, 2,3,6-Tri-O-benzoyl-2-C-methyl-D-ribonolactone, Vancosamine, Vinelose, AD II, Affinoside B, Affinoside C, 1,6-Anhydro-3,4-O-endo-benzylidene-β-D-ribo-hexopyranos-2-ulose, 1,6-Anhydro-3,4-O-exo-benzylidene-β-D-lyxo-hexopyranos-2-ulose, 1,6-Anhydro-3,4-O-exo-benzylidene-β-D-ribo-hexopyranos-2-ulose, 1,6-Anhydro-3-deoxy-erythro-hexopyranos-2-ulose; β-D-form, 1,6-Anhydro-3-deoxy-4-O-methyl-β-D-erythro-hexopyranos-2-ulose, 1,6-Anhydro-3-deoxy-4S-phenyl-4-thio-β-D-erythro-hexopyranos-2-ulose, 1,6-Anhydro-3,4-dideoxy-β-D-glycero-hex-3-enopyranos-2-ulose, 1,6-Anhydro-3,4-dideoxy-β-D-glycero-enopyranos-2-ulose, 1,6-Anhydro-lyxo-hexopyranos-2-ulos; β-D-form, 1,6-Anhydro-ribo-hexopyranos-2-ulos; β-D-form, 1,6-Anhydro-3,4-O-isopropylidene-β-D-lyxo-hexopyranos-2-ulose, 1,6-Anhydro-3,4-O-isopropylidene-β-D-ribo-hexopyranos-2-ulose, Benzyl 4,6-O-benzylidene-3-deoxy-α-D-erythro-hexopyranosid-2-ulose, 4,6-O-Benzylidene-3-deoxy-D-erythro-hexos-2-ulose, Benzyl 3,4-O-isopropylidene-β-D-erythro-pentopyranosid-2-ulose, tert-Butyl 3,4-O-isopropylidene-α-L-erythro-pentopyranosid-2-ulose, tert-Butyl 3,4-O-isopropylidene-β-L-erythro pentopranosid-2-ulose, Coleosol, 3-Deoxy-erythro-hexos-2-ulose; D-form, 1,3-Di-O-acetyl-4,6-di-O-methyl-Q-D-arabino-hexopyranos-2-ulose, 1,6:3,4-Dianhydro-β-D-lyxo-hexopyranos-2-ulose, 1,6:3,4-Dianhydro-β-D-ribo-hexopyranos-2-ulose, 2,3:4,5-Di-O-isopropylidene-β-D-arabino-hexos-2-ulo-2,6-pyranose, Gomphoside, arabino-Hexopyranos-2-ulose; D-form, arabino-Hexopyranos-2-ulose, β-D-form, arabino-Hexopyranos-2-ulose; β-D-form, Me glycoside, 3,4,6-Tri-Ac, Humistratin, Methyl 3-O-benzoyl-4,6-O-benzylidene-α-D-arabino-hexopyranosid-2-ulose, Methyl 3-O-benzoyl-4,6-O-benzlidene-β-D-arabino-hexopyranosid-2-ulose, Methyl 3-O-benzoyl-α-D-arabino-hexopyranosid-2-ulose, Methyl 4,6-O-benzylidene-3-O-acetyl-α-D-arabino-hexopyranosid-2-ulose, Methyl 4,6-O-benzylidene-3-deoxy-erythro-hexo-pyranosid-2-ulose; D-form, Methyl 4,6-O-benzylidene-3-deoxy-α-D-threo-hexo-pyranosid-2-ulose; D-form, Methyl 4,6-O-benzylidene-3-deoxy-α-D-threo-hexo-pyranosid-2-ulose, Methyl 4,6-O-benzylidene-3-deoxy-3-C-methyl-α-D-arabino-hexopyranosid-2-ulose, Methyl 4,6-O-benzylidene-3-O-methyl-α-D-arabino-hexo-pyranosid-2-ulose; Methyl 4,6-O-benzylidene-3-O-methyl-β-D-arabino-hexopyranosid-2-ulose; Methyl 4,6-O-henzylidene-3-O-tosyl-α-

D-arabino-hexo-pyranosid-2-ulose; Methyl 4,6-O-benzylidene-3-O-tosyl-β-D-arabino-hexo-pyranosid-2-ulose; Methyl 3-deoxy-α-D-threo-hexopyranosid-2-ulose; Methyl 3-deoxy-β-D-threo-hexopyranosid-2-ulose; Methyl 3,5-di-O-benzoyl-α-D-threo-pentofuranosid-2-ulose; Methyl 3,4-dideoxy-α-D-glycero-hex-3-enopyranosid-2-ulose, Methyl 3,4-dideoxy-4-C-methyl-β-O-trityl-α-D-threo-hexopyranosid-2-ulose, Methyl 3,4-dideoxy-6-O-trityl-α-D-glycero-hex-3-enopyranosid-2-ulose, Methyl α-D-arabino-hexo-pyranosid-2-ulose, Methyl β-D-arabino-hexo-pyranosid-2-ulose, Methyl 3,5-O-isopropylidene-β-D-threo-pentofuranoside, Methyl 3,5-O-isopropylidene-α-D-threo-pentofuranoside-2-ulose, Methyl 3,4-O-isopropylidene-β-D-erythro-pentopyranoside-2-ulose, Methyl 3,4,6-trideoxy-4-C-methyl-α-L-threo-hexo-pyranosid-2-ulose, Phenyl 4,6-O-benzylidene-3-deoxy-β-D-threo-hexo-pyranosid-2-ulose, Phenyl 3-deoxy-β-D-threo-hexo-pyranosid-2-ulose, 1,3,4,6-Tetra-O-benzoyl-β-D-arabino-hexopyranos-2-ulose, 1-O-Acetyl 2,7-anhydro-4,5-O-isopropylidene-β-ribo-hepto-2,3-diulo-2,6-pyranose, 5-O-Acetyl-1,2-O-isopropylidene-α-D-erythro-pentofuranos-3-ulose tosylhydrazone, 2,7-Anhydro-4,5-O-exo-benzylidene 1-O-trityl-β-D-ribo-hepto-2,3-diulo-2,6-pyranose, 1,6-Anhydro-4-O-benzyl-2-O-tosyl-β-D-arabino-hexopyranos-3-ulose, 2,7-Anhydro-1-deoxcy-4,5-O-isopropylidene-β-D-ribo-hepto-2,3-diulo-2,6-pyranose, 1,6-Anhydro-2-4-di-O-benzoyl-β-D-lyxo-hexopyranos-3-ulose, 1,6-Anhydro-2-4-di-O-benzoyl-β-D-lyxo-hexopyranos-3-ulose, 1,6-Anhydro-2-4-di-O-tosyl-β-D-arabino-hexopyranos-3-ulose, 1,6-Anhydro-2-4-di-O-tosyl-β-D-lyxo-hexopyranos-3-ulose, 2,7-Anhydro-ribo-hepto-2,3-diulo-2,6-pyranose; β-D-form, 1,6-Anhydro-α-D-arabino-hexopyranos-3-ulose, 1,6-Anhydro-β-D-lyxo-hexopyranos-3-ulose, 2,7-Anhydro-4,5-O-isopropylidene-β-D-ribo-hepto-2 -3-diulo-2,6-pyranose, 2,7-Anhydro-4,5-O-isopropylidene-1-O-tosyl-β-D-ribo-hepto-2,3-diulo-2,6-pyranose, 2,7-Anhydro-4,5-O-iso-propylidene-1-O-trityl-β-D-ribo-hepto-2,3-diulo-2,6-pyranose, 5-O-Benzoyl-1,2-O-iso-propylidene-α-D-erythro-pentofuranos-3-ulose, Benzyl 4,6-O-benzylidene-β-D-arabino-hexopyranosid-3-ulose, Benzyl 4,6-O-benzylidene-β-D-xylo-hexopyranosid-3-ulose, 4,6-O-Benzylidene-1,2-dideoxy-threo-hex-1-enopyranos-3-ulose; D-form, 4,6-O-Benzylidene-1,2-O-isopropylidene-α-D-ribo-hexo-pyranose-3-ulose, 4,6-O-Benzylidene-1,2-O-propylidene-α-D-ribo-hexopyranos-3-ulose, 1,2-O-Cyclohexylidene-α-D-ribo-hexofuranos-3-ulose, 5-Deoxy-1,2-O-isopropylidene-α-D-erthyro-pentofuranos-3-ulose, 5-Deoxy-1,2-O-isopropylidene-β-D-threo-pentofuranos-3-ulose, 5-Deoxy-1,2-O-isopropylidene-β-L-threo-pentofuranos-3-ulose, 2,4-Di-O-acetyl-1,6-anhydro-β-D-lyxo-hexopyranose-3-Ulose, 1,2:5,6-Di-O-cyclohexylidene-α-D-ribo-hexofuranos-3-ulose, 1,2-Dideoxy-erythro-hex-1-enopyranos-3-ulose; D-form, 1,2-Dideoxy-erythro-hex-1-enopyranos-3-ulose; D-form, 1,2-Dideoxy-erythro-hex-1-enopyranos-3-ulose; D-form, 4,6-O-Isopropylidene, 1,2:5,6-Di-O-isopropylidene-β-D-orabino-hexofuranos-3-ulose, 1,2:5,6-Di-O-isopropylidene-β-D-lyxo-hexofuranos-3-ulose, 1,2:5,6-Di-O-isopropylidene-ribo-hexofuranos-3-ulose; α-D-form, 1,2:4,6-Di-O-isopropylidene-α-D-xylo-hexofuranos-3-ulose; 4,6-O-Ethylidene 1,2-O-isopropylidene-α-D-ribo-hexopyranos-3-ulose, 4,6-O-Ethylidene-1,2-O-isopropylidene-α-D-xylo-hexopyranos-3-ulose, ribo-Hexos-3-ulose, D-Furanose-form, xylo-Hexos-3-ulose, α-D-Pyranose-form, 1,2:4,6-Di-O-isopropylidene, 4-nitro-phenylhydrazone, 1,2-O-Isopropylidene-α-D-ribohexofuranos-3-ulose, 1,2-O-Isopropylidene-α-L-glycero-tetrofuranos-3-ulose, 1,2-O-Isopropylidene-α-L-glycero-tetrofuranose-3-ulose, 1,2-O-Isopropylidene-5-O-tosyl-α-D-erythro-pentofuranos-3-ulose, 1,2-O-Isopropylidene-5-O-trityl-α-D-erythro-pentofuranos-3-ulose, Methyl 2-acetamido-4,6-O-benzylidene-2-deoxy-α-D-ribo-hexopyranosid-3-ulose, Methyl 2-acetamido-4,6-O-benzylidene-2-deoxy-β-D-ribo-hexopyranosid-3-ulose, Methyl 2-O-acetyl-4,6-O-benzylidene-β-D-ribo-hexopyranosid-3-ulose, Methyl 2-O-acetyl-4,6-O-benzylidene-α-D-xylo-hexopyranosid-3-ulose, Methyl 2-azido-4,6-O-benzylidene-2-deoxy-α-D-ribo-hexopyranosid-3-ulose, Methyl 2-azido-4,6-O-benzylidene-2-deoxy-α-D-ribo-hexopyranosid-3-ulose, Methyl 2-benzamido-4,6-O-benzylidene-2-deoxy-α-D-ribo-hexopyranosid-3-ulose, Methyl 2-O-benzoyl-4,6-O-benzylidene-α-D-ribo-hexopyranosid-3-ulose, Methyl 2-O-benzoyl-4,6-O-benzylidene-,β-D-ribo-hexopyranosid-3-ulose, Methyl 2-O-benzoyl-4,6-O-Methyl 2-O-benzoyl-4,6-O-benzylidene-α-D-arabino-hexopyranosid-3-ulose oxime, Methyl 4,6-O-benzylidene-2-bromo-2-deoxy-β-D-ribo-hexo-pyranosid-3-ulose, Methyl 4,6-O-benzylidene-2-deoxy-α-D-erythro-hexo-pyranosid-3-ulose, Methyl 4,6-O-Benzylidene-2-deoxy-threo-hexopyranos-3-ulose, Methyl 4,6-O-benzylidene-2-deoxy-threo-hexopyranos-3-ulose; β-D-form, Methyl 4,6-O-benzylidene-α-D-ribo-hexopyranosid-3-ulose, Methyl 4,6-O-benzylideneα-D-ribo-hexopyranosid-3-ulose, Methyl 4,6-O-benzylidene-2-O-(mesyl-α-D-ribo-hexopyranosid-3-ulose, Methyl 4,6-O-benzylidene-2-O-methyl-α-D-ribo-hexo-pyranosid- Methyl 4,6-O-benzylidene-2-O-methyl-β-D-ribo-hexo-pyranosid-3-ulose, Methyl 4,6-O-benzylidene-2-O-tosyl-α-D-ribo-hexo-pyranosid-3-ulose, Methyl 2-deoxy-5-O-trityl-α-D-glycero-pentofuranosid-3-ulose, Methyl 2-deoxy-5-O-trityl-β-D-glycero-pentofuranosid-3-ulose, Methyl 2,6-dideoxy-L-erythro-hexopyranosid-3-ulose; α-L-form, Methyl 2,6-dideoxy-4-O-methyl-β-L-erythro-hexo-pyranosid-3-ulose, Methyl 4,6-O-ethylidene-2-O-methyl-α-D-arabino-hexopyranosid-3-ulose, Methyl α-D-erythro-pento-pyranosid-3-ulose, Methyl β-D-erythro-pento-pyranosid-3-ulose, 1,6-Anhydro-2,3-O-benzylidene-β-D-ribo-hexopyranos-4-ulose, 1,6-Anhydro-3-deoxy-β-D-erythro-hexopyranos-4-ulose, 1,6-Anhydro-3-deoxy-β-D-threo-hexopyranos-4-ulose, 1,6-Anhydro-2,3-dideoxy-β-D-glycero-hex-2-enopyranos-4-ulose, 1,6-Anhydro-2,3-dideoxy-α-D-glycero-hexopyranos-4-ulose, 1,6-Anhydro-arabino-hexopyranos-4-ulose; β-D-form, 1,6-Anhydro-lyxo-hexopyranos-4-ulose; β-D-form 1,6-Anhydro-ribo-hexopyranos-4-ulose; β-D-form, 1,6-Anhydro-2,3-O-isopropylidene-β-D-lyxo-hexopyranos-4-ulose, 1,6-Anhydro-2,3-O-isopropylidene-β-D-ribo-hexopyranos-4-ulose, Benzyl 6-deoxy-2,3-O-isopropylidene-α-L-lyxo-pyranosid-4-ulose, Benzyl 2,3-di-O-benzyl-β-L-threo-pentopyranosid-4-ulose, 1,6:2,3-Dianhydro-β-D-lyxo-hexopyranos-4-ulose, 1,6:2,3-Dianhydro-β-D-ribo-hexopyranos-4-ulose, Ethyl 6-O-benzoyl-2,3-dideoxy-α-D-glycero-hexopyranosid-4-ulose, Ethyl 2,3-dideoxy-α-D-glycero-hex-2-enopyranos-4-ulose, Ethyl 2,3-dideoxy-α-D-glycero-hexopyranoside-4-ulose, Methyl 2,3-anhydro-6-deoxy-α-D-hexopyranosid-4-ulose, Methyl 2,3-anhydro-6-deoxy-α-D-lyxo-hexopyranosid-4-ulose, Methyl 2,3-anhydro-α-D-erythro-pentopyranosid-4-ulose, Methyl 2,3-anhydro-β-L-erythro-pentopyranosid-4-ulose, Methyl 3-bromo-3,6-dideoxy-α-D-xylo-hexopyranosid-4-ulose, Methyl 6-deoxy-2,3-di-O-methyl-α-D-ribo-hexopyranosid-4-ulose, Methyl 6-deoxy-2,3-di-O-methyl-α-D-xylo-hexopyranosid-4-ulose, Methyl 6-deoxy-2,3-O-isopropylidene-α-D-lyxo-hexopyranosid-4-ulose, Methyl 6-deoxy-2,3-O-isopropylidene-α-lyxo-hexopyranosid-4- ulose, Methyl 6-deoxy-2,3-O-isopropylidene-β-L-lyxo-hexopyranosid-4-ulose, Methyl 6-deoxy-2,3-O-isopropylidene-α-D-ribo-hexopyranosid-4-ulose, Methyl 6-deoxy-2,3-O-isopropylidene-β-D-ribo-hexopyranosid-4-ulose, Methyl 2,3-di-O-benzyl-6-O-trityl-α-D-xylo-hexopyranosid-4-ulose, Methyl 2,3-dideoxy-β-D-glycero-hexpyranosid-4-ulose, Methyl 2,3-di-O-methyl-6-O-trityl-α-D-xylo-hexopyranosid-4-ulose, Methyl 2,3-di-O-methyl-6-trityl-β-D-xylo-hexopyranosid-4-ulose, Methyl α-D-xylo-hexo-pyranosid-4-ulose, Methyl β-D-xylo-hexo-pyranosid-4-ulose, Methyl 2,3-O-isopropylidene-6-O-mesyl-α-D-lyxo-hexopyranosid-4-ulose, Methyl 2,3-O-isopropylidene-6-O-methyl-α-D-lyxo-hexopyranosid-4-ulose, Methyl 2,3-O-isopropylidene-β-L-erythro-pentopyranosid-4-ulose, Methyl 3-C-methyl-6-deoxy-α-D-ribo-hexopyranosid-4-ulose, Methyl β-L-threo-pentopyranosid-4-ulose, Methyl-α-L-threo-pento-pyranosid-4-ulose O-methloxime, Methyl 2,3,6-tri-O-benzoyl-β-D-xylo-hexopyranosid-4-ulose, Methyl 2,3,6-trideoxy-α-D-glycero-hexopyranoside-4-ulose, Methyl 2,3,6-trideoxy-α-L-glycero-hexopyranosyid-4-ulose, 3-O-Benzyl-6-deoxy-1,2-O-isopropylidene-α-D-xylo-hexofuranos, 3-O-Benzyl-1,2-O-isopropylidene-α-D-xylo-hexofuranos-5-ulose, 3-O-Benzyl-1,2-O-isopropylidene-6-trityl-O-α-D-xylo-hexofuranos-5-ulose, 6-Deoxy-arabino-hexos-5-ulose; D-form, 6-Deoxy-xylo-hexos-5-ulose; D-form, 6-Deoxy-1,2-O-isopropylidene-β-D-arabino-hexofuranos-5-ulose, 6-Deoxy-1,2-O-isopropylidene-α-D-xylo-hexofuranos-5-ulose, 6-Deoxy-1,2-O-methylene-α-D-xylo-hexofuranos-5-ulose, 6-Deoxy-1,2-O-methylene-3-O-tosyl-α-D-xylo-hexofuranos-5-ulose, 3,6-Di-O-benzyl-1,2-O-isopropylidene-α-D-xylo-hexofuranos-5-ulose, xylo-Hexos-5-ulose; α-D-Furnose-form, 1,2-O-Isopropylidene, di-Me acetal, 6-phosphate, bis(cyclohexylammonium)salt, 1,2-O-Isopropylidene-α-D-xylo-hexofuranos-5-ulose, 1,2-O-Isopropylidene-3-O-methyl-6-O-tosyl-α-D-xylo-hexofuranos-5-ulose, Methyl 6-deoxy-2,3-di-O-tosyl-β-D-xylo-hexofuranosid-5-ulose, Benzyl 1-deoxy-4,5-O-iso-propylidene-D-erythro-hexo-2,3-diulo-3,6-furanoside, 1-deoxy-4,5-O-erythro-hexo-2,3-diulose, 1-deoxy-4,5-O-isopropylidene-D-erythro-hexo-2,3-diulo-3,6-furanoside, 1,2:4,5-di-O-cyclohexylidene-β-D-erythro-hexo-2,3-diulose-2,6-furanoside, 1,2:4,5-di-O-isopropylidene-β-D-erythro-hexo-2,3-diulose-2,6-furanoside, threo-Hexo-2,5-diulose; D-form, 1,2-O-Isopropylidene-β-D-erythro-hexo-2,3-diulose-2,6-pyranose, ΔUscharin, 3-O-1,2-O-cyclohexylidene-α-D-xylo-pentodialdo-1,4-furanose, 3-O-Benzyl-1,2-O-isopropylidene-α-D-xylo-pentodialdo-1,4-furanose, 1,2-O-Cyclohexylidene-α-D-xylo-pentodialdo-1,4-furanose, 1,2:3,4-Di-O-isopropylidene-galacto-hexodialdo-1,5-pyranose; α-D-form, 1,2-O-Isopropylidene-gluco-hexodialdo-1,4-furanose; α-D-form, Methyl 2,3-di-O-acetyl-4-deoxy-β-L-erythro-hex-4-enodialdo-1,5-pyranose, Methyl 2,3-isopropylidene-ribo-pentodialdo-1,4-furanose; β-D-form, xylo-Pentodialdo-1,4-furanose; α-D-form, 1,2-O-Isopropylidene, semi-carbazone, 1,2,3-Tri-O-acetyl-4-deoxy-α-L-erythro-hex-4-enodialdo-1,5-pyranose, 1,2,3-Tri-O-acetyl-4-deoxy-β-L-erythro-hex-4-enodialdo-1,5-pyranose, Allonic acid; D-form, Allonic acid; D-form, 2,5-Anydro, Me ester, Allonic acid; L-form, D-Allono-1,4-lactone, L-Allono-1,4-lactone, Altronic acid, Altronic acid; 2,5-Anhydro,-3,4,6-tribenzoyl, 2-Amino-5-O-carbamoyl-2-deoxy-L-xylonic acid, 2-Amino-2-deoxygluconic acid; D-form, 2-Amino-2-deoxygluconic acid; D-form, 3-Me, 2-Amino-2-dexoygluconic acid; D-form, 3,4,6-Tri-Me, 2-Amino-2-deoxygluconic acid; D-form, Me ester, 2-Amino-2-deoxygluconic acid; D-form, N-Benzoyl, Et ester, 2-Amino-2-deoxygluconic acid; D-form, N-Me, 2-Amino-2-deoxygluconic acid; D-form, N-Ac, 4,6-O-isopropylidene, 2-Amino-2-deoxygluconic acid; D-form, N-Ac, Me ester, 2-Amino-2-deoxygluconic acid; D-form, N-Ac, Me ester, 3,4,6-tribenzyl, 2-Amino-2-deoxygluconic acid; D-form, N-Ac, Me ester, 5,6-O-isopropylidene, 2-Amino-2-deoxygluconic acid; D-form, N-Ac, Me ester, 3,4,5,6-tetra-Ac, 2-Amino-2-deoxygluconic acid; D-form, N-Ac, 1,4-lactone, 2-Amino-2-deoxygluconic acid; D-form, N-Ac, 1,4-lactone, 5,6-O-isopropylidene, 2-Amino-2-deoxygluconic acid; D-form, N-Ac, 1,5-lactone, 2-Amino-2-deoxygluconic acid; D-form, N-Ac, 1,5-lactone, 2-Amino-2-deoxygluconic acid; D-form, N-Ac, 1,5-lactone, 3,4-di-Me, 2-Amino-2-deoxygluconic acid; D-form, N-Ac, 1,5-lactone, 4,6-O-isopropylidene, 2-Amino-2-deoxygluconic acid; D-form, N-Ac, 1,5-lactone, 4,6-O-benzylidene, 2-Amino-2-deoxy-D-xylonic acid; 2-Amino-2-deoxy-L-xylonic acid; 2-Amino-3,4,5-trihydroxy-pentonoic acid; 4,5-O-Isopropylidene, 2,5-Anhydro-D-allonic acid, L-Arabinonamide, Arabinonic acid; D-form, Arabinonic acid; D-form, Et ester, 2,3,4,5-tetra-Ac, Arabinonic acid; D-form, Butyl ester, 2,3,4,5-tetra-Ac, Arabinonic acid; D-form, Amide, 1N,2,3,5-tetrabenzyl, Arabinonic acid; L-form, Arabinonolactone; 1,4-lactone, D-form, 2-Benzyl, D-Arabinono-1,4-lactone, L-Arabinono-1,4-lactone, L-Arabinono-1,5-lactone, 4,6-O-Benzylidene-2,3-dideoxy-D-erythro-hex-2-enonic acid δ-lactone, 4,6-O-Benzylidene-D-glucono-1,5-lactone, Benzyl 1,2-O-isopropylidene-3,5-O-benzylidene-α-D-gluconate, Butyl-D-arabinonate, 2,3-O-Cyclohexylidene-D-ribono-1,4-lactone, Cymaronic acid; D-form, Cymaronic acid; D-form, 1,4-lactone, 5-Me, Cymaronic acid; D-form, 1,5-Lactone, 4-Me, 3-Deoxy-3-fluoro-D-gluconic acid, 2-Deoxy-D-arabino-hexonic acid, 2-Deoxy-D-arabino-hexonic acid; 1,4-Lactone, tri-Me, 3-Deoxy-D-arabino-hexonic acid, 3-Deoxy-D-ribo-hexonic acid, 3-Deoxy-xylo-hexonic acid; D-form, 3-Deoxy-xylo-hexonic acid; D-form, Anilide, 2-Deoxy-D-arabino-hexono-1,4-lactone, 2-Deoxy-D-arabino-hexono-1,5-lactone, 3-Deoxy-D-arabino-hexono-1,4-lactone, 3-Deoxy-D-ribo-hexono-1,4-lactone, 3-Deoxy-D-xylo-hexono-1,4-lactone, 3-Deoxy-2-C-hydroxymethyl-threo-pentonic acid, D-form, 3-Deoxy-2-C-hydroxymethyl-D-threo-pentono-1,4-lactone, 6-Deoxymannonic acid; L-form, 6-Deoxy-3-O-methyl-L-talono-1,4-lactone, 5-Deoxyribonolactone; D-form, 3-Deoxy-2,4,6-tri-O-benzyl-D-arabino-hexono-1,5-lactone, 4,6-Di-O-acetyl-D-erythro-hex-2-eno-1,5-lactone, 3,6-Diamino-5-hydroxyhexanoic acid, 2,4:3,5-Di-O-benzylidene-D-xylonic acid, 2,3-Dideoxy-erythro-hex-2-enono-1,5-lactone; D-form, 4,6-Dibenzoyl, 2,6-Dideoxy-3-O-methyl-D-ribo-hexono-1,4-lactone, 2,6-Dideoxy-3-O-methyl-D-ribo-hexono-1,5-lactone, 2,3-Dihydroxybutanoic acid, 2,5-Dihydroxyhexanedoic acid, 2,3:5,6-Di-O-isopropylidene-D-gulono-1,4-lactone, 2,3:5,6-Di-O-isopropylidene-L-gulono-1,4-lactone, 2,3:5,6-Di-O-isopropylidene-D-mannono-1,4-lactone, 2,3-Di-O-methyl-L-xylono-1,4-lactone, 3,5-Di-O-methyl-L-xylono-1,4-lactone, Eritadenine; (2R,3R)-form, Eritadenine; (2R,3S)-form, Eritadenine; (2S,3R)-form, Ethyl-D-arabinoate, Ethyl 2-deoxy-3,4,5-tetra-O-acetyl-D-arabino-hexonate, Ethyl D-gluconate, 4,6-O-Ethylidene-D-glucono-1,5-lactone, Ethyl D-mannonate, Ethyl 2,3,4,5,6-penta-O-acetyl-D-galactonate, Ethyl 2,3,4,6-tetra-O-benzoyl-D-gluconate, Ethyl 2,3,5,6-tetra-O-benzoyl-D-gluconate, Fuconic acid; D-form, Fuconic acid; L-form, D-Galactonamide, L-Galactonamide, Galactonic acid; D-form, Galactonic acid; D-form, 2-Methylpropyl ester 2,3,4,5,6-penta-Ac, Galactonic acid; D-form, 6-Me, Galactonic acid; D-form, 2,3,4-Tri-Me, Galactonic acid; D-form, 2,3,4,6-Tetra-Me, Galactonic acid; D-form, Amide 2,3,4,6-tetra-Me, Galactonic acid; D-form, Amide, 2,3,5,6-tetra-Me, Galactonic acid; D-form, Amide, N-Ph, Galactonolactone; 1,4-Lactone, D-form, 2,3,5,6-Tetrabenzoyl, Galactonolactone; 1,4-Lactone, D-form, 2,3,5,6-Tetra-Me, Galactonolactone; 1,5-Lactone, D-form, 2,3,4-Tri-Me, Galactonolactone; 1,5-Lactone, D-form, 2,3,4,6-Tetra-Me, D-Galactono-1,4-lactone; D-Galactono-1,5-lactone, L-Galactono-1,5-lactone, D-Gluconamide, Gluconic acid; D-form, Gluconic acid; D-form, 2,3,4,5,6-Penta-Ac, Gluconic acid; Amide, 1N,2,3,4,5,6-hexabenzoyl, 1,4-Gluconacetone; D-form, 1,5-Gluconacetone; D-form, D-Glucononitrile, Glucuronic acid; D-form, Glucuronic acid; D-form, 3-Me, Glucuronic acid; D-form, 4-Me, Glucuronic acid; D-form, 2,3,-Di-Me, Glucuronic acid; D-form, 3,4,-Di-Me, Glucuronic acid; D-form, 2,3,4-Tri-Me, Glucuronic acid; D-form, 1-Ac, D-Gulonamide, Gulonic acid; D-form, Gulonic acid; DL-form, D-Gulono-1,4-lactone, L-Gulono-1,4-lactone, 2,3,4,5,6,7,8-Hepta-O-acetyl-D-erythro-L-gluco-octonic acid, D-glycero-D-galacto-Heptonamide, D-glycero-D-galacto-Heptonic acid, D-glycero-D-galacto-Heptono-1,4-lactone, Idonic acid; L-form, L-ldono-1,4-lactone, 1,2-O-Isopropylidene-3,5-O-benzylidene-α-D-glucuronic acid, 5,6-O-Isopropylidene-D-galactono-1,4-lactone, 4,6-O-Isopropylidene-D-glucono-1,5-lactone, 1,2-O-Isopropylidene-α-D-glucuronic acid, 2,3-O-Isopropylidene-D-gulono-1,4-lactone, 2,3-O-Isopropylidene-D-lyxono-1,4-lactone, 3,5-O-Isopropylidene-D-lyxono-1,4-lactone, 2,3-O-Isopropylidene-2-C-methyl-D-ribonolactone, Isopropyl 2,3,4,5,6-penta-O-acetyl-D-galactonate, Isopropyl 2,3,4,5,6-penta-O-acetyl-D-gluconate, D-Lactonic acid, D-Lactono-1,5-lactone, Lyxonic acid; D-form, D-Lyxono-1,4-lactone, Maltobionic acid, Maltotetraonic acid, Mannolactone; 1,4-Lactone-D-form, 2,3-O-Isopropylidene, Mannolactone; 1,4-Lactone-D-form, 2,3-O-Isopropylidene, 5,6-di-Me, Mannolactone; 1,4-Lactone-D-form, 3,5,6-Tri-Me, Mannolactone, 1,5-Lactone-D-form, 2,3,4-Tribenzoyl, 6-deoxy, Mannolactone, 1,5-Lactone-L-form, 3,4,6-Tri-Me, D-Mannonamide, L-Mannonamide, Mannonic acid; D-form, Mannonic acid; L-form, D-Mannono-1,4-lactone, D-Mannono-1,5-lactone, L-Mannono-1,4-lactone, L-Mannono-1,5-lactone, Mannononitrile; D-form, Mannononitrile; D-form, 2,3,4,5-Tetra-Me, Melibionic acid, Methyl 2-deoxy-D-arabino-hexonate, Methyl 2-deoxy-3,4,5,6-tetra-O-acetyl-D-arabino-hexonate, Methyl 2,4:3,5-di-O-benzylidene-D-xylonate, Methyl 2,3,4,5,6,7,8-hepta-O-acetyl-D-erythro-L-gluco-octonate, Methyl D-mannonate, Methyl octa-O-methyl-D-lactonate, Methyl octa-O-methyl-maltobionate, Methyl octa-O-methyl-melibionate, Methyl 2,3,4,5,6-penta-O-acetyl-D-gluconate, Methyl 2,3,4,5,6-penta-O-acetyl-L-idonate, Methyl penta-O-acetyl-D-mannonate, Methyl penta-O-acetyl-L-mannonate, 2-C-Methylribonic acid; D-form, 2-C-Methylribonic acid; D-form, 1,4-Lactone, 2-C-Methylribonolactone; D-form, 2-C-Methylribonolactone; L-form, Methyl 2,3,4,6-tetra-O-benzoyl-D-gluconate, Methyl 2,3,5,6-tetra-O-benzoyl-D-gluconate, Methyl 2,3,4-tri-O-methyl-β-D-glucopyranosiduronic acid, Methyl D-xylonate, Mycolic acid, D-erythro-L-gluco-Octonic acid, Paneamic acid, Pantetheine, ΔPanthenol, 2,3,4,5,6-Penta-O-acetyl-D-galactonic acid, 2,3,4,5,6-Penta-O-acetyl-L-galactonic acid, 2,3,4,5,6-Pentaacetyl-D-gluconamide, 2,3,4,5,6-Penta-O-acetyl-D-glucononitrile, 2,3,4,5,6-Penta-O-acetyl-D-mannonitrile, 2,3,4,5,6-Penta-O-acetyl-D-talonic acid, 2,3,4,5,6-Penta-O-benzoyl-D-gluconamide, 2,3,4,5,6-Penta-O-benzoyl-D-glucononitrile, 2,3,4,5,6-Penta-O-methyl-D-mannonitrile, Propyl 2,3,4,5,6-Penta-O-acetyl-D-galactonate, Reflexin, L-Rhamnonamide, L-Rhamnono-1,4-lactone, L-Rhamnono-1,5-lactone, Ribonic acid; D-form, Ribonic acid; D-form, 1,4-Lactone, 5-Me, Ribonic acid; D-form, 1,4-Lactone, 3,5-di-Me, D-Ribono-1,4-lactone, L-Ribono-1,4-lactone, Talonic acid; D-form, Talonic acid; L-form, D-Talono-1,4-lactone, L-Talono-1,4-lactone, 2,3,4,5-Tetra-O-acetyl-D-arabinonic acid, 4,5,6,7-Tetra-O-acetyl-2,3-dideoxy-D-arabino-hept-2-enonic acid, 2,3,4,6-Tetra-O-acetyl-D-glucono-1,5-lactone, 2,3,5,6-Tetra-O-acetyl-D-glucono-1,4-lactone, 2,3,4,6-Tetra-O-acetyl-D-mannono-1,5-lactone, 2,3,5,6-Tetra-O-acetyl-D-mannono-1,4-lactone, 2,3,4,5-Tetra-O-acetyl-D-xylonic acid, 2,3,4,5-Tetra-O-acetyl-DL-xylonic acid, 2,3,4,5-Tetra-O-acetyl-L-xylonic acid, 2,3,4,6-Tetra-O-benzoyl-D-glucono-1,5-lactone, 2,3,5,6-Tetra-O-benzoyl-D-glucono-1,4-lactone, 2,3,4,6-Tetra-O-benzyl-D-1-2-O-(D-glucopyranosylidene)-ethanediol, 4,5,6,7-Tetrahydroxy-2-heptenoic acid; (2E,4R,-5S,6R)-form 4,5,6,7-Tetrahydroxy-2-heptenoic acid; (2E,4S,-5R,6S)-form, Me ester, 4,5,6,7-tetra-Ac, 2,3,4,6-Tetra-O-methyl-D-gluconamide, 2,3,5,6-Tetra-O-methyl-D-gluconamide, 2,3,4,6-Tetra-O-methyl-D-glucono-1,5-lactone, 2,3,5,6-Tetra-O-methyl-D-glucono-1,4-lactone, 2,3,4,6-Tetra-O-methyl-D-glucononitrile, 2,3,5,6-Tetra-O-methyl-D-glucononitrile, 2,3,4,6-Tetra-O-methyl-D-mannono-1,5-lactone, 2,3,4,6-Tetra-O-methyl-L-mannono-1,5-lactone, 2,3,5,6-Tetra-O-methyl-D-mannono-1,4-lactone, 2,3,5-Triamino-2,3,5-trideoxy-D-arabino-1,4-lactone, 2,3,6-Tri-O-benzoyl-2-C-methyl-D-ribonolactone, 2,3,5-Tri-O-benzyl-D-arabino-1,4-lactone, 2,4,6-Tri-O-benzyl-3-deoxy-threo-hex-2-enono-1,5-lactone; L-form, 2,3,4-Trihydroxybutanoic acid, 2,3,4-Tri-O-methyl-D-xylono-1,5-lactone, 2,3,5-Tri-O-methyl-L-xylono-1,4-lactone, D-Xylonamide, Xylonic acid; D-form, Xylonic acid; L-form, 1,4-Xylonolactone; D-form, 1,4-Xylonolactone, L-form, 2-Acetamido-4,6-O-benzylidene-2,3-deoxy-D-erythro-hex-2-enono-1,5-lactone, 2-Acetamido-2-deoxy-L-galacturonic acid, 2-Acetamido-2,3-dideoxy-D-threo-hex-2-enonic acid γ-lactone, 2-Acetamido-2,3-dideoxy-D-erythro-hex-2-enonolactone, 2-Acetamido-2,3-dideoxy-D-erythro-hex-2-enono-1,4-lactone, 2-Acetamido-2,3-dideoxy-D-threo-hex-2-enono-1,5-lactone, 2-Acetamido-2,3-dideoxy-5,6-O-isopropylidene-D-erythro-hex-2-enonic acid γ-lactone, 2-Acetamido-2,3-dideoxy-5,6-O-isopropylidene-D-threo-hex-2-enonic acid γ-lactone, 2-Acetamido-2,3-dideoxy-4,6-O-isopropylidene-D-erythro-hex-2-enono-1,5-lactone, 2-Acetamido-2,3-dideoxy-4,6-O-isopropylidene-D-threo-hex-2-enono-1,5-lactone, 2-Amino-2-deoxyaltruronic acid; L-form, 2-Amino-2-deoxygalacturonic acid; D-form, 2-Amino-2-deoxyglucuronic acid; D-form, 2-Amino-2-deoxyglucuronic acid; α-D-pyranose-form, Benzyl glycoside, N-benzyloxycarbonyl, 4-Amino-4-deoxyglucuronic acid; D-form, 2-Amino-2-deoxyguluronic acid; L-form, 2-Amino-2-deoxymannuronic acid; D-form, 2-Amino-2-deoxymannuronic acid; D-form, N-Ac, 2-Amino-2-deoxymannuronic acid; α-D-pyranose-form, Benzyl glycoside, di-Ac, Me ester, Benzyl 2-acetamido-2-deoxy-α-D-mannopyranosiduronic acid, Benzyl 2,3-di-O-benzyl-galactopyranosiduronic acid; β-D-form, Benzyl glucopyranosiduronic acid; α-D-form, Benzyl glucopyranosiduronic acid; β-D-form, Benzyl glucopyranosiduronic acid; β-D-form, Me ester, 2,3-dibenzyl, Benzyl β-D-ribofuranosiduronic acid, Benzyl 2,3,4-tri-O-benzyl-β-D-glucopyranosiduronic acid, Cellobiouronic acid, Chondrosine, 1,2-O-Cyclohexylidene-α-D-glucurono-6,3-lactone, 2,3-Diacetamido-2,3-dideoxy-D-glucuronic acid, 2,3-Diacetamido-2,3-dideoxy-L-guluronic acid, 2,3-Diamino-2,3-dideoxy-glucuronic acid; D-form, 2,3-Di-O-methyl-D-galacturonic acid, 2,4-Di-O-methyl-D-galacturonic acid, 3,4-Di-O-methyl-D-galacturonic acid, 2,3-Dioxopropanoic acid, Galacturonic acid; D-form, Galacturonic acid; α-D-pyranose-form, Galacturonic acid; α-D-pyranose-form, 1,2:3,4-Di-O-benzylidene, Galacturonic acid; β-D-pyranose-form, Galacturonic acid; β-D-furanose-form, Galacturonic acid; β-D-furanose-form, Me glycoside, Me ester, 2,3-di-Me, Galacturonic acid; β-D-furanose-form, Me glycoside, Me ester, 2,3,5-tri-Me, Glucuronamide; α-D-form, Me pyranoside, 3,4-di-Me, ΔGlucurono-6,3-lactone; D-form, Glucurono-6,3-lactone; D-form, 5-Benzyl, Glucurono-6,3-lactone; α-1,2,-O-Cyclohexylidene, 5-benzyl, Glucurono-6-3-lactone; α-D-furanose-form, Me glycoside, 5-benzyl, 2-Me, Glucurono-6,3-lactone; α-D-furanose-form, Me glycoside, 2,5-di-Me, Glucurono-6,3-lactone; β-D-furanose-form, Me glycoside, 5-benzyl, 2-Me, Glucurono-6,3-lactone; β-D-furanose-form; Me glycoside, 2,5-di-Me, Guluronic acid; L-form, Guluronic acid; L-form, 3,6-Lactone, Hyalbiuronic acid, 3-C-Hydroxymethylriburonic acid; D-form, Iduronic acid; D-form, D-Idurono-1,4-lactone, L-Idurono-1,4-lactone, 1,2-O-Isopropylidenegluco-fururono-6,3-lactone; α-D-form, 1,2-O-Isopropylidene-α-D-glucuronamide, 1,2-O-Isopropylidene-L-idurono-1,4-lactone, Laetrile, Lyxuronic acid; D-form, Lyxuronic acid; L-form, Maltobiouronic acid, Mannuronic acid; D-form, Mannuronic acid; α-D-Pyranose-form, Me glycoside, 2,3,4-tri-Ac, Mannuronic acid; L-form, Methyl 4-amino-4-deoxy-α-D-glucopyranosiduronic acid, Methyl 4-amino-2,3,4-trideoxy-α-D-erythro-hex-2-enopyranosiduronic acid, Methyl(benzyl 2,3-O-benzyl-β-D-galactopyranosid)uronate, Methyl(benzyl β-D-gluco-pyranosid)uronate, Methyl(benzyl hexa-O-acetyl-β-maltobiopyranosid)uronate, Methyl(benzyl 2,3-O-isopropylidene-β-D-ribo-furanosid)uronate, Methyl(benzyl 2,3,4-tri-O-acetyl-β-D-gluco-pyranosid)uronate, Methyl (benzyl-2,3,4-tri-O-acetyl-β-D-glucopyranosid)-uronate, Methyl(benzyl 2,3,4-tri-O-benzyl-β-D-glucopyranosid)-uronate, Methyl 1,2:3,4-di-O-benzylidene-α-D-galacto-pyranosuronate, Methyl 1,2:3,4-di-O-isopropylidene-α-D-galacto-pyranosuronate, Methyl 2,5-di-O-methyl-α-D-glucopyranosiduronamide, Methyl 2,5-di-O-methyl-β-D-glucopyranosiduronamide, Methyl β-D-furanosiduronо-6,3-lactone, Methyl α-D-galacto-pyranosiduronamide, Methyl galactopyranosiduronic acid; α-D-form, Methyl galactopyranosiduronic acid; α-D-form, 3,4-Di-Me, Methyl galactopyranosiduronic acid; α-D-form, Me ester, 2,3-dibenzyl, Methyl galactopyranosiduronic acid; α-D-form, Me ester, 2-Me, Methyl galactopyranosiduronic acid; α-D-form, Me ester, 3,4-di-Me, Methyl galactopyranosiduronic acid; α-D-form, Me ester, 2,3,4-tri-Me, Methyl galactopyranosiduronic acid; α-D-form, Me ester, 2,3-dibenzyl, Methyl galactopyranosiduronic acid; β-D-form, Methyl galactopyranosiduronic acid; β-D-form, 2,3,4-Tri-Me, Methyl galactopyranosiduronic acid; β-D-form, Me ester, 2,3-di-Me, Methyl galactopyranosuronate, Methyl galactosiduronamide; α-D-Pyranose-form, 3,4-O-Isopropylidene, 2-Ac, Methyl galactosiduronamide; α-D-Pyranose-form, 2-Me, Methyl galactosiduronamide; α-D-Pyranose-form, 3,4-Di-Me, Methyl galactosiduronamide; α-D-Pyranose-form, 2,3,4-Tri-Me, Methyl galactosiduronamide; β-D-Furanose-form, 2,3-Di-Me, Methyl α-D-gluco-furanosiduronо-6,3-lactane, Methyl β-D-glucopyranosiduron-amide, Methyl glucopyranosiduronic acid; α-D-form, Methyl glucopyranosiduronic acid; β-D-form, Methyl glucopyranosiduronic acid; β-D-form, 4-Ac, 2,3-di-Me, Methyl glucopyranosiduronic acid; β-D-form, Me ester, 4-Ac, 2,3-di-Me, 2-O-(4-O-Methyl-α-D-glucopyranuronosyl)-D-xylose, Methyl glucuronate; α-D-form, Methyl glucuronate; α-D-form, Me pyranoside, 4-Me, Methyl glucuronate; β-D-form, Me pyranoside, 2,3,4-tri-Ac, Methyl hepta-O-acetyl-maltobiuronate, Methyl 3,4-O-isopropylidene-α-D-galactopyranosiduron-amide, Methyl 1,2-O-isopropylidene-α-D-ribofuranuronate, Methyl 2,3-O-isopropylidene-β-D-ribofuranuronate, Methyl L-lyxuronate, Methyl mannofuranosidurono-6,3-lactone; α-D-form, Methyl mannofuranosidurono-6,3-lactone; α-D-form, Methyl α-D-manno-pyranosiduronamide, Methyl α-D-manno-pyranosiduronic acid, Methyl α-D-manno-pyranosidurono-6,3-lactone, Methyl(methyl 3-benzamido-2-O-benzoyl-3,4-dideoxy-α-D-xylo-hexopyranosid)uronate, Methyl(methyl 3-benzamido-2-O-benzoyl-3,4-dideoxy-β-D-xylo-hexopyranosid)uronate, Methyl(methyl 4-deoxy-α-L-threo-hex-4-enopyranosid)-uronate, Methyl (methyl 4-deoxy-β-L-threo-hex-4-enopyranosid)-uronate, Methyl(methyl α-D-galacto-pyranosid)uronate, Methyl (methyl β-D-galacto-pyranosid)uronate, Methyl 4-O-methyl-α-D-gluco-pyranosiduronamide, Methyl 4-O-methyl-β-D-gluco-pyranosiduronamide, Methyl(methyl 3,4-O-iso-propylidene-α-D-galacto-pyranosid)uronate, Methyl(methyl 3,4-O-iso-propylidene-β-D-galacto-pyranosid)uronate, Methyl(methyl α-D-manno-pyranosid)uronate, Methyl(methyl β-D-ribo-furanosid)uronate, Methyl (methyl 2,3,4-tri-O-acetyl-α-D-galacto-pyranosid)uronate, Methyl(methyl 2,3,4-tri-O-acetyl-β-D-gluco-pyranosid)uronate, Methyl(methyl 2,3,4-tri-O-benzoyl-α-D-galacto-pyranosid)uronate, Methyl(methyl 2,3,4-tri-O-methyl-β-D-gluco-pyranosid)uronate, Methyl(methyl 2,3,4-tri-O-methyl-α-D-gluco-pyranosid)uronate, Methyl(methyl 2,3,4-tri-O-methyl-α-D-manno-pyranosid)uronate, Methyl (phenyl β-D-gluco-pyranosid)uronate, Methyl(phenyl 2,3,4-tri-O-acetyl-α-D-gluco-pyranosid)uronate, Methyl(phenyl 2,3,4-tri-O-acetyl-β-D-gluco-pyranosid)uronate, Methyl 1,2,3,4-tetra-O-acetyl-α-D-glucuronate, Methyl 1,2,3,4-tetra-O-acetyl-β-D-glucuronate, Methyl 2,3,5-tri-O-methyl-β-D-galactopyranosiduronamide, Methyl 2,3,4-tri-O-methyl-α-D-glucopyranosiduronamide, Methyl 2,3,4-tri-O-methyl-β-D-glucopyranosiduronamide, Methyl 2,3,4-tri-O-methyl-β-D-glucopyranosiduronin acid, Moenuronic acid; α-Pyranose-form, Me glycoside, Phenyl glucopyranosiduronic acid; α-D-form, Phenyl glucopyranosiduronic acid; β-D-form, Riburonic acid; D-form, Riburonic acid; α-D-furanose-form, 2,3-O-Isopropylidene, Riburonic acid; α-D-furanose-form, 2,3-O-Isopropylidene, 1,5-lactone, Riburonic acid; β-D-furanose-form, Benzyl glycoside, 2,3-O-Isopropylidene, Riburonic acid; β-D-furanose-form, Me glycoside, 2,3-O-Isopropylidene, Riburonic acid; β-D-furanose-form, Me glycoside, 2,3-O-Isopropylidene, Me ester, Riburonic acid; β-D-furanose-form, Me glycoside, 2,3-O-Isopropylidene, isopropyl ester, Riburonic acid; L-form, 1,2,5-Tri-O-acetyl-α-D-glucurono-6,3-lactone, 1,2, 5-Tri-O-acetyl-β-D-glucurono-6,3-lactone, 2,3,4-Tri-O-methyl-D-galacturonic acid, Allaric acid; D-form, D-Allaric acid diamide, D-Allaric acid, Arabinaric acid; D-form, Arabinaric acid; L-form, Diamide, tri-Me, 2,4-O-Benzylidene-D-glucaric acid, 2,3-Di-O-acetyl-L-tartaric acid, 2,6-Diamino-2,4,5,6-tetra-deoxy-arabino-heptaric acid, 2,6-Diamino-2,4,5,6-tetra-deoxy-lyxo-heptaric acid, 2,6-Diamino-2,4,5,6-tetra-deoxy-ribo-heptaric acid, 2,6-Diamino-2,4,5,6-tetra-deoxy-xylo-heptaric acid, 2,3-Di-O-benzoyl-L-tartaric acid, 2,4:3,5-Di-O-benzylidene-D-idaric acid, Diethyl D-allarate, Diethyl galactarate, Diethyl L-tartrate, Diethyl meso-tartrate, Dihydroxybutenedioic acid, 2,3-Dihydroxy-2,3-dimethyl-butanedioic acid, 2,4-Dihydroxypentanedioic acid, 2,3-Dimethoxybutanedioic acid, Dimethyl 2,4:3,5-di-O-benzylidene-D-idarate, Dimethyl galactarate, Dimethyl D-glucarate, Dimethyl DL-tartrate, Dimethyl L-tartrate, Dimethyl meso-tartrate, 1,3-Dioxolane-4,5-dicarboxylic acid, Diphenyl L-tartrate, Fukiic acid, ΔGalactaric acid, Galactaric acid; 2,3,4,5-Tetra-Ac, Galactaric acid; 2,3,5-Tri-Me((±)-), Galactaric acid; Mono-Et ester ((±)-), Galactaric acid; Di-Me ester, 2,3,4,5-tetra-Ac, Galactaric acid; Di-Et ester, di-O-isopropylidene, Galactaric acid; Di-Et ester, 2,3,4,5-tetra-Ac, Galactaric acid; Di-Et ester, 2,3:4,5-di-O-methylene, Galactaric acid; Di-Et ester, 2,5:3,4-di-O-methylene, Galactaric acid; Diamide, Galactaric acid; Diamide, 1N,2,3,5,6N-penta-Me ((±)-), Galactaric acid; Diamide, 2,3,4,5-tetra-Ac, Galactaric acid; Diamide, 2,3,4-tri-Me ((±)-), Galactaric acid; 1,4-Lactone, Et ester ((±)-), Glucaric acid; D-form, Di-Me ester, 5-Ac, Glucaric acid; D-form, Di-Me ester, 2,3,:4,5-di-O-benzylidene, Glucaric acid; D-form, Di-Me ester, 3,4-O-isopropylidene, Glucaric acid; D-form, Di-Me ester, 3,4-O-isopropylidene, 2,5-di-Me, Glucaric acid; D-form, Di-Me ester, 3,5-di-Ac, Glucaric acid; D-form, Di-Me ester, 2,3,4,5-tetra-Me, Glucaric acid; D-form, Di-Me ester, 3,4-O-benzylidene, 2,5-di-Me, Glucaric acid; D-form, 6-Amide, 1-Me ester, 2,4-O-benzylidene, Glucaric acid; D-form, Diamide, Glucaric acid; D-form, Diamide, 2,4-O-benzylidene, Glucaric acid; D-form, Diamide, 3,4-O-isopropylidene, Glucaric acid; D-form, Diamide, 3,4-O-isopropylidene, 2,5-di-Me, 1,4:6,3-Glucarodilactone; D-form, 1,4:6,3-Glucarodilactone; D-form, 2,5-Di-Me, 1,5:6,3-Glucarodilactone; D-form, Glucarodilactone; 1,4-Lactone, D-form, 6-Me ester, 2,3,5-tri-Me, Glucarodilactone; 1,5-Lactone, D-form, 2,3,4-Tri-Me, Glucarodilactone; 1,5-Lactone, D-form, 6-Benzyl ester, 2,3,4-tribenzyl, Glucarodilactone; 1,5-Lactone, D-form, 6-Me-ester, 2,3,4-tri-Me, Glucarodilactone; 6,3-Lactone, D-form, 1-Et ester, 2,4-O-benzylidene, Glucarodilactone; 6,3-Lactone, D-form, 1-Et ester, 2,4-O-benzylidene, 5-Ac, Glucarodilactone; 6,3-Lactone, D-form, 1-Et ester, 2,4-O-benzylidene, 5-benzoyl, Glucarodilactone; 6,3-Lactone, D-form, 1-Et ester, 2,4-O-methylene, Glucarodilactone; 6,3-Lactone, D-form, 1-Me ester, 2,4-O-benzylidene, Glucarodilactone; 6,3-Lactone, D-form, 1-Me ester, 2,4-O-benzylidene, 5-Ac, Glucarodilactone; 6,3-Lactone, D-form, 1-Me ester, 2,4-O-methylene, Glucarodilactone; 6,3-Lactone, D-form, 1-Amide, 2,4-O-benzylidene, D-Glucaro-1,4-lactone, D-Glucaro-1,5-lactone, D-Glucaro-6,3-lactone, L-Gularic acid, ΔHydroxybutanediol acid, Idaric acid; D-form, Mannaric acid; D-form, Mannaric acid; D-form, 1,4-Lactone, phenylhydrazide, D-Mannaric acid diamide, L-Mannaric acid diamide, D-Mannaro-1,4:6,3-bislactone, L-Mannaro-1,4:6,3-bislactone, Piscidic acid, Ribaric acid, Ribaric acid; 1,4-lactone, Ribarci acid; Diamide, 1,5-di-N-Me,2,3,4-tri-Me, ΔSuccinic acid, Talaric acid; L-form, D-Talaro-1,4-lactone, D-Talaro-6,3-lactone, Tartaric acid; (2R,3R)-form, Diamide, DL-Tartaric acid, meso-Tartaric acid, Tetrahydro-α-3,5-trimethyl-6-oxo-2H-pyran-2-acetic acid, D-Threatic acid, ΔL-Threatic acid, Xylaric acid, Xylaric acid; Di-Me ester, tri-Ac, Xylaric acid; Anhydride, tri-Ac, Xylaric acid; Diamide, tri-Me, N-Acetylneuramine acid, 6-O-(N-Acetyl-α-D-neuraminyl)-D-galactose, Araboascorbic acid; L-form, Araboascorbic acid; L-form, 3-Me, Ascorbalamic acid, Ascorbic acid; D-form, Ascorbic acid; L-form, Ascorbic acid 2-phosphate; L-form, 5,6-O-Cyclohexylidene-L-threo-hex-2-enono-1,4-lactone, Dehydroascorbic, 3-Deoxy-D-arabinoheptulosonic acid 7-phosphate, 3-Deoxy-D-manno-oct-2-ulosonic acid, 3-Deoxy-D-manno-oct-2-ulosonic acid; α-pyranose-form, 4,5,7,8-Tetra-Ac, 2,3:4,6-Di-O-isopropylidene-β-L-xylo-2-hexulosonic acid, Glucoascorbic acid; D-form, Glucoascorbic acid; D-form, 3-Me, Glucoascorbic acid; D-form, 2,3-Di-Me, arabino-2-Hexulosonic acid, xylo-5-Hexulosonic acid; D-form, Isoascorbic acid, 5,6-O-Isopropylidene-L-threo-hex-2-enono-1,4-lactone, Methyl 3-deoxy-D-manno-oct-2-ulono-1,4-lactone, Methyl 3-deoxy-α-D-manno-oct-2-ulopyranosidonic acid, Methyl 3-deoxy-β-D-manno-oct-2-ulopyranosidonic acid, Methyl 3-deoxy-2,4,5,7,8-penta-O-acetyl-D-manno-oct-2-ulopyranosonate, Methyl(methyl 3-deoxy-4,6,7,-8-tetra-O-benzoyl-β-D-manno-oct-2-ulpyranosidonate), Methyl 2,3,4,6-tetra-O-acetyl-D-hex-5-ulosonate, Neuraminic acid, Neuraminic acid, N-Benzoyl, Neuraminic acid, N-Benzyloxy-carbonyl, 2,3,5,7-Penta-O-methyl-D-arabino-hept-2-enono-1,4-lactone, Sialic acid, ΔVitamin C, 4,7-Anhydro-5,6,8-O-tri-benzyl-2,3-dideoxy-2,2,3,3-tetrahydro-D-allo-octonic acid methyl ester, 4,7-Anhydro-5,6,8-O-tri-benzyl-2,3-dideoxy-2,2,3,3-tetrahydro-D-altro-octonic acid methyl ester, Ascorbalamic acid, 3-Deoxy-D-arabinoheptulosonic acid 7-phosphate, 3-Deoxy-D-manno-oct-2-ulosonic acid, 3-Deoxy-D-manno-oct-2-ulosonic acid; α-Pyranose-form, 4,5,7,8-Tetra-Ac, Glucoascorbic acid; D-form, Glucoascorbic acid; D-form, 3-Me, Glucoascorbic acid; D-form, 2,3-Di-Me, D-Glycero-D-ido-heptono-1,4-lactone, N-Glycolylneuraminic acid, 2,3,4,5,6,7,8-Hepta-O-acetyl-D-erythro-L-manno-octonic acid, 2,3,4,5,6,7,8-Hepta-O-acetyl-D-erythro-L-gluco-octonic acid, D-glycero-D-galacto-Hepton-amide, D-glycero-L-manno-Hepton-amide, D-glycero-D-ido-Heptonic acid, D-glycero-D-galacto-Heptonic acid, D-glycero-D-gulo-Heptonic-amide, D-glycero-D-gulo-Heptonic-amide, 1,4-Lactone, 2,3,5,-6,7-penta-Me, D-glycero-D-talo-Heptonic acid, D-glycero-L-manno-Heptonic acid, D-glycero-D-galacto-Heptono-1,4-lactone, D-glycero-D-gulo-Heptono-1,4-lactone, D-glycero-D-talo-Heptono-1,4-lactone, D-glycero-L-manno-Heptono-1,4-lactone, Methyl 3,6-anydro-2-deoxy-4,5:7,8-di-O-isopropylidene-D-glycero-D-talo-octonate, Methyl 3,6-anhydro-2-deoxy-4,5:7,8-di-O-isopropylidene-D-glycero-D-galacto-octonate, Methyl 3-deoxy-D-manno-oct-2-ulono-1,4-lactone, Methyl 3-deoxy-α-D-manno-oct-2-ulopyranosidonic acid, Methyl 3-deoxy-β-D-manno-oct-2-ulopyranosidonic acid, Methyl 3-deoxy-2,4,5,7-penta-O-acetyl-D-manno-oct-2-ulopyranosonate, Methyl 2,3,4,5,7,8-penta-O-acetyl-D-manno-oct-2-ulopyranosonate, Methyl 2,3,5,6,7,8-hepta-O-acetyl-D-erythro-L-gluco-octonate, Methyl(methyl-4,6,7,8-tetra-O-benzoyl-β-D-manno-oct-2-ulopyranosidonate), Neuraminic acid, Neuraminic acid; N-Benzoyl, Neuraminic acid; N-Benzyl-oxycarbonyl, D-erythro-L-manno-Octonic acid, D-erythro-L-gluco-Octonic acid, 2,3,5,6,7-Penta-O-methyl-D-arabino-hept-2-enono-1,4-lactone, Acetylmuramic acid, Benzyl 2-acetamido-4,6-O-benzylidene-3-O-(1-carboxy-ethyl)-2-deoxy-α-D-gluco-pyranoside, Benzyl 2-acetamido-3-O-(1-carboxyethyl)-2-deoxy-α-D-glucopyranoside, 3-Deoxy-2-C-hydroxymethyl-D-erythropento-1,4-lactone, 3-Deoxy-2-C-hydroxymethyl-D-erythro-pentonic acid, 3-Deoxy-2-C-hydroxymethyl-2,2',4,5-tetra-O-acetyl-D-erythro-pentonic acid, Methyl 2-acetamido-4,6-O-benzylidene-3-O-(1-carboxyethyl)-2-deoxy-α-D-glycopyranoside, 2-C-Methyl-1,4-erythro-nolactone; D-form, Muramic acid, Quinic acid, Δ3-Benzyloxy-1,2-propanediol, Cytidine diphosphate glycerol, ΔA1,3-Dioxolane4-methanol, Erythroflavin, 1-O-β-D-Galactofuranosyl-D-glycerol, O-α-D-Galactopyranosyl-(1→2)-O-α-D-glucopyranosyl-(1→1)-D-glycerol, 2-O-α-D-Galactopyranosyl-glycerol, ΔGlycerol, ΔGlycerol 1-acetate, Glycerol 2-acetate, Glycerol 1,2- dihexadecanoate-3-phosphoinositol, Glycerol 1,2-di-9,12-oct-adecadienoate 3-phosphoinositol, Glycerol 1,2-di-9,12-oct-adecadienoate 3-phosphoserine, Glycerol 1-dodecanoate 2-9-octadecadienoate 3-phosphoinositol, Glycerol 1-hexadecanoate 2-9-octadecadienoate 3-phosphoinositol, Glycerol 1-monophosphate, Glycerol 2-monophosphate, Glycerol 1-9,12-octadecadienoate 3-phosphoinositol, Glycerol 1-octadecanoate 2,9-octadecenoate 3-phosphoinositol, ΔGlycerol triacetate, ΔGlycerol trinitrate, Glycosyldiacylglycerols, 1,2-O-Isopropylideneglycerol; (R)-form, 1,2-O-Isopropylideneglycerol; (S)-form, 1,2-O-Isopropylideneglycerol; (±)-form, D-1,2-O-Isopropylidene-tritylglycerol; 2-Methyl-1,2,3-butanetriol, 2-Methyl-1,3-dioxolane-4-methanol, Δ3-(2-Methylphenoxy)-1,2-propanediol, Militarine, Parishin, 1,2,3-Pentanetriol, 1,2,5-Pentanetriol, 1,3,4-Pentanetriol, 1,3,5-Pentanetriol, 2,3,4-Pentanetriol, 7-Phenyl-4,6-heptadiyne-1,2,3-triol, 1-Phenyl-1,2,3-propanetriol, 1,3:2,4-Di-O-benzylidene-erythritol, 1,2:3,4-Di-O-benzylidene-DL-erythritol, 1,2:3,4-Di-O-benzylidene-L-erythritol, ΔErythritol, 1,2,3,4-Hexanetetrol, 1,2,5,6-Hexanetetrol, 1,3,4,6-Hexanetetrol, 2,3,4,5-Hexanetetrol, 2,3-O-Isopropylidene-D-threitol, 2,3-O-Isopropylidene-L-threitol, 2-C-Methylerythritol; D-form, Montagnetol, Putidolumazine, 1,2,3,4-Tetra-O-acetyl-erythritol, 1,2,3,4-Tetra-O-benzoyl-erythritol, Threitol; (2R, 3R), Threitol; (2S,3S), Threitol; (±)-form, Arabinitol; D-form, Arabinitol; L-form, Araboflavin; D-form, Araboflavin; L-form, Araboflavin; DL-form, 1,3-O-Benzylidene-D-arabinitol, 3,5-O-Benzylidene-L-arabinitol, 10-Deazariboflavin, 2,3:4,5-Di-O-benzylidene-D-arabinitol, 2,3:4,5-Di-O-isopropylidene-D-arabinitol, 2,3:4,5-Di-O-isopropylidene-L-arabinitol, Kelletinin II, Lyxoflavin; D-form, Lyxoflavin; L-form, 1,2,3,4,5-Penta-O-acetyl-D-arabinitol, 1,2,3,4,5-Penta-O-acetyl-L-arabinitol, ΔRibitol, Ribitol; 2,4-O-Benzylidene Ribitol; 2,3:4,5-Di-O-benzylidene, Ribitol; 2,3,4-Tribenzoyl, 1,5-diphosphate, Ribitol; 2,3,4-Tribenzyl, 1,5-ditrityl, ΔRiboflavin, 2,3,4-Tri-O-benzoyl-1,5-di-O-tosyl-L-arabinitol, Umbilicin, ΔXylitol, Xylitol; 1,2:3,4-Di-O-isopropylidene, Xylitol; Penta-Ac, Xylitol; Pentabenzoyl, α-Acritol, Allitol, Allitol; 2,4:3,5-Di-O-methylene, Allitol; 2,4:3,5-Di-O-methylene, 1,6-ditosyl, Allitol; 1,2,3,4,6-Penta-Me, Allitol; 1,2,4,6-Penta-Me, 1-Amino-1-deoxyglucitol; D-form, 2-Amino-2-deoxyglucitol; D-form, B,HCl, 1-Amino-1-deoxymannitol; D-form, 1-Amino-1-dexoxyribitol; D-form, 1-Amino-1-deoxyribitol; L-form, 1,4-Anhydro-DL-allitol, 1,5-Anhydro-D-allitol, 1,4-Anhydro-2,3:5,6-di-O-isopropylidene-D-mannitol, 1,5-Anhydro-2,3:4,5-di-O-isopropylidene-D-mannitol, 1,5-Anhydrogalactitol; D-form, 1,4-Anhydroglucitol; D-form, 1,5-Anhydroglucitol; D-form, 1,5-Anhydroglucitol; D-form, 2,3,4-Tri-Ac, 1,5-Anhydroglucitol; D-form, Tetra-Ac, 1,4-Anhydromannitol; D-form, 1,4-Anhydromannitol; D-form, 2,3-O-Isopropylidene, 6-tosyl, 2,5-Anhydrotalitol; D-form, 1-O-Benzoyl-2,3:4,5-di-O-isopropylidene-D-allitol, 1-O-Benzoyl-L-fucitol, 3-O-Benzyl-D-allitol, 1,3-O-Benzylidenearabinitol; D-form, 4,6-O-Benzylidene-D-glucitol, 1,3-O-Butlyidene-L-fucitol, 6-Deoxy-2,4:3,5-di-O-methylene-D-glucitol, 6-Deoxy-2,4:3,5-di-O-methylene-L-glucitol, 1-Deoxy-D-gulitol, 1-Dexoy-L-gulitol, 6-Deoxy-2,4-O-methylene-D-glucitol, 6-Deoxy-2,4-O-methylene-L-glucitol, 6-Deoxy-D-talitol, 6-Deoxy-L-talitol, 2,5-Di-O-acetyl-1,4:3,6-dianhydro-D-iditol, 2,5-Di-O-acetyl-1,4:3,6-dianhydro-L-iditol, 1,2-Diamino-1,2-dideoxyglucitol; D-form, 1,4-Diamino-1,4-dideoxyglucitol; D-form, 1,2-Diamino-1,2-dideoxymannitol; D-form, 1,4:3,6-Dianhydro-2,5-di-O-benzoyl-D-iditol, 1,4:3,6-Dianhydro-2,5-di-O-benzoyl-L-iditol, 1,4:3,6-Dianhydro-2,5-di-O-mesyl-D-iditol, 1,4:3,6-Dianhydro-2,5-di-O-mesyl-L-iditol, 1,4:3,6-Dianhydro-2,5-di-O-tosyl-D-iditol, 1,4:3,6-Dianhydro-2,5-di-O-tosyl-L-iditol, Δ1,4:3,6-Dianhydroglucitol; D-form, 1,4:3,6-Dianhydroglucitol; D-form, 2-Ac, 5-tosyl, 1,4:3,6-Dianhydroglucitol; D-form, 5-Ac, 2-tosyl, 1,4:3,6-Dianhydroglucitol; D-form, 2,5-Ditosyl, 1,4:3,6-Dianhydroglucitol; D-form, 2,5-Dibenzyl, 1,4:3,6-Dianhydroiditol; L-form, 1,4:3,6-Dianhydromannitol; D-form, 1,4:3,6-Dianhydromannitol; D-form, 2,5-Di-Ac, 1,4:3,6-Dianhydromannitol; D-form, 2,5-Dibenzoyl, 1,4:3, 6-Dianhydromannitol; D-form, 2,5-Ditosyl, Deoxystreptamine, 4,6-Diamino-1,2,3,5-cyclo-hexanetetrol, ΔDibekacin, 3,4-Dicaffeoylquinic acid, 3,5-Dicaffeoylquinic acid, 4,5-Dicaffeoylquinic acid, 1,2:3,4-Di-O-cyclohexylidene-cis-inositol, 1,2:3,4-Di-O-cyclohexylidene-epi-inositol, 1,2:5,6-Di-O-cyclohexylidene-myo-inositol, 2,3:5,6-Di-O-isopropylidene-1,4-di-O-methyl-D-chiro-inositol, 1,2:4,5-Di-O-isopropylidene-muco-inositol, 1,2:4,5-Di-O-isopropylidene-myo-inositol, 1,2:4,5-Di-O-isopropylidene-L-chiro-inositol, Galactinol, Gentamine $C_{1a}$, Glycerol 1,2-dihexadecanoate 3-phosphoinositol, Glycerol 1,2-di-9,12-octadecadienoate 3-phosphoinositol, Glycerol 1,2-di-9,12-octadecadienoate 3-phosphoserine, Glycerol 1-dodecanoate 2-9-octadecenoate 3-phosphoinositol, Glycerol-1-hexadecanoate 2-9-octadecenoate 3-phosphoinositol, Glycerol 1,9,12-octadecadienoate 2,9-octadecenoate 3-phosphoinositol, Glycerol 1-octadecanoate 2,9-octadecenoate 3-phosphinositol, 1,2,3,4,5,6-Hexa-O-acetyl-epi-inositol, 1,2,3,4,5,6-Hexa-O-acetyl-muco-inositol, 1,2,3,4,5,6-Hexa-O-acetyl-neo-inositol, 1,2,3,4,5,6-Hexa-O-acetyl-scyllo-inositol, 1,2,3,4,5,6-Hexa-O-benzoyl-cis-inositol, 1,2,3,4,5,6-Hexa-O-benzoyl-myo-inositol, Homoquinic acid; 1,3,4,5-tetra-Ac, Homoquinic acid; Nitrile, 2-Hydroxybutirosin, 4-Hydroxymethyl-1,2,3-hexanetriol, allo-Inositol, cis-Inositol, d-Inositol, epi-Inositol, 1-Inositol, muco-Inositol, muco-Inositol, 1-Me, myo-Inositol, myo-Inositol, 1-phosphate, myo-Inositol, 1,4-Di-phosphate, neo-Inositol, scyllo-Inositol, D-Inosose, epi-Inosose-2; (+)-form, epi-Inosose-2; (−)-form, myo-Inosose-1; (−)-form, myo-Inosose-2, myo-Inosose-2; Penta-Ac, myo-lnosose-2; Pentabenzoyl, Kanamine, Kasuganobiosamine, (−)-Laminitol, (−)-Leucanthemitol, D-(−)-Liriodendritol, Mannimositose, 2-O-α-D-Mannopyranosyl-myo-inositol, Melibiitol, N-Methyl-2-deoxystreptamine, 1-O-Methyl-D-chiro-inositol, 1-O-Methyl-L-chiro-inositol, 1-O-Methyl-D-myo-inositol; D-form, 1-O-Methyl-D-chiro-inositol; L-form, 2-O-Methyl-D-myo-inositol, 4-O-Methyl-D-myo-inositol; D-form, 5-O-Methyl-D-myo-inositol, Mytilitol, ΔNarciclasine, Neosurugatoxin, Penta-O-acetyl-(+)-epi-inosose, Penta-O-acetyl-1-O-methyl-D-myo-inosose, Penta-O-acetyl-1-O-methyl-L-myo-inosose, 1,2,3,4,6-Penta-O-acetyl-5-O-methyl-myo-inositol, 1,2,3,5,6-Penta-O-acetyl-4-O-methyl-myo-inositol, 1,2,4,5,6-Penta-O-acetyl-2-O-methyl-myo-inositol, Penta-O-benzoyl-(+)-epi-inosose, Penta-O-benzoyl-(−)-epi-inosose, ΔPhytic acid, D-Pinitol, L-Pinitol, Pinpollitol, Quebrachitol; L-form, Quebrachitol; L-form, 5,6-O-Isopropylidene, Quebrachitol; L-form, 3,4:5,6Di-O-isopropylidene, L-Quebrachitol, proto-Quercitol; (+)-form, Pentabenzoyl, proto-Quercitol; (+)-form, 3,4-O-Isopropylidene, scyllo-Quercitol; Penta-Ac, scyllo-Quercitol; 3-Me, vibo-Quercitol; L-form, vibo-Quercitol; L-form, Penta-Ac, vibo-Quercitol; L-form, Pentabenzoyl, vibo-Quercitol; L-form, 2-Me, Saccharocin, Streptamine, 2,4,5,6-Tetra-O-acetyl-dambonitol, 1,2,5,6-Tetra-O-acetyl-myo-inositol, 1,2:3,4:5,6-Tri-O-cyclo-hexylidene-epi-inositol, 1,2:3,4:5,6-Tri-O-iso-propylidene-allo-inositol, 1,2:3,4:5,6-Tri-O-iso-propylidene-L-chiro-inositol, Wilfordine, Bis(methyl-4,6-O-benzylidene-[2,3-b][2'3'-k]-1,4,7,10,-13,16-hexaoxacyclo-octadecane, Bis(methyl-4,6-O-benzylidene-[2,3-b][3'2'-k]-1,4,7,10,-13,16-hexaoxacyclo-octadecane, 3,6-Dideoxy-D-ribo-hexitol, 3,6-Dideoxy-D-xylo-hexitol, Δ1-O-β-D-Mannopyranosyl-L-erythritol, Tannin, 2-Acetamido-2-deoxy-α-D-glucose 1-(dihydrogen phosphate), 2-Acetamido-2-deoxy-β-D-glucose 1-(dihydrogen phosphate), ΔAdenosine diphosphate, Adenosine 2',5'-diphosphate, Adenosine 3',5'-diphosphate, Adenosine diphosphate ribose, Adenosine 5'-diphospho-glucose, ΔAdenosine triphosphate, Adenosine 5'-uridine 5'-phosphate, ΔAdenylic acid, 2'-Adenylic acid, 3'-Adenylic acid, Adenylosuccinic acid, εADP, Agrocin 84, 2-Amino-2-deoxyglucitol; D-form, 3-phosphate, 2-Amino-2-deoxyglucopyranosyl phosphate; α-D-form, 2-Amino-2-deoxyglucose 1-(dihydrogen phosphate); D-form, 2-Amino-2-deoxyglucose 3-(dihydrogen phosphate); D-form, 2-Amino-2-deoxyglucose 6-(dihydrogen phosphate); D-form, N-(5-Amino-1-β-D-ribo-furanosylimidazole-4-carbonyl)-L-aspartic acid 5'-phosphate, 5-Amino-1-ribofuranosyl-1H-imidazole-4-carboxamide; β-D-form, 5'-Phosphate, 5-Amino-1-ribofuranosyl-imidazole-4-carboxamide, 5'-(dihydrogen phosphate); β-D-form, 3'-εAMP, 5'-εAMP, Anthranilic deoxyribulotide, 1-Arabinofuranosyluracil; β-D-form, 5'-Phosphate, Ascorbic acid 2-phosphate; L-form, εATP, 8-Azaguanosine; 5'-Phosphate, 6-Azathymidine; 3'-Phosphate, 6-Azathymidine; 5'-Phosphate, 6-Azathymidine; 3',5'-Phosphate, 6-Azauridine 5'-phosphate, Benzyl 2-amino-4,6-O-benzylidene-2-deoxy-α-D-glucopyranoside-3-(dihydrogen phospate), Coenzyme A, ΔCoenzyme 1, Coenzyme II, ΔCyclic AMP, Cyclic GMP, Cytidine 2'-(dihydrogen phosphate), Cytidine 3'-(dihydrogen phosphate), ΔCytidine 5'-(dihydrogen phosphate), Cytidine diphosphate ethanolamine, Cytidine diphosphate glycerol, Cytidine 2',3'-phosphate, 2'-Deoxyadenosine; 3'-Phosphate, 2'-Deoxyadenosine; 5'-Phosphate, 2'-Deoxycytidine; 3'-Phosphate, 2'-Deoxycytidine; 5'-Phosphate, 6-Deoxy-6-fluoro-α-D-galactopyranose 1-(dihyrogen phosphate), 2'-Deoxyribofuranosylguanine; β-D-form, 5'-Phosphate, $P^1,P^4$-Diguanosine 5'-tetraphosphate, 1,2:3,4-Di-O-isopropylidene-(α-D-galactopyranose 6-dihydrogen phosphate, N-Dimethyladenosine; 5'-Phosphate, Fructose 1,6-bis(dihydrogen phosphate); D-form, Fructose 1-dihydrogen phosphate; D-form, Fructose 2-dihydrogen phosphate, Fructose 6-dihydrogen phosphate; D-form, FUDRP, Galactose 1-dihydrogen phosphate; α-D-Pyranose-form, Galactose 1-dihydrogen phosphate; β-D-Pyranose-form, Galactose 3-dihydrogen phosphate; D-form, Galactose 3-dihydrogen phosphate; D-form, Isopropylidene, 4,6-O-ethylene, Galactose 6-dihydrogen phosphate; D-form, Glucose 1-dihydrogen phosphate; α-D-Pyranose-form, Glucose 1-dihydrogen phosphate; α-L-Pyranose-form, Glucose 2-dihydrogen phosphate; D-form, Glucose 3-dihydrogen phosphate; D-form, Glucose 4-dihydrogen phosphate; D-form, Glycerol 1,2-di-9,12-octadecadienoate 3-phosphoinositol, Glycerol 1,2-di-9, 12-octadecadienoate 3-phosphoserine, Glycerol 1-dodecanote 2-9-octadecanoate 3-phosphoinositol, Glycerol 1-hexadecanoate 2-9-octadecenoate 3-phosphoinositol, Glycerol 1-monophosphate, Glycerol 2-monophosphate, Glycerol 1-9,12-octadecadienoate 2,9-octadecenoate 3-phosphoserine, Glycerol 1-octadecanoate 2,9-octadecenoate 3-phosphoinositol, Guanosine 5'-diphosphate, Guanosine diphosphate mannose, ΔGuanosine 5'-triphosphate, 3'-Guanylic acid, Δ5'-Guanylic acid, L-glycero-D-manno-heptose; 1-Phosphate, dicyclohexylammonium salt, altro-2-Heptulose; D-form, 7-Phosphate, xylo-Hexos-5-ulose; α-D-Furanose-form, 1,2-O-Isopropylidene, di-Me acetal, 6-phosphate, bis(cyclohexylammonium) salt, myo-Inositol; 1-Phosphate myo-Inositol; 1,4-Di-phosphate, Mannose; β-D-Pyranose-form, 2,3,4,6-Tetra-Ac, 1-(dihydrogen phosphate), 2-Methyladenosine; 5'-Phosphate, 2-Methylthioadenosine; 5'-di-hydrogen phosphate, Orotidine 5'-(dihydrogen phosphate), Phosphoramidon, ΔPhytic acid, Ribitol; 2,3,4-Tribenzyl, 1,5-diphosphate, 9-Ribofuranosyluric acid; β-D-form, 5'-Phosphate, Robison ester, ΔSpongoadenosine, Tagatose; D-form, Tagatose; α-D-furanose-form, 1,2:3,4-Di-O-isopropylidene, 6-phosphate, Talopeptin, 5-Thioglucose; α-D-Pyranose-form, Me glycoside, 6-phosphate, 4-Thiourine; 5'-Diphosphate, 4-Thioruine; 5'-Triphosphate, Thuringiensin, Thymidine, 5'-Phosphate, Thymidine 5'-pyrophosphate, Trehalose 6-(dihydrogen phosphate), 1,3,4-Trihydroxy-2-butanone; (R)-form, Dimethyl ketal 1-phosphate, Uridine diphosphate glucose, ΔUridine 5'-(tetrahydrogen triphosphate), Uridine 5'-(trihydrogen diphosphate), 5'-Uridylic acid, Xylose 1-dihydrogen phosphate; α-D-Pyranose-form, Xylose 1-dihydrogen phosphate; β-D-Pyranose-form, Xylose 3-dihydrogen phosphate; D-form, Xylose 5-dihydrogen phosphate; D-form, Acaciabiuronic acid, 2-Acetamido-3-O-(2-acetamido-2,3-dideoxy-5,6-O-iso-propylidene-α-D-erythro-hex-2-enofuranosyl)-1,4-anhydro-2-deoxy-5,6-iso-propylidene-D-arabino-hex-1-enitol, 2-Acetamido-3-O-(2-acetamido-2,3-dideoxy-5,6-O-iso-propylidene-β-D-erythro-hex-2-enofuranosyl)-1,4-anhydro-2-deoxy-5,6-O-iso-propylidene-D-arabino-hex-1-enitol, 1,4:3,6-Dianhydromannitol; D-form, 2,5-Ditrityl, 1,3:2,4-Di-O-benzylidene-D-glucitol, 2,3:4,5-Di-O-benzylidene-D-glucitol, Δ1,6-Dibromo-1,6-dideoxy-galactitol, 1,6-Dibromo-1,6-dideoxy-3,4-O-isopropylidene-D-mannitol, Δ1,6-Dibromo-1,6-dideoxy-mannitol; D-form, 1,6-Dibromo-1,6-dideoxy-mannitol; D-form, 3,4-O-Isopropylidene, 2,5-di-Ac, 1,2:3,4-Di-O-ethylidene-D-glucitol, 1,6-Di-O-β-D-glucopyranosyl-D-mannitol, 2,3:4,5-Di-O-isopropylidene-L-fucitol, 2,3:4,5-Di-O-isopropylidene-L-rhamnitol, 2,3:4,5-Di-O-isopropylidene-D-talitol, 2,3:4,5-Di-O-isopropylidene-5-O-tosyl-L-rhamnitol, 2,3:4,5-Di-O-methylene-D-mannitol, 1,3:4,5-Di-O-methylene-D-talitol, 2,3:4,5-Di-O-methylene-D-talitol, 1,6-Di-O-trityl-D-mannitol, 4,6-O-Ethylidene-D-glucitol, Galactitol, Galactitol; Hexa-Ac, Galactitol; 1,6-Dibenzoyl, Galactitol; Hexabenzoyl, 3-O-β-D-Galactofuranosyl-D-mannitol, Glucitol; DL-form, 1-O-D-Glucopyranosyl-D-mannitol; α-form, 1-O-D-Glucopyranosyl-D-mannitol; β-form, 3-O-β-D-Glucopyranosyl-D-mannitol; 1,2,3,4,5,6-Hexa-O-acetyl-D-glucitol, 1,2,3,4,5,6-Hexa-O-acetyl-D-iditol, 1,2,3,4,5,6-Hexa-O-acetyl-L-iditol, 1,2,3,4,5,6-Hexa-O-acetyl-D-mannitol, 1,2,3,4,5,6-Hexa-O-acetyl-D-talitol, 1,2,3,4,5,6-Hexa-O-benzoyl-D-glucitol, 1,2,3,4,5,6-Hexa-O-benzoyl-L-iditol, 1,2,3,4,5,6-Hexa-O-benzoyl-D-mannitol, 6-(1H-Indol-3-yl)-8-(2,3,4,5-tetrahydroxypentyl)-2,4,7-(1H,3H,8H)-pteridinetrione, 3,4-O-Isopropylidene-L-iditol, 3,4-O-Isopropylidene-L-rhamnitol, ΔMannitol; D-form, Mannitol; L-form, ΔMannomustine, 1,2,3,4,5-Penta-O-acetyl-6-deoxy-D-glucitol, 1,2,3,4,5-Penta-O-acetyl-6-deoxy-L-glucitol, 1,2,3,4,5-Penta-O-acetyl-L-fucitol, 1,2,3,4,5-Penta-O-acetyl-L-fucitol, Rhamnitol; D-form, Rhamnitol; L-form, Rhamnitol; DL-form, Rhodeitol, Sorbierite, Sorbieritol, ΔD-Sorbitol, L-Sorbitol, Styracitol, Talitol, D-form, Talitol; L-form, Talitol; DL-form, Talitol, DL-form, Hexa-Ac, 2,3,4,5-Tetra-O-acetyl-1,6-di-O-tosyl-D-mannitol, 2,3,4,5-Tetra-O-benzoyl-1,6-di-O-tosyl-D-mannitol, 2,4,5-Tri-O-acetyl-1,3-O-benzylidene-D-arabinitol, 1,3:2,4:5,6-Tri-O-benzylidene-D-glucitol, 1,2:3,4:5,6-Tri-O-iso-propylidene-D-glucitol, 1,2:3,4:5,6-Tri-O-iso-propylidene-L-iditol, 1,3:2,4:5,6-Tri-O-methylene-D-talitol, Valolaginic acid, Vescalagin, 3,7-Anhdro-1,2-dideoxy-D-glycero-L-manno-1-octenitol; 5,6,8-Tribenzyl, 7-Deoxy-D-glycero-D-manno-heptitol, 7-Deoxy-D-glycero-D-manno-heptitol, Tri-O-benzylidene, glycero-gulo-Heptitol, glycero-gulo-Heptitol, Hepta-Ac, glycero-gulo-Heptitol, 1,2:4,5:6,7-Tri-O-iso-propylidene, D-glycero-D-manno-Heptitol, D-glycero-D-manno-Tri-O-benzylidene, D-glycero-D-manno-Heptitol; Hepta-Ac, D-glycero-D-galacto-Heptitol, D-glycero-D-galacto-Heptitol, 1,2:4,5:6,7-Tri-O-iso-propylidene, D-glycero-D-galacto-Heptitol, Hepta-Ac, D-glycero-D-gluco-Heptitol, D-glycero-L-gulo-Heptitol, D-glycero-L-gulo-Heptitol, heptabenzoyl, D-glycero-L-talo-Heptitol, D-glycero-L-galacto-Heptitol, D-glycero-L-galacto-Heptitol, Hepta-Ac, D-arabino-L-galacto-Nonitol, D-arabino-L-galacto-Nonitol, Nona-Ac, D-erythro-D-galacto-Octitol, D-erythro-D-galacto-Octitol, Octabenzoyl, Actinamine, ΔAmikacin, 4-O-(6-Amino-6-deoxygluco-pyranosyl)-2,5-dideoxy-streptamine, 5"-Amino-4',5"-dideoxy-butirosin A, 1-Amino-6-hydroxymethyl-1,2,3-cyclohexanetriol, 5"-Amino-3',4,5"-trideoxy-butirosin A, Amylostatin, Aphloiol, Bluensidene, Butikacin, ΔButirosamine, ΔButirosin A, Conduritol A, Conduritol B, Conduritol C, Conduritol D, Conduritol E, 1-O-p-Coumaroylquinic acid, 3-O-p-Coumaroylquinic acid, 4-O-p-Coumaroylquinic acid, 5-O-p-Coumaroylquinic acid, Crotepoxide, 1,2,3,4-Cyclohexanetetrol, 1,2,3,5-Cyclohexanetetrol, 1,2,4,5-Cyclohexanetetrol, 1,2,3-Cyclohexanetetrol, 1,2,4-Cyclohexanetetrol, 1,3,5-Cyclohexanetetrol, 1,2-O-Cyclohexylidene-myo-inositol, 1,2,3,4,5-Cyclopentanepentol, 1,2,3,4-Cyclopentanetriol, 1,2,3-Cyclopentanetriol, 1,2,4-Cycoopentanetriol, Dambonitol, 2-Deoxy-chiro-inositol, 2-Deoxy-L-chiro-inositol, Acetobromocellobiose, Acetobromoisoprimeverose, Acetobromolactose, Acetobromolactose, Acetobromomaltose, Acetobromomelibiose, Acetobromorutinose, Acetobromosophorose, Acetobromoturanose, Acetochlorocellobiose, Acetochlorogentiose, Acetochlorolactose, Acetochloromaltose, Acetochloromelibiose, Acetochloroprimeverose, Acetochlororutinose, Acetochloroturanose, 6-O-(N-Acetyl-α-D-neuraminyl)-D-galactose, Acetoside, Agarobiose, Amicetamine, ΔAmicetin, Amorphol, ΔAmygdalin, Δ1',2-Anydro-1-O-D-fructo-furanose-D-fructofuranose, 1',2-Anydro-1-O-fructosyl-furanose-Dipyranosyl-form, 1',2-Anydro-1-O-fructosyl-furanose-Furanosyl-form, Arabinofuranobiose, Arabinopyranobiose, Azralidose, 2-Bromoethyl 4-O-(2,3,4,6-tetra-O-acetyl-α-D-galactopyranosyl)-2,3,6,-tri-O-acetyl-β-D-galactopyranoside, 2-Bromoethyl 4-O-(2,3,4,6-tetra-O-acetyl-β-D-galactopyranosyl)-2,3,6,-tri-O-acetyl-β-D-galactopyranoside, 6'-O-(tert-Butylphenyl)-sucrose, Carrabiose, Cellobial, Cellobiose, Cellobiose, α-Pyranose-form, Cellobiose, β-Pyranose-form, Me glycoside, hepta-Ac, Cellobiouronic acid, Cellobiulose, Chondrosine, 1'-Deoxy-1'-fluorosucrose, 6',6-Diamino-6',6-dideoxysucrose, 1,6-Dichloro-1,6-dideoxy-β-D-fructofuranosyl 4-chloro4-deoxy-α-D-galactopyranoside, 6',6-Dichloro-6',6-dideoxy-hexabenzoylsucrose, 6',6-Dideoxyhexabenzoyl-sucrose, 1,6-Di-O-β-D-glucopyranosyl-D-mannitol, 13,28-Epoxy-11-oleanene-3,16-diol, Eryscenobiose, 8-Ethoxycarbonyl 2-acetamido-2-deoxy-3-O-β-D-galacto-pyranosyl-β-D-gluco-pyranoside, 8-Ethoxycarbonyl hepta-O-acetyl-α-D-cellobio-pyranoside, 8-Ethoxycarbonyl hepta-O-acetyl-β-D-lactopyranoside, 8-Ethoxycarbonyl hepta-O-acetyl-β-D-maltopyranoside, 8-Ethoxycarbonyl hepta-O-acetyl-β-D-maltopyranoside, Everninose, Flambabiose, Forsythiaside, β-D-Fructofuranosyl-α-D-arabino-hexopyranosid-2-ulose, Furcatin, Galactinol, 6-O-β-D-Galactofuranosyl-D-galactose, 1-O-β-D-Galactofuranosyl-D-glycerol, 3-O-β-D-Galactofuranosyl-D-mannitol, α-D-Galactopyranosyl-α-D-galactopyranoside, α-D-Galactopyranosyl-β-D-galactopyranoside, β-D-Galactopyranosyl-β-D-galactopyranoside, 3-O-β-D-Galactopyranosyl-D-galactose, 4-O-α-D-Galactopyranosyl-D-galactose, 4-O-β-D-Galactopyranosyl-D-galactose, 6-O-α-D-Galactopyranosyl-D-galactose, 2-O-α-D-Galactopyranosyl-glycerol, β-D-Galactopyranosyl 1-thio-β-D-galactopyranoside, Galiosin, Gein, Gentiobiose; α-Pyranose-form, Gentiobiose; β-Pyranose-form, Glucal; D-form, 3-O-β-D-glucosyl, 2-O-β-D-Glucopyranosyl-L-arabinose, 6-O-β-D-Glucopyranosyl-D-galactose, 1-O-D-Glucopyranosyl-D-mannitol; α-form, 1-O-D-Glucopyranosyl-D-mannitol; β-form, 3-O-β-D-Glucopyranosyl-D-mannitol; α-form, 3-O-β-D-Glucopyranosyl-D-mannose, Grandifoline, 1,2,2',3,3',4',6'-Hepta-O-acetyl-6-deoxy-6-iodo-D-lactose, 1,2,2',3,3',4',6'-Hepta-O-acetyllactose-D-form; Hepta-O-acetyl-α-D-lactosyl bromide, Hepta-O-acetyl-α-D-primeveropyranose, Hepta-O-acetyl-β-primeveroside, Hepta-O-acetyl-α-rutinose, Hexa-O-acetyl-α-robinobiosyl chloride, Hyalbiuronic acid, Inulobiose, Isomaltose, Isomaltulose, Isoprimeverose, Kasuganobiosamine, Kojibiose, Lactal, Lacto-N-biose, Lactosan, Lactose; α-form, Lactose; β-form, Lactulose, Laminaribiose, Lanceolarin, Leucrose, Levanbiose, Lucumin, Lycobiose, Lycoricyanin, ΔMacrozamin, Maltal, Maltobionic acid, Maltobiouronic acid, Maltosamine, ΔMaltose, Maltulose, Mannobiose, Mannobiose; β-Pyranose-form, 1-O-β-D-Mannopyranosyl-L-erythriol, 2-O-α-Mannopyranosyl-myo-inositol, Mannosylglucosaminide, Marsectobiose, Melibiitol, Melibionic acid, Melibiose, [2-(4-Methoxycarbonylbutane-carboxamido)ethyl]-2-acetamido-2-deoxy-3-O-β-D-galactopyranosyl-α-D-galactopyranoside, [2-(4-Methoxycarbonylbutane-carboxamido)ethyl]-2-acetamido-2-deoxy-3-O-β-D-galactopyranosyl-β-D-galactopyranoside, 8-Methoxycarbonyloctyl-α-D-cellobiopyranoside, 8-Methoxycarbonyloctyl-β-D-cellobiopyranoside, 8-Methoxycarbonyloctyl α-D-lactopyranoside, 8-Methoxycarbonyloctyl β-D-lactopyranoside, 8-Methoxycarbonyloctyl α-D-maltopyranoside, 8-Methoxycarbonyloctyl β-D-maltopyranoside, 22-Methoxy-3,26-furostane-diol, Methyl α-carrabioside, Methyl β-carrabioside, Methyl gentiobioside; α-form, Methyl gentiobioside; β-form, Methyl 4-O-β-D-glucopyranosyl-α-D-glucopyranoside, Methyl 4-O-α-D-gluco-pyranosyl-α-D-gluco-pyranoside, 2-O-(4-O-methyl-α-D-gluco-pyranuronosyl)-D-xylose, Methyl hepta-O-acetyl-α-D-galactopyranosyl-β-D-glucoside, Methyl hepta-O-acetylmalto-biuronate, Methyl hepta-O-methyl-α-D-galactopyranosyl-α-D-glucoside, Methyl hepta-O-methyl-α-D-galactopyranosyl-β-D-glucoside, Methyl α-D-lactopyranoside, Methyl β-D-lactopyranoside, Methyl maltopyranoside; α-D-form, Methyl octa-O-methylmalto-bionate, Methyl octa-O-methylmeli-bionate, Nasunin, Neoagarobiose, Neohesperidose, Neolactose, Neolloydosin, Nigerose, Octa-O-acetyl-α-D-lactopyranose, Octa-O-acetyl-β-D-lactopyranose, Octa-O-acetyl-α-neolactose, Octa-O-acetyl-β-neolactose, Octa-O-acetyl-α-D-turano-furanose, Octa-O-acetyl-β-D-turano-furanose, Octa-O-acetyl-α-turano-pyranose, Octa-O-acetyl-β-turano-pyranose, 6-O-Oleuropeoylsucrose, 3-Pentenoic acid, Periandrin III, Phenyl 2,2',3,3',4',6,6'-hepta-O-acetyl-α-D-lactoside, Phenyl 2,2',3,3',4',6,6'-hepta-O-acetyl-α-D-lactoside, Phenyl α-D-lactopyranoside, Phenyl α-D-maltoside, Phenyl β-D-maltoside, Planteobiose, Primeverin, Primeverose, Primulaverin, Rhoifolin, β-D-Ribofuranosyl-β-D-ribo-furanoside, ΔRobinin, Robinobiose, ΔRutin, Rutinose, Saikogenin F, Saikogenin G, Sambubiose, Sarsaparilloside, Solabiose, Sophoraflavanoloside, Sophorose, Strophanthobiose; Pyranose-form, Sucrose; Octa-Ac, Sucrose; Octabenzoyl, 6-O-(2,3,4,6-Tetra-O-acetyl-β-D-glucopyranosyl)-tri-O-acetyl-α-D-glucopyranosyl bromide, 2-Trehalosamine, 3-Trehalosamine, 4-Trehalosamine, α,α-Trehalose, α,α-Trehalose; Octa-Ac, α,β-Trehalose; β,β-Trehalose; Trehalose 6-(dihydrogen phosphate), α,α-Trehalose; 6,6'-dimycolate, 1',6',6-Triamino-1',6',6-trideoxysucrose, 2,2,2-Trichoroethyl 2-acetamido-2-deoxy-3-O-β-D-galactopyranosyl-β-D-glucopyranoside, 1,2,5-Trideoxy-4-O-(β-D-glucopyranosyl)-1,5-imino-D-arabino-hexitol, Troxerutin, Turanose, Umbilicin, Vicianose, Xylobiose, Xylobiose; Pyranose-form, Acarbose, Ajugose, Avenacin, Celloheptaose, Cellohexaose, Cellopentaose; β-form, Cellotetraose, Cellotriose, ΔCyclamin, ΔCycloheptaamylose, ΔCyclohexaamylose, Cyclooctaamylose, 2-4-Dammarene-3,12,20-triol, Dextrantriose, 4,6-Di-O-(α-D-gluco-pyranosyl)-D-glucopyranose, 5,6-Dimethylcytidine, Everninonitrose, Evertetrose, Evertriose, Flambeurekanose, O-α-D-Galactopyranosyl-(1→2)-O-α-D-glucopyranosyl-(1→1)-D-glycerol, Galactotriose, Gentianose, Gentiotetraose, Gentiotriose, F-Gitonin, Ipolearoside, 1-Kestose, 6-Kestose, Kojitriose, D-Lactonic acid, D-Lactono-1,5-lactone, Lactulosucrose, Laminaritriose, Maltohexaose, Maltopentaose, α-Maltosylfructose, Maltotetraitol, Maltotetraonic acid, Maltotetraose, Maltotriose, Mannimositose, Melezitose, Methyl octa-O-methyl-D-lactonate, Neokestose, Olgose, Operculinic acid, Panose, Papyrioside L-IIa, Planteose, Raffinose, Rhynchosporosides, Solatriose, Stachyose, Strophanthotriose, Trestatin A, Umbelliferose, Verbascose, Violutin, Xanthorhamnin, Xylohexaose, Xylopentaose, Xylotetraose, 3,3'-Di-O-acetyl-1,2-O-isopropylidene-β-L-tetrofuranose, 1 2:3,3'-Di-O-acetyl-1,2-O-isopropylidene-α-erythro-tetrofuranose, 3,3'-Di-O-benzyl-1,2-O-isopropylidene-α-L-erythrotetrofuranose, 3,3'-Di-O-benzyl-1,2-O-isopropylidene-β-L-threo-tetrofuranose, 1,2:3,3'-Di-O-isopropylidene-α-D-erythro-tetrofuranose, 1,2:3,3'-Di-O-isopropylidene-β-L-threo-tetrofuranose, Erythrose; D-form, Erythrose; α-D-Furanose-form, 1,2-O-Isopropylidene, Erythrose; L-form, Erythrose; β-D-Furanose-form, 2,3-O-Isopropylidene, 1,2-O-Isopropylideneapiose; β-L-threo-form, 1,2-O-Isopropylideneapiose; α-D-erythro-form, 1,2-O-Isopropylideneapiose; α-L-erythro-form, 1,2-O-Isopropylideneapiose; β-D-threo-furanose, 1,2-O-Isopropylidene-β-L-threofuranose, Threose; D-form, Threose; L-form, Threose; L-form, 2,4-O-Benzylidene, 1,3,4-Trihydroxy-2-butanone; (R)-form, 1,3,4-Trihydroxy-2-butanone; (S)-form, 2-Amino-2-dexoyarabinose; D-form, 2-Amino-2-deoxyarabinose; L-form, Arabinose; D-form, Arabinose; DL-form, Arabinose diethyldithioacetal; D-form, Arabinose diethyldithioacetal; L-form, Arabinosylamine; L-form, Benzyl arabinopyranoside; α-D-form, Benzyl arabinopyranoside; β-D-form, Benzyl arabinopyranoside; α-L-form, Benzyl arabinopyranoside; β-L-form, Benzyl 3,4-O-benzylidene-,β-L-arabinopyranoside, Benzyl 3,4-O-(R)-benzylidene-α-D-arabinopyranoside, Benzyl 3,4-O-isopropylidene-2-O-tosyl-α-D-arabinopyranoside, Benzyl 2,3,4-tri-O-acetyl-β-D-arabinopyranoside, Benzyl 2,3,4-tri-O-acetyl-α-L-arabinopyranoside, Benzyl 2,3,4-tri-O-acetyl-β-L-arabinopyranoside, Benzyl 2,3,4-tri-O-benzoyl-β-L-arabinopyranoside, 1,2:3,4-Di-O-isopropylidene-β-D-arabinopyranose, 1,2:3,4-Di-O-isopropylidene-β-L-arabinopyranose, 2,3:4,5-Di-O-isopropylidene-D-arabinose, 1,2-O-Isopropylidenearabinofuranose; β-L-form, 3,4-O-Isopropylidenearabinopyranose;β-D-form, 3,4-O-Isopropylidenearabinopyranose; -β-L-form, 1,2-O-Isopropylidenc-5-O-tosyl-, β-D-arabinofuranose, Methyl arabinofuranoside; α-D-form, Methyl arabinofuranoside; β-D-form, Methyl arabinofuranoside; α-L-form, Methyl arabinopyranoside; β-L-form, Methyl D-arabinopyranoside; α-form, Methyl D-arabinopyranoside; β-form, Methyl L-arabinopyranoside; α-form, Methyl L-arabinopyranoside; β-form, Methyl 3,4-O-benzylidene-β-L-arabinopyranoside, Methyl 3,4-di-O-methyl-β-L-arabinopyranoside, Methyl 3,4-O-ethylidene-β-L-arabinopyranoside, Methyl 3,4-O-isopropylidenearabinopyranoside; β-L-form, Methyl 3,4-O-isopropylidene-α-D-arabinopyranoside, Methyl 3,4-O-isopropylidene-β-D-arabinopyranoside, Methyl 4-O-methylarabinopyranoside; β-D-form, Methyl 4-O-methylarabinopyranoside; β-L-form, Methyl 4-O methylarabinopyranoside; α-DL-form, Methyl 5-O-tosyl-α-L-arabinofuranoside, Methyl 5-O-tosyl-β-L-arabinofuranoside, Methyl 2,3,4-tri-O-acetyl-α-D-arabinopyranoside, Methyl 2,3,4-tri-O-acetyl-α-D-arabinopyranoside, Methyl 2,3,4-tri-O-acetyl-β-D-arabinopyranoside, Methyl 2,3,4-tri-O-methyl-β-D-arabinopyranoside, Methyl 2,3,4-tri-O-methyl-β-L-arabinopyranoside, Methyl 5-O-trityl-α-L-arabinopyranoside, Pectinose, 1,2,3,5-Tetra-O-acetyl-α-D-arabinofuranose, 1,2,3,4-Tetra-O-acetyl-α-D-arabinopyranose, 1,2,3,4-Tetra-O-acetyl-α-L-arabinopyranose, 1,2,3,4-Tetra-O-acetyl-β-L-arabinopyranose, 2,3,4,5-Tetra-O-acetyl-D-arabinose diethyldithioacetal, 2,3,4,5-Tetra-O-acetyl-L-arabinose diethyldithioacetal, 1,2,3,4-Tetra-O-benzoyl-α-D-arabinopyranose, 1,2,3,4-Tetra-O-benzoyl-β-D-arabinopyranose, 1,2,3,4-Tetra-O-benzoyl-α-L-arabinopyranose, 1,2,3,4-Tetra-O-benzoyl-β-L-arabinopyranose, 1-Thioarabinose, L-form, 5-Thioarabinose; L-Furanose-form, 2,3,4-Tri-O-acetyl-β-L-arabinopyranoside, 2-Amino-2-deoxylyxose; D-form, 2-Amino-2-deoxylyxose; L-form, 5-O-Benzoyl-2,3-O-carbonyl-α-D-lyxofuranosyl bromide, Benzyl 2,3-O-isopropylidene-α-D-lyxofuranoside, 3,4-Di-O-benzoyl-2-bromo-2-deoxy-α-D-lyxopyranosyl bromide, 3,4-Di-O-benzoyl-2-bromo-2-deoxy-β-D-lyxopyranosyl bromide, 1,2,3,5-Di-O-benzylidene-α-D-xylofuranose, 1,2-O-Isopropylidene-β-L-lyxofuranose, 2,3-O-Isopropylidenelyxose; α-D-Furanose-form, Lyxose; D-form, Lyxose; α-D-Pyranose form, Lyxose; L-form, Lyxose; DL-form, Lyxosylamine; D-form, Lyxosylamine; L-form, Lyxosyl bromide; α-D-Pyranose-form, 2-C-Bromo, tribenzoyl, Lyxosyl chloride; α-D-Pyranose-form, Tribenzoyl, 2-C-chloro, Lyxosyl chloride; β-D-Pyranose-form, Tribenzoyl, 2-C-chloro, Methyl 5-O-benzyl 2,3-O-isopropylidene-α-D-lyxofuranoside, Methyl 2,3-O-isopropylidene-α-D-lyxopyranoside, Methyl 2,3-O- isopropylidene-L-lyxopyranoside, Methyl lyxofuranoside; α-D-form, Methyl lyxofuranoside; β-D-form, Methyl lyxopyranoside; α-D-form, Methyl lyxopyranoside; and β-D-form, Methyl 2,3,4-tri-O-acetyl-β-D-lyxopyranoside, Methyl 2,3,5-tri-O-tosyl-β-D-ribofuranoside, Methyl 2,3,5-tri-O-benzoyl-α-D-lyxofuranoside, D-Ribopyranosylamine, Methyl 2,3,4-tri-O-benzoyl-α-D-lyxopyranoside, Ribose; D-form, Methyl 5-O-trityl-α-D-lyxofuranoside, Ribose; L-form, Methyl 5-atrityl-β-D-lyxofuranoside, Ribose; DL-form, 1,2,3,4-Tetra-O-aceryl-α-D-lyxopyranose, D-Ribothiafuranose, 1,2,3,4-Tetra-O-acetyl-β-D-lyxopyranose, L-Ribothiafuranose, Tetra-O-acetyl-α-L-xylofuranose, α-D-Ribothiapyranose, Tetra-O-acetyl-α-D-xylopyranose, Tetra-O-acetyl-5-thio-β-D-ribopyranose, Tetra-O-acetyl-α-D-xylopyranose, 1-Thioribose; D-form Tetra-Ac, Tetra-O-acetyl-β-L-xylopyranose, 5-Thioribose; β-D-Pyranose-form, 1,2,3,4-Tetra-O-benzoyl-α-D-lyxopyranose, 1,2,3,4-Tetra-O-benzoyl-β-D-lyxopyranose, 1,2,3,4-Tetra-O-benzoyl-α-D-xylopyranoside, 2,3,4,5-Tetra-O-benzoyl-β-L-xylopyranose, 2,3,5-Tri-O-acetyl-1-O-benzoyl-β-D-xylofuranose, 2-Amino-2-deoxyxylose; α-D-form, 2,3,5-Tri-O-acetyl-α-D-lyxofuranosyl chloride, 2-Amino-2-deoxyxylose; α-L-form, 2,3,4-Tri-O-acetyl-α-D-lyxopyranosyl chloride, 4-Aminophenyl xylopyranoside; β-D-form, Xylose; D-form, 1,2-O-Cyclohexylidenexylofuranose; D-form, Xylose; L-form, 1,2-O-Cyclohexylidenexylofuranose; D-form, 3,5-Dimesyl, Xylose; DL-form, 2-O-Cyclohexylidenexylofuranose; D-form, 3,5-Ditosyl, 1,2:3,5-Di-O-cyclohexylidene-α-D-xylofuranose, 1,2:3,5-Di-O-isopropylidene-α-D-xylofuranose, 3-Acetamido-1,2,5-tri-O-acetyl-3-deoxy-β-ribofuranose, 2,3-Di-O-methyl-α-D-xylopyranose, 3-Amino-3-deoxy-1,2-O-isopropylidene-α-D-ribofuranose, 2,4-Di-O-methyl-β-D-xylopyranose; 2-Amino-2-deoxyribose; D-form, 2,5-Di-O-methyl-D-xylose, 2-Amino-2-deoxyribose; L-form, 3,4-Di-O-methyl-D-xylose, 3-Amino-3-deoxyribose; D-form, 3,5-Di-O-methyl-D-xylose, 1,2-O-Benzylidene-α-D-ribofuranose, 1,2-O-Isopropylidene-5-thio-α-D-xylofuranose, 2,3-O(R)-Benzylidene-β-D-ribofuranose, 1,2-O-Isopropylidenexylofuranose; α-D-form, 2,3-O-(S)-Benzylidene-β-D-ribofuranose, Methyl 3,5-O-isopropylidene-α-D-xylofuranoside, 5-O-Benzyl-1,2-O-isopropylidene-α-D-ribofuranose, Methyl 2-O-methyl-β-D-xylopyranoside, Benzyl 3,4-O-isopropylidene-β-D-ribopyranoside, Methyl 1-thio-β-D-xylopyranoside, Benzyl riboside; β-D-Pyranose-form, Methyl 2,3,4-tri-O-acetyl-α-D-xylopyranoside, Benzyl riboside; β-D-Furanose-form, Methyl 2,3,4-tri-O-acetyl-β-D-xylopyranoside, Benzyl riboside; β-D-Furanose-form, 5-Tosyl, Methyl 2,3,4-tri-O-benzoyl-α-D-xylopyranoside, Benzyl riboside; β-L-Pyranose-form, Methyl 2,3,4-tri-O-benzoyl-β-D-xylopyranoside, Benzyl 2,3,4-tri-O-benzoyl-β-D-ribopyranoside, Methyl xylofuranoside; α-D-form, 1,2:3,4-Di-O-isopropylidene-α-D-ribopyranose, Methyl xylopyranoside; α-D-form, Ethyl 1-thio-α-D-ribofuranoside, Methyl xylopyranoside; β-D-form3, 1,2-O-Isopropylideneribofuranose; α-D-form, 2-O-Methylxylose; D-form, 2,3-O-Isopropylideneribofuranose; D-form, 2-O-Methylxylose; D-form, Diethyldithioacetal, 1,2-O-Isopropylidene-α-D-ribopyranose, 2-O-Methylxylose; β-D-Pyranose-form, 3,4-O-Isopropylidene-β-D-ribopyranose, 3-O-Methylxylose; D-form, 1,2-O-Isopropylidene-5-O-tosyl-α-D-ribofuranose, 1,2,3,4-Tetra-O-acetyl-5-thio-α-D-xylopyranose, 1,2-O-Isopropylidene-5-O-trityl-α-D-ribofuranose, 1,2,3,4-Tetra-O-acetyl-5-thio-β-D-xylopyranose, Methyl 3-acetamido-2,5-di-O-acetyl-3-dexoy-β-D-ribofuranose, 2,3,4,5-Tetra-O-acetyl-D-xylose diethyldithioacetal, Methyl 3-acetamido-2,5-di-O-acetyl-3-deoxy-,α-D-ribofuranoside, 2,3,4,5-Tetra-O-acetyl-L-xylose diethyldithioacetal, Methyl 3-acetamido-2,4-di-O-acetyl-3-deoxy-α-D-ribopyranoside, 1-Thioxylose-D-form, Methyl 3-amino-3-deoxy-β-D-ribofuranose, 5-Thioxylose, Methyl 5-O-benzoyl-2,3-O-benzylidene-β-D-ribofuranoside, 2,3,4-Tri-O-methyl-D-xylose, Methyl 5-O-benzoyl-2,3-O-methylene-β-D-ribofuranoside, 2,3,5-Tri-O-methyl-D-xylose, Methyl 2,3-O-isopropylidene-β-D-ribofuranoside, Xylose diethyldithioacetal; D-form, Methyl 2,3-O-isopropylidene-β-L-ribofuranoside, Xylose diethyldithioacetal; L-form, Methyl 3,4-O-isopropylidene-β-D-ribopyranoside, Xylose 1-dihydrogen phosphate; α-D-Pyranose form, Methyl 2,3-O-isopropylidene-5-O-tosyl-β-D-ribofuranoside, Xylose 1-dihydrogen phosphate; β-D-Pyranose form, Methyl 2,3-O-isopropylidene-5-O-tosyl-B-L-ribofuranoside, Xylose 3-dihydrogen phosphate; D-form, Methyl ribofuranoside; α-D-form, Xylose 5-dihydrogen phosphate; D-form, Methyl ribofuranoside; β-D-form, Xylosylamine; D-form, Methyl ribofuranoside; α-L-form, Xylosylamine; L-form, Methyl ribofuranoside; β-L-form, Methyl ribopyranoside; α-D-form, Methyl ribopyranoside; β-D-form, Methyl 5-thio-α-D-ribopyranoside, Methyl 5-thio-β-D-ribopyranoside, 3-Acetamido-3-deoxy-1,2:5,6-di-O-isopropylidene-α-D-allofuranose, Methyl 2,3,5-tri-O-benzoyl-β-D-ribofuranoside, 3-Acetamido-3-deoxy-1,2-O-isopropylidene-α-D-allofuranose, 1-O-Acetyl-2,3:5,6-di-O-isopropylidene-β-D-allofuranose, Allose; D-form, Allose; D-form, Di-Et dithioacetal, Allose; D-form, 3-Tosyl, Allose; α-D-Pyranose-form, 1,2-O-Ethylidene, 4,6-di-Ac, 3-benzyl, Allose; β-D-Pyranose-form, Allose; β-D-Pyranose-form, 1,2,4,6-Tetrabenzoyl, 3-Me, Allose; β-D-Furanose-form, (S,S)-2,3:5,6-Di-O-ethylidene, Allose; β-D-Furanose-form, (R,R)-2,3:5,6-Di-O-ethylidene, 1-Ac, Allose; β-D-Furanose-form, (S,S)-2,3:5,6-Di-O-ethylidene, 1-Ac, Allose; L-form, 1,2-O-Isopropylidene-3,5,6-tri-O-benzoyl-α-D-allofuranose, 2-Amino-2-deoxyallose; D-form, 1,2-O-Isopropylidene-6-O-trityl-α-D-allofuranose, 3-Amino-1,2:5,6-di-O-cyclohexylidene-3-deoxy-α-D-allofuranose, Methyl 2-acetamido-4,6-O-benzylidene-2-deoxy-α-D-allopyranoside, 1-O-Benzoyl-2,3:5,6-di-O-isopropylidene-β-D-allofuranose, Methyl 2-O-acetyl-4,6-O-benzylidene-α-D-allopyranoside, 3-O-Benzyl-1,2:4,6-di-O-ethylidene-α-D-allopyranose, Methyl 2-O-acetyl-4,6-O-benzylidene-α-D-galactopyranoside, 1,2-Cyclohexylideneallofuranose; α-D-form, Methyl 3-O-acetyl-4,6-O-benzylidene-α-D-galactopyranoside, 2,6-Diacetamido-2,6-dideoxy-α-D-allopyranoside, 3-O-Methyl-β-D-allopyranose, 2,3-Diamino-2,3-dideoxyallose; D-form, Methyl alloside; α-D-Pyranose-form, 2,6-Diamino-2,6-dideoxyallose; α-D-allofuranose, Methyl alloside; α-D-Pyranose-form, 3,4-O-Isopropylidene, 6-benzoyl,2-tosyl, 1,2:5,6-Di-O-cyclohexylidene-α-D-allofuranose, Methyl alloside; α-D-Pyranose-form, 3,4-O-Isopropylidene, 2-tosyl, 1,2:5,6-Di-O-cyclohexylidene-3-C-ethyl-α-D-allofuranose, Methyl alloside; α-D-Pyranose-form, 3,4-O-Isopropylidene, 2,6-ditosyl, 1,2:5,6-Di-O-cyclohexylidene-3-O-mesyl-α-D-allofuranose, Methyl alloside; α-D-Pyranose-form, 3,Benzyl,2-Me, 6-tosyl, 1,2:5,6-Di-O-cyclohexylidene-3-C-methyl-α-D-allofuranose, Methyl alloside; β-D-Pyranose-form, 1,2:5,6-Di-O-cyclohexylidene-3-C-vinyl-α-D-allofuranose, Methyl alloside; β-D-Pyranose-form, 2,4-Di-Ac, 3,6-ditosyl, 2,3:5,6-Di-O-ethylidene-β-D-allopyranose, Methyl alloside; α-D-Furanose-form, 1,2:5,6-Di-O-isopropylidene-α-D-allofuranose, Methyl alloside; β-D-Furanose-form, 2,3:5,6-Di-O-isopropylideneallofuranose;

D-form, Methyl alloside; β-L-Furanose-form, 2,3-O-Isopropylidene, 6-Me, 5-tosyl, 2,3:5,6-Di-O-isopropylideneallofuranose; D-form, 1-(4-Nitrobenzoyl), Methyl 2,3-anhydro-4,6-O-benzylidene-β-D-allopyranoside, 2,3:5,6-Di-O-isopropylideneallofuranose; β-D-form, Methyl 2,3-anhydro-4,6-O-benzylidene-3-C-nitro-β-D-allopyranoside, 1,2:5,6-Di-O-isopropylidene-3-O-tosyl-α-D-allofuranose, Methyl 5,6-anhydro-2,3-O-isopropylidene-β-L-allofuranoside, Helicide, Methyl 2-benzamido-4,6-O-benzylidene-2-deoxy-α-D-allopyranoside, 1,2-O-isopropylideneallofuranose; α-D-form, Methyl 2-O-benzoyl-4,6-O-benzylidene-α-D-allopyranoside, 1,2-O-isopropylideneallofuranose; α-D-form, 3-Ac, Methyl 2-O-benzoyl-4,6-O-benzylidene-α-D-galactopyranoside, 1,2-O-isopropylideneallofuranose; α-D-form, 5,6-Di-Ac, Methyl 3-O-benzoyl-4,6-O-benzylidene-α-D-galactopyranoside, 1,2-O-isopropylideneallofuranose; α-D-form, 5,6-Di-Ac, 3-tosyl, Methyl 4,6-O-benzylideneallopyranoside; α-D-form, 1,2-O-Isopropylideneallofuranose; α-D-form, 5,6-Di-Ac, 3-benzyl, Methyl 4,6-O-benzylidene-α-D-galactopyranoside; 2,3-Di-Me, 1,2-O-Isopropylideneallofuranose; α-D-form, 3-Benzoyl, Methyl 4,6-O-benzylidene-2,3-O-isopropylidene-α-D-allopyranoside, 1,2-O-Isopropylideneallofuranose; α-D-form, 5-Benzoyl, Methyl 4,6-O-benzylidene-2-O-mesyl-α-D-allopyranoside, 1,2-O-Isopropylideneallofuranose; α-D-form, 6-Benzoyl, 3-Me, 5-tosyl, Methyl 4,6-O-benzylidene-2-O-tosyl-α-D-allopyranoside, 1,2-O-Isopropylideneallofuranose; α-D-form, 3,5-Dibenzoyl, Methyl 4,6-O-benzylidene-2-O-tosyl-α-D-galactopyranoside, 1,2-O-Isopropylideneallofuranose; α-D-form, 3-Tosyl, Methyl 4,6-O-benzylidene-3-O-tosyl-α-D-galactopyranoside, 1,2-O-Isopropylideneallofuranose; α-D-form, 6-Tosyl, Methyl 3-O-benzyl-2-O-methyl-α-D-allopyranoside, 1,2-O-Isopropylideneallofuranose; α-D-form, 3,6-Ditosyl, Methyl 5,6-O-cyclohexylidene-α-D-allofuranoside, 1,2-O-Isopropylideneallofuranose; α-D-form, 3-Me, Methyl 2,3-di-O-acetyl-4,6-O-benzylidene-α-D-allopyranoside, 1,2-O-Isopropylideneallofuranose; α-D-form, 3,5,6-Tri-Me, Methyl 2,3-di-O-acetyl-4,6-O-benzylidene-α-D-galactopyranoside, 1,2-O-Isopropylideneallofuranose; α-D-form, 5,6-O-Isopropylidene, 3-Ac, Methyl 2,6-dibenzamido-2,6-dideoxy-α-D-allopyranoside, 1,2-O-Isopropylideneallofuranose; α-D-form, 5,6-O-Isopropylidene, 3-benzoyl, Methyl 2,3:4,6-di-O-ethylidene-α-D-allopyranoside, 1,2-O-Isopropylideneallofuranose; α-D-form, 5,6-O-Isopropylidene, 3-benzyl, Methyl 2,3:5,6-di-O-isopropylidene-α-D-allofuranoside, 1,2-O-Isopropylideneallofuranose; α-D-form, 5,6-O-Isopropylidene, 3-Me, Methyl 2,3:5,6-di-O-isopropylidene-α-D-allofuranoside, 1,2-O-Isopropylideneallofuranose; α-D-form, 3-Benzyl, Methyl 2,3-O-isopropylidene-β-L-allofuranoside, 1,2-O-Isopropylidene-3,5,6-tri-O-acetyl-(α-D-allofuranose, Methyl 2,3-O-isopropylidene-6-O-methyl-β-L-allofuranoside, 1,2-O-Isopropylidene-3,5,6-tri-O-benzoyl-α-D-allofuranose, Methyl 2,3,4,6-tetra-O-acetyl-α-D-allopyranoside, 1,2-O-Isopropylidene-6-O-trityl-α-D-allofuranose, 1,2,3,4,6-Penta-O-acetyl-β-D-allopyranose, Methyl 2-acetamido-4,6-O-benzylidene-2-deoxy-α-D-allopyranoside, 1,5,6-Tri-O-acetyl-2,3-O-ethylidene-β-D-allofuranose, Methyl 2-O-acetamido-4,6-O-benzylidene-α-D-allopyranoside, 3,4,6-Tri-O-acetyl-1,2-O-ethylidene-α-D-allopyranose, Methyl 2-acetamido-4,6-O-benzylidene-α-D-galactopyranoside, Methyl 3-O-acetamido-4,6-O-benzylidene-α-D-galactopyranoside, 3-O-Methyl-β-D-alloypyranose, Methyl alloside; -α-D-Pyranose-form, Methyl alloside; -α-D-Pyranose-form, 3,4-O-Isopropylidene, 6-benzoyl, 2-tosyl, Altrose; D-form, Methyl alloside; -α-D-Pyranose-form, 3,4-O-Isopropylidene, 2-tosyl, Altrose; L-form, Methyl alloside; -α-D-Pyranose-form, 3,4-O-Isopropylidene, 2,6-ditosyl, Altrose; L-form, me glycoside, 2,3-dibenzyl, 6-trityl, Methyl alloside; -α-D-Pyranose-form, 3-Benzyl, 2-Me, 6-tosyl, 2-Amino-2-deoxyaltrose; D-Pyranose-form, Methyl alloside; -β-D-Pyranose-form, 1,2:5,6-Di-O-isopropylidene-β-D-altrofuranose, Methyl alloside; -β-D-Pyranose-form, 2,4-Di-Ac, 3,6-ditosyl, 1,2:3,4-Di-O-isopropylidene-β-D-altropyranose, Methyl alloside; -α-D-Furanose-form, 1,2-O-Isopropylidenealtrose; β-D-Pyranose-form, Methyl alloside; -β-D-Furanose-form, 1,2-O-Isopropylidenealtrose; β-D-Furanose-form, Methyl alloside; -β-L-Furanose-form, 2,3-O-Isopropylidene, 6-Me, 5-tosyl, 1,2-O-Isopropylidenealtrose; β-D-Furanose-form, 5,6-O-Isopropylidene,3-Ac, Methyl 2,3-anhydro-4,6-O-benzylidene-β-D-allopyranoside, Methyl altropyranoside; α-D-form, Methyl 2,3-anhydro-4,6-O-benzylidene-3-C-nitro-β-D-allopyranoside, Methyl altropyranoside; α-D-form, 4,6-O-Isopropylidene, 2,3-di-Ac, Methyl 5,6-anhydro-2,3-O-Isopropylidene-β-L-allofuranoside, Methyl altropyranoside; α-D-form, 4,6-O-Ethylidene, 2-Me, Methyl 2-benzamido-4,6-O-benzylidene-2-deoxy-α-D-allopyranoside, Methyl altropyranoside; α-D-form, 2,3-Dibenzyl, 6-tosyl, Methyl 2-O-benzoyl-4,6-O-benzylidene-α-D-allopyranoside, Methyl altropyranoside; α-D-form, 2-Me, 3-tosyl, Methyl 2-O-benzoyl-4,6-O-benzylidene-α-D-galactopyranoside, Methyl altropyranoside; α-D-form, 2-Me, 4,6-dibenzoyl, 3-tosyl, Methyl 3-O-benzoyl-4,6-O-benzylidene-α-D-galactopyranoside, Methyl altropyranoside; α-D-form, 2-Me, 4-Ac, 3-tosyl, 6-trityl, Methyl 4,6-O-benzylideneallopyranoside-α-D-form, Methyl altropyranoside; α-D-form, 2-Benzoyl, 3,4-dimesyl, 6-trityl, Methyl 4,6-O-benzylideneallopyranoside-α-D-form, 2-Tosyl, 3-benzyl, Methyl 2-O-benzoyl-4,6-O-benzylidene-α-D-altropyranoside, Methyl 4,6-O-benzylideneallopyranoside-α-D-form, 2-Me, 3-tosyl, Methyl 3-O-benzoyl-4,6-O-benzylidene-α-D-altropyranoside, Methyl 4,6-O-benzylideneallopyranoside-α-D-form, 2-Me, 3-benzyl, Methyl 4,6-O-benzylidene 2,3-di-O-methyl-α-D-altropyranoside, Methyl 4,6-O-benzylideneallopyranoside-β-D-form, Methyl 4,6-O-benzylidene-2-O-methyl-α-D-altropyranoside, Methyl 4,6-O-benzylidene-α-D-galactopyranoside, Methyl 4,6-O-benzylidene-3-O-methyl-α-D-altropyranoside, Methyl 4,6-O-benzylidene-α-D-galactopyranoside; 2,3-Dibenzoyl, Methyl 2,3-Di-O-benzoyl-4,6-O-benzylidene-α-D-altropyranoside, Methyl 4,6-O-benzylidene-α-D-galactopyranoside; 2,3-Dibtosyl, Methyl 2,3-di-O-benzyl-α-L-altrofuranoside, Methyl 4,6-O-benzylidene-α-D-galactopyranoside; 2,3-Dibenzyl, Methyl 2,3-di-O-benzyl-β-L-altrofuranoside, Methyl 2,3-di-O-benzyl-α-D-altropyranoside, 2,4-Diamino-2,4-dideoxygalactose; D-form, Methyl 2,3-di-O-benzyl-4,6-O-benzylidene-α-D-altropyranoside, 2,6-Diamino-2,6-dideoxygalactose; α-D-Pyranose-form, Methyl 3,4-O-isopropylidene-α-D-altropyranoside, 2,6-Di-O-benzyl-β-D-galactopyranose, Methyl 4,6-O-isopropylidene-α-D-altropyranoside, 1,2:3,4-Di-O-cyclohexylidene-6-O-tosyl-α-D-galactopyranose, 1,2,3,4,6-Pentra-O-acetyl-α-D-altropyranose, 1,2:5,6-Di-O-isopropylidene-α-D-galactofuranose, 1,2:3,4-Di-O-isopropylidenegalactopyranose; α-D-form, 6-Ac, 1,2:3,4-Di-O-isopropylidenegalactopyranose; α-D-form, 6-Mesyl, 1,2:3,4-Di-O-isopropylidenegalactopyranose; α-D-form, 6-Tosyl, 1,2:3,4-Di-O-isopropylidenegalactopyranose; α-D-form, 6-Allyl, 4-Acetamido-4-deoxy-D-galactose, 1,2:3,4-Di-O-isopropylidenegalactopyranose; α-D-form, 6-Benzyl, Allyl 4,6-O-benzylidene-α-D-galactopyranoside, 1,2:3,4-Di-O-isopropylidenegalactopyranose; α-D-form, 6-Me, Allyl 4,6-di-O-benzyl-α-D-galactopyranoside, 1,2:3,4-Di-O-isopropylidenegalactopyranose; α-D-form, 6-Trityl, Allyl 4,6-di-O-benzyl-α-D-galactopyranoside, 1,2:3,4-Di-O-isopropylidene-α-D-galactopyranose; 6-hydrogen phosphate, Allyl galactopyranoside; α-D-form, 1,2:3,4-Di-O-isopropylidene-6-O-methyl-α-D-galactopyranside, Allyl galactopyranoside; β-D-form, 2,3-Di-O-methylgalactose; D-form, Allyl galactopyranoside; β-D-form, 3,4-O-Isopropylidene, 2,3-Di-O-methylgalactose; α-D-Pyranose-form, Me glycoside, 6-benzoyl, Allyl galactopyranoside; β-D-form, 4,6-O-Isopropylidene, 2,4-Di-O-methylgalactose; D-form, Allyl galactopyranoside; β-D-form, 2,6-Di-Ac, 2,6-Di-O-methylgalactose; D-form, 4-Amino-4-deoxygalactose; D-form, 2,6-Di-O-methylgalactose; β-D-Pyranose-form, Me glycoside, 4-Aminophenyl 2-acetamido-2-deoxygalactopyranoside; α-D-form, 3,4-Di-O-methylgalactose; D-form, 4-Aminophenyl 2-acetamido-2-deoxygalactopyranoside; β-D-form, 3,6-Di-O-methylgalactose; D-form, 4-Aminophenyl; α-D-form, 4,6-Di-O-methylsalactose; D-form, 4-Aminophenyl; β-D-form, 5,6-O-Ethylidene-D-galactose diethyldithioacetal, 1,6-Anhydro-2,3,4-tri-O-methyl-β-D-galactopyranoside, 3,4-O-Ethylidene-1,2-O-isopropylidene-α-D-galactopyranose, 2-Azido-2-deoxy-3,4,6-tri-O-acetyl-α-D-galactopyranosyl bromide, Ethyl 1-thio-α-D-galactofuranoside, 6-(4-Azido-3,5-diiodobenzamido-2-hydroxy)-6-deoxygalactose; D-form, Ethyl 1-thio-α-D-galactopyranoside, Benzyl 2-O-benzoyl-4,6-O-benzylidene-β-D-galactopyranoside, Ethyl 1-thio-β-D-galactopyranoside, Benzyl 4,6-O-benzylidene-α-D-galactopyranoside, Galactose; D-form, 2-Benzyl, Benzyl 4,6-O-benzylidene-α-D-galactopyranoside, Galactose; D-form, 2,3-Dibenzyl, Benzyl galactopyranoside; α-D-form, 4,6-O-Benzylidene, 2,3-dibenzyl, Galactose; α-D-Pyranose-form, Benzyl galactopyranoside; β-D-form, Galactose; α-D-Pyranose-form, 4,6-O-Benzylidene, 2,3-dibenzyl, Benzyl galactopyranoside; β-D-form, 4,6-O-Benzylidene, 2,3-dibenzoyl, Galactose; β-D-Pyranose-form, Benzyl galactopyranoside; β-D-form, 3,4-O-Isopropylidene, 6-benzoyl, Galactose; L-form, Benzyl galactopyranoside; β-D-form, 3,4-O-Isopropylidene, 2,6-dibenzoyl, Galactose diethyldithioacetal; D-form, 4,6-O-Benzylidene-α-D-galactopyranose, Galactose 1-dihydrogen phosphate; α-D-Pyranose-form, Benzyl 3,4-O-isopropylidene-β-D-galactopyranoside, Galactose 1-dihydrogen phosphate; β-D-Pyranose-form, Benzyl 4,6-O-isopropylidene-β-D-galactopyranoside, Galactose 3-dihydrogen phosphate; D-Pyranose-form, Benzyl 3,4-O-isopropylidene-6-O-trityl-β-D-galactopyranoside, Galactose 3-dihydrogen phosphate; D-Pyranose-form, α-1,2-O-Isopropyliene, Benzyl 2,3,4-tri-O-benzyl-α-D-galactopyranoside, 4,6-O-ethylidene, Benzyl 2,3,4-tri-O-benzyl-β-D-galactopyranoside, Galactose 6-dihydrogen phosphate, D-form, Benzyl 2,3,6-tri-O-benzyl-β-D-galactopyranoside, Galactosylamine; D-form, 2-Bromoethyl galactopyranoside; α-D-form, Tetra-Ac, Idaein, 2-Bromoethyl galactopyranoside; α-D-form, Tetrabenzyl, 1,2-O-Isopropylidene-3,6-di-O-methyl-α-D-galactofuranose, 2-Bromoethyl galactopyranoside; β-D-form, 4,6-O-Benzylidene, 1,2-O-Isopropylidenegalactofuranose; α-D-form, 5,6-O-Isopropylidene, 4,6-O-(1-Carboxyethylidene)galactose; (β-D-Pyranose, 1'R)-form, 3-tosyl, 4,6-O-(1-Carboxyethylidene)galactose; (β-D-Pyranose, 1'S)-form, 1,2-O-Isopropylidenegalactopyranose; α-D-form, 3,4-O-Ethylidene, 6-tosyl, Cerebrose, 1,2-O-Isopropylidenegalactopyranose; α-D-form, 4,6-O-Ethylidene, 3-benzyl, Chondrosamine, 1,2-O-Isopropylidenegalactopyranose; α-D-form, 4,6-O-Ethylidene, 2,3-Diamino-2,3-dideoxygalactose; D-form, 3-(methylthiomethyl), 3,4-O-Isopropylidene-D-galactopyranose, 2-O-Methylgalactose; D-form, 4,6-O-Isopropylidene-D-galactopyranose, 2-O-Methylgalactose; α-D-Pyranose-form, Me glycoside, 4,6-O-benzylidene, 5,6-O-Isopropylidene-D-galactopyranose, 3-O-Methylgalactose; D-form, 3,4-O-Isopropylidene-6-O-methyl-D-galactose, 3-O-Methylgalactose; D-form, Di-Et dithioacetal, 2-(4-Methoxycarbonylbutanecarboxamido)ethyl, 2-acetamido-2-deoxygalacto-, 3-O-Methylgalactose; α-D-Furanose-form, isopropylidene, pyranoside; α-D-form, 4-O-Methylgalactose; D-form, 2-(4-Methoxycarbonylbutanecarboxamido)ethyl, 2-acetamido-2-deoxygalacto-, 6-O-Methylalactose; D-form, pyranoside; β-D-form, Methyl 3,4-O-isopropylidene-2,6-di-O-methyl-α-D-galactopyranoside, Methyl 2-O-acetyl-4,6-O-benzylidene-β-D-galactopyranoside, Methyl 5,6-O-Isopropylidene-α-D-galactofuranoside, Methyl 3-O-acetyl-4,6-O-benzylidene-β-D-galactopyranoside, Methyl 5,6-O-isopropylidene-β-D-galactofuranoside, Methyl 2-O-benzoyl-4,6-O-benzylidene-β-D-galactopyranoside, Methyl 3,4-O-isopropylidene-β-D-galactopyranoside, Methyl 3-O-benzoyl-4,6-O-benzylidene-β-D-galactopyranoside, Methyl 4,6-O-isopropylidene-β-D-galactopyranoside, Methyl 6-O-benzoyl-3,4-O-benzylidene-α-D-galactopyranoside, Methyl 3,4-O-isopropylidene-2-O-methyl-α-D-galactopyranoside, Methyl 6-O-benzoylgalactopyranoside-α-D-form, Methyl 3,4-O-isopropylidene-2-O-methyl-β-D-galactopyranoside, Methyl 2-O-benzyl-4,6-O-benzylidene-β-D-galactopyranioside, Methyl 2-O-mesyl-3,4,6-tri-O-methyl-β-D-galactopyranoside, Methyl 4,6-O-benzylidene-2,3-di-O-methyl-α-D-galactopyranoside, Methyl 4,6-O-methylene-α-D-galactopyranoside, Methyl 4,6-O-benzylidene-2,3-di-O-methyl-β-D-galactopyranoside, Methyl 3-O-methyl-β-D-galactofuranoside, Methyl 4,6-O-benzylidene-2,3-di-O-tosyl-α-D-galactopyranoside, Methyl 2-O-methyl-α-D-galactopyranoside, Methyl 3,4-O-benzylidene-β-D-galactopyranoside, Methyl 2-O-methyl-β-D-galactopyranoside, Methyl 4,6-O-benzylidene-β-D-galactopyranoside, Methyl 3-O-methyl-α-D-galactopyranoside, Methyl 4,6-O-benzylidene-β-D-galactopyranoside, 2,3-Di-Me, Methyl 3-O-methyl-β-D-galactopyranoside, Methyl 4,6-O-benzylidene-3-O-methyl-α-D-galactopyranoside, Methyl 4-O-methyl-α-D-galactopyranoside, Methyl 4,6-O-benzylidene-3-O-methyl-α-D-galactopyranoside, Methyl 4-O-methyl-β-D-galactopyranoside, Methyl 4,6-O-benzylidene-3-O-tosyl-β-D-galactopyranoside, Methyl 6-O-methyl-α-D-galactopyranoside, Methyl 3,4-O-(1-carboxyethylidene)-β-D-galactopyranoside, Methyl 6-O-methyl-β-D-galactopyranoside, Methyl 2,3-di-O-acetyl-4,6-O-benzylidene-β-D-galactopyranoside, Methyl 3-O-methyl-6-O-trityl-β-D-galactofuranoside, Methyl 3,6-di-O-benzoyl-α-D-galactopyranoside, Methyl 3,5,6-tetra-O-benzyl-β-D-galactofuranoside, Methyl 2,3-di-O-benzyl-4,6-O-benzylidene-β-D-galactopyranoside, Methyl 2,3,5,6-tetra-O-benzyl-β-D-galactofuranoside, Methyl 2,3-di-O-benzyl-α-D-galactofuranoside, Methyl 2,3,4,6-tetra-O-benzyl-β-D-galactopyranoside, Methyl 2,3-di-O-benzyl-β-D-galactofuranoside, Methyl 2,3,5,6-tetra-O-methyl-α-D-galactofuranoside, Methyl 2,3-Di-O-benzyl-5,6-O- isopropylidene-α-D-galactofuranoside, Methyl 1-thio-β-D-galactopyranoside, Methyl 2,3-di-O-benzyl-5,6-O-isopropylidene-β-D-galactofuranoside, Methyl 6-O-tosyl-α-D-galactopyranoside, Methyl 2,3-di-O-methyl-α-D-galactopyranoside, Methyl 2,3,6-tri-O-benzoyl-α-D-galactopyranoside, Methyl 2,3-di-O-methyl-β-D-galactopyranoside, Methyl 2,3,4-tri-O-methyl-α-D-galactopyranoside, Methyl 2,4-di-O-methyl-α-D-galactopyranoside, Methyl 2,3,5-tri-O-methyl-α-D-galactofuranoside, Methyl 2,4-di-O-methyl-β-D-galactopyranoside, Methyl 2,3,6-tri-O-methyl-α-D-galactopyranoside, Methyl 3,4-di-O-methyl-β-D-galactopyranoside, Methyl 2,3,6-tri-O-methyl-β-D-galactopyranoside, Methyl 3,6-di-O-methyl-β-D-galactopyranoside, Methyl 2,4,6-tri-O-methyl-α-D-galactopyranoside, Methyl 4,6-di-O-methyl-β-D-galactopyranoside, Methyl 2,4,6-tri-O-methyl-β-D-galactopyranoside, Methyl 2,6-di-O-methyl-3,4-O-isopropylidene-β-D-galactopyranoside, Methyl 6-O-trityl-β-D-galactofuranoside, Methyl 3,4-O-ethylidene-β-D-galactopyranoside, Methyl 6-O-trityl-β-D-galactopyranoside, Methyl 4,6-O-ethylidene-α-D-galactopyranoside, Penta-O-acetylgalactose; α-D-Pyranose-form, Methyl galactofuranoside; α-D-form, Penta-O-acetylgalactose; β-D-Pyranose-form, Methyl galactofuranoside; β-D-form, Penta-O-acetylgalactose; α-D-Furanose-form, Methyl α-D-galactopyranoside, Penta-O-acetylgalactose; β-D-Furanose-form, Methyl α-D-galactopyranoside; 2,3-Dibenzyl, 2,3,4,5,6-Penta-O-acetyl-D-galactose diethyldithioacetal, Methyl β-D-galactopyranoside, Phenyl 4,6-O-benzylidene-α-D-galactopyranoside, Methyl β-D-galactopyranoside; 2,3,6-Tribenzyl, Phenyl 4,6-O-benzylidene-β-D-galactopyranoside, Methyl β-D-galactopyranoside; Tetra-Me, Phenyl galactopyranoside; α-D-form, Phenyl galactopyranoside; β-D-form, 1,6-Anhydro-2,3,5-tri-O-methyl-β-D-glucose, Phenyl 1-thio-α-D-galactofuranoside, Arbutin, Phenyl 2,3,4-tri-O-benzyl-α-D-galactopyranoside, Asperuloside, Phenyl 2,3,4-tri-O-benzyl-β-D-galactopyranoside, 2-Azido-2-dexoyglucopyranosyl bromide; α-D-form, 2,3,4,6-Tetra-O-benzyl-α-D-galactopyranosyl chloride, 2-Azido-2-deoxyglucose; D-form, 2,3,4,6-Tetra-O-benzylgalactose; α-D-Pyranose-form, 6-O-Benzoyl-3,5-O-benzylidene-1,2-O-isopropylidene-α-D-glucofuranose, 2,3,4,6-Tetra-O-benzylgalactose; α-D-Pyranose-form, Ac, 3-O-Benzoyl-1,2:4,6-di-O-benzylidene-α-D-glucopyranose, 2,3,4,6-Tetra-O-methylgalactose; α-D-Pyranose-form, 3-O-Benzoyl-1,2:5,6-di-O-isoproylidene-α-D-glucopyranose, 2,3,4,6-Tetra-O-methylgalactose; β-D-Pyranose-form, 1-O-Benzoylglucose; β-D-form, 2,3,5,6-Tetra-O-methylgalactose; D-Furanose-form, 6-O-Benzoyl-D-glucose diethyldithioacetal, 6-O-Tosyl-D-galactopyranose, 6-O-Benzyl-3,5-O-benzylidene-1,2-O-cyclohexlyidene-α-D-glucofuranose, 2,3,4-Tri-O-benzyl-α-D-galactopyranose, Benzyl 4,6-O-benzylidene-α-D-glucopyranoside, 2,3,6-Tri-O-benzyl-D-galactopyranose, Benzyl 4,6-O-benzylidene-β-D-glucopyranoside, 2,4,6-Tri-O-benzyl-D-galactopyranose, 6-O-Benzyl-3,5-O-benzylidene-1,2-O-isopropylidene-α-D-glucopyranose, 2,2,2-Trichloroethyl galactopyranoside; α-D-form, Benzyl 4,6-O-benzylidene-2-O-tosyl-α-D-glucopyranoside, 2,2,2-Trichloroethyl galactopyranoside; α-D-form, 2,3,6-Tribenzoyl, Benzyl 4,6-O-benzylidene-2,3-O-tosyl-α-D-glucopyranoside, 2,2,2-Trichloroethyl 2,3,4,6-tetra-O-acetyl-α-D-galactopyranoside, 3,O-Benzyl-1,2-O-cyclohexylideneglucofuranose; α-D-form, 2,2,2-Trichloroethyl 2,3,4,6-tetra-O-acetyl-β-D-galactopyranoside, Benzyl 2,4-diamino-2,4-dideoxy-α-D-glucopyranoside, 2,3,4-Tri-O-methylgalactose; α-D-Pyranose-form, Benzyl 2,3-di-O-dibenzyl-4,6-O-benzylidene-α-D-glucopyranoside, 2,3,5-Tri-O-methylgalactose; D-Furanose-form, Benzyl 2,3-di-O-benzyl-4,6-O-benzylidene-β-D-glucopyranoside, 2,3,6-Tri-O-methylgalactose; D-Pyranose-form, Benzyl 2,3-di-O-benzyl-β-D-glucopyranoside, 2,4,6-Tri-O-methylgalactose; α-D-Pyranose-form, Benzyl 2,3-dibenzyl-6-O-trityl-D-glucopyranoside, 3,4,6-Tri-O-methylgalactose; α-D-Pyranose-form, Benzyl 2,3-di-O-benzyl-β-D-glucopyranoside, Benzyl glucopyranoside-α-D-form, 2-O-Benzylglucose; D-form, 3,5-O-Benzylidene-1,2-O-cyclohexylidene-α-D-glucofuranose, 4,6-O-Benzylideneglucopyranose; α-D-form, Acacipetalin, 1,2-O-Benzylideneglucose; α-D-Pyranose-form, 3-Acetamido-3-deoxy-α-D-glucopyranose, 1,2-O-Benzylideneglucose; α-D-Furanose-form, 4-Acetamido-4-deoxy-α-D-glucopyranoside, 1,2-O-Benzylidene-5,6-O-isopropylidene-α-D-glucofuranose, 3-Acetamido-3-deoxy-1,2-O-isopropylidene-α-D-glucofuranose, 3,5-O-Benzylidene-1,2-O-isopropylideneglucofuranose; α-D-form, 2-Acetamido-2-deoxy-5-thio-D-glucopyranose, 4,6-O-Benzylidene-1,2-O-isopropylidene-α-D-glucopyranose, 2-Acetamido-2-deoxy-3,4,6-tri-O-acetylglucopyranosyl chloride, 3,5-O-Benzylidene-1,2-O-isopropylidene-6-O-mesyl-α-D-glucofuranose, 6-O-Acetyl-3,5-O-benzylidene-1,2-O-isopropylidene-α-D-glucofuranose, 6-O-Benzyl-1,2-O-isopropylidene-3,5-di-O-methyl-α-D-glucofuranose, 3-O-Acetyl-4,6-O-benzylidene-1,2-O-(1-methoxyethylidene)-α-D-glucopyranose, 3-O-Benzyl-1,2-O-isopropylidene-α-D-glucofuranose, 3-O-Acetyl-1,2:4,6-di-O-benzylidene-α-D-glucopyranose, 6-O-Benzyl-1,2-O-isopropylidene-α-D-glucofuranose, 3-O-Acetyl-1,2:4,5-di-O-isopropylidene-α-D-glucoseptanoside, Benzyl 1-thio-α-D-glucopyranoside, 6-O-Acetylglucose; D-form, Benzyl 2,3,4-tri-O-benzyl-β-D-glucopyranoside, Allyl glucopyranoside; α-D-form, Benzyl 2,3,6-tri-O-benzyl-α-D-glucopyranoside, Allyl glucopyranoside; β-D-form, Benzyl 2,3,6-tri-O-benzyl-β-D-glucopyranoside, Amarogentin, Blepharin, Amaroswerin, 2-Bromoethyl 4,6-O-benzylidene-β-D-glucopyranoside, 3-Amino-3-deoxyglucose; β-D-Pyranose-form, Me glycoside, N-Ac, 2-Bromoethyl 2,3,6-tri-O-benzyl-β-D-glucopyranoside, 4-Amino-4-deoxyglucose; D-form, 8-Carboxyoctyl glucopyranose; α-D-form, 2-Amino-2-deoxy-5-thioglucose; α-D-Pyranose form, N,1,3,4,6-Penta-Ac, 8-Carboxyoctyl glucopyranose; β-D-form, 4-Aminophenyl glucopyranoside; α-D-form, Cerasine, 4-Aminophenyl glucopyranoside; β-D-form, Corolin, 1,6-Anhydro-2,4-diazido-2,4-dideoxy-β-D-glucopyranose, Coronarian, 5,6-Anhydro-1,2-O-isopropylidene-α-D-glucofuranose, Coronillin, Crassinodine, 9-Glucopyranosyltheophylline; β-D-form, 1,2-O-Cyclohexylideneglucofuranose; α-D-form, Glucose; D-form, Phenylhydrazone, 1,2-O-Cyclohexylideneglucofuranose; α-D-form, 3,5,6-Orthoformate, Glucose; D-form, Phenylosazone, 1,2-O-Cyclohexylideneglucofuranose-3,5-O-methylene-α-D-glucofuranose, Glucose; D-form, Oxime, penta-Ac, Diedaclin, Glucose; D-form, Di-Me dithioacetal, 2,4-Diacetamido-2,4-dideoxy-D-glucose, Glucose; D-form, Dibenzyl dithioacetal, 2,3-Diamino-2,3-dideoxyglucose; α-D-Pyanose-form, Glucose; α-D-Pyranose-form, 2,3-Diamino-2,3-dideoxyglucose; β-D-Pyanose-form, Glucose; β-D-Pyranose-form, 2,4-Diamino-2,4-dideoxyglucose; D-form, Glucose; L-form, 2,4-Diazido-2,4-dideoxyglucose; D-form, Glucose; DL-form, 1,2:3,5-Di-O-benzylidene-α-D- glucofuranose, aldehydo-Glucose; D-form, 2,3,4,5,6-Pentabenzoyl, 1,2:4,6-Di-O-benzylidene-α-D-glucopyranose, aldehydo-Glucose; D-form, 2,3,4,5,6-Penta-Ac, 1,2:4,6-Di-O-benzylidene-3-mesyl-α-D-glucopyranose, aldehydo-Glucose; D-form, 2,3,4,5,6-Penta-Me, 1,2:5,6-Di-O-cyclohexylidene-α-D-glucofuranose, aldehydo-Glucose; D-form, Dibenzyl acetal, 2,3:5,6-di-O-isopropylidene, 1,2:5,6-Di-O-cyclohexylidene-3-O-tosyl-α-D-glucofuranose, aldehydo-Glucose; D-form, Dibenzyl acetal, 3,4:5,6-di-O-isopropylidene, 1,2:5,6-Di-O-isopropylideneglucofuranose; α-D-form, Glucose diethyldithioacetal; D-form, 1,2:5,6-Di-O-isopropylideneglucofuranose; α-D-form, 3-(2,2,2-, Glucose diethyldithioacetal; D-form, 6-Benzoyl, 2,3:4,5-di-O-, Trifluoroethanesulfonyl), isopropylidene, 1,2:5,6-Di-O-isopropylideneglucofuranose; α-D-form, 3-, Glucose 1-dihydrogen phosphate; α-D-Pyranose-form, (Pentafluorobenzenesulfonyl), Glucose 1-dihydrogen phosphate; α-L-Pyranose-form, 1,2:5,6-Di-O-isopropylideneglucofuranose; α-D-form, 3-, Glucose 2-dihydrogen phosphate; D-form, Xanthate, Glucose 3-dihydrogen phosphate; D-form, 1,2:5,6-Di-O-isopropylideneglucofuranose; α-D-form, 3-tert-Butyl, Glucose 4-dihydrogen phosphate; D-form, 1,2:5,6-Di-O-isopropylideneglucofuranose; α-D-form, 3-Trityl, Glucose diphenylformazan, 1,2:3,4-Di-O-isopropylidene-α-D-glucoseptanoside, Glucosylamine; D-form, 1,2:5,6-Di-O-isopropylidene-3-O-mesyl-α-D-glucofuranose, D-Glucothiapyranose, 1,2:3,4-Di-O-isopropylidene-5-O-methyl-α-D-glucoseptanoside, Gynocardin, 1,2:5,6-Di-O-isopropylidene-3-O-tosyl-α-D-glucofuranose, D-glycero-L-manno-Heptitol, 2,3-Di-O-methylglucose; α-D-Pyranose-form, D-glycero-L-manno-Heptitol; Hepta-Ac, 2,4-Di-O-methylglucose; β-D-Pyranose-form, 1,2-Isopropylidene-3,5-di-O-methyl-α-D-glucofuranose, 2,6-Di-O-methylglucose; D-form, 1,2-O-Isopropylidene-5,6-di-O-methyl-α-D-glucofuranose, 3,4-Di-O-methylglucose; β-D-Pyranose-form, 1,2-O-Isopropylidene-3,4-di-O-methyl-α-D-glucopyranose, 3,5-Di-O-methylglucose; D-Furanose-form, 1,2-O-Isopropylidene-3,5-di-O-methyl-6-O-tosyl-α-D-glucofuranose, 3,6-Di-O-methylglucose; α-D-Pyranose-form, 1,2-O-Isopropylidene-3,5-di-O-methyl-6-O-trityl-α-D-glucofuranose, 4,6-Di-O-methylglucose; α-D-Pyranose-form, 1,2-O-Isopropylideneglucofuranose;-α-D-form, 5,6-Di-O-methylglucose; D-form, 1,2-O-Isopropylideneglucofuranose;-α-D-form, 5,6-Carbonate, 1,6-Dithioglucose; D-form, 1,2-O-Isopropylideneglucofuranose;-α-D-form, 5,6-Thiocarbonate, Ethyl glucoside; α-D-Pyranose-form, 1,2-O-Isopropylidene-α-glucoseptanose, Ethyl glucoside; β-D-Pyranose-form, 1,2-O-Isopropylidene-6-O-mesyl-α-D-glucofuranose, Ethyl glucoside; α-D-Furanose-form, 1,2-O-Isopropylidene-5-O-methyl-α-D-glucofuranose, Ethyl glucoside; β-D-Furanose-form, 1,2-O-Isopropylidene-6-thio-α-D-glucofuranose, Ethyl 2,3,4,6-tetra-O-acetyl-1-thio-α-D-mannopyranoside, 1,2-O-Isopropylidene-3-O-tosyl-α-D-glucofuranose, Ethyl 1-thio-β-D-glucofuranoside, 1,2-O-Isopropylidene-6-O-tosyl-α-D-glucofuranose, Ethyl 1-thio-α-D-glucopyranoside, 1,2-O-Isopropylidene-3,5,6-tri-O-methyl-α-D-glucofuranose, Ethyl 1-thio-β-D-mannopyranoside, 1,2-O-Isopropylidene-3,4,6-tri-O-methyl-α-D-glucopyranose, Ethyl 2,3,4-tri-O-acetyl-β-D-glucopyranoside, Isoranunculin, Ethyl 3,4,6-tri-O-benzyl-α-D-glucopyranoside, Kanosamine, Ethyl 3,4,6-tri-O-benzyl-β-D-glucopyranoside, Liliosíde B, Eximin, Liliosíde A, Linamarin, Methyl 4,6-di-O-methyl-α-D-glucopyranoside, Melampyroside, Methyl 4,6-di-O-methyl-β-D-glucopyranoside, Methyl 3-acetamido-4,6-O-benzylidene-3-deoxy-α-D-glucopyranoside, Methyl 3,4-di-O-methyl-6-O-trityl-β-D-glucopyranoside, Methyl 2-acetamido-2-deoxy-5-thio-D-glucopyranoside, Methyl α-D-glucofuranoside, 1-O-(N-Methyl)acetimidyl-2,3,4,6-tetra-O-acetyl-α-D-glucopyranoside, Methyl α-D-glucofuranoside; 5,6-Carbonate, Methyl 2-O-acetyl-4,6-O-benzylidene-α-D-glucopyranoside, Methyl β-D-glucofuranoside, Methyl 3-O-acetyl-4,6-O-benzylidene-α-D-glucopyranoside, Methyl β-D-glucofuranoside; 5,6-Carbonate, Methyl 6-O-acetyl-α-D-glucopyranoside, Methyl α-D-glucopyranoside, Methyl 6-O-acetyl-β-D-glucopyranoside, Methyl α-D-glucopyranoside; 4,6-O-Ethylidene, Methyl 3-amino-4,6-O-benzylidene-3-dexoy-α-D-glucopyranoside, Methyl β-D-glucopyranoside, Methyl 3-amino-3-deoxy-α-D-glucopyranoside, Methyl α-L-glucopyranoside, Methyl 4,6-O-benzylidene-2-O-benzoyl-α-D-glucopyranoside, 2-O-Methylglucose; D-form, Methyl 4,6-O-benzylidene-2,3-di-O-benzoyl-α-D-glucopyranoside, 3-O-Methylglucose; α-D-Pyranose-form, Methyl 4,6-O-benzylidene-2,3-di-O-tosyl-α-D-glucopyranoside, 3-O-Methylglucose; β-D-Pyranose-form, Methyl 4,6-O-benzylidene-2,3-di-O-tosyl-β-D-glucopyranoside, 4-O-Methylglucose; D-form, Methyl 4,6-O-benzylidene-α-D-glucopyranoside, 5-O-Methylglucose; D-form, Methyl 4,6-O-benzylidene-β-D-glucopyranoside, 6-O-Methyl)lucose; D-form, Methyl 4,6-O-benzylidene-2-O-methyl-α-D-glucopyranoside, Methyl β-D-glucoseptanoside, Methyl 4,6-O-benzylidene-2-O-methyl-β-D-glucopyranoside, Methyl α-D-glucothiapyranoside, Methyl 4,6-O-benzylidene-3-O-methyl-α-D-glucopyranoside, Methyl β-D-glucothiapyranoside, Methyl 4,6-O-benzylidene-3-O-methyl-β-D-glucopyranoside, Methyl 4,6-O-isopropylideneglucopyranoside; α-D-form, Methyl 4,6-O-benzylidene-2-O-tosyl-α-D-glucopyranoside, Methyl 4,6-O-isopropylideneglucopyranoside; β-D-form, Methyl 4,6-O-benzylidene-3-O-tosyl-α-D-glucopyranoside, Methyl 4,5-O-isopropylidene-α-D-glucoseptanoside, Methyl 4,6-O-benzylidene-3-O-tosyl-β-D-glucopyranoside, Methyl 4,6-O-methylene-α-D-glucopyranoside, Methyl 2-O-benzyl-3,4,6-tri-O-inethyl-β-D-glucopyranoside, Methyl 4,6-O-methylene-β-D-glucopyranoside, Methyl 2,3-di-O-acetyl-4,6-O-benzylidene-α-D-glucopyranoside, Methyl 2-O-methyl-α-D-glucopyranoside, Methyl 2,3-di-O-acetyl 4,6-O-benzylidene-β-D-glucopyranoside, Methyl 2-O-methyl-β-D-glucopyranoside, Methyl 2,3-di-O-benzoyl-6-O-benzyl-α-D-2lucopyranoside, Methyl 3-O-methyl-α-D-glucopyranoside, Methyl 2,3-di-O-benzoyl-4,6-O-benzylidene-β-D-glucopyranoside, Methyl 3-O-methyl-β-D-glucopyranoside, Methyl 2,3-di-O-benzyl-4,6-O-benzylidene-β-D-glucopyranoside, Methyl 4-O-methyl-α-D-glucopyranoside, Methyl 2,3-di-O-benzyl-β-D-glucofuranoside, Methyl 4-O-methyl-β-D-glucopyranoside, Methyl 2,3-di-O-benzyl-α-D-glucopyranoside, Methyl 6-O-methyl-α-D-glucopyranoside, Methyl 2,3-di-O-benzyl-β-D-glucopyranoside, Methyl 6-O-methyl-β-D-glucopyranoside, Methyl 2,3-di-O-benzyl-5-O-mesyl-6-O-trityl-β-D-glucofuranoside, Methyl 4,6-O-propylidene-α-D-glucopyranoside, Methyl 2,3:4,6-di-O-isopropylidene-β-D-glucopyranoside, Methyl 4,6-O-salicylidene-α-D-glucopyranoside, Methyl 2,3:4,5-di-O-isopropylidene-α-D-glucoseptanoside, Methyl tetra-O-acetyl-α-D-glucothiapyranoside, Methyl 2,3:4,5-di-O-isopropylidene-D-glucoseptanoside, Methyl tetra-O-acetyl-β-D-glucothiapyranoside, Methyl 2,3:4,5-di-O-isopropylidene-β-D-glucoseptanoside, Methyl 2,3,4,6-tetra-O-benzyl-α-D-glucopyranoside, Methyl 3,6-di-O-methyl-2,4-di-O-tosyl-β-

D-glucopyranoside, Methyl 2,3,4,6-tetra-O-benzyl-β-D-glucopyranoside, Methyl 4,6-di-O-methyl-2,3-di-O-tosyl-α-D-glucopyranoside, Methyl 2,3,5,6-tetra-O-methyl-β-D-glucofuranoside, Methyl 2,3-di-O-methyl-α-D-glucopyranoside, Methyl 2,3,4,6-tetra-O-methyl-α-D-glucopyranoside, Methyl 2,3-di-O-methyl-β-D-glucopyranoside, Methyl 2,3,4,6-tetra-O-methyl-β-D-glucopyranoside, Methyl 2,4-di-O-methyl-β-D-glucopyranoside, Methyl 2,3,4,6-tetra-O-tosyl-β-D-glucopyranoside, Methyl 2,6-di-O-methyl-α-D-glucopyranoside, Methyl 6-thio-β-D-galactoseptanoside, Methyl 2,6-di-O-methyl-β-D-glucopyranoside, Methyl 1-thio-α-D-glucopyranoside, Methyl 2,6-di-O-methyl-β-D-glucopyranoside, Methyl 1-thio-β-D-glucopyranoside, Methyl 3,4-di-O-methyl-β-D-glucopyranoside, Methyl 6-O-tosyl-α-D-glucopyranoside, Methyl 3,4-di-O-methyl-β-D-glucopyranoside, Methyl 3,4,6-tri-O-acetyl-2-O-benzyl-β-D-glucopyranoside, Methyl 3,6-di-O-methyl-β-D-glucopyranoside, Methyl 2,3,6-tri-O-benzyl-α-D-glucopyranoside, Methyl 2,3,5-tri-O-methyl-β-D-glucofuranoside, Methyl 3,5,6-tri-O-methyl-α-D-glucofuranoside, Methyl 2,3,4-tri-O-methyl-β-D-glucopyranoside, Methyl 2,3,6-tri-O-methyl-α-D-glucopyranoside, Methyl 2,3,6-tri-O-methyl-β-D-glucopyranoside, Methyl 2,4,6-tri-O-methyl-β-D-glucopyranoside, Methyl 3,4,6-tri-O-methyl-α-D-glucopyranoside, Methyl 3,4,6-tri-O-methyl-α-D-glucopyranoside, Methyl 2,4,6-tri-O-methyl-3-O-tosyl-α-D-glucopyranoside, Methyl 2,4,6-tri-O-methyl-3-O-tosyl-α-D-glucopyranoside, Methyl 6-O-(triphenylmethyl) glucopyranoside; α-D-form, Methyl 6-O-(triphenylmethyl) glucopyranoside; β-D-form, Neosamine C, 6-O-Acetylarbutin, 1,2,3,5,6-Penta-O-acetylglucofuranoside; β-D-form, 1,2,3,4,6-Penta-O-acetylglucopyranose; α-D-form, 1,2,3,4,6-Penta-O-acetylglucopyranose; β-D-form, 2,3,4,5,6-Penta-O-acetyl-D-glucose diethyldithioacetal, 1,2,3,4,6-Penta-O-acetyl-6-thio-α-D-galactopyranose, 1,2,3,4,5-Penta-O-acetyl-6-thio-α-D-galactoseptanose, 1,2,3,4,5-Penta-O-acetyl-6-thio-β-D-galactoseptanose, 2,4-Diacetamido-2,4-dideoxy-D glucose, isopropylidene, Penta-O-acetyl-1-thio-β-D-glucopyranoside, 2,3,4,5,6-Penta-O-methylglucose; D-form, Phenyl 4,6-O-benzylidene-α-D-glucopyranoside, Phenyl 4,6-O-benzylidene-2-O-tosyl-α-D-glucopyranoside, Phenyl 2,3-O-acetyl-4,6-O-benzylidene-β-D-glucopyranoside, Phenyl 2,3-di-O-methyl-α-D-glucopyranoside, Phenyl 2,4-di-O-methyl-β-D-glucopyranoside, Phenyl glucopyranoside; α-D-form, Phenyl glucopyranoside; β-D-form, Phenyl 2,3,4,6-tetra-O-acetyl-6-thio-β-D-, galactopyranoside, Phenyl 2,3,4,6-tetra-O-acetyl-6-thio-β-D-, galactopyranoside, Phenyl 2,3,4,6-tetra-O-acetyl-6-thio-α-D-, glucopyranoside, Phenyl 2,3,4,6-tetra-O-acetyl-6-thio-β-D-, glucopyranoside, Phenyl 1-thio-α-D-glucofuranoside, Phenyl 1-thio-α-D-glucopyranoside, Piptoside, Procacaciberin, Ranuncoside, Ranunculoside, Robinson ester, 1-Selenoglucose, O-(2,3,4, 6-Tetra-O-acetyl-α-D-glucopyranosyl)-, trichloroacetimidate, 2,3,4,6-Tetra-O-acetyl-1-thio-β-D-glucopyranose, 2,3,4,6-Tetra-O-acetyl-5-thio-α-D-glucopyranosyl, bromide, 3,4,5,6-Tetra-O-benzoyl-D-glucose, dieyldithioacetal, 1,2,3,6-Tetra-O-benzoyl-5-O-methyl-β-D-, glucofuranose, O-(2,3,4,6-Tetra-O-benzyl-α-D-glucopyranosyl)-, trichloroacetimidate, 2,3,4,6-Tetra-O-benzylglucose; α-D-Pyranose-, form, 2,3,4,6-Tetra-O-methylglucose; α-D-Pyranose-, form, 2,3,4,6-Tetra-O-methylglucose; β-D-Pyranose-, form, 2,3,5,6-Tetra-O-methylglucose; D-Furanose-, form, 2,3,5,6-Tetra-O-methyl-1-O-tosyl-α-D-, glucopyranose, Tetraphyllin B, 1-Thioglucose; D-form, 5-Thioglucose; α-D-Pyranose-form, Penta-Ac, 5-Thioglucose; α-D-Pyranose-form, Me, glycoside, 6-phosphate, 5-Thioglucose; β-D-Pyranose-form, Penta-Ac, 5-Thioglucose; β-D-Pyranose-form, 1-Bromo, tetra-Ac, 6-Thioglucose; β-D-Pyranose-form, 1,2,3,4,6-, Penta-Ac, 1-Thiomannose; β-D-Pyranose-form, 3-O-Tosylglucose; D-form, 3,5,6-Tri-O-acetyl-1,2-O-benzylidene-α-D-, glucofuranose, 3,4,6-Tri-O-acetyl-1,2-O-(R)-benzylidene-α-D-, glucopyranose, 3,4,6-Tri-O-acetyl-1,2-O-(S)-benzylidene-α-D-, glucopyranose, 1,3,6-Tri-O-acetyl-2,4-diazido-2,4-dideoxy-α-D-, glucopyranose, 3,4,6-Tri-O-acetyl-1,2-O-(1-methoxyethylidene)-, α-D-glucopyranose, Tribenoside, 3,4,6-Tri-O-acetyl-1,2-O-(1-methoxyethylidene)-, α-D-glucopyranose, 1,2,3-Tri-O-benzoyl-4,6-O-benzylidene-α-D-, glucopyranose, 1,2,3-Tri-O-benzoyl-4,6-O-benzylidene-α-D-, glucopyranose, 3,5,6-Tri-O-benzoyl-D-glucose diethyldithioacetal, 3,4,6-Tri-O-benzyl-1,2-O-(1-methoxyethylidene)-, α-D-glucopyranose, 2,2,2-Trichloroethyl 2,3,4,6-tetra-O-acetyl-α-D-, glucopyranoside, 2,2,2-Trichloroethyl 2,3,4,6-tetra-O-acetyl-β-D-, glucopyranoside, 2,3,4-Tri-O-methylglucose; D-Pyranose-form, 2,3,5-Tri-O-methylglucose; D-form, 2,3, 6-Tri-O-methylglucose; α-D-Pyranose-form, 2,4,6-Tri-O-methylglucose; α-D-Pyranose-form, 3,4,6-Tri-O-methylglucose; α-D-Pyranose-form, 3,4,6-Tri-O-methylglucose; β-D-Pyranose-form, Trimethylsilyl glucopyranoside, Trimethylsilyl 2,3,4,6-tetra-O-acetyl-β-D-, glucopyranoside, Trimethylsilyl 2,3,4,6-tetra-O-benzyl-α-D-, galactopyranoside, Trimethylsilyl 2,3,4,6-tetra-O-methyl-α-D-, glucopyranoside, Trimethylsilyl 2,3,4,6-tetra-O-methyl-β-D-, glucopyranoside, 6-Tuliposide, Uridine diphosphate glucose, Vicine, 3-O-Acetyl-1,2:5,6-di-O-isopropylidene-α-D-, glucofuranose, 2-Amino-2-deoxygulose; D-form, 2-Amino-2-deoxygulose; L-form, 5,6-Anhydro-1,2-O-isopropylidene-3-O-methyl-α-, D-gulofuranose, 3-O-Benzyl-1,2:5,6-di-O-isopropylidene-α-D-, gulofuranose, 3-O-Benzyl-1,2-O-isopropylidene-α-D-, gulofuranose, 1,2:5,6-Di-O-isopropylidenegulofuranose; α-D-, form, 1,2:5,6-Di-O-isopropylidenegulofuranose; α-D-, form, 3-Me, 1,2:5,6-Di-O-isopropylidene-3-O-tosyl-α-, gulofuranose, 4,6-Di-O-Ethylidene-1,2-O-isopropylidene-α-D-, gulopyranose, Gulose; D-form, Gulose; α-D-Pyranose-form,4,6-Di-O-Ethylidene, 1,2-O-isopropylidene, 3-benzoyl, Gulose; α-D-Pyranose-form,4,6-Di-O-Ethylidene, 1,2-O-isopropylidene, 3-tosyl, Gulose; L-form, Gulose; α-L-Pyranose-form, 1,2-O-Isopropylidenegulofuranose; α-D-form, 5,6-Di-Ac, 3-benzyl, 1,2-O-Isopropylidenegulofuranose; α-D-form, 6-, Benzoyl, 3-Me, 1,2-O-Isopropylidenegulofuranose; α-D-form, 3-, Me, 1,2-O-Isopropylidene-3,5,6-tri-O-acetyl-α-D-, gulofuranose, Methyl 4,6-O-benzylidene-α-D-gulopyranoside, Methyl 4,6-O-benzylidene-β-D-gulopyranoside, Methyl 2,3:5,6-di-O-isopropylidene-β-D-, gulofuranoside, Methyl 2,3:5,6-di-O-isopropylidene-β-L-, gulofuranoside, Methyl gulopyranoside; α-D-form, Methyl gulopyranoside; β-D-form, Methyl gulopyranoside; β-D-form, 4,6-O-, Benzylidene, 2,3-dibenzoyl, Methyl gulopyranoside; α-L form, Methyl gulopyranoside; β-L form, Methyl 2,3-O-isopropylidene-β-D-gulofuranoside, Methyl 2,3-O-isopropylidene-β-L-gulofuranoside, Methyl 4,6-O-isopropylidene-α-D-gulopyranoside, Methyl 2,3,4,6-tetra-O-acetyl-α-D-, gulopyranoside, Methyl 2,3,4,6-tetra-O-acetyl-β-D-, gulopyranoside, Methyl 2,3,4,6-tetra-O-acetyl-α-L-, gulopyranoside, Methyl 2,3,4,6-tetra-O-acetyl-β-L-, gulopyranoside, Penta-O-acetyl-α-D-gulopyranose, 2-Amino-2-deoxyidose; D-form, 3-O-Benzyl-1,2:5,6,-di-O-isopropylidene-β-, idofuranose, 3,5-O-Benzylidene-1,2-O- isopropylidene-β-L-, idofuranose, 3,5-O-Benzylidene-1,2-O-isopropylidene-6-O-, tosyl-β-L-idofuranose, 1,2:5,6-Di-O-isopropylidene-β-D-idofuranose, 1,2:5,6-Di-O-isopropylidene-β-L-idofuranose, Idose; D-form, Idose; α-D-Pyranose-form, Idose; α-L-Pyranose-form, 1,2-O-isopropylideneidofuranose; β-D-form, 1,2-O-isopropylideneidofuranose; β-L-form, Methyl α-D-idopyranoside, Methyl β-D-idopyranoside, Methyl α-L-idopyranoside, Methyl β-L-idopyranoside, Neosamine B, 1,2,3,4,6-Penta-O-acetyl-5-deoxy-5-mercapto-L-, idopyranose, 1,2,3,4,6-Penta-O-acetyl-α-D-idopyranose, 1,2,3,4,6-Penta-O-benzoyl-α-D-idopyranose, 2,3,4,6-Tetra-O-benzylidopyranose, 3,5,6-Tri-O-acetyl-1,2-O-isopropylidene-β-L-, idofuranose, Allyl 2,3:5,6-di-O-isopropylidene-α-D-, mannofuranoside, Allyl 2,3:5,6-di-O-isopropylidene-β-D-, mannofuranoside, Allyl 2,3-O-isopropylidene-α-D-mannofuranoside, 2-Amino-2-deoxymannose; D-form, 2-Amino-2-deoxymannose; L-form, 4-Aminophenyl-mannopyranoside; α-D-form, 4-Aminophenyl-mannopyranoside; α-D-form, N, N-Di-Me, Benzyl 2,3-anhydro-4,6-O-benzylidene-α-D-, mannopyranoside, Benzyl 4,6-O-benzylidene-α-D-mannopyranoside, Benzyl 2,3:4,6-O-benzylidene-α-D-, mannopyranoside, Benzyl mannoside; α-D-Pyranose form, Benzyl mannoside; α-D-Furanose form, Benzyl mannoside; β-D-Furanose form, endo-1,2,0-(1-Benzyloxyethylidene)-β-D-, mannopyranose, exo-1,2,0-(1-Benzyloxyethylidene)-β-D-, mannopyranose, 2,6-Diamino-2,6-dideoxymannose; α-D-Pyranose, form, 2,3:5,6-Di-O-isopropylidenz-α-D-mannofuranose, 2,3:5,6-Di-O-isopropylidene-α-L-, mannofuranoside, 2,3-Di-O-methylmannose; D-form, 2,4-Di-O-methylmannose; D-form, 2,6-Di-O-methyl-D-mannose, 3,4-Di-O-methylmannose; D-form, 3,5-Di-O-methylmannose; D-form, 3,6-Di-O-methyl-D-mannose, 4,6-Di-O-methylmannose; D-form, Mannose; α-D-Pyranose-form, Mannose; β-D-Pyranose-form, Mannose; L-form, Mannosylamine; D-form, Methyl 2,3-anhydro-4,6-O-benzylidene-α-D-, mannopyranoside, Methyl 2,3-anhydro-4,6-O-benzylidene-β-D-, mannopyranoside, Methyl 2-O-benzoyl-4,6-O-benzylidene-α-D-, mannopyranoside, Methyl 3-O-benzoyl-4,6-O-benzylidene-α-D-, mannopyranoside, Methyl 2-O-benzyl-4,6-O-benzylidene-α-D-, mannopyranoside, Methyl 2-O-benzyl-4,6-O-benzylidene-β-D-, mannopyranoside, Methyl 3-O-benzyl-4,6-O-benzylidene-α-D-, mannopyranoside, Methyl 3-O-benzyl-4,6-O-benzylidene-β-D-, mannopyranoside, Methyl 4,6-O-benzylidene-2,3-dimesyl-α-D-, mannopyranoside, Methyl 4,6-O-benzylidene-2,3-O-isopropylidene, α-D-mannopyranoside, Methyl 4,6-O-benzylidene-α-D-, mannopyranoside, Methyl 4,6-O-benzylidene-β-D-, mannopyranoside, Methyl 4,6-O-benzylidene-3-O-tosyl-α-D-, mannopyranoside, Methyl 4-O-benzyl-6-O-trityl-α-D-, mannopyranoside, Methyl 2,3:4,6-di-O-benzylidene-α-D-, mannopyranoside, Methyl 2,3:4,6-di-O-ethylidene-α-D-, mannopyranoside, Methyl 2,3:4,6-di-O-ethylidene-β-D-, mannopyranoside, Methyl 2,3:5,6-di-O-isopropylidene-α-D-, mannofuranoside, Methyl 2,3:5,6-di-O-isopropylidene-β-D-, mannofuranoside, Methyl 2,3:4,6-di-O-isopropylidene-β-D-, mannofuranoside, Methyl 2,3:4,6-di-O-isopropylidene-α-D-, mannopyranoside, Methyl 1,6-dimesyl-2,3-O-isopropylidene-α-L-, mannofuranoside, Methyl 2,3:5,6-di-O-methylene-α-D-, mannofuranoside, Methyl 2,3:4,6-di-O-methylene-α-D-, mannopyranoside, Methyl 2,3-di-O-methyl-α-D-mannopyranoside, Methyl 2,4-di-O-methyl-α-D-mannopyranoside, Methyl 3,4-di-O-methyl-α-D-mannopyranoside, Methyl 4,6-di-O-methyl-α-D-mannopyranoside, Methyl 4,6-di-O-ethylidenhemannopyranoside; α-D-form, Methyl 4,6-di-O-ethylidenemannopyranoside; α-D-form, 3-Tosyl, Methyl 4,6-di-O-ethylidenemannopyranoside; α-D-form, 2,3-Ditosyl, Methyl 4,6-di-O-ethylidenemannopyranoside; β-D-form, 2,3-Ditosyl, Methyl 2,3-O-isopropylidenemannopyranoside; α-D-form, Methyl 2,3-O-isopropylidene-6-O-trityl-α-D-, mannopyranoside; Methyl mannofuranoside; α-D-form, Methyl mannofuranoside; β-D-form, Methyl α-D-mannopyranoside, Methyl β-D-mannopyranoside, Methyl α-L-mannopyranoside, 2-O-Methylmannose; D-form, 3-O-Methylmannose; D-form, 4-O-Methylmannose; D-form, 6-O-Methylmannose; D-form, Methyl 4,6-O-methylene-α-D-mannopyranoside, Methyl 4-O-methyl-α-D-mannopyranoside, Methyl 6-O-methyl-α-D-mannopyranoside, Methyl 2,3,4,6-tetra-O-acetyl-α-D-, mannopyranoside, Methyl 2,3,4,6-tetra-O-benzoyl-α-D-, mannopyranoside, Methyl 2-O-tosyl-6-O-trityl-α-D-, mannopyranoside, Methyl 3-O-tosyl-6-O-trityl-α-D-, mannopyranoside, Methyl 4-O-tosyl-6-O-trityl-α-D-, mannopyranoside, Methyl 2,3,4-tri-O-benzyl-6-O-trityl-α-D-, mannopyranoside, Methyl 2,3,6-tri-O-methyl-α-D-, mannopyranoside, Methyl 2,4,6-tri-O-methyl-α-D-mannopyranoside, Methyl 3,4,6-tri-O-methyl-α-D-mannopyranoside, Methyl 6-tritylmannofuranoside; α-D-form, Methyl 6-O-tritylmannopyranoside; α-D-form, 1,2,34,6-Penta-O-acetyl-α-D-mannopyranose, 1,2,34,6-Penta-O-acetyl-β-D-mannopyranose, 1,2,34,6-Penta-O-acetyl-β-D-mannopyranose, 1,2,34,6-Penta-O-benzoyl-β-D-mannopyranose, 1,2,34,6-Penta-O-benzoyl-β-D-mannopyranose, 2-Propenyl mannopyranoside, 2,3,4,6-Tetra-O-acetyl-β-D-mannopyranoside, endo-3,4,6-Tri-O-acetyl-1,2-O-(1-, methoxyethylidene)-β-D-mannopyranose, exo-3,4,6-Tri-O-acetyl-1,2-O-(1-, methoxyethylidene)-β-D-mannopyranose, 2,3,4-Tri-O-methyl-D-mannose, 2,3,6-Tri-O-methylmannose; D-form, 2,4,6-Tri-O-methylmannose; D-form, 3,4,6-Tri-O-methylmannose; α-D-Pyrannose-, form, 3-O-Acetyl-1,2:5,6-di-O-isopropylidene-β-D-, talofuranose, 2-Amino-2-deoxytalose; D-form, 2,5-Anhydrotalose; D-form, 2,5-Anhydro-3,4,6-tri-O-benzoyl-L-talose, dimethylacetal, 2,5-Anhydro-3,4,6-tri-O-benzyl-L-talose, dimethylacetal, 3-O-Benzyl-1,2-O-isopropylidene-β-D-, talopyranose, 1,2:5,6-Di-O-isopropylidene-β-D-talofuranose, 1,2:5,6-Di-O-isopropylidene-β-L-talofuranose, 1,2:5,6-Di-O-isopropylidene-3-O-tosyl-β-D-, talofuranose, 1,2:5,6-Di-O-isopropylidene-3-O-tosyl-β-L-, talofuranose, 1,2-O-isopropylidene-3-O-methyl-β-D-, talopyranose, 1,2-O-isopropylidenetalofuranose; β-L-form, 1,2-O-isopropylidenetalofuranose; β-L-form, 5,6-O-Isopropylidene, 3-benzyl, 1,2-O-isopropylidenetalofuranose; β-L-form, 3-, Benzoyl, 1,2-O-isopropylidenetalofuranose; β-L-form, 6-, Benzoyl, 3-Me, 1,2-O-isopropylidenetalofuranose; β-L-form, 5,6-, Dibenzoyl, 3-Me, 1,2-O-isopropylidenetalofuranose; β-L-form, 3-, Benzyl, 5,6-dibenzoyl, 1,2-O-isopropylidenetalofuranose; β-L-form, 5-, Tosyl, 3-benzyl, 6-trityl, 1,2-O-isopropylidenetalofuranose; β-L-form, 3-, benzyl, 6-trityl, Methyl 2,3-anhydro-4,6-O-, benzylidenetalopyranoside; α-D-form, Methyl 2,3-anhydro-4,6-O-, benzylidenetalopyranoside; β-D-form, Methyl 2,3-isopropylidene-6-O-methyl-α-D-, talopyranoside, Methyl 6-O-methyl-α-D-talopyranoside, Methyl α-D-talofuranoside, Methyl β-D-talofuranoside, Methyl α-D-talopyranoside, Methyl β-D-talopyranoside, 1,2,3,4,6-Penta-O-acetyl-α-D-talopyranose, 1,2,3,5,6-Penta-O-benzoyl-α-D-talofuranoside, Talose; α-D-Pyranose-form, Talose; α-D-Pyranose-form, Me glycoside, 2,3-, O-isopropylidene, 4-Ac, 6-Me, Talose; β-D-Pyranose-form, Talose; L-form, 3,5,6-Tri-O-benzoyl-1,2-O-isopropylidene-β-D-, talofuranose, 2-Amino-1,3,4-isosanetriol, 7-Deoxy-D-glycero-D-gluco-heptose, 7-Deoxy-L glycero-L-galacto-heptose, 7-Deoxy-L glycero-L-galacto-heptose, α-, Pyranose-form, Penta-Ac, 7-Deoxy-L glycero-L-galacto-heptose; β-, Pyranose-form, Penta-Ac, 7-Deoxy-L glycero-D-gluco-heptose; 1,2:5,6-Di-O-isopropylidene-D-glycero-L-gluco, -β-heptofuranose, 1,2:6,7-Di-O-isopropylidene-D-glycero-L-gluco, heptofuranose, 1,2:3,4-Di-O-isopropylidene-L-glycero-α-D-, galacto-7-octulopyranose trimethylendithioacetal, D-glycero-D-gulo-Heptose, D-glycero-D-gulo-Heptose; α-Furanose-form, D-glycero-D-galacto-Heptose; α-form, D-glycero-D-galacto-Heptose; β-form, D-glycero-D-manno-Heptose, D-glycero-D-manno-Heptose; Hexa-Ac, D-glycero-D-gluco-Heptose, D-glycero-L-manno-Heptose; 2,3,4,5,6,7-Hexa-, Ac, D-glycero-L-manno-Heptose; β-Pyranose-form, 1,2,3,4,6-Pentabenzoyl, D-glycero-L-manno-Heptose; β-Pyranose-form, Me glycoside, D-glycero-L-manno-Heptose; β-Pyranose-form, Et glycoside, D-glycero-L-manno-Heptose; β-Furanose-form, 2,3:6,7-Di-O-isopropylidene, D-glycero-L-galacto-Heptose, D-glycero-L-gluco-Heptose; α-form, D-glycero-L-gluco-Heptose; β-form, L-glycero-D-manno-heptose, L-glycero-D-manno heptose; 1-Phosphate, dicyclohexylammonium salt, Hikosamine; Me α-glycoside, N-Ac, Hikosamine; Me β-glycoside, N-Ac, Lincomycin, Lincosamine; Di-Me dithioacetal, Methyl 6-amino-6,8-dideoxy-1-thio-D-erythro-α-, D-galacto-octopyranoside, Methyl 7-deoxy-L-glycero-L-galacto-β-, heptofuranoside, Methyl 7-deoxy-L-glycero-L-galacto-α-, heptopyranoside, Methyl 7-deoxy-L-glycero-L-galacto-β-, heptopyranoside, Methyl 5,6-dideoxy-2,3:8,9:10,11-tri-O-, isopropylidene L-lyxo-α-L-talo-undec-5-, enodialdo-1,4-furanoside-11,7-pyranose; (E)-, form, Methyl 5,6-dideoxy-2,3:8,9:10,11-tri-O-, isopropylidene L-lyxo-α-L-talo-undec-5-, enodialdo-1,4-furanoside-11,7-pyranose; (Z)-, form, Methyl D-glycero-D-gulo-α-heptofuranoside, Methyl D-glycero-D-gulo-β-heptofuranoside, Methyl D-glycero-D-gulo-α-heptopyranoside, Methyl D-glycero-D-gulo-β-heptopyranoside, Methyl D-glycero-D-galacto-α-heptopyranoside, D-erythro-D-galacto-Octose, D-erythro-L-galacto-Octose, D-erythro-L-galacto-Octose; Me glycoside, v-Octose, v-Octose; 1,1'-Anhyrdro, 1,2:3,4:6,7-Tri-O-isopropylidene-D-glycero-D-, galacto-α-heptopyranose, 1,2:3,4:6,7-Tri-O-isopropylidene-D-glycero-L-, galacto-β-heptopyranose, Anthranilic deoxyribulotide, 3,5-O-Benzylidene-1-deoxy-erythropentulose; D-, form, 1-(2-Carboxyanilino)-1-deoxyribulose; D-form, 1,2:3,4-Di-O-isopropylidene-α-D-erythro-2-, pentulose, 1,2:3,4-Di-O-isopropylidene-β-D-erythro-2-, pentulose, erythro-2-Pentulose; D-form, erythro-2-Pentulose; L-form, 1-Deoxy-threo-pentulose; D-form, 2,3-O-isopropylidene-β-D-threo-pentulofuranose, Methyl α-D-threo-pentulofuranoside, 1,4-Anhydro-2-deoxy-5-O-methoxymethyl-D-erythro-pent-1-enitol, 1,4-Anhydro-2,3:5,6-di-O-isopropylidene-D-mannitol, 1,4-Anhydro-2,3-di-O-methyl-α-D-arabino-pyranose, 1,4-Anhydroglucitol; D-form, 1,4-Anhydroglucose: α-D-Pyranose-form, 1,4-Anhydromannitol; D-form, 1,4-Anhydromannitol; D-form, 2,3-O-Isopropylidene, 6-tosyl, 1,4-Anhydro-2,3,6-tri-O-benzyl-α-D-glucopyranose, 1,4-Anhydro-2,3,6-tri-O-methyl-β-D-galacto-pyranoside, 1,5-Anhydro-D-allitol, 1,5-Anhydro-2,3:4,5-di-O-isopropylidene-D-mannitol, 1,5-Anhydrogalactitol; D-form, 1,5-Anhydroglucitol; D-form, 1,5-Anhydroglucitol: D-form, 2,3,4-Tri-Ac, 1,5-Anhydroglucitol; D-form, Tetra-Ac, 1,5-Anhydro-2,3,6-tri-O-benzoyl-4-deoxy-L-erythro-hex-4-enitol, Arabinal; D-form, Arabinal; L-form, 3,4-Di-O-acetyl-D-arabinal, 3,4-Di-O-acetyl-L-arabinal, 3,4-Di-O-benzoyl-D-arabinal, Styracitol, 2,3,4-Tri-O-acetyl-1,5-anhydro-6-deoxy-D-xylohex-5-enitol, 1,6-Anhydro-endo-3,4-O-benzylidene-β-D-galactopyranose, 1,6-Anhydro-exo-3,4-O-benzylidene-β-D-galactopyranose, 1,6-Anhydro-2,3-O-benzylidene-β-D-ribo-hexopyranose-4-ulose, 1,6-Anhydro-3,4-O-endo-benzylidene-β-D-ribo-hexopyranose-2-ulose, 1,6-Anhydro-3,4-O-benzylidene-β-D-lyxo-hexopyranos-2-ulose, 1,6-Anhydro-3,4-O-exo-benzylidene-β-D-ribo-hexopyranos-2-ulose, 1,6-Anhydro-4-O-exo-benzyl-2-O-β-D-arabino-hexopyranos-3-ulose, 1,6-Anhydro-3-deoxy-erythro-hexopyranos-2-ulose; β-D-form, 1,6-Anhydro-3-deoxy-β-D-threo-hexopyranos-4-ulose, 1,6-Anhydro-3-deoxy-4-O-methyl-β-D-erythro-hexopyranos-2-ulose, 1,6-Anhydro-3-deoxy-4S-phenyl-4-thio-β-D-erythro-hexopyranos-2-ulose, 1,6-Anhydro-2,4-diazido-2,4-dideoxy-β-D-glucopyranos, 1,6-Anhydro-2,4-di-O-benzoyl-β-D-lyxo-hexopyranos-3-ulose, 1,6-Anhydro-2,4-di-O-benzyl-β-D-lyxo-hexopyranos-3-ulose, 1,6-Anhydro-2,4-dideoxy-2,4-difluoroglucopyranose; β-D-form, 1,6-Anhydro-2,3-dideoxy-β-D-glycero-hex-2-enopyranose-4-ulose, 1,6-Anhydro-3,4-dideoxy-β-D-glycero-hex-3-enopyranos-2-ulose, 1,6-Anhydro-3,4-dideoxy-β-D-glycero-hexopyranos-2-ulose, 1,6-Anhydro-2,4-di-O-tosyl-O-D-arabino-hexopyranos-3-ulose, 1,6-Anhydro-2,4-di-O-tosyl-β-D-lyxo-hexopyranos-3-ulose, 1,6-Anhydrogalactofuranose; α-D-form, 1,6-Anhydrogalactofuranose; α-D-form, 2-Tosyl, 1,6-Anhydrogalactofuranose; αD-form, 3-Tosyl, 1,6-Anhydrogalactofuranose; α-D-form, 5-Tosyl, 1,6-Anhydrogalactopyranose; β-D-form, 1,6-Anhydroglucose; β-D-Pyranose-form, Tri-Ac, 1,6-Anhydroglucose; β-D-Pyranose-form, Tribenzyl, 1,6-Anhydroglucose; β-D-Pyranose-form, Tribenzoyl, 1,6-Anhydrogulose; β-D-Pyranose-form, 2,3-O-Isopropylidene, 1,6-Anhydrogulose; β-D-Pyranose-form, Tri-Ac, 1,6-Anhydrogulose; β-D-Pyranose-form, Tribenzoyl, 1,6-Anhydrogulose; β-D-Pyranose-form, Tritosyl, 1,6-Anhydrogulose; α-L-Furanose-form, 1,6-Anhydro-erythro-hex-3-enopyranose; β-D-form, 1,6-Anhydro-lyxo-hexopyranos-2-ulose, 1,6-Anhydro-ribo-hexopyranos-2-ulose, β-D-form, 1,6-Anhydro-β-D-arabino-hexopyranos-3-ulose, 1,6-Anhydro-β-D-lyxo-hexopyranos-3-ulose, 1,6-Anhydro-arabino-hexopyranos-4-ulose, β-D-form, 1,6-Anhydro-lyxo-hexopyranos-4-ulose, β-D-form, 1,6-Anhydro-ribo-hexopyranos-4-ulose, β-D-form, 1,6-Anhydro-3,4-O-isopropylidene-β-D-galacto-pyranose, 1,6-Anhydro-3,4-O-isopropylidene-β-D-galacto-pyranose, 1,6-Anhydro-2,3-O-isopropylidene-α-L-gulofuranose, 1,6-Anhydro-2,3-O-isopropylidene-β-D-lyxo-hexopyranose-4-ulose, 1,6-Anhydro-2,3-O-isopropylidene-β-D-ribo-hexopyranose-4-ulose, 1,6-Anhydro-3,4-O-isopropylidene-β-D-lyxo-hexopyranose-2-ulose, 1,6-Anhydro-3,4-O-isopropylidene-β-D-ribo-hexopyranose-2-ulose, 1,6-Anhydro-2,3-O-isopropylidene-β-D-mannofuranose, 1,6-Anhydro-2,3-O-isopropylidene-β-D-mannopyranose, 1,6-Anhydromannose-β-D-Pyranose-form, 2,3-O-Benzylidene, 1,6-Anhydromannose-β-D-Furanose-form, 1,6-Anhydromannose-β-D-Furanose-form, Tritosyl, 1,6-Anhydro-2,3,4-tri-O-methyl-β-D-galacto-pyranoside, 1,6-Anhydro-2,3,5-tri-O-methyl-β-D-glucose, 2,4-Di-O-acetyl-1,6-anydro-3-deoxy-β-D-ribo-hexopyranoside, 2,4-Di-O-acetyl-1,6-anhydro-β-D-lyxo-hexopyranose-3-ulose, 2,4-Dideoxy-2,4-difluoroglucose; β-D-Pyranose-form, 1,6-Anhydro, D-Galactosan, Lactosan, Levoglucansan, D-Mannosan, Multistriatin, 2,3,4-Tri-O-acetyl-1,6-anhydro- α-L-gulofuranose, 2,3,5-Tri-O-acetyl-1,6-anhydro-β-D-mannofuranose, 2,3,5-Tri-O-acetyl-1,6-anhydro-β-D-mannopyranose, 2,3-Anhydroallopyranose; α-D-form, 2,3-Anhydro-6-O-benzyl-5-O-tosyl-β-D-allofuranose, 2,3-Anhydro-5,6-di-O-benzoyl-β-D-allofuranose, 2,3-Anhydro-5,6-di-O-tosyl-β-D-allofuranose, 2,3-Anhydrolyxose; α-D-Furanose-form, Me glycoside, 5-p-nitrobenzyl, 2,3-Anhydrolyxose; α-D-Furanose-form, Me glycoside, 5-tosyl, 2,3-Anhydrolyxose; α-D-Furanose-form, Et glycoside, 5-tetrahydropyranyl, 2,3-Anhydrolyxose; β-D-Furanose-form, Me glycoside, 5-p-nitrobenzoyl, 2,3-Anhydrolyxose; β-D-Furanose-form, Me glycoside, 5-tosyl, 2,3-Anhydrolyxose; β-D-Furanose-form, Et glycoside, 5-Ac, 2,3-Anhydrolyxose; β-D-Furanose-form, Et glycoside, 5-tetrahydropyranyl, 2,3-Anhydroribofuranose; α-D-form, Me glycoside, 5-nitrobenzoyl, 2,3-Anhydroribofuranose; β-D-form, Me glycoside, 5-tosyl, 2,3-Anhydroribopyranose; α-D-form, Benzyl glycoside, 4-triflate, Benzyl 2,3-anhydro-α-D-allopyranoside, Benzyl 2,3-anhydro-4,6-O-benzylidene-α-D-allo-pyranoside, Benzyl 2,3-anhydro-4,6-O-benzylidene-αD-allo-pyranoside, Benzyl 2,3-anhydro-4,6-O-benzylidene-α-D-manno-pyranoside, Benzyl 2,3-anhydro-α-D-manno-pyranoside, Benzyl 2,3-anhydro-β-D-manno-pyranoside, Benzyl 2,3-anhydro-4-O-methyl-β-D-ribopyranoside, Benzyl 2,3-anhydro-α-D-ribo-pyranoside, Benzyl 2,3-anhydro-β-D-manno-pyranoside, Ethyl 5-O-acetyl-2,3-anhydro-α-D-lyxo-furanoside, Ethyl 2,3-Anhydro-α-D-lyxo-furanoside, Ethyl 2,3-Anhydro-β-D-lyxo-furanoside, Methyl 4-O-acetyl-2,3-anhydro-6-deoxy-α-D-gulo-pyranoside, Methyl 4-O-acetyl-2,3-anhydro-6-deoxy-β-D-gulo-pyranoside, Methyl 5-O-acetyl-2,3-anhydro-α-D-lyxopyranoside, Methyl 5-O-acetyl-2,3-anhydro-β-D-lyxopyranoside, Methyl 4-O-acetyl-2,3-anhydro-β-D-ribopyranoside, Methyl 5-O-acetyl-2,3-anhydro-β-D-ribopyranoside, Methyl 2,3-anhydro-α-D-allo-pyranoside, Methyl 2,3-anhydro-β-D-allo-pyranoside, Methyl 2,3-anhydro-5-O-benzoyl-α-D-lyxofuranoside, Methyl 2,3-anhydro-5-O-benzoyl-β-D-ribofuranoside, Methyl 2,3-anhydro-5-O-benzoyl-β-D-ribopyranoside, Methyl 2,3-anhydro-5-O-benzyl-6-deoxy-α-D-allo-furanoside, Methyl 2,3-anhydro-6-O-benzyl-α-D-gulopyranoside, Methyl 2,3-anhydro-4-6-O-benzylideneallopyranoside, Methyl 2,3-anhydro-4,6-O-benzylideneallopyranoside; β-D-form, Methyl 2,3-anhydro-4,6-O-benzylidene-β-D-allo-pyranoside; Methyl 2,3-anhydro-4,6-O-benzylidene-α-D-gulo-pyranoside; Methyl 2,3-anhydro-4,6-O-benzylidene-β-D-gulo-pyranoside; Methyl 2,3-anhydro-4,6-O-benzylidene-α-D-manno-pyranoside; Methyl 2,3-anhydro-4,6-O-benzylidene-β-D-manno-pyranoside; Methyl 2,3-anhydro-4,6-O-benzylidene-3-C-nitro-β-D-allopyranoside; Methyl 2,3-anhydro-4,6-O-benzylidenetalopyranoside; α-D-form, Methyl 2,3-anhydro4,6-O-benzylidenetalopyranoside; β-D-form, Methyl 2,3-anhydro-5-O-benzyl-α-D-lyxofuranoside, Methyl 2,3-anhydro-5-O-benzyl-β-D-lyxofuranoside, Methyl 2,3-anhydro-5-O-benzyl-α-D-ribofuranoside, Methyl 2,3-anhydro-5-O-benzyl-β-D-ribofuranoside, Methyl 2,3-anhydro-6-deoxy-α-D-gulopyranoside, Methyl 2,3-anhydro-6-deoxy-β-D-gulopyranoside, Methyl 2,3-anhydro-6-deoxy-α-D-hexopyranosid-4-ulose, Methyl 2,3-anhydro-6-deoxy-α-D-lyxo-hexopyranosid-4-ulose, Methyl 2,3-anhydro-6-deoxy-α-D-ribo-hexopyranosid-4-ulose, Methyl 2,3-anhydro-6-deoxy-α-D-mannopyranoside, Methyl 2,3-anhydro-5-deoxy-α-D-ribofuranoside, Methyl 2,3-anhydro-5-deoxy-β-D-ribofuranoside, Methyl 2,3-anhydro-α-D-lyxo-furanoside, Methyl 2,3-anhydro-β-D-lyxo-furanoside, Methyl 2,3-anhydro-4-O-deoxy-α-D-mannopyranoside, Methyl 2,3-anhydro-4-O-deoxy-β-D-mannopyranoside, Methyl 2,3-anhydro-5-O-methyl-α-D-lyxofuranoside, Methyl 2,3-anhydro-5-O-methyl-β-D-lyxofuranoside, Methyl 2,3-anhydro-4-O-methyl-β-D-ribopyranoside, Methyl 2,3-anhydro-β-D-erythro-pentopyranosid-4-ulose, Methyl 2,3-anhydro-β-L-erythro-pentopyranosid-4-ulose, Methyl 2,3-anhydro-α-D-ribofuranoside, Methyl 2,3-anhydro-β-D-ribofuranoside, Methyl 2,3-anhydro-α-D-ribopyranoside, Methyl 2,3-anhydro-β-D-ribopyranoside, Methyl 2,3-anhydro-6-O-tosyl-α-D-gulopyranoside, Methyl 2,3-anhydro-4-O-tosyl-α-D-ribopyranoside, Methyl 2,3-anhydro-4-O-tosyl-β-D-ribopyranoside, Methyl 2,3-anhydro-5-O-(triphenylmethyl)-α-D-ribo-pyranoside, Methyl 2,3-anhydro-6-O-trityl-α-D-gulopyranoside, Methyl 2,3-anhydro-5-O-trityl-β-D-lyxopyranoside, Phenyl 2,3-anhydro-4,6-O-benzylidene-α-D-manno-pyranoside, 1,5,6-Tri-O-acetyl-2,3-anhydro-β-D-allofuranose, Allonic acid; D-form, 2,5-Anhydro, Me ester, Alltronic acid; 2,5-Anhydro, 3,4,6-tribenzoyl, 2,5-Anhydro-D-allonic acid, 2,5-Anhydroallose; DL-form, 2,5-Anhydro-6-O-benzoyl-3,4-O-isopropylidene-D-allo-nonitrile, 2,5-Anhydro-6-O-benzoyl-3,4-O-isopropylidene-D-allose, 2,5-Anhydro-3,4-di-O-tosyl-D-lyxose dimethyl acetal, 2,5-Anhydro-3,4-di-O-tosyl-L-lyxose dimethyl acetal, 2,5-Anhydro-3,4-O-isopropylidene-D-allonitrile, 2,5-Anhydrotalitol; D-form, 2,5-Anhydrotalose; D-form, 2,5-Anhydro-6-O-tosyl-L-idose dimethyl acetal, 2,5-Anhydro-3-O-tosyl-D-xylose dimethyl acetal, 2,5-Anhydro-3,4,6-tri-O-benzoyl-D-allononitrile, 2,5-Anhydro-3,4,6-tri-O-benzoyl-L-talose dimethylacetal, 2,5-Anhydro-3,4,6-tri-O-benzyl-D-allose, 2,5-Anhydro-3,4,6-tri-O-benzyl-L-talose dimethylacetal, 2,5-Anhydroxylose; D-form, Dimethyl acetal, 3,4-ditosyl, 2,6-Anhydro-1-deoxy-galacto-hept-1-enitol; D-form, 2,6-Anhydro-1-deoxy-gluco-hept-1-enitol; D-form, 2,6-Anhydro-1-deoxy-3,4,5,7-tetra-O-acetyl-D-gluco-hept-1-enitol, 2,6-Anhydrofructofuranose; β-D-fructofuranose, 3,4-Anhydro-1,2-O-isopropylidene-β-D-tagatose, Methyl 3,4-anhydro-6-deoxy-arabino-hex-5-enopyranoside; α-L-form, Methyl 3,4-anhydro-6-deoxy-ribo-hex-5-enopyranoside; β-L-form, Methyl 3,4-anhydro-1,6-di-O-tosyl-α-tagatofuranoside, Methyl 3,4-anhydro-1,6-di-O-tosyl-β-tagatofuranoside, Methyl 3,4-anhydro-α-D-tagatofuranoside, Methyl 3,4-anhydro-β-D-tagatofuranoside, Methyl 1,6-di-O-acetyl-3,4-anhydro-α-D-tagato-furanoside, Methyl 1,6-di-O-acetyl-3,4-anhydro-β-D-tagato-furanoside, Agarobiose, 3,6-Anhydro-1,2-dideoxy-D-allo-hept-1-ynitol, 3,6-Anhydro-1,2-dideoxy-D-allo-hept-1-ynitol, 3,6-Anhydro-1,2-dideoxy-4,5-O-isopropylidene-D-altro-hept-1-ynitol, 3,6-Anhydro-1,2-dideoxy-4,5-O-isopropylidene-D-allo-hept-1-ynitol, 3,6-Anhydro-1,2-dideoxy-4,5-O-isopropylidene-D-arabino-hex-1-enitol, 3,6-Anhydrogalactose; D-form, 3,6-Anhydrogalactose; L-form, 3,6-Anhydroglucose; D-form, 3,6-Anhydro-1,2-O-iso-propylidene-α-D-galacto-pyranose, 3,6-Anhydro-1,2-O-iso-propylidene-α-L-galactose, 3,6-Anhydro-1,2-O-iso-propylidene-α-D-glucofuranoside, Ethyl 3,6-anhydro-2-deoxy-2-(formylamino)-4,5:7,8-di-O-isopropylidene-D-erythro-L-manno-octonate, Ethyl 3,6-anhydro-2-deoxy-4,5-O-isopropylidene-D-allo-heptonate, Methyl 2-acetamido-4-O-acetyl-3,6-anhydro-2-deoxy-α-D-glucopyranoside, Methyl 3,6-anhydro-2-acetamido-2-deoxy-α-D-glucopyranoside, Methyl 3,6-anhydro-2-deoxy-4,5:7,8-di-O-isopropylidene-D-glycero-D-talo-octonate, Methyl 3,6-anhydro-2-deoxy-4,5:7,8-di-O-isopropylidene-D-glycero-D-galacto-octonate, Methyl 3,6-anhydro-α-D-galactopyranoside, Methyl 3,6-anhydro-β-D-galactopyranoside, Methyl 3,6-anhydro-α-D- glucofuranoside, Methyl 3,6-anhydro-β-D-glucofuranoside, Methyl 3,6-anhydro-α-D-glucopyranoside, Methyl 3,6-anhydro-β-D-glucopyranoside, Methyl 3,6-anhydro-4,5,7-tri-O-benzyl-2-deoxy-allo-heptonate, 2,3,4,6-Tetra-O-benzyl-α-D-galactopyranosyl bromide, Methyl 4,6-anhydro-2,3-di-O-methyl-α-D-galactopyranose, 5,6-Anhydro-1,2-O-iso-propylidene-α-D-gluco-furanose, 5,6-Anhydro-1,2-O-isopropylidene-β-L-form, 5,6-Anhydro-1,2-O-iso-propylidene-3-O-mesyl-β-L-idofuranose, 5,6-Anhydro-1,2-O-iso-propylidene-3-O-mesyl-α-D-gulofuranose, 5,6-Anhydro-1,2-O-iso-propylidene-3-O-tosyl-β-L-idofuranose, Methyl 5,6-Anhydro-2,3-O-isopropylidene-3-O-β-L-allo-furanoside, 4-O-Acetyl-1,6:2,3-dianhydro-β-D-eulopyranose, 2,5-Di-O-acetyl-1,4:3,5-dianhydro-D-iditol, v-Octose; 1,1'-Anhydro, 2-Acetamido-2-deoxy-3,4:6-tri-O-acetyl-α-D-glucopyranosyl bromide, 2-Acetamido-2-deoxy-3,4,6-tri-O-acetylglucopyranosyl chloride, 2-Acetamido-2-deoxy-3,4,6-tri-O-acetylglucopyranosyl chloride; α-D-form, 2-Acetamido-3,4,6-tri-O-acetyl-2-deoxy-α-D-galactopyranosyl chloride, Acetobromocellobiose, Acetobromo-L-fucose, Acetobromoglucose; α-D-Pyranose-form, Acetobromoglucose; β-Pyranose-form, Acetobromoglucose; α-L-Pyranose-form, Acetobromoisoprimeverose, Acetobromolactose, Acetobromolactose, Acetobromomaltose, Acetobromo-L-rhamnose, Acetobromorutinose, Acetobromosophorose, Acetobromomoturanose, Acetochlorocellobiose, Acetochlorogentiobiose, Acetochlorolactose, Acetochloromaltose, Acetochloroprimeverose, Acetochlororutinose, Acetochloroturanose, 4-O-Acetyl-2,3-O-carbonyl-α-L-rhamnopyranosyl bromide, 2-O-Acetyl-3,5-di-O-benzoyl-β-D-ribofuranosyl fluoride, 3-O-Acetyl-2,5-di-O-benzoyl-β-D-ribofuranosyl fluoride, 5-O-Acetyl-2,3-di-O-benzoyl-β-D-ribofuranosyl fluoride, 2-Amino-2-deoxyglucopyranosyl bromide; α-D-form, Tri-Ac, 2-Amino-2-deoxyglucopyranosyl bromide; α-D-form, Tri-Ac, 2-Amino-2-deoxy-3,4,6-tri-O-benzoyl-α-D-galactopyranosyl bromide, Arabinofuranosyl bromide; α-D-form, Tris-4-nitrobenzoyl, Arabinofuranosyl chloride; α-D-form, Tris(4-nitro-benzoyl), Arabinofuranosyl chloride; α-D-form, Tribenzyl, 2-Azido-5-O-benzoyl-3-O-(4-nitrobenzoyl)-α-D-arabino-furanosyl chloride, 2-Azido-2-deoxyglucopyranosyl bromide; α-D-form, 2-Benzamido-3,4,6-tri-O-benzoyl-2-deoxy-α-D-glucopyranosyl bromide, 5-O-Benzoyl-2,3-O-carbonyl-α-D-lyxofuranosyl bromide, 2-O-Benzyl-3,5-bis-O-(4-nitrobenzoyl)-α-D-arabino-furanosyl chloride, 2-O-Benzyl-3,4,6-tris(4-nitrobenzoyl)-α-D-glucopyranosyl bromide, 2-O-Benzyl-3,4,6-tris(4-nitrobenzoyl)-β-D-glucopyranosyl bromide, 6-Bromo-6-deoxy-2,3,4-tri-O-acetyl-α-D-galactopyranosyl bromide, 1-Deoxy-1-fluoro-2,3:4,5-di-O-isopropylidene-D-fructose, 6-Deoxy-6-fluoro-1,2:3,4-di-O-isopropylidene-α-L-galactopyranose, 1-Deoxy-1-fluorofructose; D-form, 6-Deoxy-6-fluorogalactose; L-Pyranose-form, 6-Deoxy-6-fluoro-α-D-glucopyranosyl fluoride, 6-Deoxy-6-fluoro-β-D-glucopyranosyl fluoride, 1'-Deoxy-1'-fluorosucrose, 6-Deoxy-6-iodo-2,3,4-tri-O-acetyl-α-D-mannopyranosyl bromide, 6-Deoxy-2,3,4-tri-O-acetyl-α-L-mannopyranosyl chloride, 2-Deoxy-3,4,6-tri-O-acetyl-2-trifluoroacetamido-α-D-galactopyranosyl bromide, 3,4-Di-O-benzoyl-2-bromo-2-deoxy-α-D-lyxopyranosyl bromide, 3,4-Di-O-benzoyl-2-bromo-2-deoxy-β-D-lyxopyranosyl bromide, 2,3-Di-O-benzoyl-5-O-tosyl-α-L-arabinofuranosyl bromide, 2,3-Di-O-benzyl-5-O-(4-nitrobenzoyl)-α-D-arabinofuranosyl chloride, 1,6-Dibromo-1,6-dideoxy-3,4-O-isopropylidene-D-mannitol, Δ1,6-Dibromo-1,6-dideoxy-mannitol; D-form, 1,6-Dibromo-1,6-dideoxy-mannitol; D-form, 3,4-O-Iso-propylidene, 2-5-di-Ac, 2,3:5,6-Di-O-isopropylidene-α-D-mannofuranosyl chloride, Galactosyl chloride; α-D-Pyranose-form, 2,3,4-Tri-Ac, 6-tosyl, Galactosyl chloride; α-D-Pyranose-form, 3,4,6-Tri-Ac, 2-trichloroacetyl, Galactosyl chloride; α-D-Pyranose-form, Tetrabenzyl, Galactosyl chloride; β-D-Pyranose-form, 3,4,6-Tri-Ac, 2-(trichloroacetyl), Glucopyranosyl fluoride; α-D-form, Glucopyranosyl fluoride; α-D-form, 6-Trityl, Hepta-O-acetyl-α-D-bromide, Hexa-O-acetyl-robinobiosyl chloride, Lyxosyl bromide; α-D-Pyranose-form, 2-C-Bromo, tribenzyl, Lyxosyl chloride; α-D-Pyranose-form, Tribenzyl, 2-C-chloro, Lyxosyl chloride; β-D-Pyranose-form, Tribenzyl, 2-C-chloro, Mannosyl chloride; α-D-Pyranose-form, 4,6-Di-Ac, 2,3-dibenzyl, Mannosyl chloride; α-D-Pyranose-form, 2,4-Di-Ac, 3,6-dibenzyl, Mannosyl chloride; α-D-Pyranose-form, Di-O-cyclohexylidene, Methyl 6-deoxy-6-fluoro-α-D-galactopyranoside, Methyl 6-deoxy-6-fluoro-β-D-galactopyranoside, Methyl 2,3,4-tri-O-acetyl-6-deoxy-6-fluoro-α-D-galactopyranoside, Methyl 2,3,4-tri-O-acetyl-6-deoxy-6-fluoro-β-D-galactopyranoside, 2-O-Nitro-3,5-bis(4-nitrobenzoyl)-α-D-arabino-fuanosyl chloride, 2-O-Nitro-3,5-bis(4-nitrobenzoyl)-β-D-arabino-furanosyl chloride, Rhamnopyranosyl bromide; α-L-form, Tribenzyl, Ribofuranosyl bromide; β-D-form, 2,3-O-Isopropylidene, 5,(4-nitrobenzoyl), Ribofuranosyl bromide; β-D-form, 3,5-Dibenzyl, Ribofuranosyl bromide; β-D-form, 3,5-Dibenzoyl, 2-Ac, Ribofuranosyl bromide; β-D-form, 3,5-Dibenzoyl, 2,(4-nitrobenzoyl), Ribofuranosyl bromide; β-D-form, Tribenzoyl, Ribofuranosyl bromide; β-D-form, Tris(4-nitrobenzoyl), Ribofuranosyl chloride; β-D-form, 2,3-O-Isopropylidene, 5-trityl, Ribofuranosyl chloride; β-D-form, 2,3-O-Isopropylidene, 5-Me, Ribofuranosyl chloride; β-D-form, 2,3-O-Isopropylidene, 5-methoxymethyl, 2,3,5,6-Tetra-O-acetyl-β-D-galactofuranosyl chloride, 2,3,4,6-Tetra-O-acetyl-α-D-galactopyranosyl bromide, 2,3,4,6-Tetra-O-acetyl-α-D-galactopyranosyl chloride, 2,3,4,6-Tetra-O-acetyl-β-galactopyranosyl chloride, 2,3,4,6-Tetra-O-acetyl-α-D-gluco-pyranosyl chloride, 2,3,4,6-Tetra-O-acetyl-β-D-chloride, 2,3,4,6-Tetra-O-acetyl-α-D-glucopyranosyl fluoride, 2,3,4,6-Tetra-O-acetyl-β-D-glucopyranosyl fluoride, 6-O-(2,3,4,6-Tetra-O-acetyl-β-D-glucopyranosyl)-tri-O-acetyl-α-D-gluco-pyranosyl bromide, 2,3,4,6-Tetra-O-acetyl-α-D-manno-pyransoyl bromide, 2,3,4,6-Tetra-O-acetyl-α-D-manno-pyransoyl chloride, 2,3,4,6-Tetra-O-acetyl-β-D-manno-pyransoyl chloride, 2,3,4,6-Tetra-O-acetyl-5-thio-α-D-gluco-pyransoyl bromide, 2,3,4,6-Tetra-O-benzoyl-α-D-gluco-pyranosyl bromide, 2,3,4,6-Tetra-O-benzoyl-α-D-gluco-pyranosyl chloride, 2,3,4,6-Tetra-O-benzoyl-β-D-gluco-pyranosyl chloride, 2,3,4,6-Tetra-O-benzoyl-β-D-gluco-pyranosyl fluoride, 2,3,4,6-Tetra-O-benzoyl-α-D-manno-pyranosyl bromide, 2,3,4,6-Tetra-O-benzoyl-α-D-manno-pyranosyl chloride, 2,3,4,6-Tetra-O-benzoyl-β-D-manno-pyranosyl chloride, 2,3,4,6-Tetra-O-benzyl-α-D-galacto-pyranosyl chloride, 2,3,4,6-Tetra-O-benzyl-α-D-gluco-pyranosyl bromide, 2,3,4,6-Tetra-O-benzyl-α-D-gluco-pyranosyl chloride, 2,3,4,6-Tetra-O-benzyl-β-D-gluco-pyranosyl fluoride, 5-Thioglucose; β-D-Pyranose-form, 1-Bromo, tetra-Ac, 2,3,4-Tri-O-acetyl-β-D-arabinopyranosyl bromide, 2,3,4-Tri-O-acetyl-β-L-arabinopyranosyl bromide, 2,3,4-Tri-O-acetyl-β-D-arabinopyranosyl chloride, 2,3,4-Tri-O-acetyl-β-L-arabinopyranosyl chloride, 2,3,4-Tri-O-acetyl-β-L-arabinopyranosyl chloride, 3,4,6-Tri-O-acetyl-2-benzamido-2-deoxy-α-D-glucopyranosyl bromide, 3,4,6-Tri-O-acetyl-2-O-benzyl-α-D-galactopyranosyl chloride, 2,3,4-Tri-O-acetyl-6-deoxy-6-fluoro-β-D-galactopyranosyl bromide, 2,3,4-Tri-O-acetyl-6-deoxy-6-fluoro-α-D-glucopyranosyl fluoride, 2,3,4-Tri-O-acetyl-6-deoxy-6-fluoro-β-D-glucopyranosyl fluoride, 3,4,6-Tri-O-acetyl-2-deoxy-2-nitroso-glucopyranosyl chloride; α-D-form, 3,4,6-Tri-O-acetyl-2-deoxy-2-phthalimido-β-D-glucopyranosyl bromide, 2,3,4-Tri-O-acetyl-α-D-galactopyranosyl chloride, 3,4,6-Tri-O-acetyl-α-D-galactopyranosyl chloride, 3,4,6-Tri-O-acetyl-α-D-arabino-hexopyranosyl-2-ulose chloride, 2,3,5-Tri-O-acetyl-α-D-lyxofuranosyl chloride, 2,3,4-Tri-O-acetyl-α-D-lyxopyranosyl bromide, 2,3,4-Tri-O-acetyl-α-D-lyxopyranosyl chloride, 2,3,5-Tri-O-acetyl-α-D-ribofuranosyl chloride, 2,3,5-Tri-O-acetyl-β-D-ribofuranosyl chloride, 2,3,4-Tri-O-acetyl-β-D-ribopyranosyl bromide, 2,3,4-Tri-O-acetyl-β-D-ribopyranosyl chloride, 2,3,4-Tri-O-acetyl-α-D-xylopyranosyl bromide, 2,3,4-Tri-O-aceryl-α-D-xylopyranosyl chloride, 2,3,4-Tri-O-acetyl-β-D-xylopyranosyl chloride, 2,3,4-Tri-O-benzoyl-α-D-arabino-furanosyl bromide, 2,3,4-Tri-O-benzoyl-β-D-arabino-furanosyl bromide, 2,3,4-Tri-O-benzoyl-β-D-arabino-pyranosyl bromide, 2,3,4-Tri-O-benzoyl-β-L-arabino-pyranosyl bromide, 2,3,6-Tri-O-benzoyl-α-D-glucopyranosyl bromide, 3,4,6-Tri-O-benzoyl-α-D-arabino-hexopyranosyl-2-ulose bromide, 2,3,5-Tri-O-benzoyl-α-D-ribofuranosyl fluoride, 2,3,4-Tri-O-benzoyl-α-D-ribopyranosyl bromide, 2,3,4-Tri-O-benzoyl-β-D-ribopyranosyl bromide, 2,3,4-Tri-O-benzoyl-α-D-ribopyranosyl chloride, 2,3,4-Tri-O-benzoyl-β-D-ribopyranosyl chloride, 2,3,4-Tri-O-benzoyl-α-D-xylopyranosyl bromide, 2,3,4-Tri-O-benzoyl-β-D-xylopyranosyl bromide, 2,3,4-Tri-O-benzoyl-α-D-xylopyranosyl chloride, 2,3,4-Tri-O-benzoyl-β-D-xylopyranosyl chloride, 2,3,4-Tri-O-benzyl-α-L-fucopyranosyl bromide, 2,3,5-Tri-O-benzyl-α-D-ribofuranosyl fluoride, Acetobromomelibiose, Acetochloromelibiose, 1,6-Anhydro-2,4-dideoxy-2,4-diflouro-glucopyranose; β-D-form, 2-Azido-2-deoxy-3,4,6-tri-O-acetyl-α-D-galactopyranosyl bromide, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside, 1-(2-Bromo-2-deoxy-3,4,6-tri-O-acetyl-β-D-glucopyranosyl)-4-methylpyridinium bromide, 2-Deoxy-2-fluoroarabinose; D-form, 2-Deoxy-2-fluoroglucose; D-form, 4-Deoxy-4-fluoro-1,2-O-isopropylidene-β-D-tagatopyranose, 4-Deoxy-4-fluoro-D-tagatose, 3,4-Di-O-benzoyl-2-bromo-2-deoxy-α-D-lyxopyranosyl bromide, 3,4-Di-O-benzoyl-2-bromo-2-deoxy-β-D-lyxopyranosyl bromide, 2,4-Dideoxy-2,4-difluoroglucose; D-form, 2,4-Dideoxy-2,4-difluoroglucose; β-D-Pyranose-form, 1,6-Anhydro, Lyxosyl bromide; α-D-Pyranose-form, 2-C-Bromo, tribenzoyl, Lyxosyl chloride; α-D-Pyranose-form, Tribenzoyl, 2-C-chloro, Lyxosyl chloride; β-D-Pyranose-form, Tribenzoyl, 2-C-chloro, Methyl 4,6-O-benzylidene-2-bromo-2-deoxy-β-D-ribohexopyranosid-3-ulose, Methyl 4,6-O-benzylidene-2-bromo-2,3-dideoxy-threo-hex-3-enopyranoside; -α-D-form, Methyl 2-deoxy-2-fluoro-α-D-arabino-furanoside, Methyl 3,4,6-tri-O-acetyl-2-deoxy-2-fluoro-β-D-glucopyranoside, 2,3,4,6-Tetraacetamido-2,3,4,6-tetra-deoxy-α-D-glucopyranose, 2,3,4,6-Tetraamido-2,3,4,6-tetradeoxy-glucose; D-form, 1,3,4,5-Tetra-O-benzoyl-α-L-sorbo-pyranosyl bromide, 1,3,4,5-Tetra-O-benzoyl-α-L-sorbo-pyranosyl chloride, Benzyl 3-deoxy-3-fluoro-α-D-gluco-pyranoside, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside, 1,2-O-Cyclohexylidene-3-deoxy-3-fluoro-α-D-glucofuranose, 3-Deoxy-3-fluoro-D-gluconic acid, 3-Deoxy-3-fluoroglucose; D-form, Methyl 3-bromo-3,6-dideoxy-α-D-xylo-hexopyranosid-4-ulose, 2,3,4,6-Tetraacetamido-2,3,4,6-tetra-deoxy-α-D-glucopyranose, 1,2,4,6-Tetra-O-acetyl-3-deoxy-3-fluoro-α-D-glucopyranose, 1,2,4,6-Tetra-O-acetyl-3-deoxy-3-fluoro-β-D-glucopyranose, 2,3,4,6-Tetraamino-2,3,4,6-tetradeoxyglucose; D-form, 1,6-Anhydro-2,4-dideoxy-2,4-difluoroglucopyranose; β-D-form, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside, 4-Deoxy-4-fluoroglucose; D-form, 2,6-Diamino-2,6-dideoxygalactose; α-D-Pyranose-form, 4,6-Dichloro-4,6-dideoxygalactose; D-form, 2,4-Dideoxy-2,4-difluoroglucose; D-form, 2,4-Dideoxy-2,4-difluoroglucose; β-D-Pyranose-form, 1,6-Anhydro, Methyl 4,6-dichloro-4,6-dideoxy-2,3-di-O-tosylα-D-galactopyranoside, Methyl 4,6-dichloro-4,6-dideoxy-2,3-di-O-tosyl-β-D-galactopyranoside, Methyl 4,6-dichloro-4,6-dideoxy-α-D-galactopyranoside, Methyl 4,6-dichloro-4,6-dideoxy-β-D-galactopyranoside, Methyl 4,6-dichloro-4,6-dideoxy-α-D-glucopyranoside, 2,3,4,6-Tetraacetoamido-2,3,4,6-tetradeoxy-α-D-glucopyranose, 2,3,4,6-Tetraamino-2,3,4,6-tetradeoxyglucose; D-form, 5-Deoxy-5-fluoro-1,2-O-isopropylidene-α-D-xylofuranose, 5-Deoxy-5-fluoroxylose; D-Furanose-form, 2,3,4,6-Tetraacetamido-2,3,4,6-tetra-deoxy-α-D-glucpyranose, 3,5-O-Benzylidene-6-deoxy-6-fluoro-1,2-O-isopropylidene-α-D-glucofuranose, Benzyl 2,3,4,6-tetraacetamido-2,3,4,6-tetradeoxyα-D-glucopyranoside, Benzyl 2,3,4,6-tetrabenzamido-2,3,4,6-tetradeoxy-α-D-glucopyranoside, Benzyl 2,3,4-tri-O-benzyl-6-bromo-6-deoxy-D-glucopyranoside, 6-Bromo-6-deoxy-1,2:3,4-di-O-iso-propylidene-α-D-galactopyranose, 6-Bromo-6-deoxy-1,2:3,4-di-O-iso-propylidene-α-L-galactopyranose, 6-Bromo-6-deoxy-1,2:3,5di-O-iso-propylidene-α-D-glucofuranose, 6-Bromo-6-deoxygalactose; D-Pyranose-form, 6-Bromo-6-deoxyglucose; D-form, 6-Deoxy-6-fluoro-1,2:3,4-di-O-isopropylidene-α-D-galactopyranose, 6-Deoxy-6-fluoro-1,2:3,5-di-O-methyl-ene-α-D-glucofuranose, 6-Deoxy-6-fluoro-α-D-galactopyranose 1-(dihydrogen phosphate), 6-Deoxy-6-fluorogalactose; α-D-Pyranose-form, 6-Deoxy-6-fluoro-α-D-glucopyranosyl fluoride, 6-Deoxy-6-fluoro-β-D-glucopyranosyl fluoride, 6-Deoxy-6-fluoroglucose; D-form, 6-Deoxy-6-iodo-2,3,4-tri-O-acetyl-α-D-mannopyranosyl bromide, 4,6-Dichloro-4,6-dideoxygalactose; D-form, 6',6-Dichloro-6',6-dideoxyhexabenxoyl-sucrose, 1,2,2',3,3',4',6'-Hepta-O-acetyl-6-deoxy-6-iodo-D-lactose, Methyl 4-O-benzoyl-6-bromo-6-deoxy-galactopyranoside; α-D-form, Methyl 4-O-benzoyl-6-bromo-6-deoxy-galactopyranoside; β-D-form, Methyl 4-O-benzoyl-6-bromo-6-deoxy-glucopyranoside, Methyl 4-O-benzoyl-6-bromo-6-deoxy-glucopyranoside; β-D-form, Methyl 6-bromo-6-deoxy-α-D-galacto-pyranoside, Methyl 6-bromo-6-deoxy-α-D-gluco-pyranoside, Methyl 6-bromo-6-deoxy-β-D-gluco-pyranoside, Methyl 6-bromo-6-deoxy-3,4-O-iso-propylidene-α-D-galactopyranoside, Methyl 6-bromo-6-deoxy-3,4-O-isopropylidene-β-D-galactopyranoside, Methyl 6-deoxy-6-fluoro-α-D-glucopyranoside, Methyl 3,4-di-O-acetyl-6-bromo-6-deoxy-3-O-mesyl-α-D-glucopyranoside, Methyl 4,6-dichloro-4,6-dideoxy-α-D-galactopyranoside, Methyl 4,6-dichloro-4,6-dideoxy-α-D-glucopyranoside, Methyl 2,3,4-tri-O-acetyl-6-bromo-6-deoxy-α-D-galactopyranoside, Methyl 2,3,4-tri-O-acetyl-6-bromo-6-deoxy-β-D-galactopyranoside, Methyl 2,3,4-tri-O-acetyl-6-bromo-6-deoxy-α-D-glucopyranoside, Methyl 2,3,4-tri-O-acetyl-6-deoxy-6-fluoro-α-D-glucopyranoside, Methyl 2,3,4-tri-O-benzyl-6-bromo-6-deoxy-α-D-glucopyranoside, Methyl 2,3,4-tri-O-benzyl-6-bromo-6-deoxy-β-D-glucopyranoside, 1,2,3,4-Tetra-O-acetyl-6-bromo-6-deoxy-β-D-glucopyranoside, 1,2,3,4-Tetra-O-acetyl-6-deoxy-6-fluoro-α-D-glucopyranose, 1,2,3,4-Tetra-O-acetyl-6-deoxy-6-fluoro-β-D-glucopyranose, 2,3,4,6-Tetraamine-2,3,4,6-tetradeoxy-glucose; D-form, 2,3,4-Tri-O-acetyl-6-deoxy-6-fluoro-α-D-galactopyranosyl bromide, 2,3,4-Tri-O-acetyl-6-deoxy-6-fluoro-α-D-glucopyranosyl fluoride, 2,3,4-Tri-O-acetyl-6-deoxy-6-fluoro-β-D-glucopyranosyl fluoride, N-Acetyl-L-arabinosylamine, N-Acetyl-D-mannopyranosylamine, N-Acetyl-2,3,4,6-tetra-O-acetyl-α-D-galactopyranosylamine, N-Acetyl-2,3,4,6-tetra-O-acetyl-β-D-galactopyranosylamine, N-Acetyl-2,3,4-tri-O-acetyl-D-xylosamine, N-Acetyl-2,3,4-tri-O-acetyl-L-xylosamine, N-Acetyl-D-xylosamine, Arabinosylamine; L-form, N-Benzoyl-D-mannopyranosylamine, N-Benzyl-D-glucosylamine, N-Benzyl-D-mannopyranosylamine, 1-(2-Bromo-2-deoxy-3,4,6-tri-O-acetyl-β-D-glucopyranosyl)-4-methylpyridinium bromide, 2,3:5,6-Di-O-isopropylidene-N-phenyl-D-mannosylamine, Fructosylamine; D-form, N-Benzyl, Fructosylamine; D-form, N-Phenyl, Galactosylamine; D-form, 1-(α-D-Glucopyranosyl)pyridinium bromide, 1-(β-D-Glucopyranosyl)pyridinium bromide, Glucosylamine; D-form, Glucosylamine; α-D-Pyranose-form, N-Phenyl, 2,3,4,6-tetra-Ac1,2:3,4-Di-O-isopropylidene-α-D-erythro-2-, pentulose, 6-(1H-Indol-3-yl)-8-(2,3,4,5-tetrahydroxypentyl)-2-,4,7-(1H, 3H, 8H)-pteridinetrione, I-00009, Lyxosylamine; D-form, Lyxosylamine; D-form, N-(4-Nitrophenyl), in L-00059, Lyxosylamine; L-form, Mannosylamine; D-form, Mannosylamine; β-D-Pyranose-form, N-Methyl-L-rhamnopyranosylamine, N-Phenyl-D-arabinosylamine, N-Phenyl-L-arabinosylamine, N-Phenylα-D-galactopyranosylamine, N-Phenyl-β-D-galactopyranosylamine, N-Phenyl-α-D-glucosylamine, N-Phenyl-β-D-glucosylamine, N-Phenyl-L-rhamnopyranosylamine, Rhamnosylamine: L-Pyranose-form, D-Ribopyranosylamine, Ribosylamine; D-Pyranose-form, N-Ph, Sorbosylamine: L-form, Sorbosylamine; L-form, N-Benzyl, Sorbosylamine; L-form, N-Phenyl, 1-(2,3,4,6-Tetra-O-acetyl-α-D-glucopyranosyl)pyridinium bromide, 1-(2,3,4,6-Tetra-O-acetyl-β-D-alucopyranosyl) pyridinium bromide, 2,3,4,6-Tetra-O-acetyl-D-glucosylamine, 2,3,4,6-Tetra-O-acetyl-D-mannosylamine, 1-(2,3,4,6-Tetra-O-benzylglucopyranosyl)pyridinium(1+); β-D-form, Trigluoromethanesulfonat, 1',6',6'-Triamino-1',6',6'-trideoxysucrose, 1-(Xylopyranosyl)pyridinium(1+); α-D-form, Bromide, 1-(Xylopyranosyl)pyridinium(1+); β-D-form, Bromide, Xylosylamine; D-form, Xylosylamine; L-form, 2-Acetamido-3-O-(2-acetamido-2,3-dideoxy-5,6-O-isopropylidene-α-D-erythro-hex-2-enofuranosyl)-1,4-anhydro-2-deoxy-5,6-O-isopropylidene-D-arabino-hex-1-enitol, 2-Acetamido-3-O-(2-acetamido-2,3-dideoxy-5,6-O-isopropylidene-β-D-erythro-hex-2-enofuranosyl)-1,4-anhydro-2-deoxy-5,6-O-isopropylidene-D-arabino-hex-1-enitol, 2-Acetamido-1-O-acetyl-2-deoxy-α-D-glucopyranose, 2-Acetamido-1-O-acetyl-2-deoxy-3,4,6-tri-O-benzyl-α-D-glucopyranose, 2-Acetamido-1-O-acetyl-2-deoxy-3,4,6-tri-O-benzyl-β-D-glucopyranose, 4-Acetamido-2-amino-2,4,6-trideoxy-D-glucose, 2-Acetamido-1,4-anhydro-2-deoxy-5,6-O-isopropylidene-arabino-hex-1-enitol; D-form, 2-Acetamido-4,6-O-benzylidene-2,3-deoxy-D-erythro-hex-2-enono-1,5-lactone, 2-Acetamido-2-deoxy-D-allose, 2-Acetamido-2-deoxy-D-arabinose, 2-Acetamido-2-deoxy-L-arabinose, 2-Acetamido-2-deoxy-1,3-di-O-acetyl-α-D-glucopyranose, 2-Acetamido-2-deoxy-1,3-di-O-acetyl-4,6-O-isopropylidene-α-D-glucopyranose, 2-Acetamido-2-deoxy-3,4-di-O-methyl-D-glucose, 2-Acetamido-2-deoxy-3,6-di-O-methyl-D-glucose, 2-Acetamido-2-deoxy-4,6-di-O-methyl-D-glucose, 2-Acetamido-2-deoxy-D-galactose, 2-Acetamido-2-deoxyglucose; D-form, 2-Acetamido-2-deoxyglucose; α-D-Pyranose-form, 2-Acetamido-2deoxyglucose; β-D-Pyranose-form, 2-Acetamido-2-deoxy-α-D-glucose 1-(dihydrogen phosphate), 2-Acetamido-2-deoxy-β-D-glucose 1-(dihydrogen phosphate), 2-Acetamido-2-deoxy-4,6-O-isopropylidene-D-glucopyranose, 2-Acetamido-2-deoxy-D-mannose, 2-Acetamido-2-deoxy-3-O-methylglucose; D-form, 2-Acetamido-2-deoxy-4-O-methylglucose; D-form, 2-Acetamido-2-deoxy-6-O-methylglucose; D-form, 2-Acetamido-2-deoxy-1,3,4,6-tetra-O-acetyl-α-D-galactopyranose, 2-Acetamido-2deoxy-1,3,4,6-tetra-O-acetyl-β-D-galactopyranose, 2-Acetamido-2-deoxy-1,3,4,6-tetra-O-acetyl-β-D-mannopyranose, 2-Acetamido-2-deoxy-1,3,4,6-tetra-O-acetyl-β-L-mannopyranose, 2-Acetamido-2-deoxy-3,4,6-tri-O-acetyl-α-D-glucopyranosyl bromide, 2-Acetamido-2-deoxy-3,4,6-tri-O-acetylglucopyranosyl chloride, 2-Acetamido-2-deoxy-3,4,6-tri-O-methyl-D-glucose, 2-Acetamido-2-deoxy-α-D-xylose, 2-Acetamido-2-deoxy-α-L-xylose, 2-Acetamido-2,6-dideoxy-D-galactose, 2-Acetamido-2,6-dideoxy-L-galactose, 2-Acetamido-2,6-dideoxy-D-glucose, 2-Acetamido-2,3-dideoxy-D-threo-hex-2-enono acid γ-lactone, 2-Acetamido-2,3-deoxy-D-erythro-hex-2-enonolactone, 2-Acetamido-2,3-dideoxy-D-erythro-hex-2-enono-1,4-lactone, 2-Acetamido-2,3-dideoxy-D-threo-hex-2-enono-1,5-lactone, 2-Acetamido-1,2-dideoxy-D-arabino-hex-1-enopyranose, 2-Acetamido-2,3-dieoxy-5,6-O-isopropylidene-D-erythro-hex-2-enonic acid γ-lactone, 2-Acetamido-2,3-dideoxy-5,6-O-isopropylidene-D-threo-hex-2-enonic acid γ-lactone, 2-Acetamido-2,3-dideoxy-4,6-O-isopropylidene-D-erythro-hex-2-enono 1,5-lactone, 2-Acetamido-2,3-dideoxy-4,6-O-isopropylidene-D-threo-hex-2 enono-1,5-lactone, 2-Acetamido-3,4,6-tri-O-acetyl-2-deoxy-α-D-galactopyranosyl chloride, Allyl 2-acetamido-2-deoxyglucopyranoside; α-D-form, Allyl 2-acetamido-2-deoxyglucopyranoside; β-D-form, 2-Amino-N-benzyloxycarbonyl-2-deoxy-D-glucopyranose, 2-Amino-5-O-carbamoyl-2-deoxy-L-xylonic acid, 2'-Amino-2'-deoxyadenosine, 2-Amino-2-deoxyallose; D-form, 2-Amino-2-deoxyaltrose; D-Pyranose-form, 2-Amino-2-deoxyaltruronic acid; L-form, 2-Amino-2-deoxyarabinose; D-form, 2-Amino-2-deoxyarabinose; L-form, 2-Amino-2-deoxy-4,6-di-O-methyl-D-glucose, 2-Amino-2-deoxygalactopyranosyl bromide; α-D-form, Tri-Ac, 2-Amino-2-deoxy-α-D-galactopyranosyl phosphate, 2-Amino-2-deoxygalacturonic acid; D-form, 9-(2-Amino-2-deoxyglucofuranosyl)adenine; α-D-form, 9-(2-Amino-2-deoxyglucofuranosyl)adenine; β-D-form, 2-Amino-2-deoxygluconic acid; D-form, 2-Amino-2-deoxygluconic acid; D-form, 2-Me, 2-Amino-2-deoxygluconic acid; D-form, 3,4,6-Tri-Me, 2-Amino-2-deoxygluconic acid; D-form, Me ester, 2-Amino-2-deoxygluconic acid; D-form, N-Benzoyl, Et ester, 2-Amino-2-deoxygluconic acid; D-form, N-Me, 2-Amino-2-deoxygluconic acid; D-form, N-Ac, 4,6-O-isopropylidene, 2-Amino-2-deoxygluconic acid; D-form, N-Ac, Me ester, 2-Amino-2-deoxygluconic acid; D-form, N-Ac, Me ester, 3,4,6-tribenzyl, 2-Amino-2-deoxygluconic acid; D-form, N-Ac, Me ester, 5,6-O-isopropylidene, 2-Amino-2-deoxygluconic acid; D-form, N-Ac, Me ester, 3,4.5,6-tetra-Ac, 2-Amino-2-deoxygluconic acid; D-form, N-Ac, 1,4-lactone, 2-Amino-2-deoxygluconic acid; D-form, N-Ac, 1,4-lactone, 5,6-O-isopropylidene, 2-Amino-2-deoxygluconic acid; D-form, N-Ac, 1,5-lactone, 2-Amino-2-deoxygluconic acid; D-form, N-Ac, 1,5-lactone, 3,4,6-tribenzyl, 2-Amino-2-deoxygluconic acid; D-form, N-Ac, 1,5-lactone, 3,4-di-Me, 2-Amino-2-deoxygluconic acid; D-form, N-Ac, 1,5-lactone, 4,5-O-isopropylidene, 2-Amino-2-deoxygluconic acid; D-form, N-Ac, 1,5-lactone, 4,6-O-benzylidene, 2-Amino-2-deoxyglucopyranosyl bromide; α-D-form, Tri-Ac, 2-Amino-2-deoxyglucopyranosyl phosphate; α-D-form, 2-Amino-2-deoxyglucose; D-form, N-Me, 2-Amino-2-deoxyglucose; α-D-Pyranose-form, 2-Amino-2-deoxyglucose; β-D-Pyranose-form, 2-Amino-2deoxyglucose; 1-(dihydrogen phosphate); D-Form, 2-Amino-2-deoxyglucose 3-(dihydrogen phosphate); D-form, 2-Amino-2-deoxyglucose 6-(dihydrogen phosphate); D-form, 2-Amino-2-deoxygluconic acid; D-form, 2-Amino-2-deoxygulose; D-form, 2-Amino-w-deoxygulose; L-form, 2-Amino-2-deoxyguluronic acid; L-form, 2-Amino-2-deoxyidose; D-form, 2-Amino-2-deoxyidose; L-form, 2-Amino-2-deoxylyxose; D-form, 2-Amino-2-deoxylyxose; L-form, 2-Amino-2deoxymannose; D-form, 2-Amino-2-deoxylyxose; L-form, 2-Amino-2-deoxymannose; L-form, 2-Amino-2-deoxymannuronic acid; D-form, 2-Amino-2-deoxy-3-O-methylglucose; D-form, 2-Amino-2-deoxy-4-O-methylglucose; D-form, 2-Amino-2-deoxy-6-O-methylglucose; D-form, 9-(2-Amino-2-deoxyribofuranosyl) adenine; α-D-form, 2-Amino-2-deoxyribose; D-form, 2-Amino-2-deoxyribose; L-form, 2-Amino-2-deoxytalose; D-form, 2-Amino-2-deoxy-1,3,4,6-tetra-O-acetyl-α-D-glucopyroanose, 2-Amino-2-deoxy-1,3,4,6-tetra-O-acetyl-β-D-glucopyroanose, 2-Amino-2-deoxy-3,4,5'-tri-O-benzoyl-α-D-galactopyranosyl bromide, 2-Amino-2-deoxy-D-xylonic acid, 2-Amino-2-deoxy-L-xylonic acid, 2-Amino-2-deoxyxylose; α-D-form, 2-Amino-2-deoxyxylose; α-L-form, 2-Amino-2,6-dideoxy galactose; D-form, 2-Amino-2,6,-dideoxygalactose; L-form, 2-Amino-2,6,-dideoxygalactose; DL-form, 2-Amino-2,6,-dideoxyglucose; D-form, 2-Amino-2,6,-dideoxyglucose; L-form, 2-Amino-2,6,-dideoxyglucose; L-form, N-Me, 2-Amino-2,3-dideoxy-ribo-hexopyranose; D-form, 2-Amino-2,6-dideoxymannose; D-form, 2-Amino-2,6-dideoxymannose; L-form, 2-Amino-2,6-dideoxytalose; D-form, 4-Aminophenyl 2-acetamido-2-deoxygalactopyranoside; α-D-form, 4-Aminophenyl 2-acetamido-2-deoxygalactopyranoside; β-D-form, 4-Aminophenyl 2-acetamido-2-deoxygalactopyranoside; β-D-form, 2-Amino-2,3,4,6-tetradeoxy-6-methylamino-D-ribo-heptose, in βP-00019, 2-Amino-3,4,5-trihydroxypentanoic acid; (2R,3R,4R)-form, 4, O-Isopropylidene, 2-Benzamido-2-deoxy-D-allose, 2-Benzamido-2-deoxyglucose; D-form, 2-Benzamido-2-deoxy-1,3,4,6-tetra-O-acetyl-α-D-glucopyranose, 2-Benzamido-3,4,6-tri-O-benzoyl-2-deoxy-α-D-glucopyranosyl bromide, Benzyl 2-acetamido-4,6-O-benzylidene-2-deoxy-α-D-glucopyranoside, Benzyl 2-acetamido-3-O-benzyl-4,6-O-isopropylidene-β-D-glucopyranoside, Benzyl 2-acetamido-2-deoxygalactopyranoside; α-D-form, Benzyl 2-acetamido-2-deoxy-4,6-O-isopropylidene-β-D-glucopyranoside, Benzyl 2-acetamido-3,6-di-O-benzyl-2-deoxyglucopyranoside; α-D-form, Benzyl 2-amino-4,6-O-benzylidene-2-deoxy-α-D-glucopyranoside-3-(dihydrogen phosphate), Benzyl 2-amino-2-deoxyglucopyranoside; α-D-form, Benzyl 2-amino-2-deoxyglucopyranoside; β-D-form, Benzyl 2-deoxy-2-phthalimido-β-D-glucopyranoside, Benzyl 2,4-diacetamido-2,4-dideoxy-α-D-galactopyranoside, Benzyl 2,3-diacetamido-2,3-dideoxy-α-D-glucopyranoside, Benzyl 2,4-diacetamido-2,4,6-trideoxy-α-D-glucopyranoside, Benzyl 2,4-diamino-2,4-dideoxy-α-D-glucopyranoside, Chondrosamine, Chondrosine, 2-Deoxy-2-(-hydroxytetradecanoylamino)glucose; (D,R) form, 2-Deoxy-2-(3-hydroxytetradecanoylamino)glucose; (D,S)-form, 2-Deoxy-2-phthalimidoglucose; β-D-pyranose form, 2-Deoxy-3,4,6-tri-O-acetyl-w-trifluoroacetamido-α-D-galactopyranosyl bromide, 2,4-Diacetamido-1,3-di-O-acetyl-2,4,6-trideoxy-D-glucopyranose, 2,6-Diacetamido-2,6-dideoxy-α-D-allopyranoside, 2,6-Diacetamido-2,6-dideoxy-α-D-galactopyranose, 2,3-Diacetamido-2,3-dideoxy-α-D-glucopyranose, 2,4-Diacetamido-2,4-dideoxy-D-glucose, 2,6-Diacetamido-2,6-dideoxy α-D-mannopyranose, 2,6-Diacetamido-2,3,4,6-tetradeoxy-D-erythro-hexose diethyl dithioacetal, 2,4-Diacetamido-2,4,6-trideoxy-D-galactose, 2,4-Diacetamido-2,4,6-trideoxy-D-glucose, 2,3-Diamino-2,3-dideoxyallose, 2,6-Diamino-2,6-dideoxyallose; α-D-Pyranose-form, 2,3-Diamino-2,3-dideoxygalactose; D-form, 2,4-Diamino-2,4-dideoxygalactose; D-form, 2,3-Diamino-2,3-dideoxyglucose; α-D-Pyranose-form, 2,3-Diamino-2,3-dideoxyglucose; β-D-Pyranose form, 2,4-Diamino-2,4-dideoxyglucose; D-form, 2,3-Diamino-2,3-dideoxyglucuronic acid; D-form, 2,6-Diamino-2,6-dideoxymannose; α-D-Pyranose-form, 2,6-Diamino-24,5,6-tetradeoxy-arabino-heptaric acid, 2,6-Diamino-2,4,5,6-tetradeoxy-lyxo-heptaric acid, 2,6-Diamino-2,4,5,6-tetradeoxy-ribo-heptaric acid, 2,6-Diamino-2,4,5,6-tetradeoxy-xylo-heptaric acid, 3,4-Di-O-methyl-D-glucosamine, 3,6-Di-O-methyl-D-glucosamine, 8-Ethoxycarbonyl 2-acetamido-2-deoxy-3-O-β-D-galactopyranosyl-β-D-glucopyranoside, 8-Ethoxycarbonyloctyl 2-acetamido-2-deoxyglucopyranoside; β-D-form, Ethyl 2,6-diacetamido-2,3,4,6-tetradeoxy-α-D-glycero-hex-4-enopyranoside, Ethyl 2,4-diacetamido-2,3,4,6-tetradeoxy-β-D-arabino-hexopyranoside, Ethyl 2,6-diacetamido-2,3,4,6-tetradeoxy-α-D-erythro-hexopyranoside, Ethyl 2,6-diacetamido-2,3,6-trideoxy-α-D-ribo-hexopyranoside, Ethyl β-D-glucosaminide, Hybrimycin $A_1$, Hybrimycin$C_2$, Kasuganobiosamine, Lacto-N-biose-I, Lansioside A, 2-(4-Methoxycarbonylbutanecarboxamido)ethyl 2-acetamido-2-deoxygalactopyranoside; α-D-form, [2-(4-Methoxycarbonylbutanecarboxamido)ethyl]-2-acetamido-2-deoxy-3-O-β-D-galactopyranosyl-α-D-galactopyranoside, 2-(4-Methoxycarbonylbutanecarboxamido)ethyl 2-acetamido-2-deoxygalactopyranoside; β-D-form, [2-(4-Methoxycarbonylbutanecarboxamido)ethyl]-2-acetamido-2-deoxy-3-O-β-D-galactopyranoside, 8-(Methoxycarbonyl)octyl 2-acetamido-4,6-O-benzylidene-2-deoxy-α-D-glucopyranoside, 8-(Methoxycarbonyl)octyl 2-acetamido-4,6-O-benzylidene-2-deoxy-β-D-glucopyranoside, 8-(Methoxycarbonyl)octyl 2-acetamido-2-deoxyglucopyranoside; α-D-form, 8-(Methoxycarbonyl)octyl 2-acetamido-2-deoxyglucopyranoside; β-D-form, Methyl 2-acetamido-4-O-acetyl-3,6-anhydro-2-deoxy-α-D-glucopyranoside, 2-Methyl-[2-acetamido-4-O-acetyl-6-O-benzyl-3-O-(2-butenyl)-1,2-dideoxy-α-D-glucopyrano]-[2,1-d]-2-oxazol Methyl 2-acetamido-3-O-acetyl-2-deoxy-4,6-O-isopropylidene-β-D-glucopyranoside, Methyl 2-acetamido-4,6-O-benzylidene-2-deoxy-α-D-allopyranoside, Methyl 2-acetamido-4,6-O-benzylidene-2-deoxy-α-D-altropyranoside, Methyl 2-acetamido-4,6-O-benzylidene-2-deoxy-α-D-ribo-hexopyranosid-3-ulose, Methyl 2-acetamido-4,6-O-benzylidene-2-deoxy-β-D-ribo-hexopyranosid-3-ulose, Methyl 2-acetamido-4,6-O- benzylidene-2-deoxy-3-O-mesyl-α-D-glucopyranoside, Methyl 2-acetamido-4,6-O-benzylidene-2-deoxy-3-O-methyl-α-D-glucopyranoside, Methyl 2-acetamido-4,6-O-benzylidene-2-deoxy-α-D-talopyranoside, Methyl 2-acetamido-4,6-O-benzylidene-2,3-dideoxy-α-D-ribohexopyranosie, Methyl 2-acetamido-2-deoxy-α-D-altropyranoside, Methyl 2-acetamido-2-deoxy-3,4-di-O-methyl-α-D-glucopyranosie, Methyl 2-acetamido-2-deoxy-3,6-di-O-methyl-α-D-glucopyranoside, Methyl 2-acetamido-2-deoxy-4,6-di-O-methyl-α-D-glucopyranoside, Methyl 2-acetamido-2-deoxy-4,6-di-O-methyl-β-D-glucopyranoside, Methyl 2-acetamido-2-deoxyglucopyranoside; Δ-D- form, Methyl 2-acetamido-2-deoxyglucopyranoside; β-D-form, Methyl 2-acetamido-2-deoxy-α-D-gulopyranoside, Methyl 2-acetamido-2-deoxy-6-O-mesyl-α-D-glucopyranoside, Methyl 2-acetamido-2-deoxy-3-O-methylglucopyranoside; α-D-form, Methyl 2-acetamido-2-deoxy-4-O-methylglucopyranoside; α-D-form, Methyl 2-acetamido-2-deoxy-6-O-methylglucopyranoside; α-D-form, Methyl 2-acetamido-2-deoxy-α-D-talopyranoside, Methyl 2-acetamido-2-deoxy-6-tosyl-α-D-altropyranoside, Methyl 2-acetamido-2-deoxy-6-tosyl-α-D-glucopyranoside, Methyl 2-acetamido-2-deoxy-3,4,6-tri-O-benzyl-β-D-glucopyranoside, Methyl 2-amino-4,6-O-benzylidene-2-deoxy-α-D-altropyranoside, Methyl 2-amino-4,6-O-benzylidene-2-deoxy-α-D-glucopyranoside, Methyl 2-amino-4,6-O-benzyldene-2-deoxy-α-D-idopyranoside, Methyl 2-amino-4,6-O-benzylidene-2-deoxy-β-D-idopyranoside, Methyl 2-amino-2-deoxy-β-D-altropyranoside, Methyl 2-amino-2-deoxyglucopyranoside; α-D-form, Methyl 2-amino-2-deoxyglucopyranoside; β-D-form, Methyl 2-amino-2-deoxy-α-D-lyxofuranoside, Methyl 2-amino-2-deoxy-β-D-ribopyranoside, Methyl 2-amino-2-deoxy-β-L-riopyranoside, Methyl 2-amino-2-dideoxy-α-D-ribo-hexopyranoside, Methyl 3,6-anhydro-2-acetamido-2-deoxy-α-D-glucopyranoside, Methyl 2-benzamido-4,6-O-benzylidene-2-deoxy-α-D-allopyranoside, Methyl 2-benzamido-4,6-O-benzylidene-2-deoxy-α-D-glucopyranoside, Methyl 2-benzamido-4,6-O-benzylidene-2-deoxy-α-ribo hexopyranosid-3-ulose, Methyl 2-benzamido-4,6-O-benzylidene-2-deoxy-3-O-tosyl-α-D-glucopyranoside, Methyl 2-benzamido-2-deoxy-4,6-di-O-tosyl-α-D-glucopyranoside, Methyl 2-benzamido-2-deoxyglucoyranoside; α-D-form, Methyl 2-benzamido-2-deoxy-3,4,6-tri-O-acetyl-α-D-glucopyranoside, Methyl 2-benzamido-2,3-dideoxy-β-D-ribo-hexopyranoside, Methyl 2-deoxy-2-phthalimido-1-thio-3,4,6-tri-O-acetyl-β-D-glucopyranoside, Methyl 2,6-diacetamido-2,3,4,6,7-pentadeoxy-α-DL-ribo-heptopyranoside, Methyl 2,4-diacetamido-2,3,4,6-tetradeoxy-α-D-arabino-hexopyranoside, Methyl 2,4-diacetamido-2,3,4,6-tetradeoxy-β-D-arabino-hexopyranoside, Methyl 2,6-diacetamido-2,3,6-trideoxy-α-D-ribo-hexofuanoside, Methyl 2,6-diacetamido-2,3,6-trideoxy-α-D-ribo hexopyranoside, Methyl 3,5-di-O-acetyl-2-benzamido-2-deoxy-α-D-xylofuranoside, Methyl 4,6-di-O-acetyl-2,3-dibenzamido-2,3-dideoxy-β-D-galactopyranoside, Methyl 2,6-diamino-2,3,4,5-tetradeoxy-α-D-erythrohexopyranoside, Methyl 2,6-dibenzamido-2,6-dideoxy-α-D-allopyranoside, Methyl 2,3-dibenzamido-2,3-dideoxy-β-D-galactopyranoside, Methyl 4,6-dichloro-4,6-dideoxy-2,3-di-O-tosyl-α-D-galactopyranoside, Methyl 4,6-dichloro-4,6-dideoxy-2,3-di-O-tosyl-β-D-galactopyranoside, Methyl 4,6-dichloro-4,6-dideoxy-β-D-galactopyranoside, 2-Methyl-(3,4,6-tri-O-acetyl-1,2-dideoxyglucopyrano[2,1-d]-2-oxazoline; α-D-form, Metrizamide, Neosamine B, Neosamine C, Paromamine, Pneumosamine, Purpurosamine B, Streptobiosamine, 1,3,4,6-Tetra-O-acetyl-2-(N-acetylbenzamido)-2-deoxy-α-D-glucopyranose, 2-Trehalosamine, 3,4,6-Tri-O-acetyl-2-benzamido-2-deoxy-α-D-glucopyranosyl bromide, 3,4,6-Tri-O-acetyl-2-deoxy-2-phthalimido-β-D-glucopyranosyl bromide, O-(3,4,6-Tri-O-acetyl-2-deoxy-2-phthalimido-β-D-glucopyranosyl)trichloracetimidate, 2,3,5-Triamino-2,3,5-trideoxy-D-arabinono-1,4-lactone, 3,4,6-Tri-O-benzyl-D-glucosamine, 2,2,2-Trichloroethyl 2-acetamido-2-deoxy-3-O-β-D-galactopyranosyl-β-D-glucopyranoside, 2,2,2-Trichloroethyl 2-acetamido-2-deoxyglucopyranoside; β-D-form, 2,2,2-Trichloroethyl 2-doxxy-3,6di-O-benzyl-2-phthalimido-β-D-glucopyranoside, 3,4,6-Tri-O-methyl-d-glucosamine, 3-Acetamido-3-deoxy-1,2:5,6-di-O-isopropyolidene-α-D-allofuranose, 3-Acetamido-3-deoxy-β-D-glucopyranose, 3-Acetamido-3-deoxy-1,2-O-isopropylidene-β-D-allufuranose, 3-Acetamido-3-deoxy-1,2-O-isopropylidene-D-glucopyranose, 3-Acetamido-3,6-dideoxy-D-galactose, 3-Acetamido-3,6-dideoxy-D-talose, 3-Acetamido-1,2,5-tri-O-acetyl-3-deoxy-β-D-ribofuranose, 3-Acetamido-2,3,6-trideoxy-D-arabino-hexopyranose, 3-Acetamido-2,3,6-trideoxy-D-lyxo-hexose, Aclacinomycin A, Aclacinomycin B, Acosamine, Akalvine, 3-Amino-3-deoxyglucose; β-D-Pyranose-form, Me glycoside, N-Ac, 3-Amino-3-deoxy-1,2-O-isopropylidene-α-D-ribofuranose, 3-Amino-3-deoxyribose, 3-Amino-1,2:5,6-di-O-cyclohexylidene-3-deoxy-α-D-allofuranose, 3-Amino-3,6-dideoxyglucose, D-form, 3-Amino-3,6-dideoxyglucose; L-form, 3-Amino-3,6-dideoxytalose; D-form, 3-Amino-3,6-dideoxytalose; L-form, 3-Amino-2,3,6-trideoxy-arabino-hexose; D-Pyranose-form, Amphotericin B, Aneolamycin, 3-Benzamido-4-O-benzoyl-2,3,6-trideoxy-3-C-methyl-α-L-xylo-hexopyranose, 3-Benzamido-2,3,6-trideoxy-D-lyxo-hexose, 3-Benzamido-2,3,6-trideoxy-L-lyxo-hexose, Benzyl 2,3-diacetamido-2,3-dideoxy-α-D-glucopyranoside, Daunosamine; L-form, 3-Deoxy-1,2-O-isopropylidene-3-(N-methylacetamido)-β-L-arabinofuranose, 3-Deoxy-1,2-O-isopropylidene-3-(N-methylacetamido)-α-D-xylofuranose, 3-Deoxy-3-(N-methylacetamido)-L-arabinose, 3-Deoxy-3-methylaminoxylose; D-form, 10-Deoxymethymycin, Desosamine, 2,3-Diacetamido-2,3-dideoxy-α-D-glucopyranose, in D-00147, 2,3-Diaminto-2,3-dideoxyallose; D-form, 2,3-Diamino-2,3-dideoxygalactose; D-form, 2,3-Diamino-2,3-dideoxyglucose; α-D-Pyranose-form, 2,3-Diamino-2,3-dideoxyglucose; β-D-Pyranose-form, 3,6-Diamino-5-hydroxyhexanoic acid, 3,6-Dideoxy-3-dimethylaminoelucose; β-D-Pyranose-form, 3,6-Dideoxy-3-dimethylaminoglucose; β-L-Pyranose-form, 3-(Dimethylamino)-2,3,6-trideoxy-lyxo-hexapyranose; Δ-D-form, 3-(Dimethylamino)-2,3,6-trideoxy-arabino-hexose; D-form, Ethyl 3-benzamido-3-C-methyl-2,3,6-trideoxy-α-L-lyxo-hexopyranoside, Ethyl 3,4,6-trideoxy-3-dimethylamino-α-D-xylo-hexopyranoside, Ethyl 3,4,6-trideoxy-3-dimethylamino-β-D-xylo-hexopyranoside, Garosamine; L-form, Hedamycin, Isorhodomycin A, Kanosamine, Methyl 3-acetamido-2-O-acetyl-3,6-dideoxy-β-D-galactopyranoside, Methyl 3-acetamido-4-O-acetyl-3,6-dideoxy-β-D-galactopyranoside, Methyl 3-acetamido-4,6-O-benzylidene-3-deoxy-α-D-glucopyranoside, Methyl 3-acetamido-2,5-di-O-acetyl-3-deoxy-β-D-ribofuranose, Methyl 3-acetamido-2,5-di-O-acetyl-3-deoxy-α-D-ribofuranoside, Methyl 3-acetamido-2,4-di-O-acetyl-3-deoxy-α-D-ribopyranoside, Methyl 3-acetamido-2,4-di-O-acetyl-3,6-dideoxy-β-D-galactopyranoside, Methyl 3-acetamido-3,6-dideoxy-β-D-galactopyranoside, Methyl 3-acetamido-3,6-dideoxy-β-L-glucopyranoside, Methyl 3-acetamido-3,6-dideoxy-β-L-glucopyranoside, Methyl 3-acetamido-3,6-dideoxy-β-L-mannopyranoside, Methyl 3-acetamido-3,6-dideoxy-α-D-talopyranoside, Methyl 3-acetamido-3,6-dideoxy-α-L-talopyranoside, Methyl 3-acetamido-2,3,6-trideoxy-α-D-arabino-hexopyranoside, Methyl 3-acetamido-2,3,6-trideoxy-β-D-arabino-hexopyranoside, Methyl 3-acetylamino-3-deoxy-2,4,6-tri-O-acetyl-α-D-glucopyranoside, Methyl 3-amino-4,6-O-benzylidene-3-deoxy-α-D-glucopyranoside, Methyl 3-amino-3-deoxy-β-D-glucopyranoside, Methyl 3-amino-3-deoxy-β-D-ribofuranose, Methyl 3-amino-3,6-dideoxy-β-D-galactopyranoside, Methyl 3-amino-3,6-dideoxy-α-L-galactopyranoside, Methyl 3-amino-3,6-dideoxy-α-D-glucopyranoside, Methyl 3-amino-3,6-dideoxy-α-L-glucopyranoside, Methyl 3-amino-3,6-dideoxy-β-L-glucopyranoside, Methyl 3-amino-3,6-dideoxy-α-D-mannopyranoside, Methyl 3-amino-3-C-methyl-2,3,6-trideoxy-α-L-lyxo-hexopyranoside, Methyl 3-amino-2,3,6-trideoxy-α-L-lyxo-hexoside, Methyl 3-amino-2,3,6-trideoxy-3-C-methyl-α-L-xylo-hexopyranoside, Methyl 3-benzamido-4-O-benzoyl-2,3,6-trideoxy-3-C-methyl-α-L-xylo-hexopyranoside, Methyl 3-benzamido-4-O-benzoyl-2,3,6-trideoxy-3-C-methyl-β-L-xylo-hexopyranoside, Methyl 3-benzamido-2,3,6-trideoxy-3-C-methyl-α-L-xylo-hexopyranoside, Methyl 5-O-benzyl-3-deoxy-3-(methylamino)-α-D-xylofuranoside, Methyl 5-O-benzyl-3-deoxy-3-(methylamino)-β-D-xylofuranoside, Methyl 3-deoxy-2,5-di-O-benzyl-3-(N-methylacetamido)-α-D-xylofuranoside, Methyl 3-deoxy-3-methylamino-α-D-arabinofuranoside, Methyl 3-deoxy-3-methylamino-α-D-arabinopyranoside, Methyl 3-deoxy-3-(methylamino)-α-L-arbinopyranoside, Methyl 3-deoxy-3-(methylamino)-α-D-xylopyranoside, Methyl 3-deoxy-3-(methylamino)-β-D-xylopyranoside, Methyl 3-deoxy-3-(methylamino)-β-L-xylopyranoside, Methyl 3-deoxy-4-C-methyl-3-(N-methylacetamido)-β-L-arabinopyranoside, Methyl 4,6-di-O-acetyl-2,3-dibenzamido-2,3-dideoxy-β-D-galactopyranoside, Methyl 2,3-dibenzamido-2,3-dideoxy-β-D-galactopyranoside, Methyl 3,6-dideoxy-3-dimethylamino-α-D-glucopyranoside, Methyl 3,6-dideoxy-3-dimethylamino-α-L-glucopyranoside, Methyl 3-(dimethylamino)-2,3,6-trideoxy-β-D-arabino-hexapyranoside, Methyl 3-(dimethylamino)-2,3,6-trideoxy-α-D-arabino-hexopyranoside, Methyl 3-(dimethylamino)-2,3,6-trieoxy-α-D-lyxo-hexopyranoside, Methyl (methyl 3-benzamido-2-O-benzoyl-3,4-dideoxy-α-D-xylo-hexopyranosid)uronate, Methyl (methyl 3-benzamido-2-O-benzoyl-3,4-dideoxy-β-D-xylo-hexopyranoside)uronate, Methyl 2,3,6-trideoxy-3-dimethylamino-α-L-ribo-hexopyranoside, Methyl 2,3,6-trideoxy-3-dimethylamino-β-L-ribo-hexopyranoside, Mycosamine, Rhodosamine, Ristosamine, 3-Trehalosamine, 2,3,5-Triamino-2,3,5-trideoxy-D-arabinono-1,4-lactone, 3,4,6-Trideoxy-3-dimethylamino-xylo-hexose; L-form, Vancosamine, 4-Acetamido-2-amino-2,4,6-trideoxy-D-glucose, 4-Acetamido-4-deoxy-D-galactose, Amicetamine, 4-Amino-4-deoxygalactose; D-form, 4-Amino-4-deoxyglucuronic acid; D-form, 4-Amino-4,6-dideoxygalactose; D-Pyranose-form, 4-Amino-4,6-dideoxymannose; D-form, 4-Amino-2,4,6-trideoxy-3-O-methyl-arabino-hexose; L-form, Benzyl 2,4-diacetamido-2,4-dideoxy-α-D-galactopyranoside, Benzyl 2,4-diacetamido-2,4,6-trideoxy-α-D-glucopyranoside, Benzyl 2,4-diamino-2,4-dideoxy-α-D-galactopyranoside, Benzyl 2,4-diamino-2,4-dideoxy-α-D-glucopyranoside, 2,4-Diacetamido-1,3-di-O-acetyl-2,4,6-trideoxy-D-glucopyranose, 2,4-Diacetamido-2,4-dideoxy-D-glucose, 2,4-Diacetamido-2,4,6-trideoxy-D-galactose, 2,4-Diacetamido-2,4,6-trideoxy-D-glucose, 2,4-Diamino-2,4-dideoxygalactose; 2,4-Diamino-2,4-dideoxyglucose; 4,6-Dideoxy-4-methylamino-α-D-glucopyranoside, 4,6-Dideoxy-3-C-methyl-4-(methylamino)mannose, D-form, 4-Dimethylamino-2,3,4,6-tetradeoxy-threo-hexose; D-form, Ethyl 2,4-diacetamido-2,3,4,6-tetradeoxy-β-D-arabino-hexopyranoside, Forosamine, wGougerotin, Kasuganobiosamine, Kijanose; D-form, Methyl 4-acetamido-4-deoxyerythrofuranoside; L-form, 2,3-Di-Ac, Methyl 4-acetamido-4-deoxy-α-D-galactopyranoside, Methyl 4-acetamido-3-O-methyl-2,4,6-trideoxy-β-D-ribo-hexopyranoside, Methyl 4-acetamido-2,4,5-trideoxy-3-O-methylα-L-arabino-hexopyranoside, Methyl 4-acetamido-2,4,6-trideoxy-3-O-methyl-β-L-arabino-hexopyranoside, Methyl 4-acetamido-2,4,6-trideoxy-3-O-methyl-α-D-ribo-hexopyranoside, Methyl 4-(acetamido)-2,4,6-trideoxy-3-O-methyl-α-D-xylo-hexopyranoside, Methyl 4-acetamido-2,4,6-trideoxy-3-O-methyl-β-D-xylo-hexopyranoside, Methyl 4-amino-4-deoxy-α-D-glucopyranosiduronic acid, Methyl 4-amino-4,6-dideoxy-α-D-galactopyranoside, Methyl 4-amino-4,6-dideoxy-α-D-glucopyranoside, Methyl 4-amino-4,6-dideoxy-α-D-mannopyranoside, Methyl 4-amino-4,6-dideoxy-α-L-mannopyranoside, Methyl 4-amino,2,3,5-trideoxy-α-D-erythro-hex-2-enopyranosiduronic acid, Methyl 4-amino-2,4,6-trideoxy-3-O-methyl-α-D-xylo-hexopyranoside, Methyl 2,4-diacetamido-2,3,4,7-tetradeoxy-α-D-arabino-hexopyranoside, Methyl 2,4-diacetamido-2,3,4,6-tetradeoxy-β-D-arabino-hexopyranoside, Methyl 4-(dimethylamino)-2,3,4,6-tetradeoxy-α-D-threo-hexopyranoside, Methyl α-sibrosaminide, Methyl β-sibrosaminide, Mitiphylline, 4-Trehalosamine, Viosamine, N-Acetylneuraminic acid, 6-O-(N-Acetyl-α-D-neuraminyl)-D-galactose, 5-Amino-5-deoxymannose, A-00130, 1,5-Dideoxy-1,5-imino-D-glucitol, 1,5-Dideoxy-1,5-(methylimino)-D-glucitol, N-Glycolylneuraminic acid, Neuraminic acid, Sialic acid, 2,3,5-Triamino-2,3,5-trideoxy-D-arabinono-1,4-lactone, 1,2,5-Trideoxy-4-O-(β-D-glucopyranosyl)-1,5-imino-D-arabino-hexitol, 6-Acetamido-6-deoxy-1,2,3,4-tetra-O-acetyl-α-D-glucopyranose, 6-Acetamido-6-deoxy-1,2,3,4-tetra-O-acetyl-β-D-glucopyranose, 6-Amino-6-deoxy-1,2,3,4-di-O-isopropylidene-α-D-galactopyranose, 6-Amino-6-deoxygalactose; D-form, 6-Amino-6-deoxyglucose; D-form, 2-Amino-2,3,4,6-tetradeoxy-6-methylamino-D-ribo-heptose, 6-(4-Azido-3,5-diiodobenzamido-2-hydroxy)-6-deoxygalactose; D-form; 6-Benzamido-6-deoxy-D-galactose; 2,6-Diacetamido-2,6-dideoxy-α-D-allopyranoside; 2,6-Diacetamido-2,6-dideoxy-α-D-galactopyranose; 2,6-Diacetamido-2,6-dideoxy-α-D-mannopyranose; 2,6-Diacetamido-2,3,4,5-tetradeoxy-D-erythro-hexose diethyl dithioacetal; 2,6-Diamino-2,6-dideoxyallose; α-D-Pyranose-form; 2,6-Diamino-2,6-dideoxygalactose; α-D-Pyranose-form; 2,6-Diamino-2,6-dideoxymannose; α-D-Pyranose-form; 6',6-Diamino-6',6-dideoxysucrose; 3,6-Diamino-5-hydroxyhexanoic acid; 2,6-Diamino-2,4,5,6-tetradeoxy-arabino-heptaric acid; 2,6-Diamino-2,4,5,6-tetradeoxy-lyxo-heptaric acid; 2,6-Diamino-2,4,5,6-tetradeoxy-ribo-heptaric acid; 2,6-Diamino-2,4,5,6-tetradeoxy-xylo-heptaric acid; Ethyl 2,6-diacetamido-2,3,4,6-tetradeoxy-α-D-flycero-hex-4-enopyranoside; Ethyl 2,6-diacetamido-2,3,4,6-tetradeoxy-α-D-erythro-hexapyranoside; Ethyl 2,6-diacetamido-2,3,6-trideoxy-α-D-ribo-hexapyranoside; w Gougerotin; Lincosamine; Di-Me dithioacetal; Methyl 6-amino-6,8-dideoxy-1-thio-D-erythro-α-D-galacto-octopyranoside; Methyl 2,6-diacetamido-2,3,4,6,7-pentadeoxy-α-DL-riboheptopyranoside; Methyl 2,6-diacetamido-2,3,6-trideoxy-α-D-ribo-hexofuranoside; Methyl 2,6-diacetamido-2,3,6-trideoxy-α-D-ribo-hexopyranoside; Methyl 2,6-diamino-2,3,4,6-tetradeoxy-α-D-erythro-hexopyranoside; Methyl 2,6-dibenzamido-2,6-dideoxy-α-D-allopyranoside; Neosamine B; Neosamine C; Purpurosamine B; 1',6',6-Triamino-1',6',6-trideoxysucrose; 1-Amino-1-deoxyglucitol; D-form; 2-Amino-2-deoxyglucitol; D-form, B,HCl; 1-Amino-1-deoxymannitol; D-form; 1-Amino-1-deoxyribitol; D-form; 1-Amino-1-deoxyribitol; L-form; Benzyl 2,4-diamino-2,4-dideoxy-α-D-galactopyranoside; 1-Deoxy-1-(methylamino)-D-glucitol; 1,4-Diacetamido-1,4-dideoxy-D-glucitol; 1,4-Diacetamido-2,3,5,6-tetra-O-acetyl-1,4-dideoxy-D-glucitol; 1,2-Diamino-1,2-dideoxyglucitol; D-form; 1,4-Diamino-1,4-dideoxyglucitol; D-form; 1,2-Diamino-1,2-dideoxymannitol; D-form; neo-Inositol; 1,4-Diamino-1,4-dideoxy; 1,5-Anhydro-2-azido-2-deoxy-D-ribo-hex-1-enitol; 1,6-Anhydro-2,4-diazido-2,4-dideoxy-β-D-glucopyranose; 2-Azido-5-O-benzoyl-3-O-(4-nitrobenzoyl)-α-D-arabinofuranosyl chloride; 2-Azido-2-deoxyglucopyranosyl bromide; α-D-form; 2-Azido-2-deoxyglucose; D-form; 2,4-Diazido-2,4-dideoxyglucose; D-form; Methyl 2-azido-4,6-O-benzylidene-2-deoxy-β-D-ribo-hexopyranosid-3-ulose; Methyl 2-azido-4,5-O-benzylidene-2,3-dideoxy-α-D-erythro-hex-2-enopyranoside; 4-Aminophenyl 1-thio-β-D-fucopyranoside, 4-Aminophenyl 1-thio-β-L-fucopyranoside, 4-Aminophenyl 1-thio-β-L-fucopyranoside, 4-Aminophenyl 1-thiogalactopyranoside; β-D-form, 4-Aminophenyl 1-thioglucopyranoside; β-D-form, 4-Aminophenyl 1-thiomannopyranoside; α-D-form, 4-Aminophenyl 1-thioxylopyranoside; β-D-form, Benzyl 1-thio-α-D-glucopyranoside, 1,6-Dithioglucose; D-form, Ethyl 2,3,4,6-tetra-O-acetyl-1-thio-α-D-mannopyranoside, Ethyl 1-thio-α-D-galactofuranoside, Ethyl 1-thio-β-D-galactopyranoside, Ethyl 1-thio-β-D-galactopyranoside, Ethyl 1-thio-α-D-glucofuranoside, Ethyl 1-thio-β-D-glucofuranoside, Ethyl 1-thio-α-D-glucopyranoside, Ethyl-1-thio-β-D-mannopyranoside, Ethyl 1-thio-β-D-ribofuranoside, β-D-Galactopyranosyl 1-thio-β-D-galactopyranoside, 1,2-O-Isopropylideneapiose; β-L-threo-form, 3'-Thio,3,3'-di-Ac, wLincomycin, Methyl 6-amino-6,8-dideoxy-1-thio-D-erythro-α-D-galacto-octopyranoside, Methyl 2-deoxy-2-phthalimido-1-thio-3,4,6-tri-O-acetyl-β-D-glucopyranoside, Methyl 1-thio-β-D-galactopyranoside, Methyl 6-thio-β-D-galactoseptanoside, Methyl 1-thio-α-D-glucopyranoside, Methyl 1-thio-β-D-glucopyranoside, Methyl 1-thio-β-D-xylopyranoside, 1,2,3,4,6-Penta-O-acetyl-6-thio-α-D-galactopyranose, 1,2,3,4,5-Penta-O-acetyl-6-thio-α-D-galactoseptanose, 1,2,3,4,5-Penta-O-acetyl-6-thio-β-D-galactoseptanose, Penta-O-acetyl-1-thio-β-D-glucopyranoside, Phenyl 2,3,4,6-tetra-O-acetyl-6-thio-α-D-galactopyranoside, Phenyl 2,3,4,6-tetra-O-acetyl-6-thio-β-D-galactopyranoside, Phenyl 1-thio-α-D-galactofuranoside, Phenyl 1-thio-α-D-glucofuranoside, Phenyl 1-thio-α-D-glucopyranoside, Pirlimycin, 1-Selenoglucose, w Sinigrin, 2,3,4,6-Tetra-O-acetyl-1-thio-β-D-glucopyranose, 1-Thioarabinose; L-form, 1-Thioglucose; D-form, 1-Thiomannose; β-D-Pyranose-form, 1-Thioribose; D-form, 1-Thioxylose; D-form, 2,3,4-Tri-O-acetyl-1,6-di-S-benzoyl-1,6-dithio-β-D-glucopyranose, 2-Acetamido-2-deoxy-5-thio-D-glucopyranose, 2-Amino-2-deoxy-5-thioglucose; α-D-Pyranose-form,N,1,3,4,6-Penta-Ac, 1,6-Anhydro-3-deoxy-4S-phenyl-4-thio-β-D-erythro-hexopyranos-2-ulose, 6-O-Benzoyl-D-glucose diethyldithioacetal, 6-Deoxy-5-thiotalose; L-Pyranose-form, 1,6-Dithioglucose; D-form, 5,6-O-Ethylidene-D-galactose diethyldithioacetal, Galactose diethyldithioacetal; D-form, Glucose diethyldithioacetal; D-form, Glucose diethyldithioacetal; D-form, 6-Benzoyl,2,3:4,5-di-O-isopropylidene, D-Glucothiapyranose, 1,2-O-Isopropylidenegalactopyranose; α-D-form, 4,6-O-Ethylidene,3-(methylthiomethyl), and Methyl 2,3,4-tri-O-acetyl-α-D-lyxopyranoside, Further stabilising agents include organic compounds selected from CRC Handbook of Physics & Chemistry (1972–73 Edition).

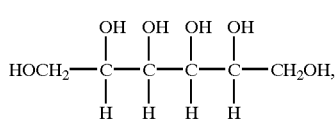

1

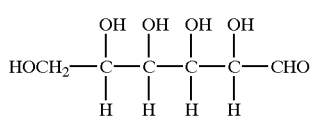

2

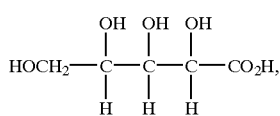

3

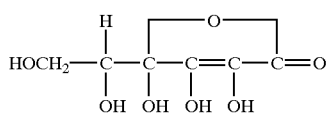

4

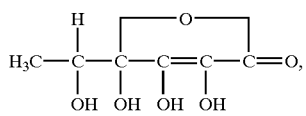

5

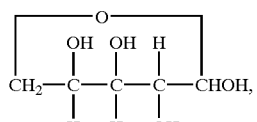

6

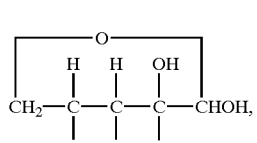

7

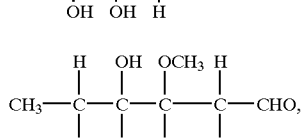

8

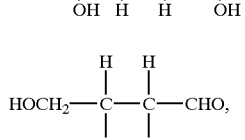

9

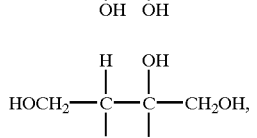

10

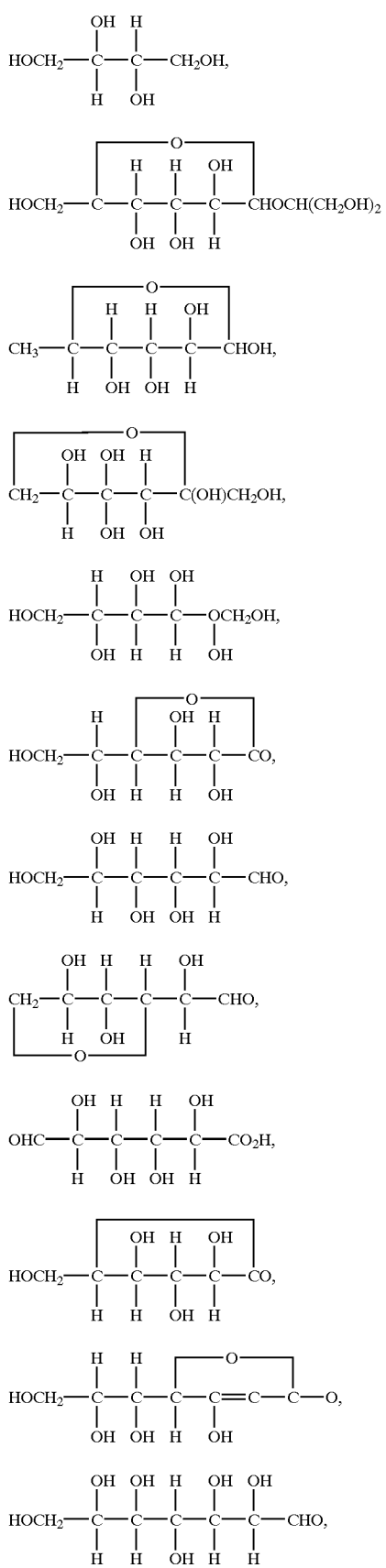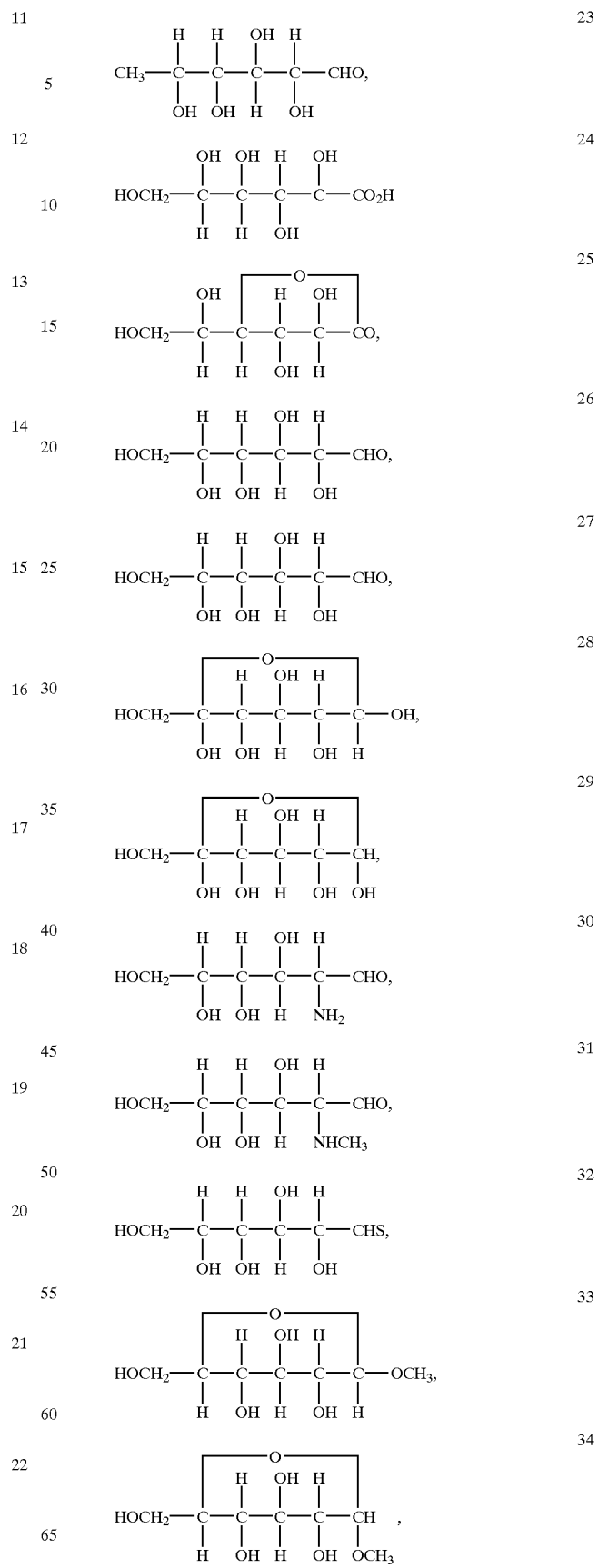

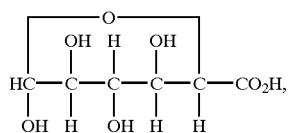
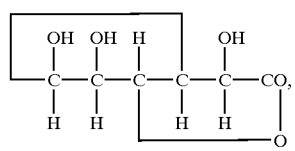
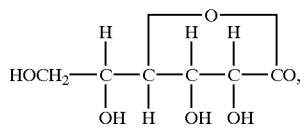
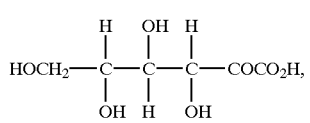
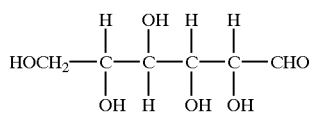
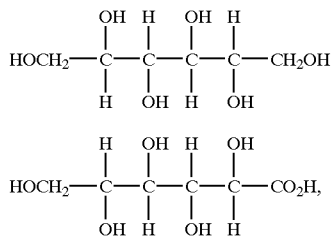
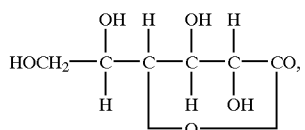
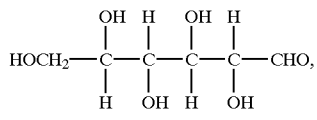
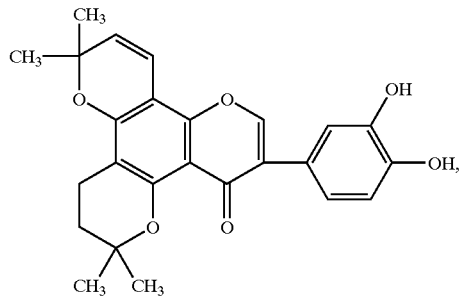
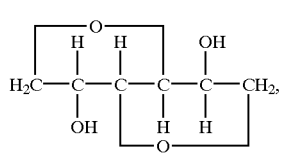
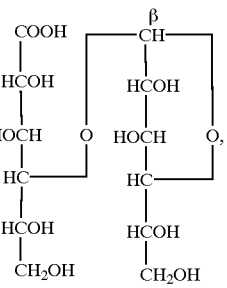
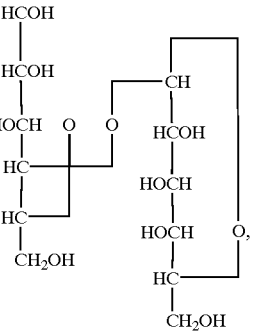
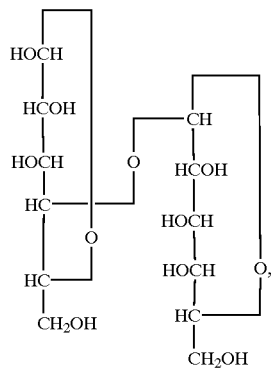
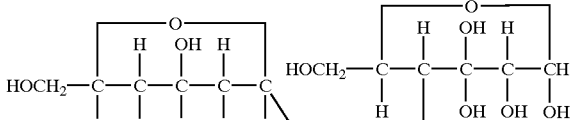
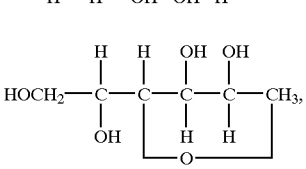
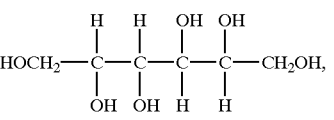
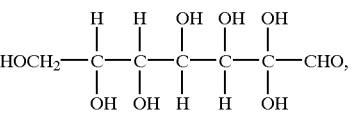

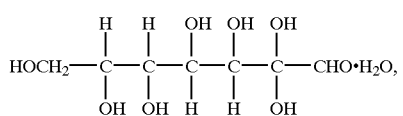
53
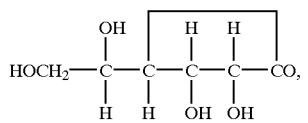
54
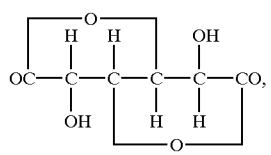
55
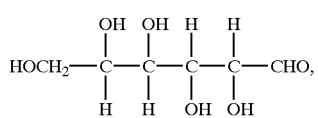
56
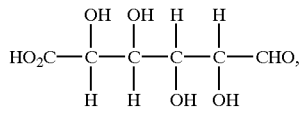
57
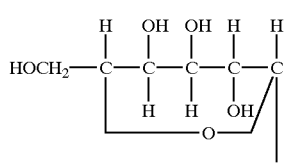
58
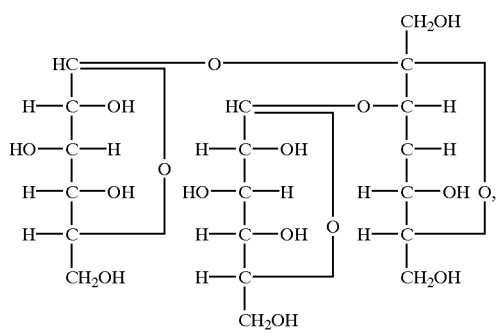
59
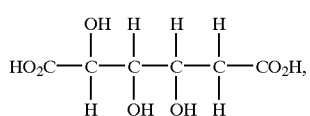
60
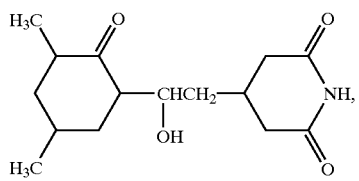
61
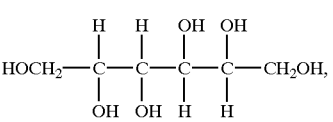
62
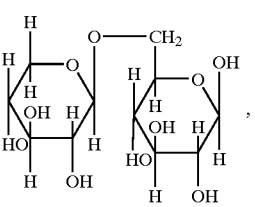
63
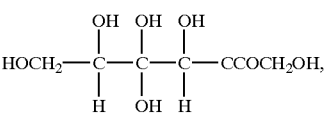
64
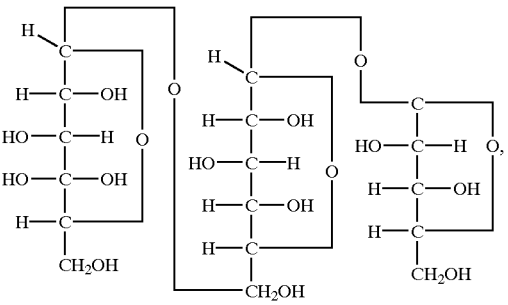
65
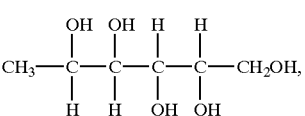
66
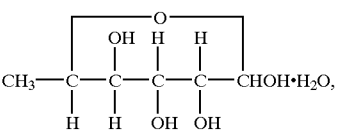
67
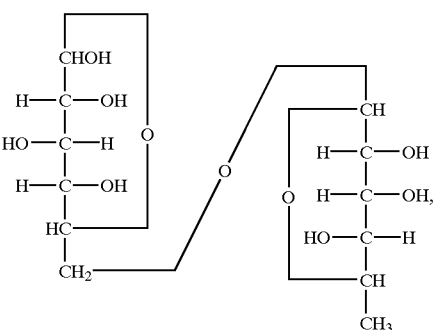
68
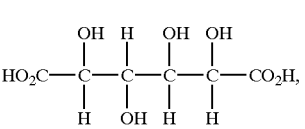
69

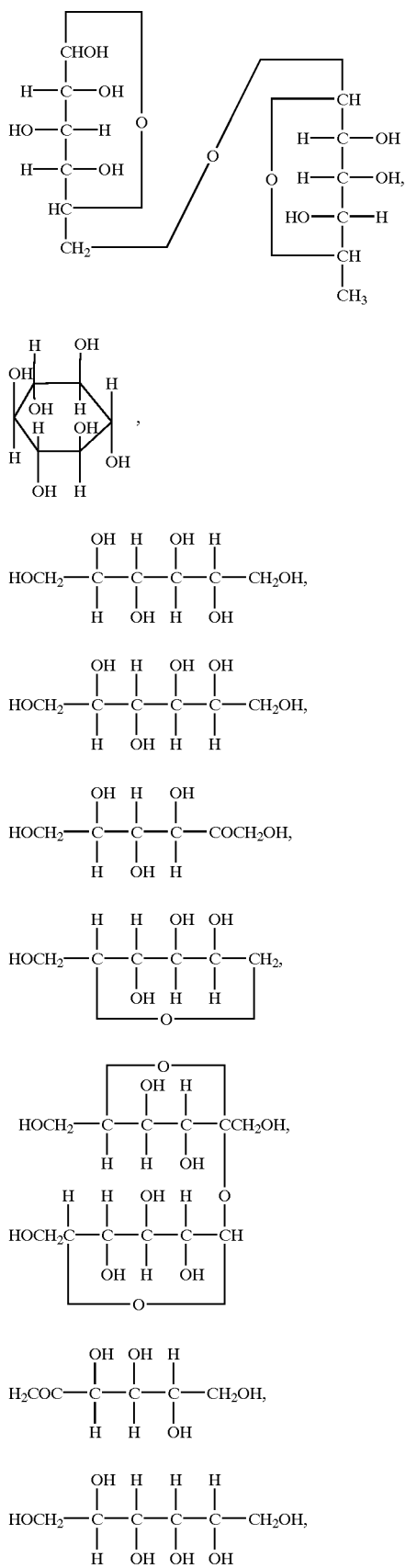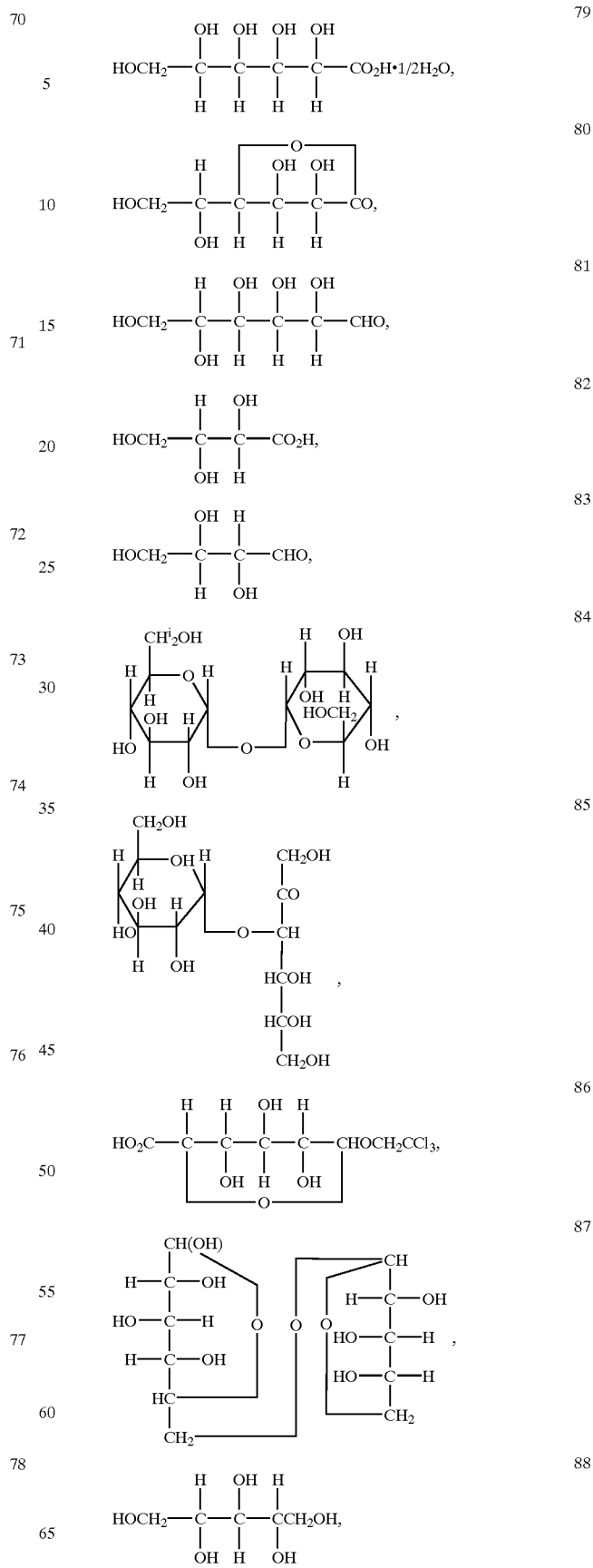

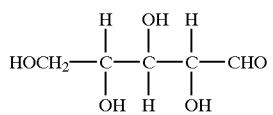

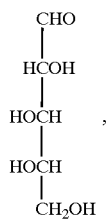,

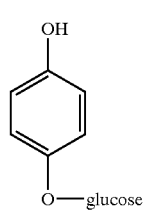,

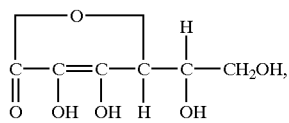,

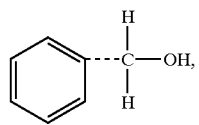,

HOCH₂CH₂OCH₂CH₂OH,

HOCH₂CH:CHCH₂OH,

CH₃(CH₂)₂CH₂OH, (C₄H₉OCO₂CH₂)₂O,

HOCH₂CH₂CH(OH)CH₃,

HOCH₂CH₂CH₂CH₂OH,

CH₃CH₂OCH₂OCH₃,

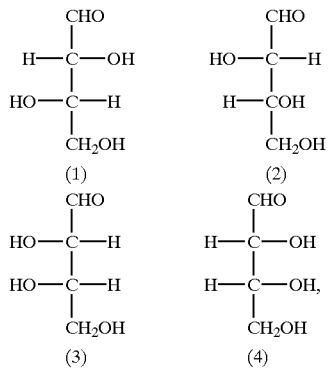

C₂H₅COC₂H₅,

C₂H₅OOCCH:CHCOOC₂H₅.

The stabilising agent may be a surfactant. The surfactant may be an anionic, cationic, amphoteric or nonionic surfactant. Mixtures of surfactants may be used but some surfactants are incompatible such as a mixture of anionic and cationic surfactants.

Examples of anionic surfactants are water-soluble soaps or water-soluble synthetic surface active compounds. Examples of the soaps are unsubstituted or substituted ammonium salts of higher fatty acids ($C_{10}$–$C_{22}$), such as the sodium or potassium salts of oleic acid or stearic acid or of natural fatty acid mixtures such as coconut oil or tallow oil, alkali metal salts, alkaline earth metal salts or fatty acid methyllaurin salts. Examples of synthetic surfactants are alkylarylsulphonates, sulphonated benzimidazole derivatives, fatty alcohol sulphates, or fatty alcohol sulphonates.

Examples of alkylarylsulphonates are the calcium, sodium or triethanolamine salts of dodecylbenzenesulphonic acid, dibutylnaphthalenesulphonic acid, of a condensate of naphthalenesulphonic acid and formaldehyde or the phosphate salt of the phosphoric acid ester of an adduct of p-nonylphenol with 4 to 14 moles of ethylene oxide, Examples of sulphonated benzimidazole derivatives are 2 sulphonic acid groups and one fatty acid radical containing approximately 8 to 22 carbon atoms. Examples of fatty alcohol sulphates or sulphonates are unsubstituted or substituted ammonium salts such as $C_8$–$C_{22}$ alknyl radical including the alkyl moiety of acyl radicals such as the calcium or sodium salt of lignosulphonic acid, of a mixture of fatty alcohol sulphates from naturally occurring fatty acids, of dodecylsulphate, alkali metal salts or alkaline earth metal salts or the salts of sulphated and sulphonated fatty alcohol/ethylene oxide adducts.

Examples of non-ionic surfactants are polyglycol ether derivatives of aliphatic or cycloaliphatic alcohols having approximately 3 to 30 glycol ether groups and approximately 8 to 20 carbon atoms in the (aliphatic) hydrocarbon moiety; saturated or unsaturated fatty acids and alkylphenols having approximately 6 to 18 carbon atoms in the alkyl moiety of the alkylphenols; water-soluble adducts of polyethylene oxide with ethylenediaminopolypropylene glycol, polypropylene glycol, or alkylpolypropylene glycol having approximately 1 to 10 carbon atoms in the alkyl chain, having approximately 20 to 250 ethylene glycol ether groups and approximately 10 to 100 propylene glycol ether groups in the usual ratio of 1 to 5 ethylene glycol moiety; propylene glycol moiety; fatty acid esters of polyoxyethylene sorbitan such as polyoxyethylene sorbitan trioleate; octylphenoxypolyethoxyethanol; polyethylene glycol; tributylphenoxypolyethyleneethanol; polypropylene/polyethylene oxide adducts; castor oil polyglycol ethers; nonylphenolpolyethoxyethanols.

Examples of cationic surfactants are quaternary ammonium salts in the form of halides, methylsulphates or ethylsulphates which have as N-substituent at least one $C_8$–$C_{22}$ alkyl radical or unsubstituted or halogenated lower alkyl or benzyl or hydroxy-lower alkyl radicals, such as stearyltrimethylammonium chloride or benzyldi(2-chloroethyl) ethylammonium bromide, Examples of amphoteric surfactants are the aminocarboxylic and aminosulphonic acids and salts thereof such as alkali metal 3-(dodecylamino)propionate and alkali metal 3-(dodecylamino)propane-1-sulphonate or alkyl and alkylamido betaines such as cocamidopropyl betaine.

Examples of surfactants which may be used in the combination are surfactants from the Teric® series such as N4 Teric, Teric BL8, Teric 16A16, Teric PE61, Alkanate 3SL3, N9 Teric, G9 A6 Teric or from the Rhodafac® series such as Rhodafac RA 600. Further examples are Calgon® (sodium hexametaphosphate), Borax® (sodium decahydrate borate), soap, sodium lauryl sulphate, or sodium cholate, Further examples of surfactants are described in "Encyclopedia of Chemical Technology", Kirk Othmer, 3rd edition, Volume 8, John Wiley & Sons 1982, "Handbook of Surfactants", M. R. Porter, Blackie (Glasgow and London), Chapman and Hall (USA) 1991, "Encyclopedia of Surfactants", compiled by Michael and Irene Ash, Volumes I–III, Chemical Publishing Co. 1980–1981, "Encyclopedia of Surfactants", compiled by Michael and Irene Ash. Volume IV, Chemical Publishing Co. 1985, "A Formulary of Detergents and Other Cleaning Agents", compiled by Michael and Irene Ash, Chemical Publishing Co. 1980, "Emulsifying Agents An Industrial Guide", Ernest W. Flick, Noyes Publications 1990, "What Every Chemical Technologist Wants To Know About . . . Volume IV Conditioners, Emollients and Lubricants", compiled by Michael and Irene Ash, Edward Arnold 1990, "McCutcheon's Detergents and Emulsifiers Annual", MC Publishing Corp., Glen Rock. N.J., USA, 1988 and "Tensid-Taschenbuch", H. Stache, 2nd edition, C. Hanser Verlag, Munich, Vienna, 1981, the contents of all of which are incorporated herein by cross reference. Typically more than one surfactant is used. Generally the amount of surfactant used in the combination is 0.5 to 99 wt %, preferably 20 to 90 wt %, more preferably 50 to 80 wt %, based on the total weight of the combination.

Generally the stabilising agent is a polyhydric alcohol, polyamine or polymercapto group containing chain or cyclic organic compound with 2 or more —OH, —NHz and/or SH groups or mixtures of these. Preferably these groups are in secondary or tertiary positions for improved stability to oxidation.

Generally, the stabilising agent is glycerine, a derivative of glycerine, oxalic acid or a salt of oxalic acid, such as ammonium oxalate, sodium oxalate, potassium oxalate, rubidium oxalate, caesium oxalate, magnesium oxalate, calcium oxalate or strontium oxalate, saccharide including L- and D-isomers and α and β forms, including acid-soluble, monosaccharides such as glucose, fructose, mannose, an aldose including aldomonose, aldodiose, aldotriose, aldotetrose, aldopentose, aldohexose, aldoheptose, aldooctose, aldononose, and aldodecose, a ketose including ketomonose, ketodiose, ketotriose, ketotetrose, ketopentose, ketohexose, ketoheptose, ketooctose, ketononose, and ketodecose, idose, galactose, allose, arabinose, gulose, fucose, glycose, glycosulose, erythrose, threose, ribose, xylose, lyxose, altrose, idose, talose, erythrulose, ribulose, mycarose, xylulose, psicose, sorbose, tagatose, glucuronic acid, glucaric acid, gluconic acid, glucuronic acid, glyceraldehyde, glucopyranose, glucofuranose, aldehydo-glucose, arabinofuranose, galacturonic acid, manuronic acid, glucosamine, galactosamine and neuraminic acid, disaccharides such as sucrose, maltose, cellobiose, lactose, and trehalose, acid-soluble, branched or unbranched or cyclic, homo- or hetero-oligosaccharides including di-, tri-, tetra-, penta-, hexa-, hepta-, octa-, nona- and deca-saccharides, cyclodextrin, cycloheptaamylose, cyclomaltoheptaose, and acid-soluble, branched or unbranched or cyclic, homo- or hetero-polysaccharides such as a small starch molecules, as well as homo or heteropolymers thereof, glycosides such as ethyl glucopyranoside, D-fructose, L-fructose, D-talose, L-talose, D-ribose, L-ribose, D-altrose, L-altrose, D-lyxose, L-lyxose, D-xlose, L-xlose, D-inositol, L-inositol, L-arabinose, L-sorbose, D-glucose, L-glucose, D-galactose, L-galactose, D-mannose, L-mannose, methyl β-D-xylopyranoside, methyl β-L-xylopyranoside, D-xylose, L-xylose, β-D-galactopyranoside, β-L-galactopyranoside, methyl α-D-mannopyranoside, methyl α-D-glucopyranoside, methyl α-L-glucopyranoside, 2-deoxy-D-ribose, methyl phenyl β-D-galactopyranoside, D-mannose, L-mannose, methyl β-D-arabinopyranoside, 2-deoxy-D-galactose, and 2-deoxy-D-glucose are specific examples of such saccharides. Stabilising agents may also be a polyhydric alcohol, such as —$CH_2$—CHOH—$H_2$OH, —$CH_2$—(CHOH)$_2$—$CH_2$OH, —$CH_2$—(CHOH)$_3$—$CH_2$—OH, —$CH_2$—(CHOH)$_4$—$CH_2$OH, or mannitol, sorbitol, glycidol, inositol, pentaerythritol, galacitol, adonitol, xylitol, alabitol, monosodium glutamate, ariflic acid, triethylenetetramine (TRIEN), D-penicillamine, D, L-penicillanine ascorbic acid, sodium citrate, potassium citrate, plus compound numbers 6, 7, 15, 16, 17, 19, 24, 35, 40, 43, 44, 50, 51, 52, 53, 54, 55, 56, 57, 58, 60, 62, 63, 66, 67, 68, 72, 73, 74, 75, 76, 77, 78, 79, 80, 81, 82, 83, 84, 85, 86, 87, 88, 89, or mixtures of 2 or more of above or the following compounds from CRC Handbook of Chemistry and Physics (1977–73 edition) (incorporated herein by cross reference) with nos. m120, p1881, r1, r27, r55, t25p, t255, m153, a778, a782, a790, a1391, a1394, c231, c737, d186, e82, e84, e147, e148, f39, f174, f175, f176, g5, g29, g30, g33, g34, g37, g38, g39, g41, g50, g52, g53, g54, g55, g56, g57, g214, g217, g218, 12, 13, I166, 14, 15, and 16.

Particularly desirable are adonitol, allitol, D-allose, L-allose, α-altrose, ammonium oxalate, D-arabinose (α and β forms), L-arabinose (α and β forms), D-arabitol, DL-arabitol, L-arabitol, D-arabonic acid, DL-arabonic acid, L-arabonic acid, 3 methyl D-fucose, d-epifucitol, 1-epifucitol, 1-epifucose, β-fructose (D-), fucose, α-fucose (L-), D-galactitol, galactonic acid, D-galactose, gluco-α-heptose, glucomethylose, gluconal, D-gluconic acid, sodium gluconate, potassium gluconate, ammonium gluconate, D-glucose, D-α-glucose, D-β-glucose, β-methyl-D-glucoside, gulose, glycerine, β-methyl-D-glucoside, D-glucuronic acid, iditol, L-idonic acid, idose-(D- and L-), inositol (allo-, cis-, D-, epi-, L-, muco-, myo-, neo-, scyllo-), D-mannitol, DL-mannitol, L-mannitol, D,α-mannoheptose, D,β-mannoheptose, D,β-mannoheptose monohydrate, mannonic acid (D and L), D-mannose, DL-mannose, DL-mannose, L-mannose, D,α-mannuronic acid, β-mannuronic acid (and Na, K and ammonium salts), mucic acid (and Na, K and ammonium salts), D-ribose, saccharic acid, scyllitol, sorbitol (D- and L-), sorbose (D-, DL- and L-), tagatose, talitol, talonic acid (and Na, K and ammonium salts), talose, xylitof, xylose, lactose, fructose, γ-lactone (and Na, K and ammonium salts), idonic acid (and Na, K and ammonium salts), ammonium gluconate, or mixtures of 2 or more of the foregoing.

More typically for vanadium ions, the stabilising agent is ammonium oxalate, glycerine, sodium gluconate, galactose, galactitol, γ-lactone (and Na and K salt), idose, idonic acid (and Na and K salt), iditol, mannose, mannitol, mannonic acid (and Na and K salt), sorbitol, inositol, fructose, fucose, triethylenetetramine, or mixtures of 2 or more of these. A mixture of inorganic and organic stabilising agents may be used.

The stabilising agent in the anolyte may be the same as the stabilising agent in the catholyte. Alternatively, the stabilising agent in the anolyte may be different from the stabilising agent in the catholyte.

The stabilising agent may be used in an amount ranging from 0.0001% to 40% or 0.01% to 20% wt/vol wt/vol (in the case of solids, for example) or wt/wt (i.e. wt of stabilising agent:wt of solution or wt of stabilising agent:wt of redox ions being stabilised) or vol/vol (i.e. vol of stabilising agent:vol of solution) or vol/wt (i.e. vol of stabilising agent:wt of solution or vol of stabilising agent:wt of redox ions being stabilised) in the case of stabilising agents that are liquids,) or mole/mole (i.e. mole of stabilising agent:mole of redox ions being stabilised) for example. Typically, the stabilising agent is used in an amount of from 0.05% to 20%, more typically 0.1% to 10%, even more typically 0.5% to 8%, and even more typically 0.5% to 7% wt/vol or wt/wt or vol/vol or vol/wt. A stabilising amount of stabilising agent is generally less than the amount required to completely chelate or complex all the redox ions or redox couple(s) present in solution. That is, typically the stabilising agent is present in an amount that is a molar fraction of the amount of stabilising that would be required to completely chelate or complex all the redox ions or redox couple(s) present in solution (e.g. <20% mole/mole of stabilising agent:redox ions or redox couple(s)). Even more typically, the stabilising agent is used in an amount of from 0.25% to 5%. Yet more typically, the stabilising agent is used in an amount of from 0.5% to 3%. An effective stabilising amount of a stabilising agent can be added to the vanadium containing electrolyte prior to, during or after the preparation of a vanadium redox electrolyte. The desired amount of stabilising agent for a given redox ion will be readily ascertained by a person skilled in the art without undue experimentation. Thus the stabilising agent is typically used in one of the following ranges: 0.01% to 20% wt/vol, 0.01% to 20% wt/wt, 0.01% to 20% vol/vol, 0.01% to 20% vol/wt, 0.01% to 20% mole/mole, 0.05% to 20% wt/vol, 0.05% to 20% wt/wt, 0.05% to 20% vol/vol, 0.05% to 20% vol/wt, 0.05% to 20% mole/mole, 0.1% to 10% wt/vol, 0.1% to 10% wt/wt, 0.1% to 10% vol/vol, 0.1% to 10% vol/wt, 0.1% to 10% mole/mole, 0.5% to 8% wt/vol, 0.5% to 8% wt/wt, 0.5% to 8% vol/vol, 0.5% to 8% vol/wt, 0.5% to 8% mole/mole, 0.5% to 5% wt/vol, 0.5% to 5% wt/wt, 0.5% to 5% vol/vol, 0.5% to 5% vol/wt, 0.5% to 5% mole/mole, 0.75% to 3% wt/vol, 0.75% to 3% wt/wt, 0.75% to 3% vol/vol, 0.75% to 3% vol/wt, 0.75% to 3% mole/mole, 1% to 2% wt/vol, 1% to 2% wt/wt, 1% to 2% vol/vol, 1% to 2% vol/wt or 1% to 2% mole/mole.

The cells and batteries of the invention may be constructed according to generally known methods for construction of redox cells.

The electrochemical reactions of the redox cell can be conducted in any electrochemical cell which has an anode compartment and a cathode compartment through which the appropriate fluids can be transported. A particular redox cell in which the stabilising agents may be used to particular advantage is an all-vanadium battery described in U.S. Pat. No. 4,786,567, the contents of which are incorporated herein by cross reference (but unexpecctedly and surprisingly with vanadium ion concentrations up to 10M).

The electrochemical cell is typically a cell of the "membrane-type", that is it employs a membrane rather than a diaphragm to separate a positive compartment from a negative compartment. The membrane employed is typically sheet-like and can transport electrolyte ions whilst at the same time being hydraulically-impermeable in contrast to a diaphragm (typically asbestos) which allows restricted electrolyte transfer between compartments. Thus the separator can be a microporous separator or a ionically conducting membrane fabricated from a polymer based on perfluorocarboxylic acids or a proton exchange polymer such as sulphonated polystyrene, sulphonated polyethylene or a substantially fluorinated sulphonic acid polymer such as Nafion (Trade Mark) or membranes of Flemion (Trade Mark), Selemion (Trade Mark) or New Selemion (Trade Mark) material as manufactured by Asahi Glass Company. Other suitable membranes are as disclosed in International Application No. PCT/AU92/00491, the contents of which are incorporated herein by cross reference).

Although the design of the anode and cathode compartments of the redox cell are not critical to the practice of this invention, certain embodiments are preferred. For example, a parallel plate electrochemical cell in which anode and cathode compartments alternate in order to increase voltage and decrease current is a preferred embodiment. The configuration of the cell may be such that there are intermediate bipolar electrodes between end plate electrodes. The electrode material will depend on the nature and composition of the anolytes and catholytes in the redox cell and are typically chosen on efficiency and stability grounds, i.e. the higher the efficiency and the greater stability in the particular anolyte and catholyte used in the redox battery, then generally the more it is favoured. Typical positive and negative electrodes may be metal, carbon/graphite, with suitable metals including transition metals such as titanium, iron, nickel, copper, silver, platinum, gold, palladium, tin, tantalum, cobalt, cadmium, lead, ruthenium oxide, and alloys and mixtures thereof. Suitable carbon/graphite electrodes include those described in International Patent Application No. PCT/AU93/00456 incorporated herein by cross reference, glassy (amorphous) carbons, reticulated vitreous carbons, pyrolytic carbons, carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; cellulose; carbon and graphite felt, mat, plate, rod, knit, fibre, and cloth, carbon impregnated teflon, carbon impregnated polyethylene, carbon impregnated polypropylene, carbon impregnated polystyrene, carbon impregnated polyvinylchloride and carbon impregnated polyvinylidenechloride, impregnated with and/or coated with Au, Pt, Ir, Ru, Os, Re, Rh and/or Ag; platinised Ti; platinised Ru; platinised Ir; platinised Pd; Pt; Pt black; dimensionally stabilized anode (DSA—Ti or Ti alloy core, coated at least partially with titanium dioxide which coating is coated or doped in turn with a noble metal coating selected from the group consisting of Pt, Pd, Os, Rh, Ru, Ir and alloys thereof); Au; Pd; Ir; Ru; Os; Re; Rh; Hg; Ag; Ti; Bi; Pb; In; Cd; Ga; Sb; Zn; Pb/Hg; Pb/Bi; Hg/In; Hg/Cd; or Hg/Ga or other suitable electrodes. Generally, carbon/graphite electrodes such as glassy (amorphous) carbons, reticulated vitreous carbons, pyrolytic carbons, carbon and graphite felt, mat, plate, rod, knit, fibre, and cloth; are bonded onto a conducting substrate such as carbon impregnated teflon, carbon impregnated polyethylene, carbon impregnated polypropylene, carbon impregnated polystyrene, carbon impregnated polyvinylchloride and carbon impregnated polyvinylidenechloride, etc. Thus for the positive electrode typical stable materials include graphite/carbon based electrodes, Dimensionally Stable Anodes i.e. metal oxides such as $TiO_2$, $RuO_2$, $Ir_2O3$, PtO, $MnO_2$ or mixtures of these coated onto a titanium substrate, Alternatively coatings of anion activated polypyrrole on conducting plastic where the conducting plastic can be graphite impregnated polyethylene/polypropylene or polyethylene/polypropylene impregnated with a mixture of 5–50% polypyrrole powder plus 5–20% graphite fibres or graphic felt/cloth/mat bonded onto a substrate of conducting plastic made of carbon black (10–50%), polyethylene or polypropylene (40–60%) and rubber (such as EPR) (10–40%). These conducting plastics can be used as substrates for coating polypyrrole electroactive films. For the negative reducing electrode typical cathode stable materials include raphite, carbon, graphite filled conducting plastics, Pb, Pt, Au, nickel, steel, etc or graphite felt/cloth/mat bonded onto a conducting plastic substrate made of carbon black, polyethylene or polypropylene and rubber.

The construction of the electrode will depend on the material type, with metal electrodes generally being in the form of plates, bars, and screens, or being sintered to form a highly porous structure. The positive and negative electrodes can be any shape desired. It is preferred that the positive and negative electrodes are rectangular-plate shaped. Metal electrodes may also be formed by depositing a film or layer of the metal on a nonconductive substrate, such as glass. The structure of carbon/graphite electrodes will depend upon the type of carbon. Glassy carbon electrodes are generally flat, polished surfaces while reticulated vitreous carbons are glass-like porous structures, typically pyrolyzed polyacrylonitriles. Pyrolytic carbons are produced by vapour phase deposition of carbon on a substrate, resulting in a polycrystalline structure with a high degree of atomic orientation. Preferred is the use of graphite, carbon/graphite or carbon felt electrodes which have been found to provide particularly effective catalytic sites after an oxidation pretreatment. The graphite, carbon/graphite or carbon felt electrodes are generally bonded onto a conducting carbon or graphite filled plastic electrode to form the final electrode configuration (see International Patent Application No. PCT/AU93/00456 incorporated herein by cross reference). Carbon felts are generally woven from yarns which are bundles of individual carbon monofilaments generally having a diameter in the range from about 1 to 50 $\mu$m. usually in the range from about 5 to 10 $\mu$m. The yarns will typically include from about 100 to 20,000 monofilaments, usually having from about 3,000 to 6,000 filaments. The denier of the yarns used as in fabricating the carbon felts will typically be in the range from about 500 to 5,000 mg/m, usually being in the range from about 1,000 to 2,000 mg/m. Denier is equal to the number of grams which yield 9,000 meters of the yarn or filament. The yarns are woven by conventional weaving machines yielding large fabrics which may be cut into the desired dimensions for the electrode. Each electrode may employ a plurality of layers of the fabric, so that the final dimensions of the electrode may vary widely. Generally, the electrodes will have a height in the range from about 0.5 cm to 2 meters. more typically, 5 to 1000 cm, a width in the range from about 0.1 cm to 2 meters, more typically, 5 to 1000 cm, and a thickness in the range from about 0.1 cm to 1.0 cm. The particular dimensions chosen will depend primarily on the power output of the electrochemical cell.

Carbon felts suitable for use in the present invention may be obtained commercially from suppliers such as FMI Fibre Materials, Inc., Biddleford, Me., Hercules, Inc., Wilmington, Del.; Celanese Engineering, Chatham, N.J.; Ultra Carbon Corp., Bay City, Mich.; and Union Carbide Corp., Mitsubishi, Japan, Toray, Japan, Kureha, Toyoba, Japan, Sigri, Germany, Specialty Polymers and Composites Division, Danbury, Conn.

The redox cell includes monopolar and bipolar type discharge cells charge cells or charge/discharge cells. A bipolar discharge cell typically includes a plurality of positive discharge compartments each having a positive discharge electrode therein and a plurality of negative discharge compartments each having a negative discharge electrode therein and wherein each of the compartments are separated by a membrane. A bipolar discharge cell is typically of the flat plate-or filter press-type.

For other methods of dissolving $V_2O_5$ and other vanadium salts are disclosed below. The methods described herein can be readily be modified to take advantage of the present invention by adding an effective stabilising amount of a stabilising agent to the vanadium containing electrolyte prior to, during or after the preparation of a vanadium redox electrolyte.

According to another embodiment of this invention there is provided a process for producing a stabilized vanadium electrolyte, up to and including supersaturated concentration, by dissolving and reducing a reducible vanadium compound disposed in, but not wholly dissolved in, an aqueous electrolyte containing a stabilizing amount of a stabilizing agent by utilizing an electrochemical cell which aqueous electrolyte is in electrical contact with a positive electrode and a negative electrodes to dissolve and reduce at least a part of the compound in the electrolyte.

According to a tenth embodiment of this invention there is provided a process for producing a stabilized vanadium electrolyte, up to and including supersaturated concentration, by dissolving and reducing a reducible vanadium compound disposed in, but not wholly dissolved in, an aqueous electrolyte containing a stabilizing amount of a stabilizing agent by utilizing an electrochemical cell having a positive compartment containing a catholyte in electrical contact with a positive electrode, a negative compartment containing an anolyte comprising an aqueous electrolyte in electrical contact with a negative electrode, and an ionically conducting separator disposed between the positive and negative compartments and in contact with the catholyte and the anolyte to provide ionic communication therebetween which process comprises adding the vanadium compound to the aqueous electrolyte or wherein the vanadium compound is predisposed in the aqueous electrolyte, and providing electrical energy from an external circuit to the positive and negative electrodes to dissolve and and reduce at least a part of the compound in the aqueous electrolyte.

The aqueous electrolyte can include vanadium (II) and/or vanadium (III) ions predisposed therein. The vanadium compound is thus reduced and dissolved by the V(II)/V(III) ions in the presence of a stabilizing amount of a stabilizing agent on addition to the aqueous solution and resultant V(V) ions can be reduced at the negative electrode to V(II)/V(III) ions, Generally up to and including supersaturated concentrations, or 0.1 to 15M, or 0.05 to 10M typically 0.25M to 5M V(II)/V(III) ions are included in the aqueous electrolyte. By V(II)/V(III) is meant V(II) ions alone or V(III) alone or a mixture of V(II) and V(III) ions.

According to a eleventh embodiment of this invention there is provided a process for producing a stabilized vanadium electrolyte, up to and including supersaturated concentration, by dissolving and reducing a reducible vanadium compound disposed in, but not wholly dissolved in, an aqueous electrolyte containing a stabilizing amount of a stabilizing agent which process comprises adding a chemical reductant to the electrolyte to dissolve and reduce the compound in the electrolyte.

According to a twelfth embodiment of this invention there is provided a process for producing a stabilized vanadium electrolyte, up to and including supersaturated concentration, by dissolving and reducing a reducible vanadium compound disposed in, but not wholly dissolved in, an aqueous electrolyte containing a stabilizing amount of a stabilizing agent by utilizing a chemical reductant and an electrochemical cell having the aqueous electrolyte in electrical contact with a positive electrode and a negative electrode which process comprises:

(a) adding a chemical reductant to the electrolyte to assist in dissolution and reduction of the compound in the electrolyte; and (b) providing electrical energy from an external circuit to the positive and negative electrodes to dissolve and reduce at least a part of the compound in the electrolyte.

According to a thirteenth embodiment of this invention there is provided a process for producing a stabilized vanadium electrolyte, up to and including supersaturated concentration. by dissolving and reducing a reducible vanadium compound disposed in, but not wholly dissolved in, an aqueous electrolyte containing a stabilizing amount of a stabilizing agent by utilizing a chemical reductant and an electrochemical cell having a positive compartment containing a catholyte in electrical contact with a positive electrode, a negative compartment containing an anolyte comprising the aqueous electrolyte in electrical contact with a negative electrode, and an ionically conducting separator disposed between the positive and negative compartments and in contact with the catholyte and the anolyte to provide ionic communication therebetween which process comprises:

(a) adding a chemical reductant to the anolyte to assist in dissolution and reduction of the compound in the anolyte; and (b) providing electrical energy from an external circuit to the positive and negative electrodes to dissolve and reduce at least a part of the compound in the electrolyte.

Aternative processes for the preparation of a stabilised vanadium electrolyte, optionally highly supersaturated with vanadium ions can be performed by adapting the processes described in AU85862/91, the contents of which are incorporated by cross reference, by adding a stabilizing agent to the electrolyte during or prior to the preparation of the vanadium electrolyte.

The chemical reductant can be a V(II), V(III) or V(IV) compound, which is soluble in the electrolyte or an aqueous solution containing V(II), V(III) and/or V(IV) ions, particularly an aqueous solution of $VOSO_4$.dihydrate, hydrated $(V_2(SO_4)_3)$ and/or $VSO_4.7H_2O$, in an amount sufficient to dissolve and reduce the, vanadium compound. It is particularly preferred that a V(II) or V(III) compound, or the the aqueous solution contains V(II) and/or V(III) ions.

The chemical reductant may also be $KHC_2O_4.H_2O$, $K_2C_2O_4$, $Na_2C_2O_4$, $(NH_4)_2C_2O_4NH_4HC_2O_4.H_2O$, $LiHC_2O_4.H_2O$, $NaHC_2O_4.H_2O$, $Li_2C_2O_4$, $SO_2$, $H_2C_2O_4$, $H_2SO_3$, $NaHSO_3$, $Na_2SO_3$, $Na_2S_2O_3$, $Na_2SO_4$, $Na_2S_2O_5$, $Na_2S_2O_6$, $Li_2SO_3$, $Li_2SO_6$, $KHSO_3$, $K_2SO_3$, $K_2S_2O_3$, $K_2S_2O_4$, $K_2S_2O_5$, $K_2S_2O_6$, $NH_4HSO_3$, $(NH_4)_2SO_3$, $(NH_4)_2SO_4$, $(NH_4)_2SO_5$, $N_2H_4$, $H_2N_2H_2.H_2O$, $H_2N_2H_2.H_2SO_4$, $(NH_4)_2SO_6$, $NaBH_4$, $LiBH_4$, $KBH_4$, $Be(BH_4)_2$, $D_2$, $T_2$, S, $H_2O_2$, hydrazine, sulphurous acid, hydrazine dihydrochloride, hydrogen peroxide, $CaH_2$, $MgH_2$, $H_2$ or calcium and magnesium salts of sulphurous acid, alkali-hydrogen-phosphites (Li, K, Na), alkali hypophosphites (Li, K, Na), hydroxyl amines, pyrosulphurous acid and dithioneous acid, Other chemical reductants can be used. For example, in principle it should possible to use a reducing organic water-soluble compound such as a reducing organic water-soluble mercapto group-containing compound including SH-containing water-soluble lower alcohols (including SH-containing $C_1$–$C_{12}$ primary, secondary and tertiary alkyl alcohols), SH-containing $C_1$–$C_{12}$ primary, secondary and tertiary alkyl carboxylic acids, SH-containing $C_1$–$C_{12}$ primary, secondary and tertiary alkyl amines and salts thereof, SH-containing $C_1$–$C_{12}$ primary, secondary and tertiary alkyl amine acids and dior tripeptides such as 2-mercaptoethylamine hydrochloride, 2-mercaptoethanol, 2-mercaptopropionylglycine, 2-mercaptopropionic acid, cystenylglycine, cysteine, carbamoyl cysteine, homocysteine, glutathione, cysteine hydrochloride ethyl ester and acetylcysteine, In principle it should also be possible to employ photocatalytic reduction and photoreduction at a semiconductor photocathode.

Reductants such as $(NH_4)_2C_2O_4NH_4HC_2O_4.H_2O$, $SO_2$, S, $H_2O_2$, $H_2C_2O_4$, $(NH_4)_2SO_3$, $(NH_4)_2SO_3$, $(NH_4)_2SO_4$, $(NH_4)_2SO_5$, $N_2H_4$, $H_2N_2H_2.H_2O$, $H_2N_2H_2.H_2SO_4$, $(NH_4)_2SO_6$, and $H_2$ are particularly advantageous as reductants since at least some of the reaction product is gaseous permitting higher concentrations of vanadium ions to be prepared and reducing further treatment of electrolyte to remove unwanted products.

The vanadium compound can be ammonium metavanadate ($NH_4VO_3$); ammonium vanadium sulphate ($NH_4V(SO_4)_2$); barium pyrovanadate ($Ba_2V_2O_7$); bismuth vanadate ($Bi_2O_3V_2O_5$); cesium vanadium sulphate ($VCs(SO_4)_2$ $12H_2O$); iron metavanadate ($Fe(VO_2)_3$); lead metavanadate ($Pb(VO_5)_2$); potassium metavanadate ($KVO_3$); potassium vanadium sulphate ($KVSO_4$); rubidium vanadium sulphate ($RbV(SO_4)_2$); sodium meta vanadate ($NaVO_3$); meta vanadic acid ($HVO_3$); sodium orthovanadate ($Na_3VO_4$); sodium pyrovanadate ($Na_4V_2O_7$); sodium hexavanadate ($Na_4V_6O_{17}$); thallium pyrovanadate ($Tl_4V_2O_7$); thallium metavanadate ($TlVO_3$); thallium pyrovanadate ($ThV_2O_7 6H_2O$); vanadium pentoxide ($V_{2O5}$); vanadium sulphate ($V(SO_4)_2$); $V_2O_3$, $V_2O_4$, $VO_2$, VO and calcium and magnesium vanadates including calcium metavanadate and magnesium metavanadate, Other vanadium salts and complexes can also be dissolved and reduced in an electrolyte by the processes of the invention. For example, in principle it should also be possible to produce highly supersaturated stabilized vanadium electrolytes containing stabilizing agents by disolving and reducing vanadium salts occurring in vanadium-bearing minerals such as patronite, bravoite, sulvanite, davidite, roscoelite, carnotite, vanadinite, descloizite, cuprodescloizite, vanadiferous phosphate rock and titaniferous magnetite using the processes of the invention as well as for recovering vanadium from spent catalysts and fly-ash.

Vanadium salts or complexes such as ammonium metavanadate ($NH_4VO_3$) and ammonium vanadium sulphate ($NH_4V(SO_4)_2$)$V_2O_5$, $V_2O_3$, $V_2O_4$, $VO_2$, are since they permit higher concentrations of vanadium ions to be prepared and reduce further treatment of electrolyte to remove unwanted products.

The electrolyte is typically an aqueous solution which includes $H_2SO_4$, trifluoromethanesulphonic acid, $Na_2SO_4$, $K_2SO_4$, $H_3PO_4$, $Na_3PO_4$, $K_3PO_4$, $HNO_3$, $KNO_3$, $NaNO_3$, $C_6$–$C_{14}$ arylsulphonic acid such as p-toluenesulphonic acid monohydrate, sulphamic acid, $C_1$–$C_6$ alkylsulphonic acid such as methylsulphonic acid and ethylsulphonic acid or acetic acid or mixtures thereof in a concentration of from 0.01M to 10M or 0.25M to 10M, more typically 1M to 10M, even more typically 2 to 9M, yet even more typically 3 to 8M, yet even more typically 4 to 7M, and yet even more typically 5 to 8M . . . It is especially preferred to use $H_2SO_4$ in a concentration of from 0.25M to 10M, more typically 1M to 10M, even more typically 2 to 9M, yet even more typically 3 to 8M, yet even more typically 4 to 7M, and yet even more typically 5 to 8M.

The processes of the invention are typically performed in the temperature range 1–99° C., or 5–60° C. more typically 15–40° C.

During the processes of the invention the electrolyte is typically stirred or agitated preferably with a mechanical stirrer or by fluidization of the solid reactants using electrolyte flow.

The processes of the invention are typically, but not necessarily, conducted under an inert atmosphere such as nitrogen, argon, helium or neon or mixtures thereof.

The positive and negative electrodes can be any shape desired. It is preferred that the positive and negative electrodes are rectangular-plate shaped although the positive electrode can be an expanded metal sheet to allow for zero gap from the membrane while facilitating escape of $O_2$ gas.

The positive and negative electrodes can be carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; cellulose; carbon and graphite felt, mat, plate, rod, knit, fibre, and cloth, carbon impregnated teflon, carbon impregnated polyethylene, carbon impregnated polypropylene, carbon impregnated polystyrene, carbon impregnated polyvinylchloride and carbon impregnated polyvinylidenechloride, impregnated with and/or coated with Au, Pt, Ir, Ru, Os; Re, Rh and/or Ag; platinised Ti; platinised Ru; platinised Ir; platinised Pd; Pt; Pt black; dimensionally stabilized anode (DSA—Ti or Ti alloy core, coated at least partially with titanium dioxide which coating is coated or doped in turn with a noble metal coating selected from the group consisting of Pt, Pd, Os, Rh, Ru, Ir and alloys thereof); Au; Pd; Ir; Ru; Os; Re; Rh; Hg; Ag; Tl; Bi; Pb; In; Cd; Ga; Sb; Zn; Pb/Hg; Pb/Bi; Hg/In; Hg/Cd; or Hg/Ga or other suitable electrodes.

In particular the positive electrode can be selected from the group consisting of DSA; Pb; Pb alloy (Eg Pb-Bi alloy); platinised Ti; platinised Ru; platinised Ir; and $V_2O_5$ coated on Pb, Ti, Zr, Hf, Ta, W or Nb which are also suitable materials for use as positive charge electrodes in an all-vanadium redox charge cell as has been disclosed in the PCT/AU88/00472, the contents of which are incorporated herein by cross reference. $V_2O_5$ coated electrodes would be unsuitable negative electrodes as they would dissolve. A DSA electrode performs well as a positive or negative electrode.

Preferably a DSA, Pb, $V_2O_5$ on Pb or graphite anode is used. It is preferred that a Pb or graphite cathode is used.

The electrochemical cell is typically a cell of the "membrane-type", that is it employs a membrane rather than a diaphragm to separate a positive compartment from a negative compartment. The membrane employed is typically sheet-like and can transport electrolyte ions whilst at the same time being hydraulically-impermeable in contrast to a diaphragm (typically asbestos) which allows restricted electrolyte transfer between compartments. Thus the ionically conducting separator can be a microporous separator or a membrane fabricated from a polymer based on perfluorocarboxylic acids or a proton exchange polymer such as sulphonated polystyrene, sulphonated polyethylene or a substantially fluorinated sulphonic acid polymer such as Nafion (Trade Mark) or membranes of Flemion (Trade Mark) or Selemion (Trade Mark) material as manufactured by Asahi Glass Company.

The electrochemical cell includes monopolar and bipolar type cells. A bipolar cell typically includes a plurality of positive compartments each having a positive electrode therein and a plurality of negative compartments each having a negative electrode therein and wherein each of the compartments are separated by a membrane. A bipolar cell is typically of the flat plate- or filter press-type.

By the processes of the invention stabilized electrolyte having vanadium ions in sufficient concentration in an aqueous electrolyte, up to and including supersaturated concentrations, or 0.1 to 15M or 0.25M to 10M, typically 1M to 10M, and more typically 1.5M to 8M which are suitable for use in a practical all-vanadium battery can be prepared in a single step process. Typically a stabilized aqueous electrolyte having vanadium ions 0.01M to 10M or 0.25M to 10M, more typically 1M to 10M, even more typically 2 to 9M, yet even more typically 3 to 8M, yet even more typically 4 to 7M, and yet even more typically 5 to 8M or 5 to 6M or 5 to 7M or 4 to 5M or 3 to 4M or 2 to 3M or 2 to 3.5M to 5.5M or 4.5 to 5.5M or 3.5 to 4.5M or 2.5 to 3.5M or 2.75 to 3.75M or 3.75 to 4.75M or 4.75 to 5.75M or 5.75 to 6.75M or 7.5 to 7.5M or 6.5 to 7.5M or 5 to 5.5M or 5.5 to 6.5M or 5.001 to 10M or 5.001 to 5.5M, or 5.001 to 6M or 5.001 to 6.5M or 5.001 to 7M or 5.001 to 8M or 5.001 to 9M, for example, vanadium ions (including V(II), V(III), V(IV), and V(V) ions) may be prepared. It is especially preferred to use $H_2SO_4$ in a concentration of from 0.25M to 10M, more typically 1M to 10M, even more typically 2 to 9M, yet even more typically 3 to SM, yet even more typically 4 to 7M, and yet even more typically 5 to 8M. By passage of the appropiate number of coulombs an electrolyte consisting of 50%M V(III) to 50%M V(IV) can be obtained. Equal volumes of this solution can then be used for each half-cell so that no overcharge of the positive side is required for the initial charging process.

If precipitation of the V(V) does eventually occur however, it can easily be redissolved and reduced by combining the V(II)IV(III) catholyte with the anolyte containing suspension and/or adding an additional stabilising amount of stabilising agent. This will result in a solution which is mixture of V(III) and V(IV) as in an uncharged battery which can readily be recharged and return battery to its original state. Occasional mixing of the catholyte and anolyte is beneficial as it assists in rebalancing the cell. Unequal rates of diffusion of the different ions of vanadium across a membrane gradually leads to a greater concentration of vanadium ions on one side, but by periodically mixing the catholyte and anolyte and equally dividing the volumes into the +ve and −ve tanks, a rebalanced cell can be readily achieved.

According to a fourteenth embodiment of this invention there is provided an all-vanadium redox charge cell having:

a negative charge compartment having a negative charge electrode for charging a charge anolyte in electrical contact with said negative charge electrode, the charge anolyte comprising an electrolyte containing trivalent and/or tetravalent vanadium ions up to and including supersaturated concentrations and optionally a stabilizing amount of a stabilizing agent;

a positive charge compartment having a positive charge electrode for charging a charge catholyte in electrical contact with said positive charge electrode, the charge catholyte comprising an electrolyte containing a stabilizing amount of a stabilizing agent and tetravalent vanadium ions up to and including supersaturated concentrations; and an ionically conducting charge separator disposed between the positive and negative charge compartments to provide ionic communication between the charge catholyte and the charge anolyte; and wherein the positive charge electrode is stable in the charge catholyte in the charge potential range during oxidisation of tetravalent vanadium ions to pentavalent vanadium ions at the positive charge electrode and the negative charge electrode is stable in the charge anolyte in the charge potential range during reduction of tetravalent and trivalent vanadium ions to divalent vanadium ions at the negative charge electrode.

The positive and negative charge electrodes can be any shape desired. It is preferred that the positive and negative charge electrodes are rectangular-plate shaped.

The positive and negative charge electrodes are chosen from electrode materials which are stable in the charge catholyte and charge anolyte respectively in the potential ranges in which the respective charge reactions occur.

The negative charge electrode has a higher hydrogen overvoltage than copper to minimise $H_2$ evolution during the charging reaction at the positive charge electrode. Low $H_2$ evolution during charging means low volume water loss from the cell electrolyte. low risk of $H_2$ explosion and high coulombic charging efficiency at the negative charge electrode. The negative charge electrode can be selected from the group consisting of TI; Bi; Pb; Hg: In; Cd; Ag; Ga; Sb; Zn; Pb/Hg; Pb/Bi; Hg/In; Hg/Cd; Hg/Ga; Hg/Ag: carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; and cellulose (most of the metallic materials could not be used to discharge the negative half-cell because they will corrode or passivate at the discharge potentials). In an all-vanadium redox charge cell in which the charge anolyte comprises up to and including supersaturated concentrations, or 0.01M–15M trivalent/tetravalent vanadium ions in 00.01M–18M, or 01M–10M $H_2SO_4$ and the charge catholyte comprises up to and including supersaturated concentrations, or 0.01M–15M pentavalent-tetravalent vanadium redox system in 0.01M–18M $H_2SO_4$, the open circuit potential of the negative charge cell is about −0.4V vs SHE. It is preferable to select the negative charge electrode from electrode materials which are stable to corrosion at the open circuit potential. Whilst some of the preceding negative charge electrode materials will dissolve/complex/corrode at open circuit (eg Cd and In) they can still be utilized but in such instances there is a need to continuously apply a suitable negative potential to such materials as they are bought into contact with the anolyte, so that the potential of the materials is more negative than −0.4V vs SHE, thus preventing the materials from corroding.

The inventor has found surprisingly that many materials are unsuitable for use as a positive charge electrode and they have also found unpredictably that a number of materials which are suitable for use as the positive charge electrode can be selected from the group consisting of DSA, platinised Ti; platinised Ru; platinised Ir; and $V_2O_5$ coated on Pb, Ti, Zr, Hf, Ta, W or Nb. The $V_2O_5$ coated electrodes would be unsuitable for the positive half-cell in a discharging battery as it would dissolve at the discharge potential range. A DSA electrode would perform well for both charging and discharging but it is an expensive electrode material and the lifetime of DSA electrodes is limited as has been found by cycling experiments.

The charge cell of the invention includes monopolar and bipolar type charge cells. A bipolar charge cell typically includes a plurality of positive charge compartments each having a positive charge electrode therein and a plurality of negative charge compartments each having a negative charge electrode therein and wherein each of the compartments are separated by a membrane. A bipolar charge cell is typically of the flat plate or containing filter press-type.

The charge cell can include a charge anolyte reservoir for storing charge anolyte operatively coupled to the negative charge compartment by charge anolyte supply and return lines via a pump and a charge catholyte reservoir for storing charge catholyte operatively coupled to the positive charge compartment by charge catholyte supply and return lines via a pump.

In an alternative arrangement the charge cell can include a charge anolyte charge reservoir having charge anolyte charge supply and return line or lines for charging further charge anolyte which is to be delivered to the negative charge compartment and a charge catholyte charge reservoir having charge catholyte charge supply and return line or lines for charging further charge catholyte which is to be delivered to the positive charge compartment an charge anolyte storage reservoir having charge anolyte storage supply and return line or lines for storing charge anolyte from the negative charge compartment and a charge catholyte storage reservoir having charge catholyte storage supply and return line or lines for storing charge catholyte from the positive charge compartment and pumping means operatively coupled to the charge anolyte storage line or lines and/or the charge anolyte charge line or lines and to the charge catholyte storage line or lines and/or the charge catholyte charge line or lines for pumping:

(i) the charge catholyte through the charge catholyte storage line or lines, the positive charge compartment and the charge catholyte charge line or lines; and (ii) the charge anolyte solution through the charge anolyte solution storage line or lines, the negative charge compartment and the charge anolyte solution charge line or lines.

According to a fifteenth embodiment of this invention there is provided a process for charging a charge anolyte and a charge catholyte of an all-vanadium redox charge cell having:

a negative charge compartment containing a charge anolyte and having a negative charge electrode for charging said charge anolyte in electrical contact with said negative charge electrode, the charge anolyte comprising an electrolyte containing a stabilizing amount of a stabilizing agent and trivalent and/or tetravalent vanadium ions up- to and including supersaturated concentrations;

a positive charge compartment containing a charge catholyte and having a positive charge electrode for charging said charge catholyte in electrical contact with said positive charge electrode, the charge catholyte comprising an electrolyte containing a stabilizing amount of a stabilizing agent and tetravalent vanadium ions up to and including supersaturated concentrations; and an ionically conducting charge separator disposed between the positive and negative charge compartments to provide ionic communication between the charge catholyte and the charge anolyte; and wherein the positive charge electrode is stable in the charge catholyte in the charge potential range during oxidisation of tetravalent vanadium ions to pentavalent vanadium ions at the positive charge electrode and the negative charge electrode is stable in the charge anolyte in the charge potential range during reduction of tetravalent and trivalent vanadium ions to divalent vanadium ions at the negative charge electrode;

which process comprises providing electrical energy to the positive and negative charge electrodes to derive stabilised divalent vanadium ions in the charge anolyte up to and including supersaturated concentrations, and stabilised pentavalent vanadium ions in the charge catholyte up to and including supersaturated concentrations.

A further embodiment of the invention involves an electrochemical apparatus for power delivery employing an array of cells comprising a positive electrode at one end of the array, a negative electrode at the other end of the array, and one or more bipolar electrodes between the end electrodes. A bubbly dispersion of air/oxygen in an electrolyte is pumped through the positive half cells of the array while a stabilized solution of V(II) or V(II)/V(III) is pumped through the negative half-cells to produce energy (and thus electricity) according to the reactions:

Positive electrode: 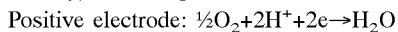
Negative electrode: 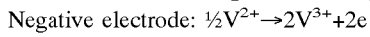

DESCRIPTION OF DRAWINGS

Preferred embodiments of the invention are described below with reference to the following drawings in which.

BEST MODE AND OTHER MODES OF CARRYING OUT THE INVENTION

Figure 1:
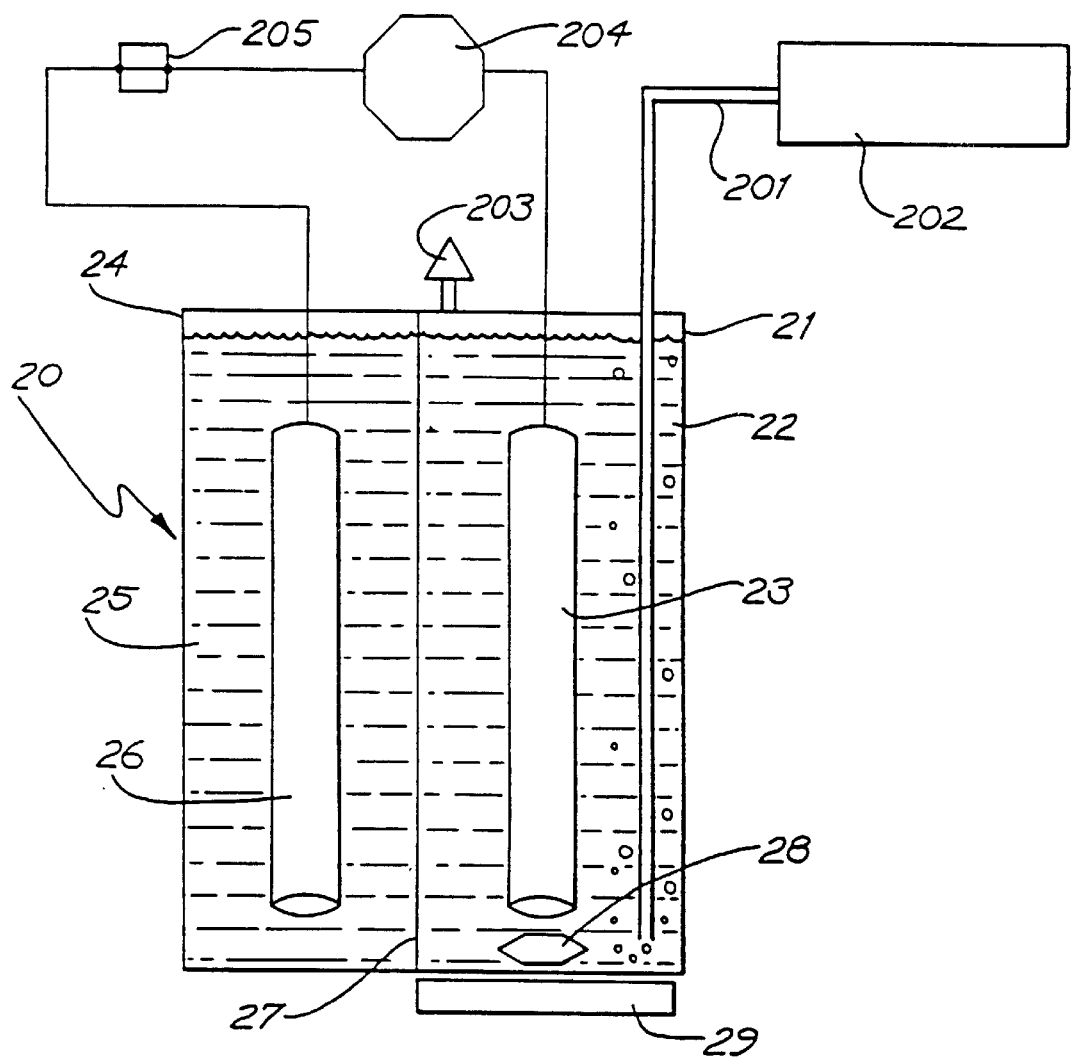
FIG. 1 depicts schematically an electrochemical cell having an ionically conducting separator for dissolving and reducing a reducible vanadium-containing salt or complex in the presence of a stabilising agent.

Referring to FIG. 1 an electrochemical cell 20 for dissolving and reducing a reducible vanadium-containing salt or complex has a positive compartment 24 containing a catholyte in electrical contact with positive electroded 26. Cell 20 has a negative compartment 21 containing an anolyte 22 in electrical contact with positive electrode 23. Positive electrode 26 is electrically coupled to a negative electrode 23 via electrical power source 204 and switch 205 which are connected in series. Power source 204 can be a dc battery capable of delivering of at least about 2.3 volts over and above resistant losses of cell 20. Ionically conducting separator 27 is disposed between positive and negative compartments 24 and 21 and is in contact with catholyte 25 and anolyte 22 to provide ionic commnunication therebetween. A preferred separator 27 is a Selemion or New Selmion or Flemion or Nafion membrane. Catholyte 25 is typically 1M to 6M $H_2SO_4$. Anolyte 22 is typically 1M to 6M $H_2SO_4$ and contains a reducible vanadium-containing salt or complex such as $V_2O_5$ in powder form. Anolyte 22 also contains a stabilising agent is used in an amount typically in the range of from 0.1 to 20 wt %, more typically 0.25% to 7.5 wt % (or vol %). Yet more typically, the stabilising agent is used in an amount of from 1% to 3 wt % or 1,5 to 5 wt %.

To dissolve and reduce the powdered $V_2O_5$, anolyte 22 is stirred by teflon coated magnetic stirrer bar 28 which is driven by magnetic stirrer 29 disposed below negative compartment 21. Nitrogen is bubbled through anolyte 22 via line 201 which delivers nitrogen from nitrogen gas cylinder 202 to which it is coupled. Nitrogen is vented from negative compartment 21 via vent 203. Switch 205 is closed so as to deliver 2.5 volts between negative and positive electrodes 23 and 26. The following reactions take place at negative electrode 23 or in positive compartment 21 as a consequence of reaction of ions formed by reactions which take place at negative electrode 23:

(a) $V(V)+3e^- \rightarrow V(II)$ (b) $V(V)+2e^- \rightarrow V(III)$ (c) $V(V)+e^- \rightarrow V(IV)$ (d) (i) $V(II)+V(IV) \rightarrow 2V(III)$
  (ii) $V(II)+\frac{1}{2}V_2O_5 \rightarrow V(II)/V(IV)$
  (iii) $V(III)+\frac{1}{2}V_2O_5 \rightarrow 2V(IV)$
  (iv) $V(IV)+\frac{1}{2}V_2O_5 \rightarrow V(V)$ (in solution)+V(IV)

From the above reactions the V(II), V(III) and V(IV) ions dissolved in anolyte 22 reduce the $V_2O_5$ powder and overall are reduced to the extent of forming dissolved V(III) and V(IV) ions, Powdered $V_2O_5$ which comes in direct contact with negative electrode 23 is directly reduced. Overall the reactions in the anolyte can be represented as:

Reducing Conditions

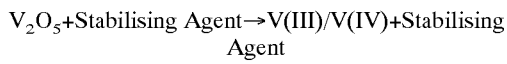

$V_2O_5$+Stabilising Agent→V(III)/V(IV)+Stabilising Agent

The addition of a stabilising agent as defined above to an aqueous solution of a vanadium salt can have a very substantial effect on the solubility of that salt. Thus, vanadium pentoxide is normally very slightly soluble in water (0.07 g/l). However, with the addition of as little as 0.5–3% by weight of stabilising agent (e.g. glycerine+ammonium oxalate) a 0.5M solution of vanadium ions in water can be prepared. Similarly, a 0.487M solution of vanadium pentoxide may be prepared in 3M $H_2SO_4$ by boiling and subsequently cooling. When 0.5–3% by weight of stabilising agent is added, a concentration of up to 3.5–5M vanadium ions is achievable (depending on the stabilising agent) by simple dissolution.

In an all vanadium redox cell tested by the inventors which did not include an effective stabilising amount of a stabilising agent, the V(III)/V(IV) electrolyte, prepared by the electrolytic dissolution of $V_2O_5$ powder, had a maximum concentration of vanadium of 2.46M, and is stable at room temperature. With the addition of 0.5–9%, more typically 2–3% by weight of stabilising agent (glycerine+ammonium oxalate based on the weight of vanadium pentoxide) a concentration of up to 4.21M $V_2O_5$ can be achieved. This solution is stable at room temperature for a period of at least several months. In the event that vanadium salts start precipitating from solution, further additions of stabilising agent can be made to the solution as required.

Figure 2:
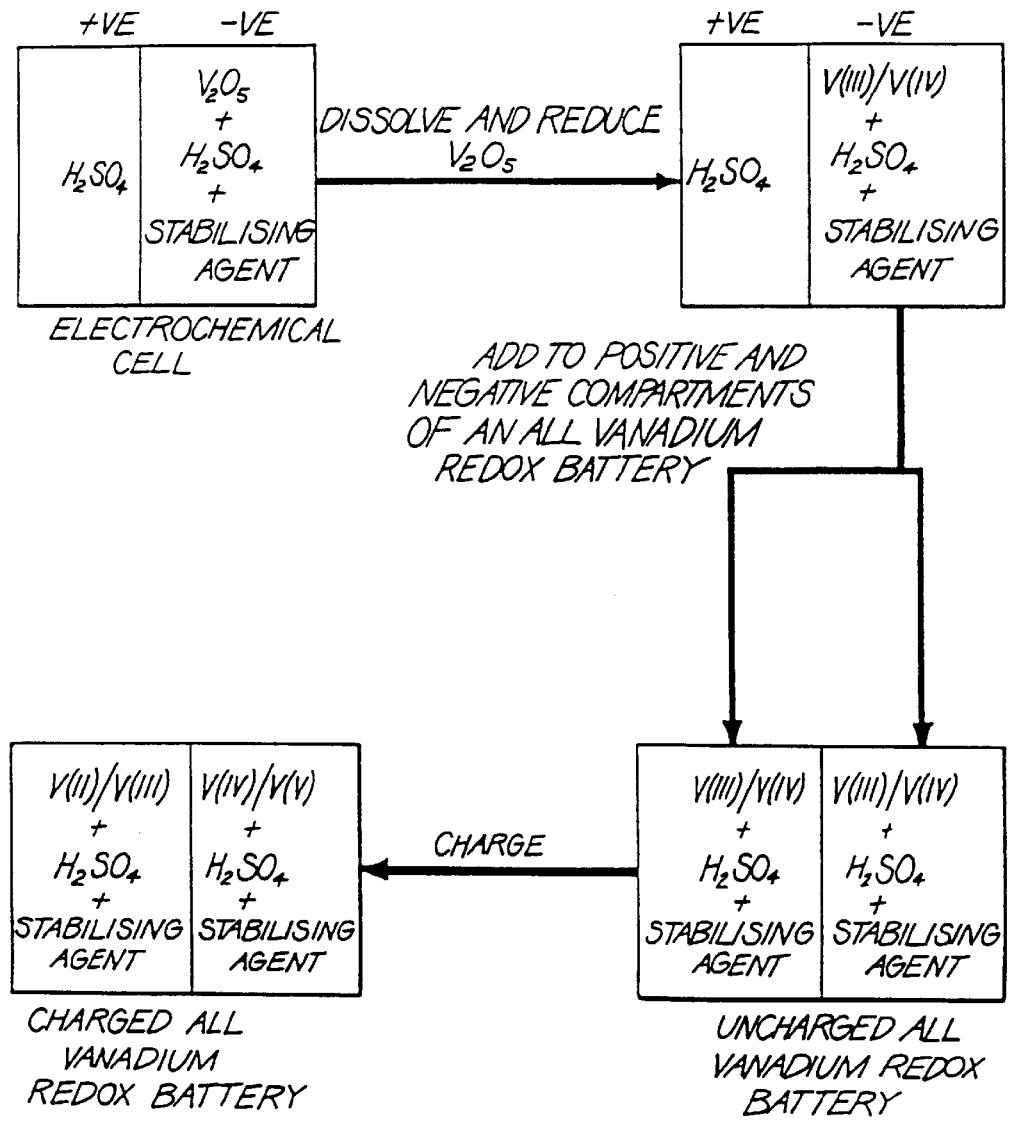
FIG. 2 depicts schematically a batch process for dissolving and reducing a reducible vanadium-containing salt or complex in the presence of a stabilising agent.
Figure 3:
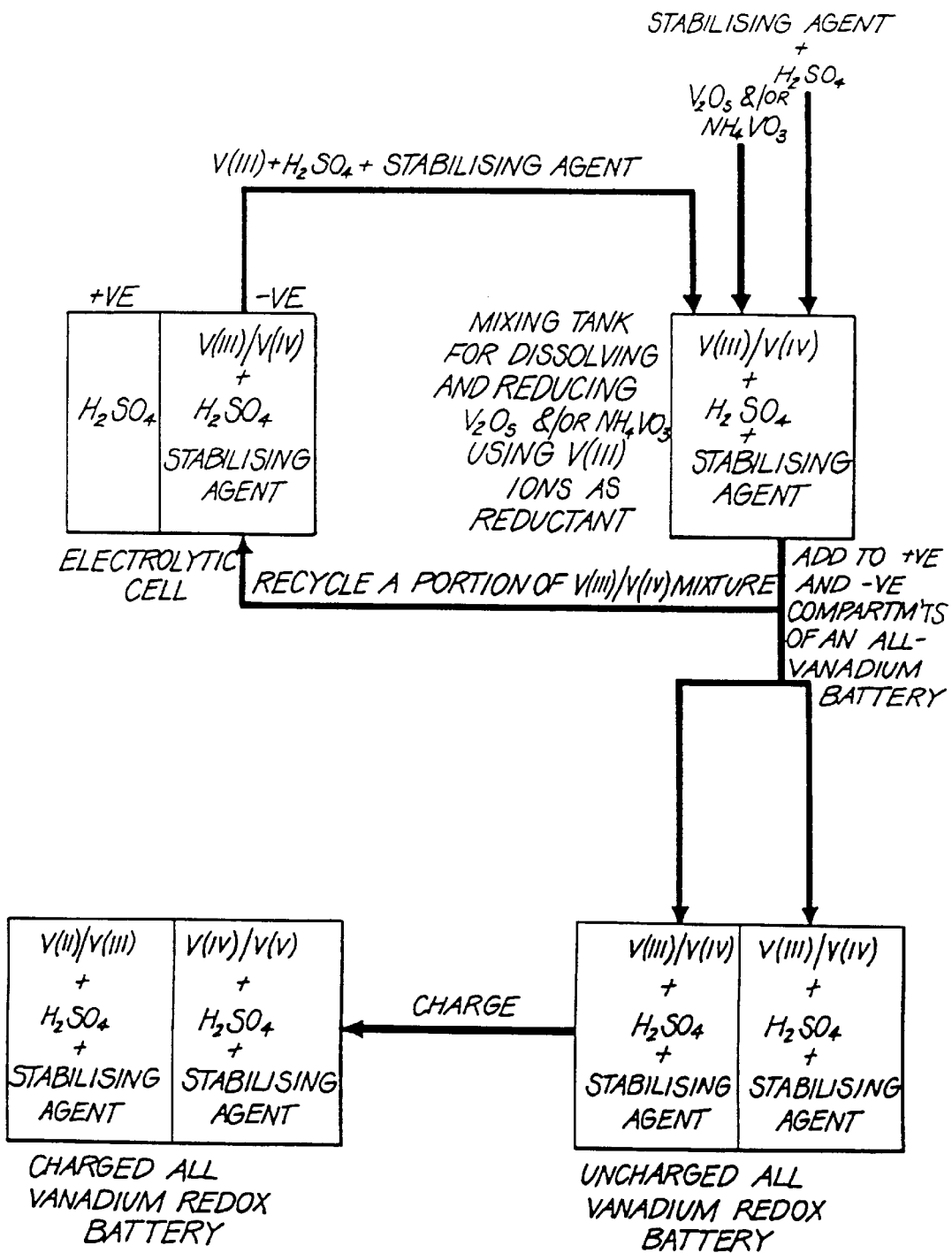
FIG. 3 depicts schematically a continuous process for dissolving and reducing a reducible vanadium-containing salt or complex in the presence of a stabilising agent.

An example of a batch process for preparing a stabilised all-vanadium electrolyte for a charged all vanadium redox battery containing using the process of the invention is depicted in FIG. 2. An example of a continuous process for preparing a stabilised all-vanadium electrolyte for a charged all vanadium redox battery using the process of the invention is depicted in FIG. 3.

Figure 15:
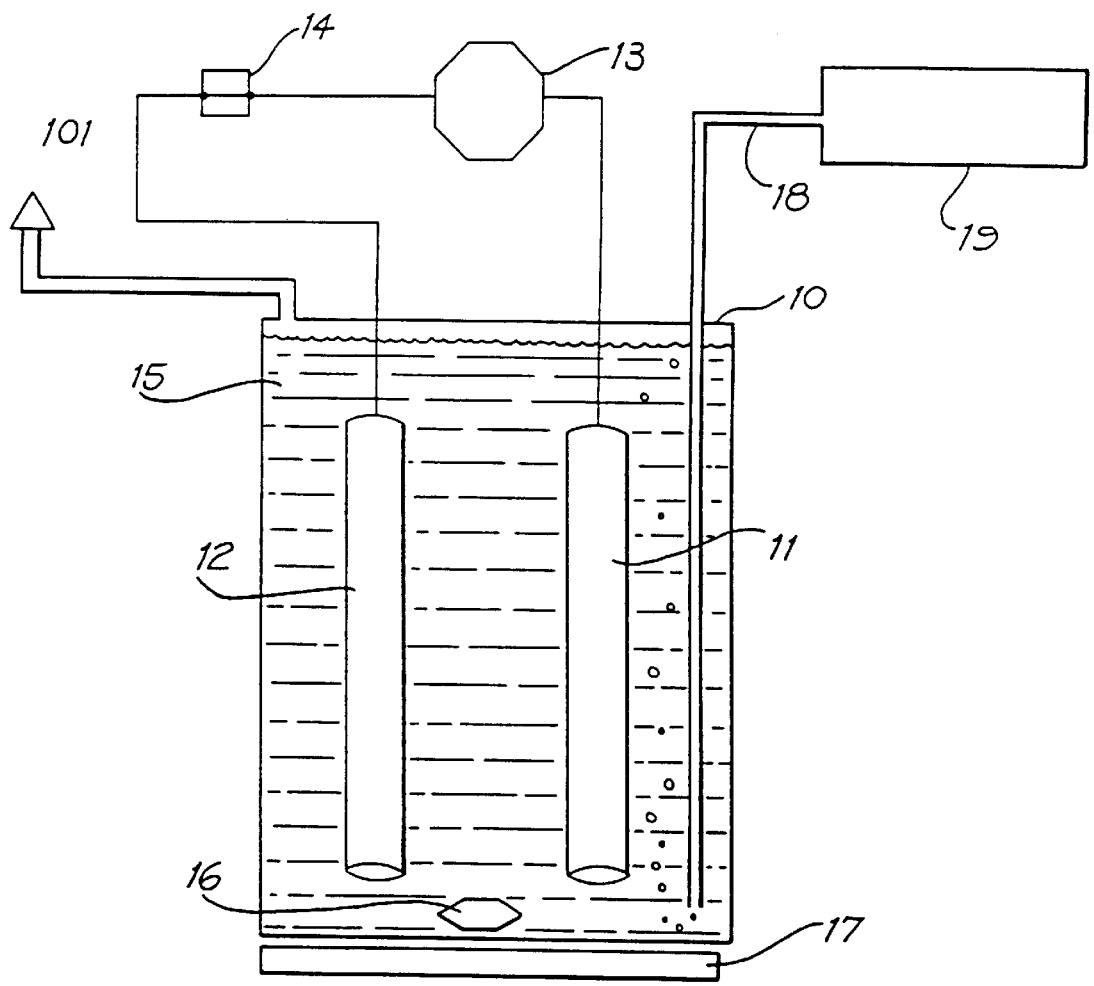
FIG. 15 depicts schematically an electrochemical cell which does not have an ionically conducting separator for dissolving and reducing a reducible vanadium compound, the electrolyte produced comprising typically a mixture of V(IV) and V(V) ions in the electrolyte.

Referring to FIG. 15 an electrochemical cell 10 for dissolving and reducing a reducible vanadium compound has a negative electrode 11 and a positive electrode 12 which are electrically coupled via electrical power source 13 and switch 14 which are connected in series. Power source 13 can be a dc battery capable of delivering at least about 0.5 to about 2.0 volts over and above resistance losses of cell 10. Cell 10 contains an aqueous electrolyte containing a stabilizing amount of a stabilizing agent 15 which is in electrical contact with positive and negative electrodes 12 and 11. Electrolyte 15 is preferably 0.5M to 10M $H_2SO_4$ and contains 0.001M to 2M of a stabilizing agent such as inositol or glycerine and 0.5M to 10M, more typically 3.5–7M of a reducible vanadium compound such as $V_2O_5$ or ammonium metavanadate in powder form, To dissolve and reduce the powdered $V_2O_5$ electrolyte 15 is stirred by teflon coated stirrer bar 16 which is driven by magnetic stirrer 17 disposed below cell 10. Nitrogen is bubbled through electrolyte 15 via line 18 which delivers nitrogen from nitrogen gas cylinder 19 to which it is coupled. Nitrogen is vented from cell 10 via vent 101. Switch 14 is closed so as to deliver 0.5 to 2.0 volts between negative and positive electrodes 11 and 12.

Figure 16:
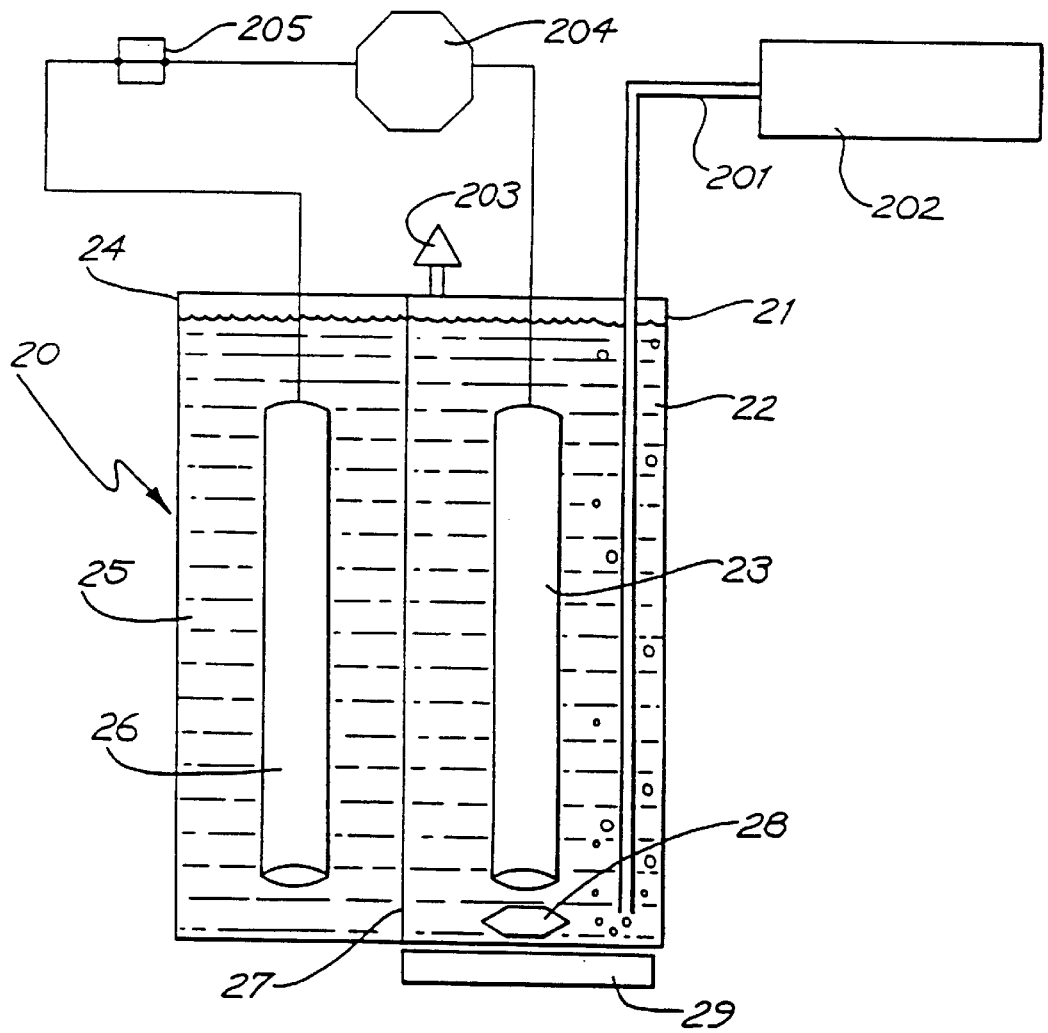
FIG. 16 depicts schematically an electrochemical cell having an ionically conducting separator for dissolving and reducing a reducible vanadium compound in the presence of a stabilizing agent.

Referring to FIG. 16 an electrochemical cell 20 for dissolving and reducing a reducible vanadium compound has a positive compartment 24 containing a catholyte with a stabilizing agent 25 in electrical contact with positive electrode 26. Cell 20 has a negative compartment 21 containing an anolyte 22 in electrical contact with positive electrode 23. Positive electrode 26 is electrically coupled to a negative electrode 23 via electrical power source 204 and switch 205 which are connected in series. Power source 204 can be a dc battery capable of delivering at least about 2.3 volts over and above resistance losses of cell 20. Ionically conducting separator 27 is disposed between positive and negative compartments 24 and 21 and is in contact with catholyte 25 and anolyte 22 to provide ionic communication therebetween. A preferred separator 27 is a Nafion membrane or Selmion CMV membrane. Anolyte 22 is preferably 0.5M to 6.0M $H_2SO_4$ and contains an effective stabilizing amount of a stabilizing agent (typically 0.5–7.5% w/w), such as inositol or glycerine and a reducible vanadium compound such as $V_2O_5$ in powder form.

To dissolve and reduce the powdered $V_2O_5$, anolyte 22 is stirred by teflon coated magnetic stirrer bar 28 which is driven by magnetic stirrer 29 disposed below negative compartment 21. Nitrogen is bubbled through anolyte 22 via line 201 which delivers nitrogen from nitrogen gas cylinder 202 to which it is coupled. Nitrogen is vented from negative compartment 21 via vent 203. Switch 205 is closed so as to deliver 2.5 volts between negative and positive electrodes 23 and 26.

The V(II), V(III) and V(IV) ions produced by reduction of the $V_2O_5$ powder and dissolved in anolyte 22 reduce the $V_2O_5$ powder and form dissolved and reduced V(II), V(III) and V(IV) ions. Powdered $V_2O_5$ which comes in direct contact with negative electrode 23 is directly reduced and at positive electrode 26, water is decomposed producing $O_2$.

Figure 17:
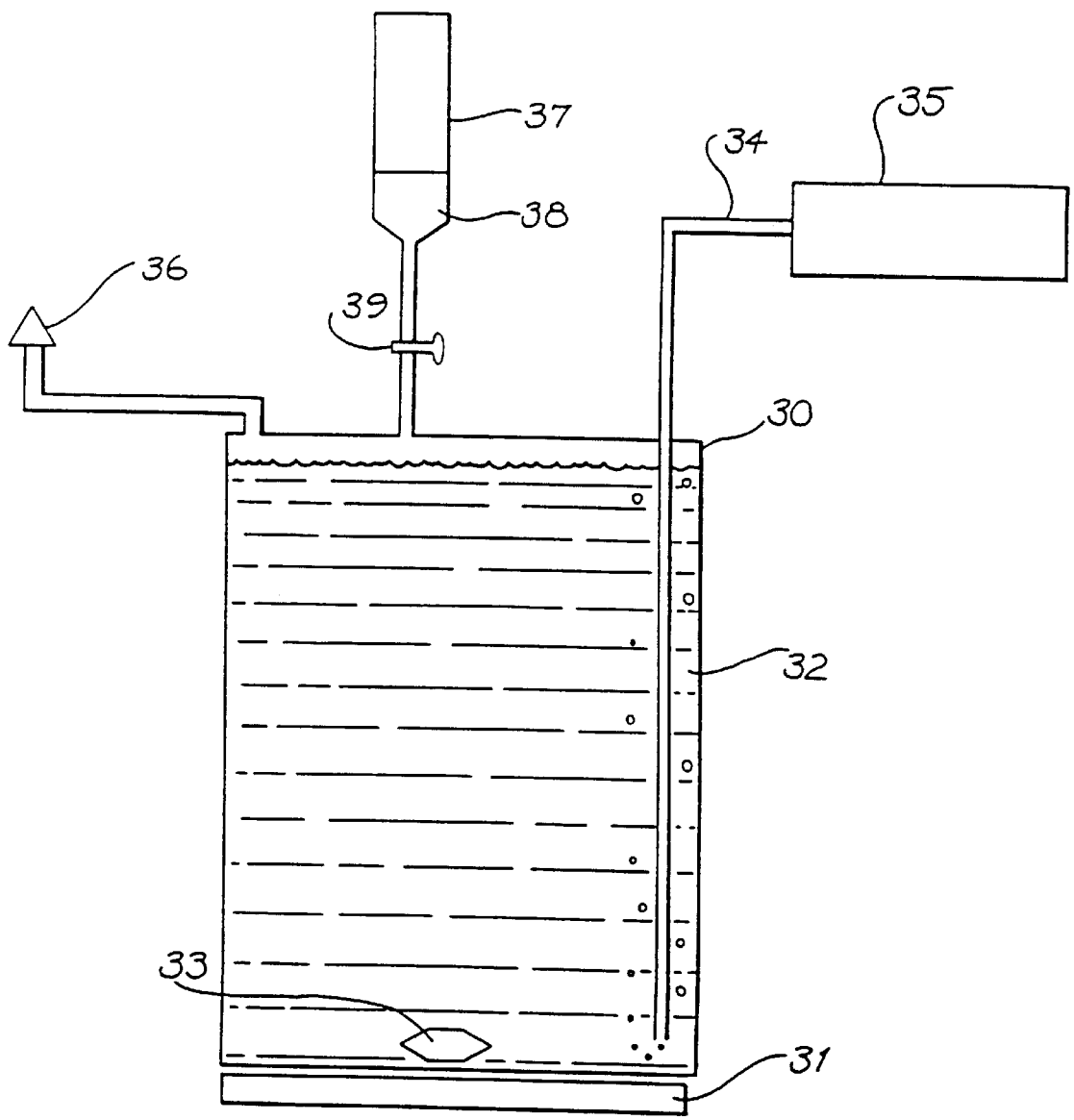
FIG. 17 depicts schematically an apparatus for dissolving and reducing a reducible vanadium compound in the presence of a stabilizing agent.

Referring to FIG. 17 a container 30 for dissolving and reducing ammonium metavanadate or vanadium pentoxide or other reducible vanadium salts or complexes is disposed on top of magnetic stirrer 31. For exemplification a process of dissolving and reducing ammonium vanadate is described. Container 30 contains an aqueous electrolyte 32 comprising 0.5M to 10M $H_2SO_4$ an effective stabilizing amount of the stabilizing agent (typically 0.75–5% w/w), such as glycerine, inositol or sodium gluconate, and ammonium vanadate in powder form.

To dissolve 0.5M to 10M of the powdered ammonium vanadate electrolyte 32 is stirred by teflon coated stirrer bar 33 which is driven by magnetic stirrer 31. Nitrogen is bubbled through electrolyte 32 via line 34 which delivers nitrogen from nitrogen gas cylinder 35 to which it is coupled. Nitrogen is vented from container 30 via vent 36. A chemical reductant preferably $SO_2$ or oxalic acid (0.05M to 10M) is added to electrolyte 32 from reservoir 37 by opening tap 39. Sufficient reductant is added to dissolve and reduce the ammonium vanadate powder in electrolyte 32.

Figure 18:
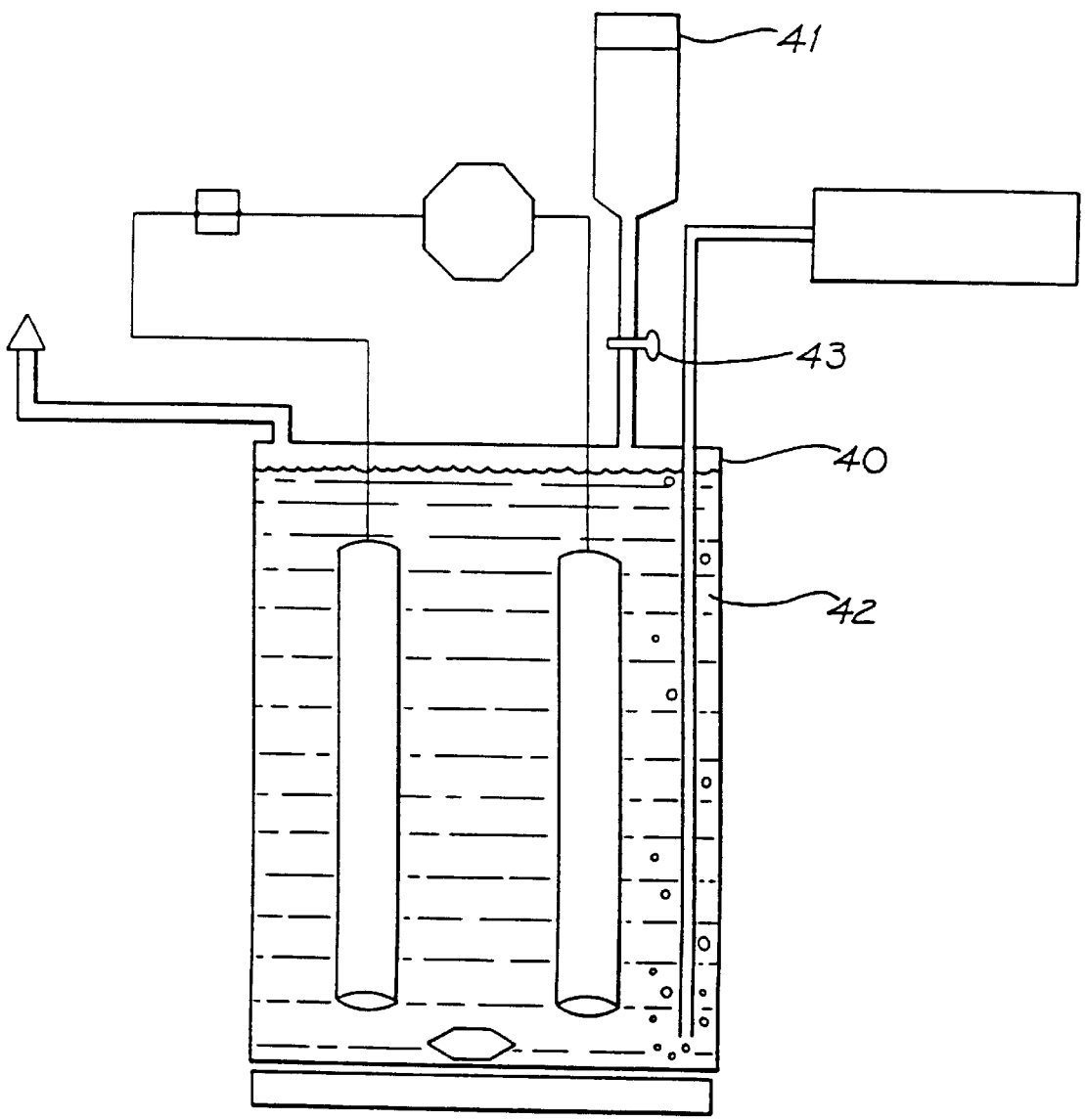
FIG. 18 depicts schematically an electrochemical cell which does not have an ionically conducting separator for dissolving and reducing a reducible vanadium compound, the electrolyte produced comprising typically a mixture of V(IV) and V(V) ions in the electrolyte.

Referring to FIG. 18 an electrochemical cell 40 for dissolving and reducing a reducible vanadium compound is the same as electrochemical cell 10 shown in FIG. 15 except it includes a reservoir 41 which contains a chemical reductant preferably $SO_2$ or oxalic acid (0.05M to 10M, more typically 0.1 to 1M). Electrochemical cell 40 can be used to dissolve and reduce a reducible vanadium compound such as $V_2O_5$ in the same way as electrochemical cell 10 in FIG. 15 is used except the chemical reductant is added to electrolyte 42 from reservoir 41 by opening tap 43. Sufficient reductant is added to assist in dissolving and reducing the $V_2O_5$ powder which is in electrolyte 42 prior to further reduction.

The following reactions take place at negative electrode 11 or as a consequence of reactions of ions formed by reactions which take place at negative electrode 11:

(a) $V^{5+}+3e^-\rightarrow V^{2+}$
(b) $V^{5+}+2e^-\rightarrow V^{3+}$
(c) $V^{5+}+e^-\rightarrow V^{1+}$
(d) (i) $V^{2+}+V^{4+}2V^{3+}$
  (ii) $V^{2+}+\frac{1}{2}V_2O_5\rightarrow V^{3+}/V^{4+}$
  (iii) $V^{3+}+\frac{1}{2}V_2O_5\rightarrow 2V^{4+}$
  (iv) $V^{4+}+\frac{1}{2}V_2O_5\rightarrow 2V^{5+}$ (in solution)+$V^{4+}$ From the above reactions the V(II), V(III) and V(IV) ions dissolved in electrolyte 15 reduce the $V_2O_5$ powder and form dissolved and reduced V(II), V(III), V(IV) and V(V) ions. Powdered $V_2O_5$ which comes into contact with negative electrode 11 is also reduced. At positive electrode 12 the following reactions take place:

(a) $V^{2+}\rightarrow V^{3+}$, $V^{4+}$ or $V^{5+}$ (in solution)+1, 2 or $3e^-$
(b) $V^{3+}\rightarrow V^{4+}$ or $V^{5+}$ (in solution)+1 or $2e^-$
(c) $V^{4+}\rightarrow V^{5+}$ (in solution)+$1e^-$
(d) $H_2O\rightarrow O^2$ From the immediately preceding reactions whilst V(II), V(III) and V(IV) ions are oxidised to higher oxidation states at positive electrode 12 the higher oxidation state vanadium ions thus formed remain in solution.

Figure 19:
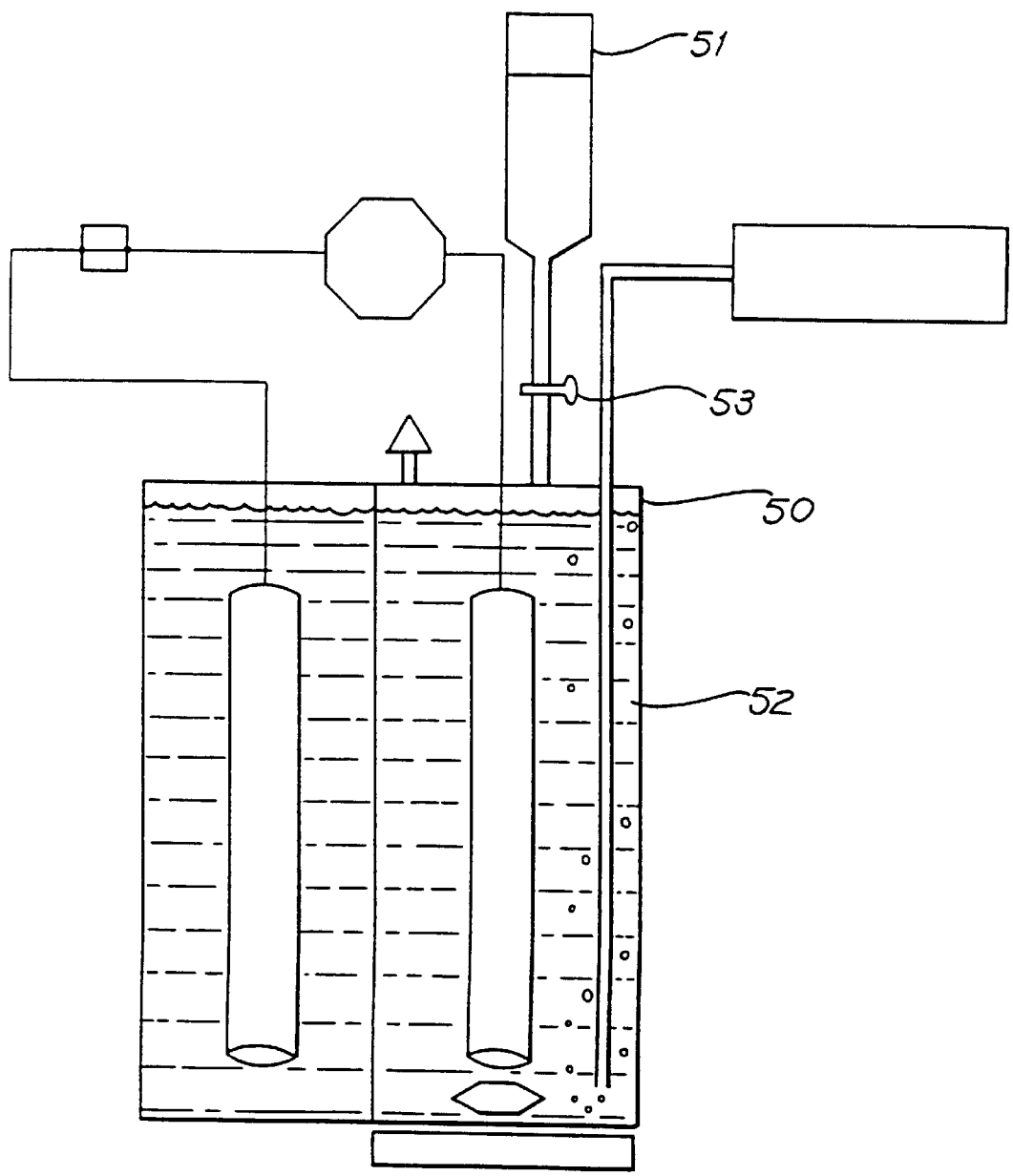
FIG. 19 depicts schematically an electrochemical cell having an ionically conducting separator for dissolving and reducing a reducible vanadium compound.

Referring to FIG. 19 an electrochemical cell 50 for dissolving and reducing a reducible vanadium compound is the same as electrolyte chemical cell 20 in FIG. 16 except it has a reservoir 51 which contains a chemical reductant preferably oxalic acid (0.05M to 5M). Electrochemical cell 50 can be used to dissolve and reduce 3–9M, for example, of a reducible vanadium compound such as $V_2O_5$ in the same way as electrochemical cell 20 in FIG. 16 is used except the chemical reductant is added to electrolyte 52 from reservoir 51 by opening tap 53. Sufficient reductant is added to assist in dissolving and reducing the $V_2O_5$ powder which is in electrolyte 52.

Figures 20A, 20B:
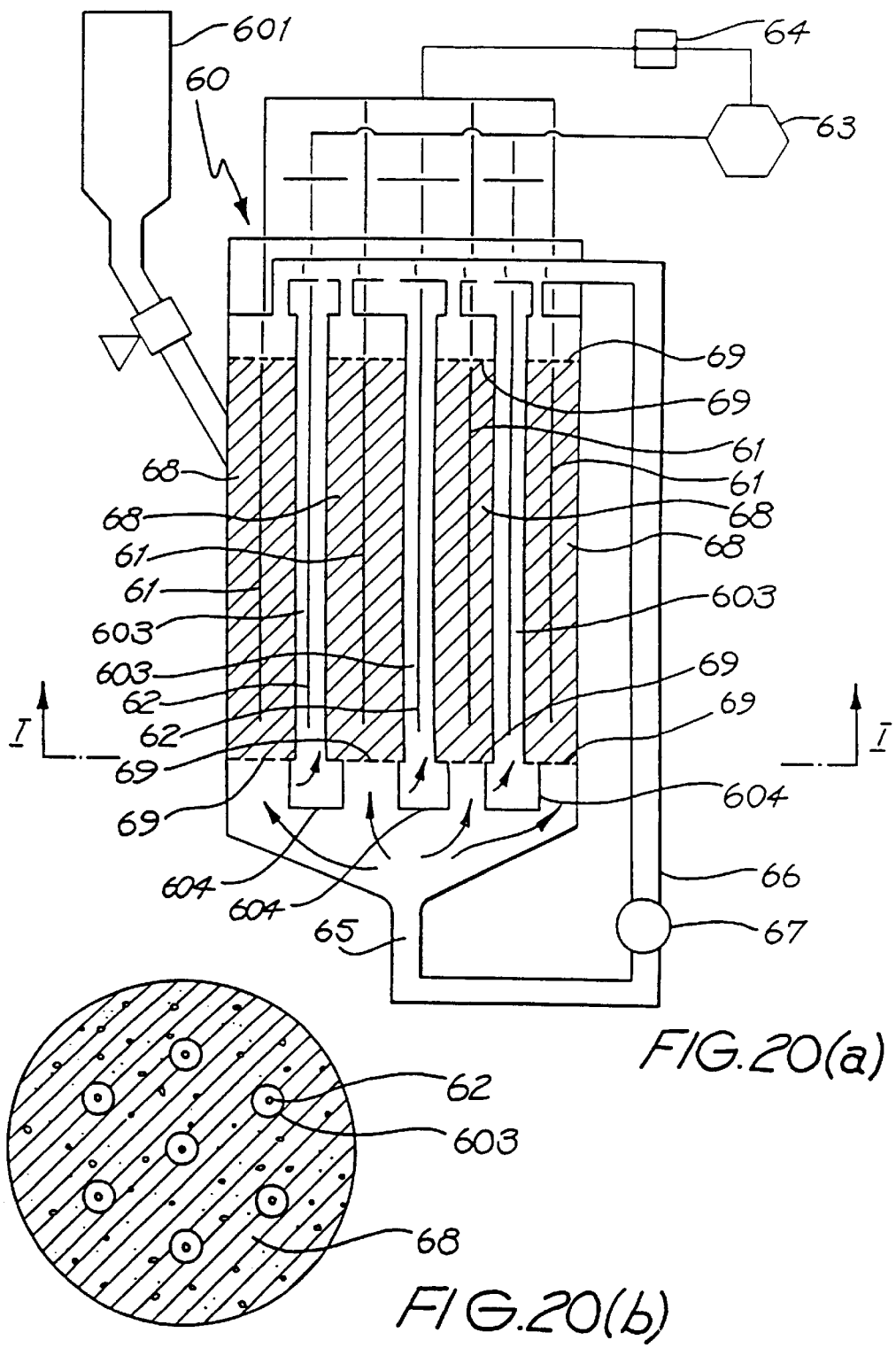
FIG. 20(a) depicts schematically an alternative electrochemical cell for dissolving and reducing a reducible vanadium compound.
FIG. 20(b) is a bottom cross-sectional view along the line I—I in FIG. 20(a)

FIG. 20(a) depicts an alternative electrochemical cell 60 for producing a highly supersaturated vanadium solution containing stabilizing agent by dissolving and reducing a reducible vanadium compound. Cell 60 has negative electrodes 61 and positive electrodes 62 which are electrically coupled via electrical power source 63 and switch 64 which are connected in series. Power source 63 can be a dc battery capable of delivering of at least 2.5 volts over and above resistance losses of cell 60. An aqueous electrolyte 65 is recirculated through cell 60 via recirculation line 66 which includes pump 67. Electrolyte 65 is preferably 0.5M to 10M $H_2SO_4$ and contains an effective stabilizing amount of a stabilizing agent (typically 0.75–5% w/w), such as glycerine, fructose or inositol and a 0.1M to 10M, more typically 2.5 to 8.5M of a reducible vanadium compound such as $V_2O_5$ or ammonium metavanadate in powder form in negative compartments 68 which contain the powdered compound by filter elements 69 located at either end of each negative compartment. Elements 69 can be glass frits or synthetic filter cloth. The compound containing electrolyte 64 can be added to negative compartments 68 from reservoir 601 by opening tap 602. Positive compartments 603 are separated from negative compartments 68 by ionically conducting separators or microporous separators 604 which are disposed in cell 60 at the bottom of positive compartment 603.

In use electrolyte 65 is recirculated through cell 60 and about 2.3 volts (excluding resistance losses) is applied between negative electrodes 61 and positive electrodes 62 respectively. Typically, the current density at negative the cathode is from about 5 to about 50 mA.cm$^{-2}$, while at the anode, the current density is from about 10 to about 300 mA.cm$^{-2}$. Flow of electrolyte 65 through negative compartments 68 agitates the compound therein and maintains the powder in a fluidized state and over a period of time the powdered compound dissolves and is reduced into electrolyte 65. The dissolution and reduction of the compound in electrolyte 65 can be assisted by adding a chemical reductant such as oxalic acid or bubbling a gaseous chemical reductant such as $SO_2$ through electrolyte 65.

Figure 21:
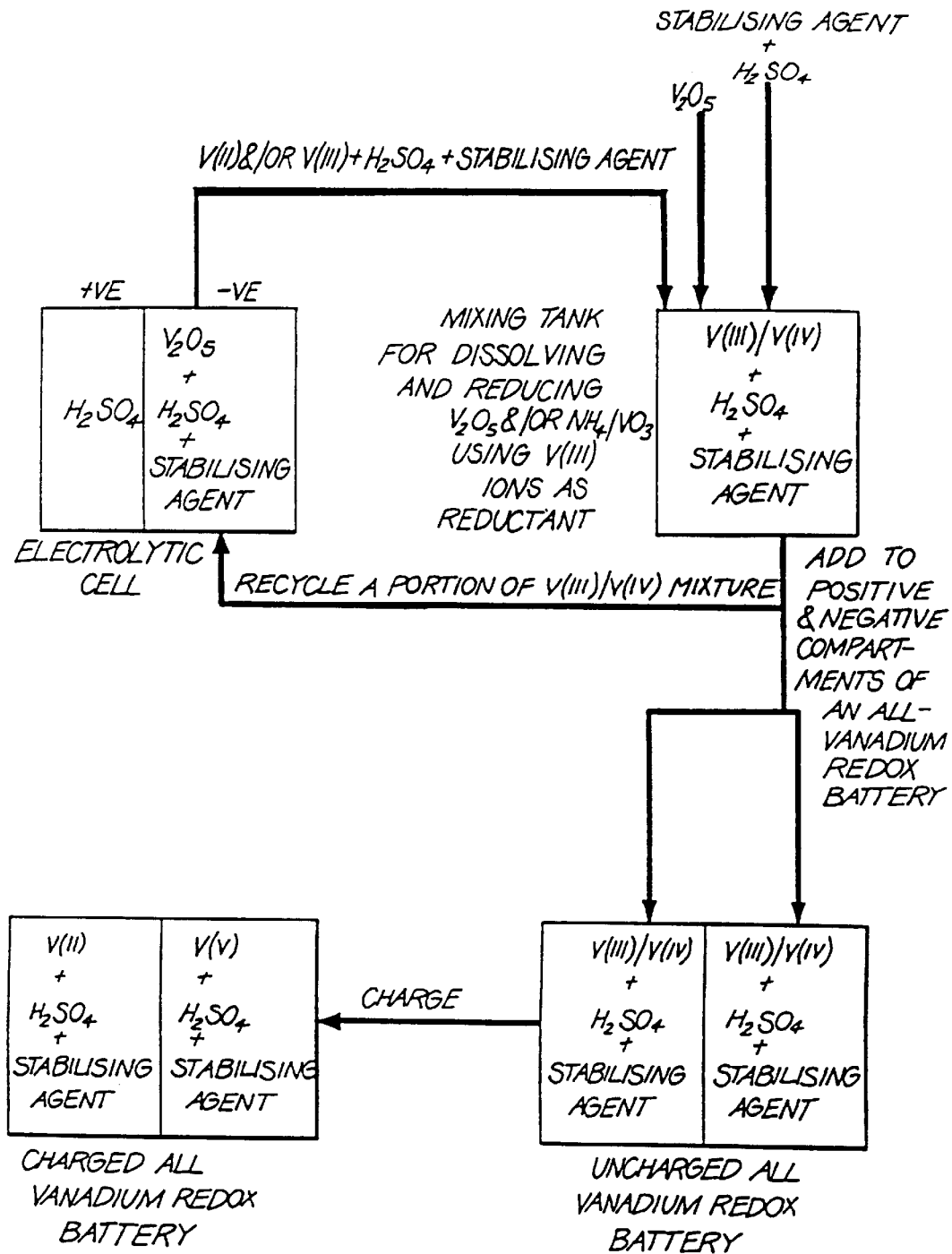
FIG. 21 depicts schematically an alternative process using an electrochemical cell having an ionically conducting separator for generating V(II) or V(III) ions by reducing a mixture of V(IV) and V(III) and $V_2O_5$, and a mixing tank for dissolving $V_2O_5$ or other vanadium salt in the presence of stabilizing agents, using the V(II) and or V(III) ions as reducing agent.

FIG. 21 shows a batch or continuous process for preparing stabilized electrolytes respectively. In FIG. 21 an effective stabilizing amount of the stabilizing agent (typically 0.75–5% w/w), $V_2O_5$ powder (or $NH_4VO_3$ powder), and $H_2SO_4$ are fed into a mixing tank and a solution of V(III) is added continuously as a leachant/reductant for the $V_2O_5$. The V(III) reduces the $V_2O_5$ to V(IV) in the presence of the stabilizing agent producing a solution containing a 50:50 mixture of V(III) and V(IV) ions at supersaturation levels. Part of this electrolyte is recycled to the negative compartment of an electrolytic cell where it is reduced to V(III) and returned to the mixing tank for further leaching of $V_2O_5$. The remaining V(III)/V(IV) electrolyte with stabilizing agent is used as feed for the positive and negative half-cells of a vanadium redox cell which upon charging, produces stabilized electrolytes of V(II)/V(III) and V(IV)/V(V) in the neative and positive ½-cells respectively.

Figure 23:
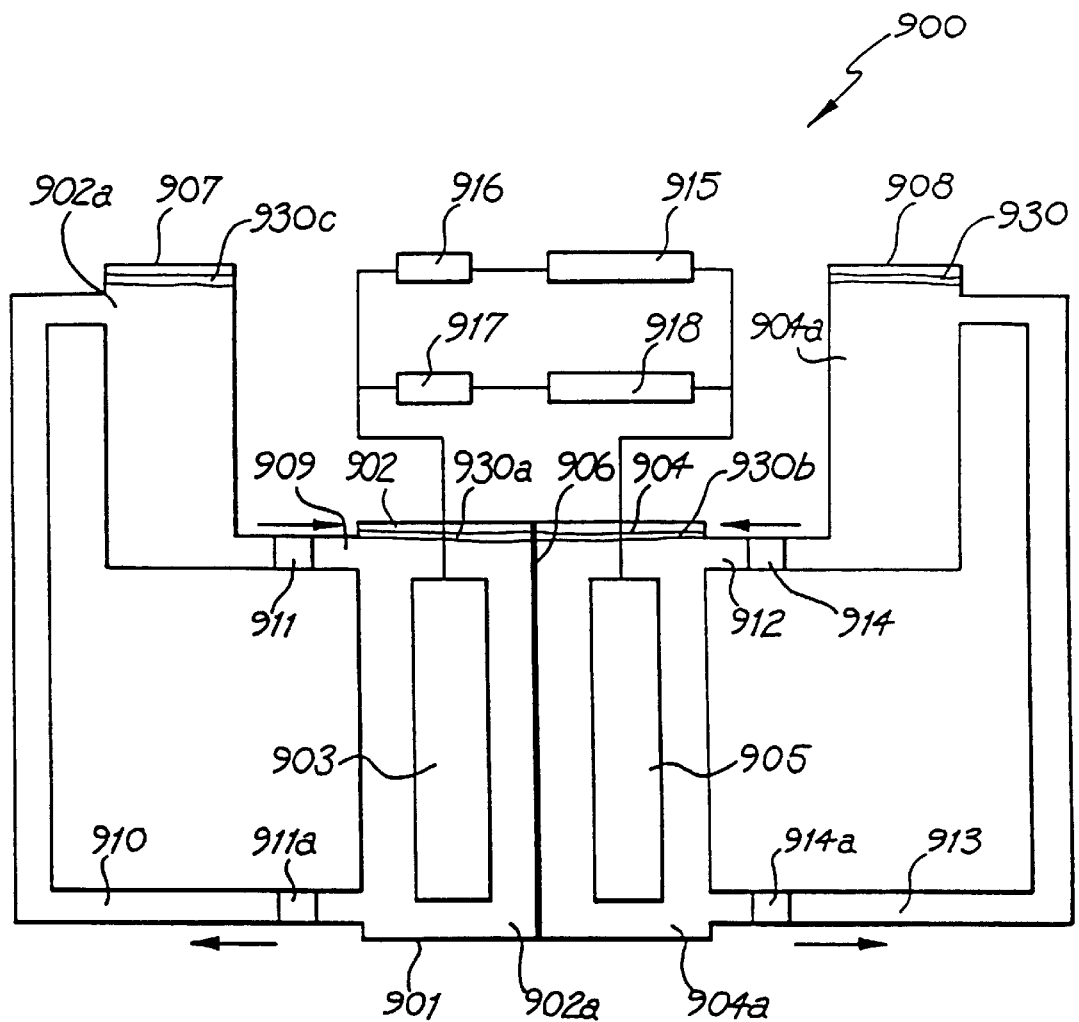
FIG. 23 depicts an all-vanadium redox battery system.

FIG. 23 schematically depicts an all-vanadium redox battery system 900. System 900 includes an all-vanadium redox battery 901 having a negative compartment 902 which includes includes an anolyte 902a therein in electrical contact with a negative electrode 903 and a positive compartment 904 which includes a catholyte 904a therein in electrical contact with a positive electrode 905. An ionically conducting separator 906 is disposed between negative and positive compartments 902 and 904 and is in contact with anolyte 902a and catholyte 904a to provide ionic communication therebetween. Anolyte 902a and catholyte 904a are typically prepared by a method in which a solution of a soluble vanadium salt such as ammonium vanadate is electrolytically reduced in an aqueos solution of concentrated sulphuric acid (1–10M) to a 100% $V^{3+}$ oxidation state, $V_2O_5$ powder and an effective stabilising amount of a stabilising agent (typically 0.5–10% w/w) is then added to the $V^{3+}$ solution and is induced to dissolve in the $V^{3+}$ solution by the $V^{3+}$ ions which act as a leaching agent for the $V_2O_5$. This solution is then placed in an electrolysis cell and reduced to $V^{3.5+}$. Additional $V_2O_5$ powder (in an amount to produce a final supersaturated solution) and an effective stabilising amount of a stabilising agent (typically 0.5–10% w/w) is added to $V^{3.5+}$ solution and mixed by mechanical stirring and after the dissolution reaction is completed the solution is filtered. The vanadium oxidation state of the solution obtained is typically close to 100% $V^{4+}$. The supersaturated (e.g. 4–10M) V(IV) electrolyte is then placed into anolyte reservoir 907 and negative compartment 902 and catholyte reservoir 908 and positive compartment 904. Thin air sealing layers 930a, 930b, 930c and 930d of paraffin oil are placed in negative and positive compartments 902 and 904 and into anolyte reservoir 907 and catholyte reservoir 908 to substantially seal anolyte 902a and catholyte 904a from air. Anolyte 902a is pumped through negative compartment 902 and anolyte reservoir 907 via anolyte supply and return lines 909 and 910 by anolyte pumps 911 and 911a, and at the same time catholyte 904a is pumped through positive compartment 904 and catholyte reservoir 908 via catholyte supply and return lines 91 and 913 by catholyte pumps 914 and 914a. Redox battery 901 is charged by providing electrical energy from power source 915 to positive and negative electrodes 903 and 905 by closing switch 916 and opening switch 917 whereby electricity flows in negative and positive electrodes 903 and 905 from power supply 915 to produce a supersaturated concentration of divalent vanadium ions in anolyte 902a and a supersaturated concentration of pentavalent vanadium ions in catholyte 904a. Electricity is derived from redox battery 911 by opening switch 916, closing switch 917 and withdrawing electrical energy via load 918 which is in electrical communication with negative and positive electrodes 903 and 905.

Redox battery 901 is recharged by opening switch 917, closing switch 916 and providing electrical energy from power source 915 to derive a supersaturated solution of divalent ions in anolyte 902a and a supersaturated solution of pentavalent ions in catholyte 904a. Additional stabilising agent may be added to anolyte 902a and catholyte 904a prior to, during or after the recharging process, if desired or if necessary. The anolyte 902a and catholyte 904a may be rebalanced 904a prior to, during or after the recharging process, to take into account any cross-contamination between anolyte 902a and catholyte 904a.

Figure 24:
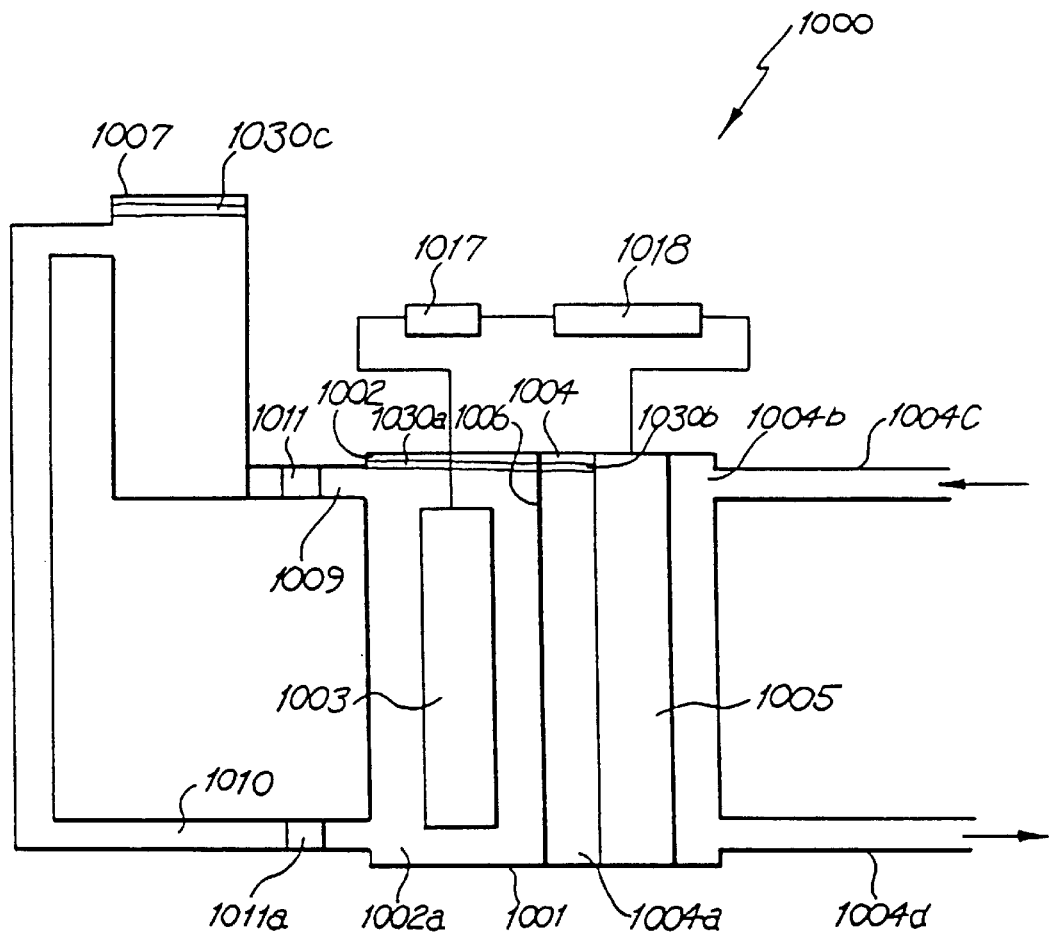
FIG. 24 depicts an all-vanadium redox batteryfuel cell system.

FIG. 24 schematically depicts an all-vanadium redox battery/fuel cell system 1000. System 1000 includes an all-vanadium redox battery/fuel cell 1001 having a negative compartment 1002 which includes includes an anolyte 1002a therein in electrical contact with a negative electrode 1003 and a positive compartment 1004 which includes a catholyte 1004a therein in electrical contact with a positive oxygen/air electrode 1005. An ionically conducting separator 1006 is disposed between negative and positive compartments 1002 and 1004 and is in contact with anolyte 1002a and catholyte 1004a to provide ionic commnunication therebetween. Anolyte 1002a and catholyte 1004a are typically prepared by a method in which a solution of a vanadium compound such as $V_2O_5$ powder is electrolytically reduced in an aqueos solution of concentrated sulphuric acid (1–10M) to a 100% $V^{3+}$ oxidation state (the solution may contain stabilising agent). $V_2O_5$ powder and an effective stabilising amount of a stabilising agent (typically 0.5–10% w/w) is then added to the $V^{3+}$ solution and is induced to dissolve in the $V^{3+}$ solution by the $V^{3+}$ ions which act as a leaching agent for the $V_2O_5$. This solution is then placed in an electrolysis cell and reduced to $V^{3.5+}$. Additional $V_2O_5$ powder (in an amount to produce a final supersaturated solution) and an effective stabilising amount of a stabilising agent (typically 0.5–10% w/w) is added to $V^{3.5+}$ solution and mixed by mechanical stirring and after the dissolution reaction is completed the solution is filtered. The vanadium oxidation state of the solution obtained is typically close to 100% $V^{4+}$. The supersaturated (e.g.4–10M) Part of the V(IV) electrolyte is then reduced to V(II) in a separate anolyte charging cell (not shown) and placed into anolyte reservoir 1007 and negative compartment 1002. Part of the V(IV) electrolyte may be optionally oxidised to V(V) in a separate catholyte charging cell (not shown) and placed in positive compartment 1004. Thin air sealing layers 1030a, 1030b, and 1030c of paraffin oil are placed in negative and positive compartments 1002 and 1004 and into anolyte reservoir 1007 to substantially seal anolyte 1002a and catholyte 1004a from air. Anolyte 1002a is pumped through negative compartment 1002 and anolyte reservoir 1007 via anolyte supply and return lines 1009 and 1010 by anolyte pumps 1010 and 1011a, and at the same time oxygen or an oxygen containing gas such as air, is passed through compartment 1004b via inlet line 1004c and water exits compartment 1004b via exit line 1004d. Catholyte 1004a is charged by passing oxygen or an oxygen containing gas over oxygen/air electrode 1005 (eg a porous carbon oxygen electrode) to oxidise vanadium (IV) to vanadium(V) in catholyte 1004a. Anolyte 1002a may be charged in a separate charging cell (as may catholyte 1004a when all of anolyte 1002a is discharged to rebalance system 1000). Electricity is derived from redox battery 1001 by closing switch 1017 and withdrawing electrical energy via load 1018 which is in electrical communication with negative and positive electrodes 1003 and 1005. Since catholyte 1004a is instanteously regenerated by oxygen via oxygen/air electrode 1005, a catholyte reservoir is not required, thus permitting, for a given size battery, twice the volume of the anolyte to be carried on a vehicle such as a car and thereby doubling the range before refuelling. System 1000 has a theoretical energy density of 270.7 Wh/kg.

Additional stabilising agent may be added to anolyte 1002a and catholyte 1004a prior to, during or after the recharging process, if desired or if necessary. The anolyte 1002a and catholyte 1004a may be rebalanced 1004a prior to, during or after the recharging process, to take into account any cross-contamination between anolyte 1002a and catholyte 1004a.

EXAMPLES

Example 1

Various quantities of solid ammonium oxalate were mixed with portions of a 2M $V^V$ electrolyte and allowed to stand at room temperature. The electrolyte solutions were observed continuously. After 10 days the $V^V$ solution was not completely reduced with 5–10 wt % of ammonium oxalate, Example 2

2–3 wt % (by weight, based on the weight of vanadium salt) of solid of ammonium oxalate was used as a stabilising agent for the production of 3M V(III–IV) electrolyte. In this oxidation state the electrolyte solution was extremely stable for a long period of time, over a temperature range of about 5° C. to 45° C.

In the V(II) oxidation state the same electrolyte with stabilising agent was stable at high temperatures, but at low temperatures after an extended period it forms crystals of V(II) complexes. The concentration of vanadium was found to be 1.8M after 20 days at a temperature of 5° C.

In the V(V) oxidation state, the same electrolyte solution forms an oxalate complex very rapidly at 100% state of charge. This orange oxalate complex is completely different from $V_2O_5$ precipitates. At 80–90% state of charge of V(V) electrolyte solution, the cell can be run for a long time at room temperature with improved efficiency compared to cells having electrolyte not containing stabilising agent. From stability tests it was found that the concentration of vanadium was 2.8M after 20 days of tests at a temperature of 5° C.

Figure 12:
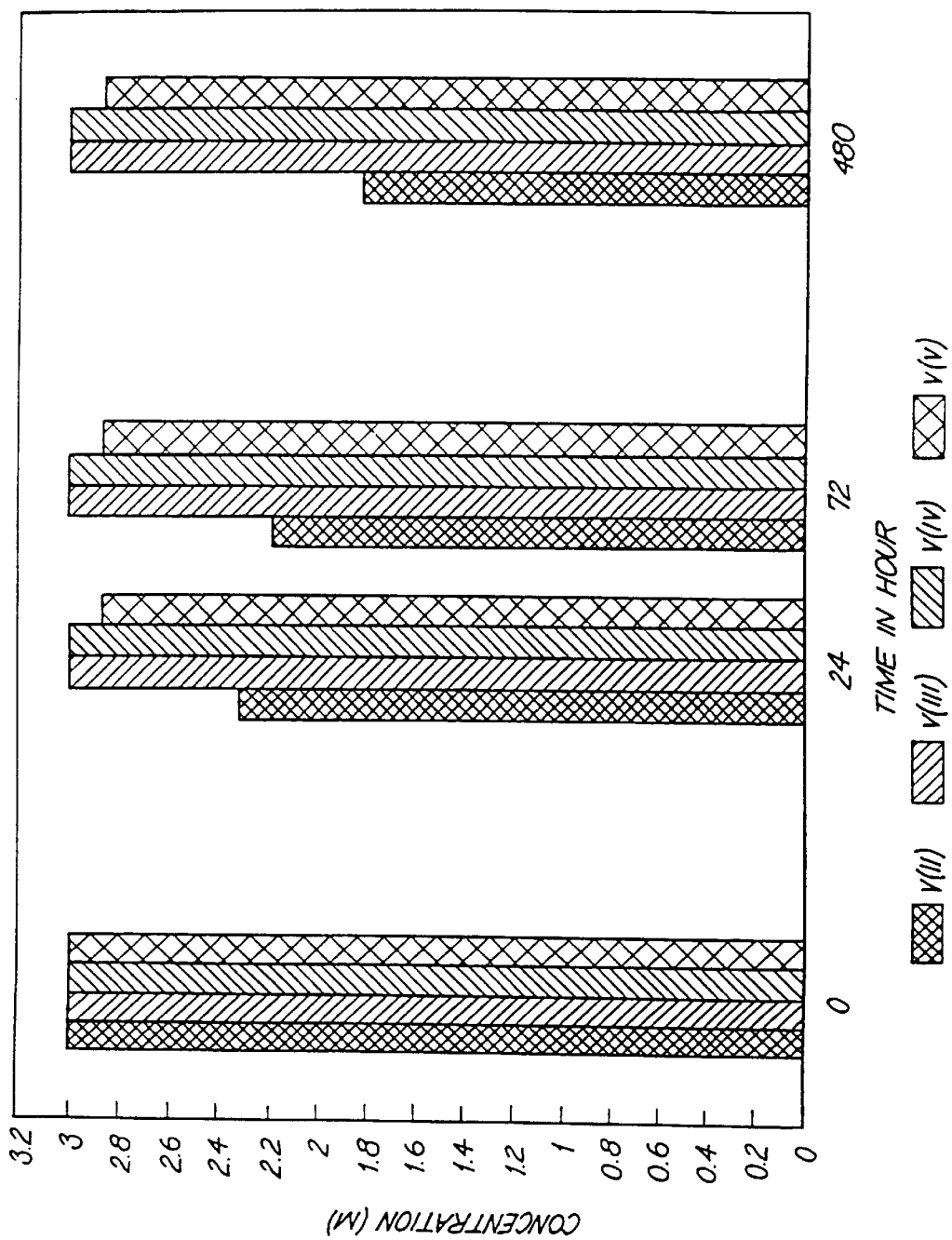
FIG. 12 depicts the concentration of V(II), V(III), V(IV) and V(V) in 5.32M sulphuric acid as a function of time at 5° C. with 2% ammonium oxalate in the electrolyte.
Figure 13:
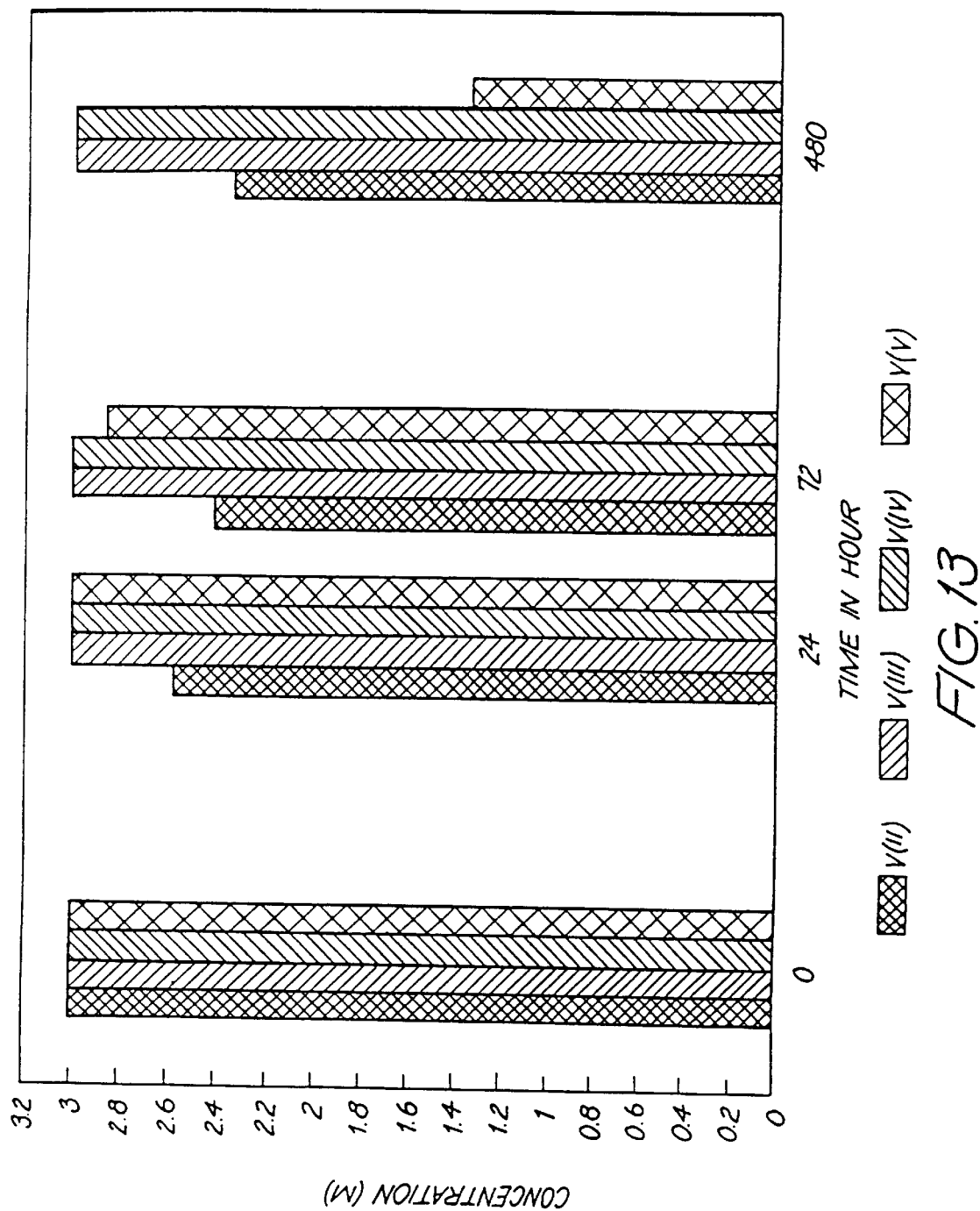
FIG. 13 depicts the concentration of V(II), V(III), V(IV) and V(V) in 5.32M. sulphuric acid as a function of time at 25° C. with 2% ammonium oxalate in the electrolyte.
Figure 14:
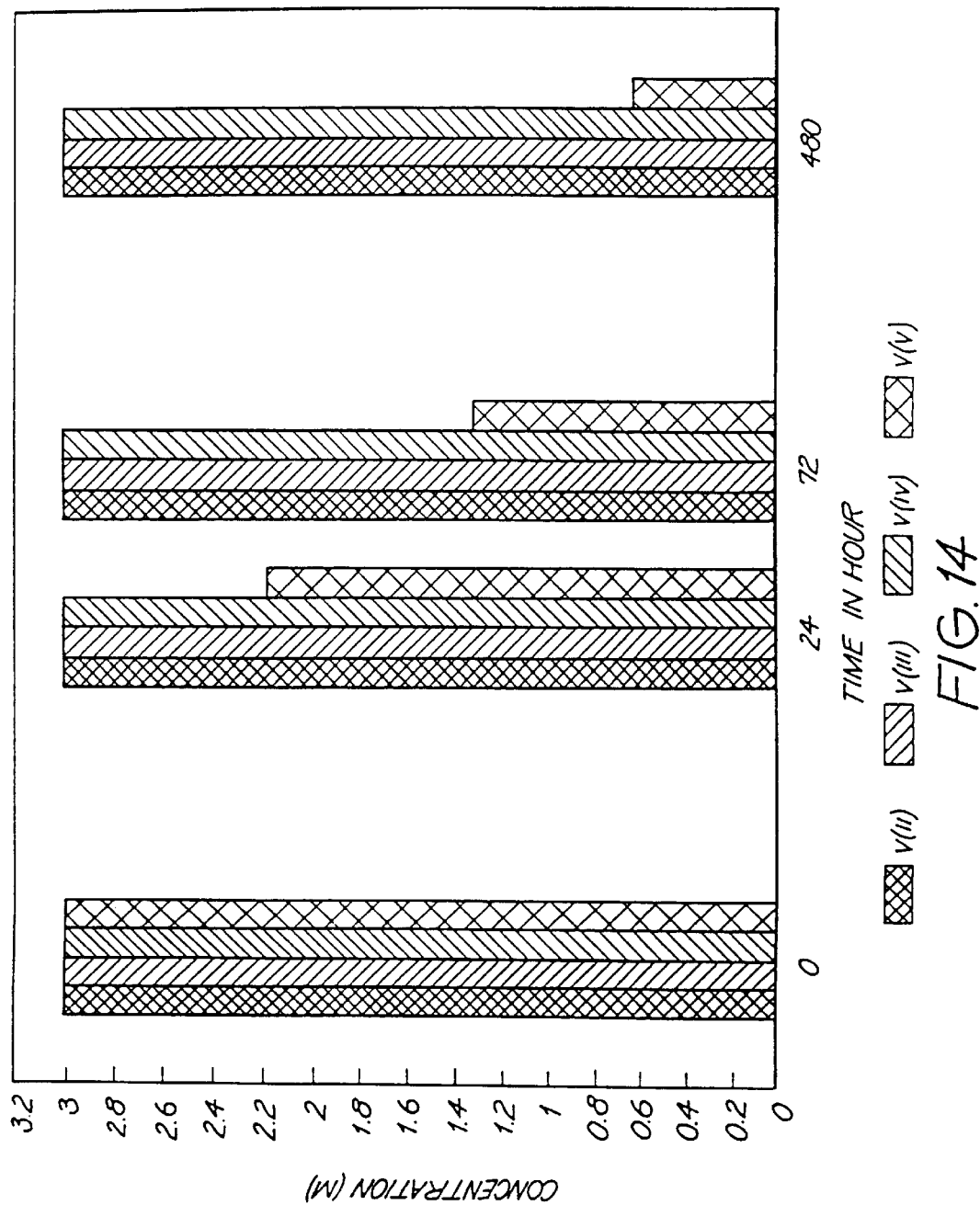
FIG. 14 depicts the concentration of V(II), V(III), V(IV) and V(V) in 5.32M sulphuric acid as a function of time at 45° C. with 2% ammonium oxalate in the electrolyte.

The results are graphed in FIGS. 12–14.

Example 3

The effect of addition of thiourea, a known strong stabilising agent, was compared to the effect of addition of ammonium oxalate, Various quantities of 1M thiourea solution were added into 2M $V^V$ electrolyte and allowed to stand at room temperature. All the $V^V$ solution was reduced to $V^{IV}$ solution even when relatively small amounts (5% by volume of 1M solution) of thiourea solution were added.

Example 4

The effect of addition of glycerol, another known strong stabilising agent, was compared to the effect of addition of ammonium oxalate, This stabilising agent was chosen for this study and used very small % (by volume) of 98% glycerine, A 2M $V^V$ electrolyte solution was mixed with 1 to 20% by volume of glycerol and the mixtures were allowed to stand at room temperature. After 10 days of performing the test, that all of the yellow $V^V$ solutions had changed to blue solutions, Thus eaten a very small quantity of this stabilising agent reduced the $V^V$ solution to the $V^{IV}$ oxidation state, The rate of reduction increased with the increase of the amount of glycerine solution added.

Example 5

$SO_2$ may bubbled through a solution of 0.1M $V_2O_5$ in 2M sulphuric acid produced V(IV), but due to the low solubility of $V_2O_5$, only very dilute solutions can be prepared in this manner. Such dilute solutions are not suitable for use in a practical all-vanadium battery.

Concentrated solutions of V(IV), V(III) and/or V(II) ions can be prepared as follows. Two moles of $V_2O_5$ powder were suspended in 1 liter of 2M $H_2SO_4$ and 1% glycerine+ 2% ammonium oxalate and $SO_2$ gas was bubbled through suspension, Substantially all the the $V_2O_5$ powder dissolved and was reduced by the $SO_2$ to form V(IV) ions in solution initially. By continuing the SO bubbling the V(IV) ions were further reduced. $SO_2$ bubbling was continued until the potential of the solution reached that of a 50:50 mixture of V(III) and V(IV) (approx. 0.3 V vs S.C.E. for 2 M vanadium in 2 M $H_2SO_4$), which is a suitable electrolyte containing stabilising agent for use in a practical all-vanadium battery.

Example 6

An electrolyte consisting of 50:50 ratio of V(III) and V(IV) in 2M $H_2SO_4$ and 2% glycerine may be prepared by electrolyzing a slurry of 1M of $V_2O_5$ powder in 1 liter 4M $H_2SO_4$ in a cell as depicted in FIG. 1.

The process is generally carried out with a separator between the anode and cathode. Since a separator is used, the electrolyte in contact with the cathode is usually continuously stirred. Cell Voltage≅2.5 Volts. Substantially all the $V_2O_5$ powder dissolves and is reduced at the cathode to form V(III)/V(IV) ions in solution.

Example 7

As for Example 5, except that $SO_2$ was bubbled through the electrolyte to assist in reduction of $V_2O_5$ as well as to keep powder in suspension.

Example 8

As for Example 6, except that $SO_2$ was bubbled through the electrolyte to assist in reduction of $V_2O_5$ as well as to keep powder in suspension.

Example 9

A 6 M solution of a V(III)/V(IV) mixture can be prepared by adding 3 moles per liter $V_2O_5$ to 6 M $H_2SO_4$ containing 1% fructose and electrolysing in a cell as depicted in FIG. 1. The polarity of the cell is then reversed and the V(III)/V(IV) mixture is oxidised to produce a 6 M V(V) solution which is stable at room temperature for 3 weeks.

Example 10

A 5 M solution of V(III)/V(IV) can be prepared by adding 2.5 moles per liter $V_2O_5$ to 6 M $H_2SO_4$ containing 1% sorbitol and electrolytically dissolving in a cell as depicted in FIG. 1. The polarity of the cell is then reversed and the vanadium is oxidised to produce a 5 M V(V) solution which is stable at room temperature for over 3 weeks.

Example 11

A 3M vanadium electrolyte was tested in a small cell consisting of Thai Gypsum conducting plastic and Toray felt and various kinds of commercially available membrane at various currents. The anolyte and catholyte were about 3M vanadium ions in 3M sulphuric acid with 3 wt % ammonium oxalate as stabilising agent.

The greatest columbic efficiency (98%) was achieved with AMV membrane, but the voltage efficiency in this case was comparatively low at 60% maximum, resulting in an overall energy efficiency of 58.8% at an applied current of 20 $mA/cm^2$. In the same system when CMV membrane was used at an applied current of 20 $mA/cm^2$ the maximum columbic efficiency was 91%, voltage efficiency was 81% and the energy efficiency was 73.7%. However with CMV membrane, the solution migrated in both directions when charging and discharging.

Figure 4:
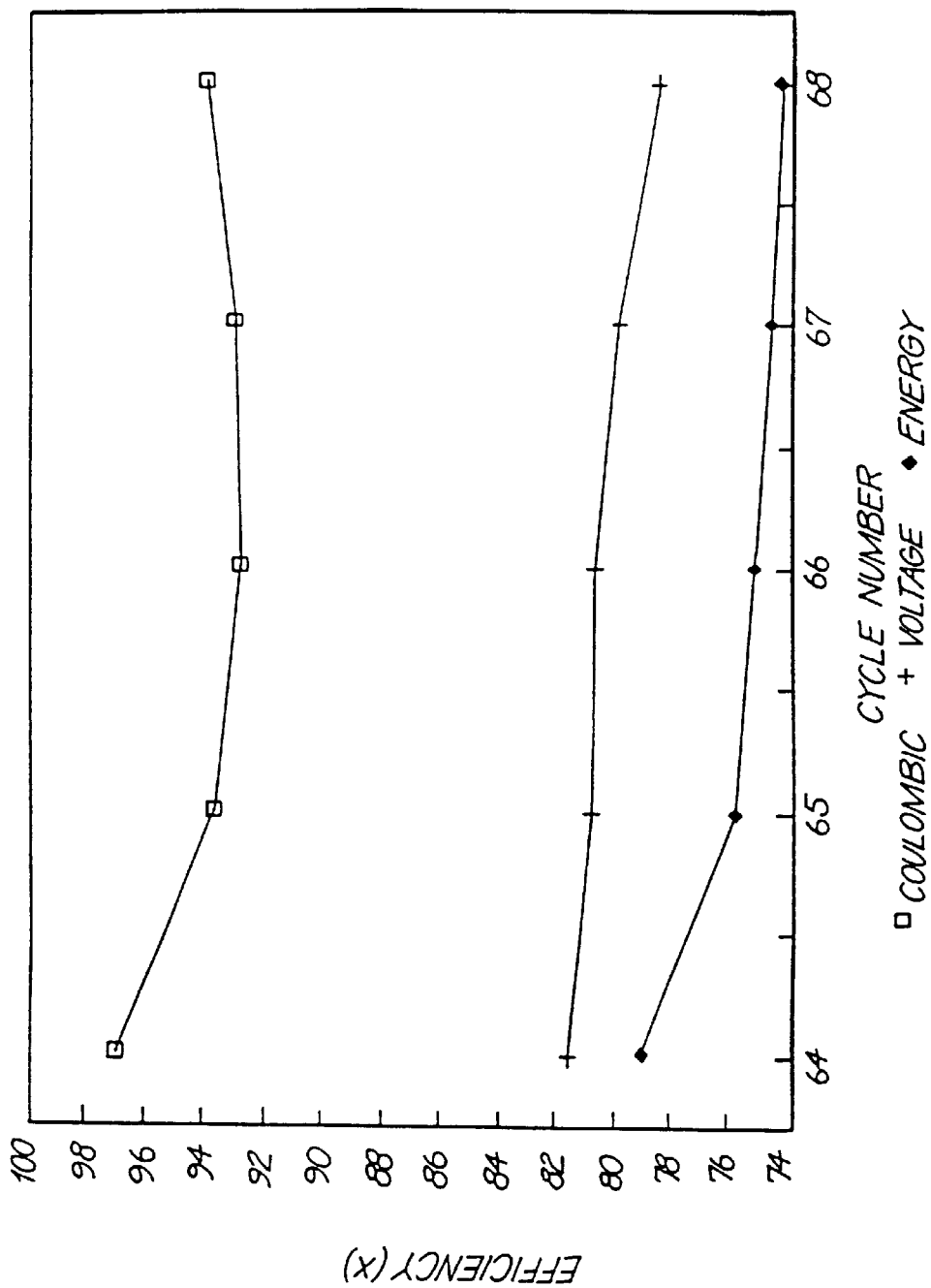
FIG. 4 depicts an all vanadium cell performance for a 3M vanadium electrolyte tested in a small cell consisting of Thai Gypsum conducting plastic and Toray felt electrodes and Flemion membrane at an applied current of 20 mA/cm². The anolyte and catholyte were about 3M vanadium ions in 3M sulphuric acid with 3 wt % ammonium oxalate as stabilising agent.
Figure 5:
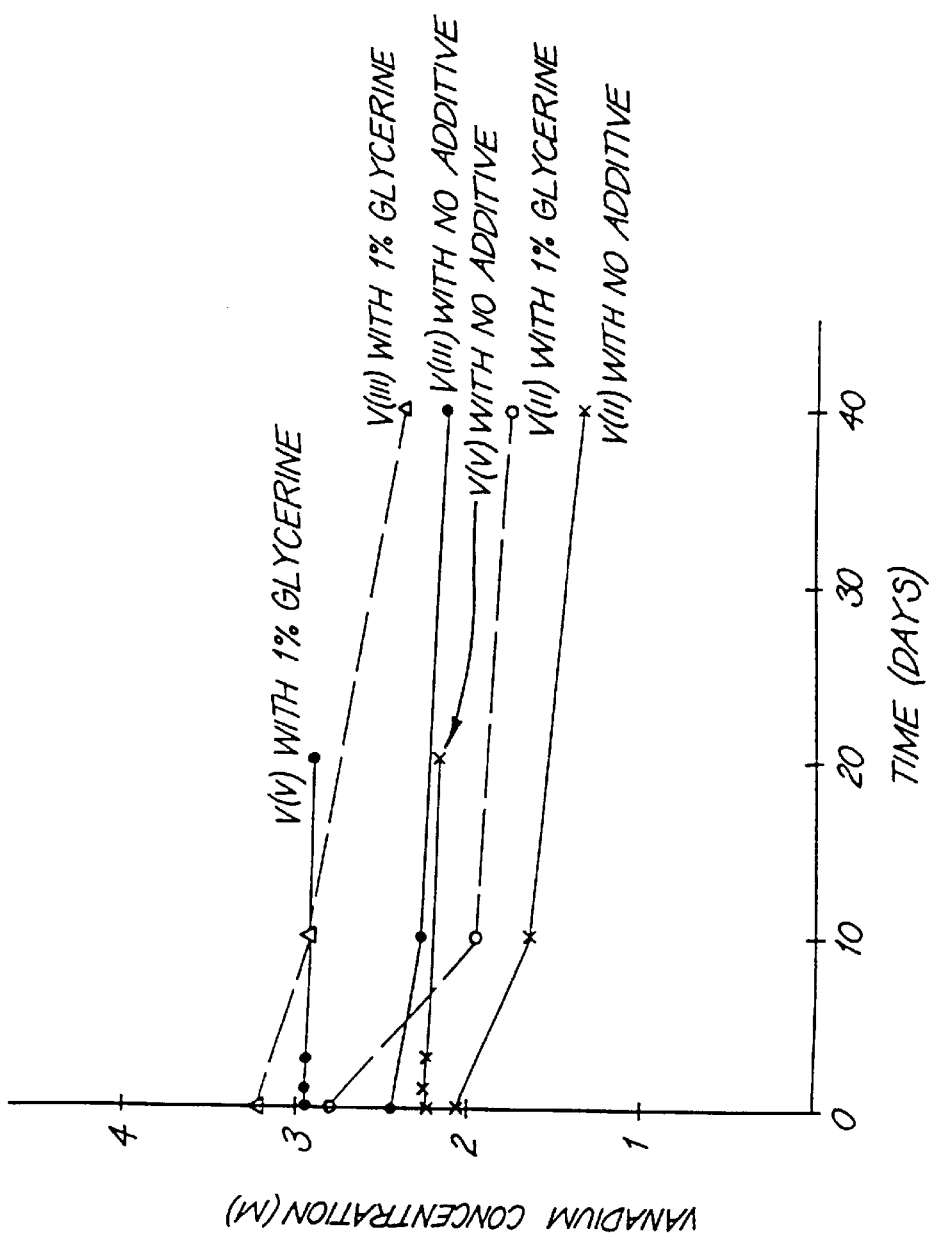
FIG. 5 depicts the concentration of V(V), V(III) and V(II) in sulphuric acid as a function of time at room temperature with and without 1% glycerine in the electrolyte.
Figure 6:
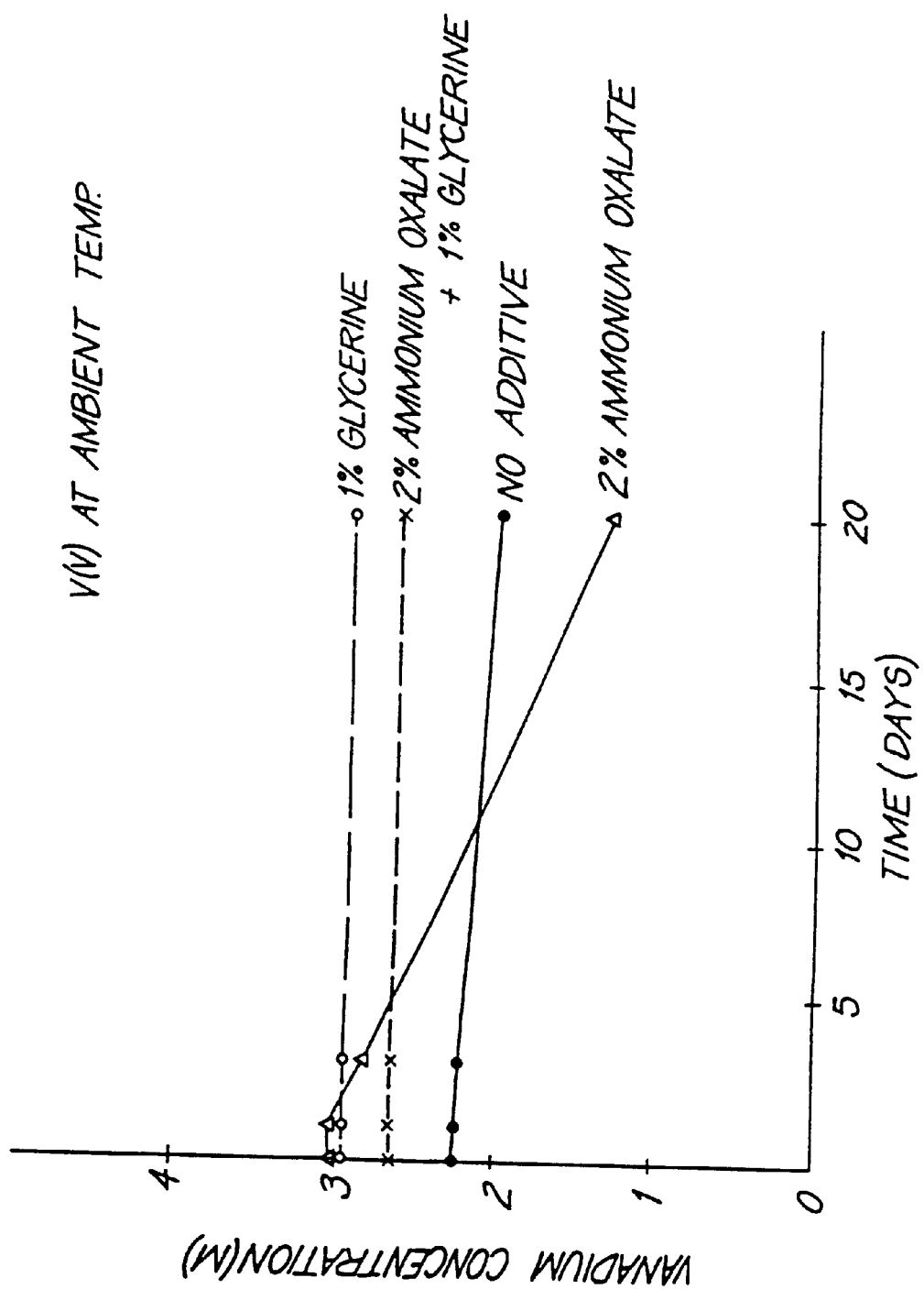
FIG. 6 depicts the concentration of V(V) in sulphuric acid as a function of time at room temperature with 1% glycerine, 2% ammonium oxalate+1% glycerine, 2% ammonium oxalate, as Resell as without any additive in the electrolyte.
Figure 7:
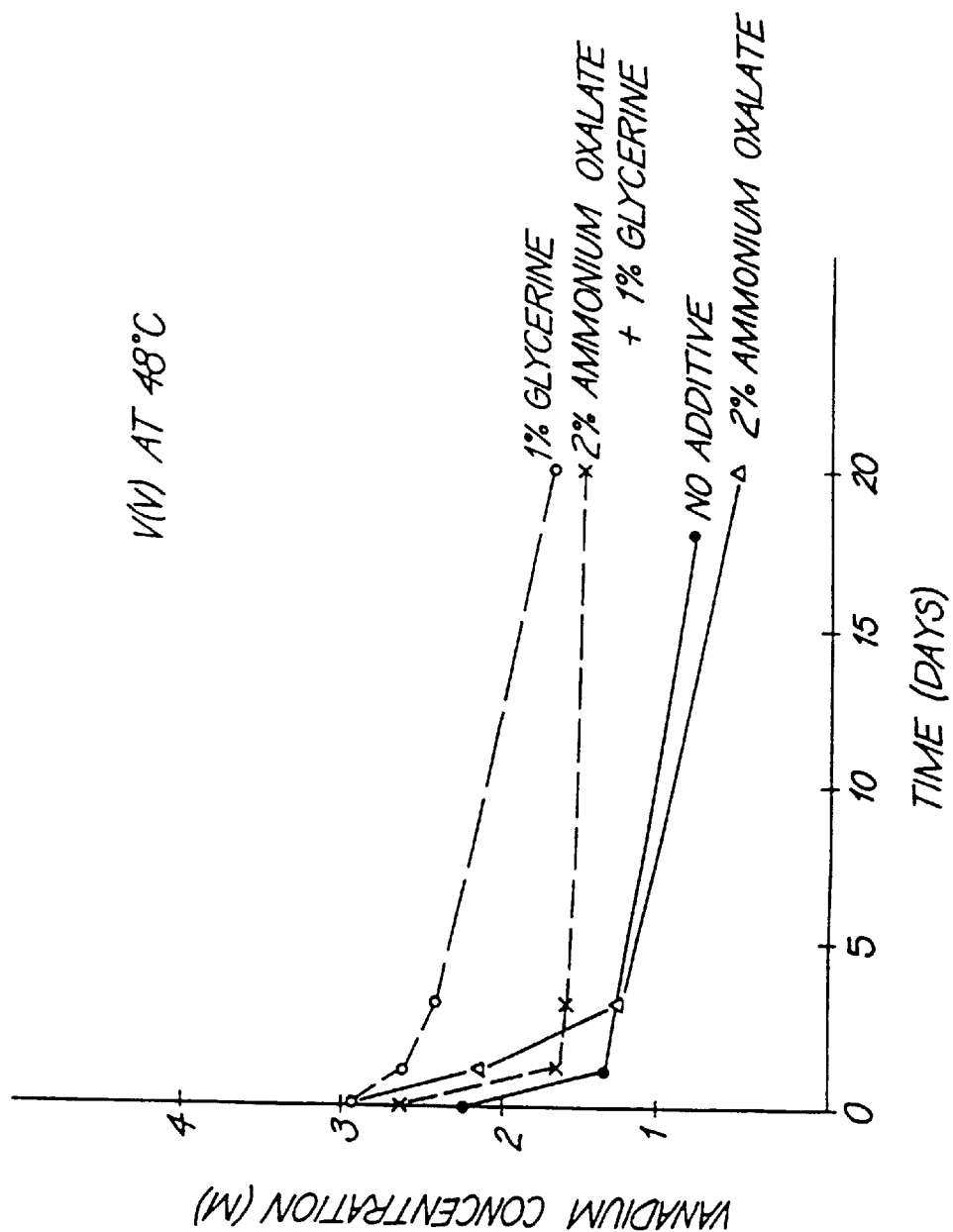
FIG. 7 depicts the concentration of V(V) in sulphuric acid as a function of time at 48° C. with 1% glycerine, 2% ammonium oxalate+1% glycerine, 2% ammonium oxalate, as well as without any additive in the electrolyte.
Figure 8:
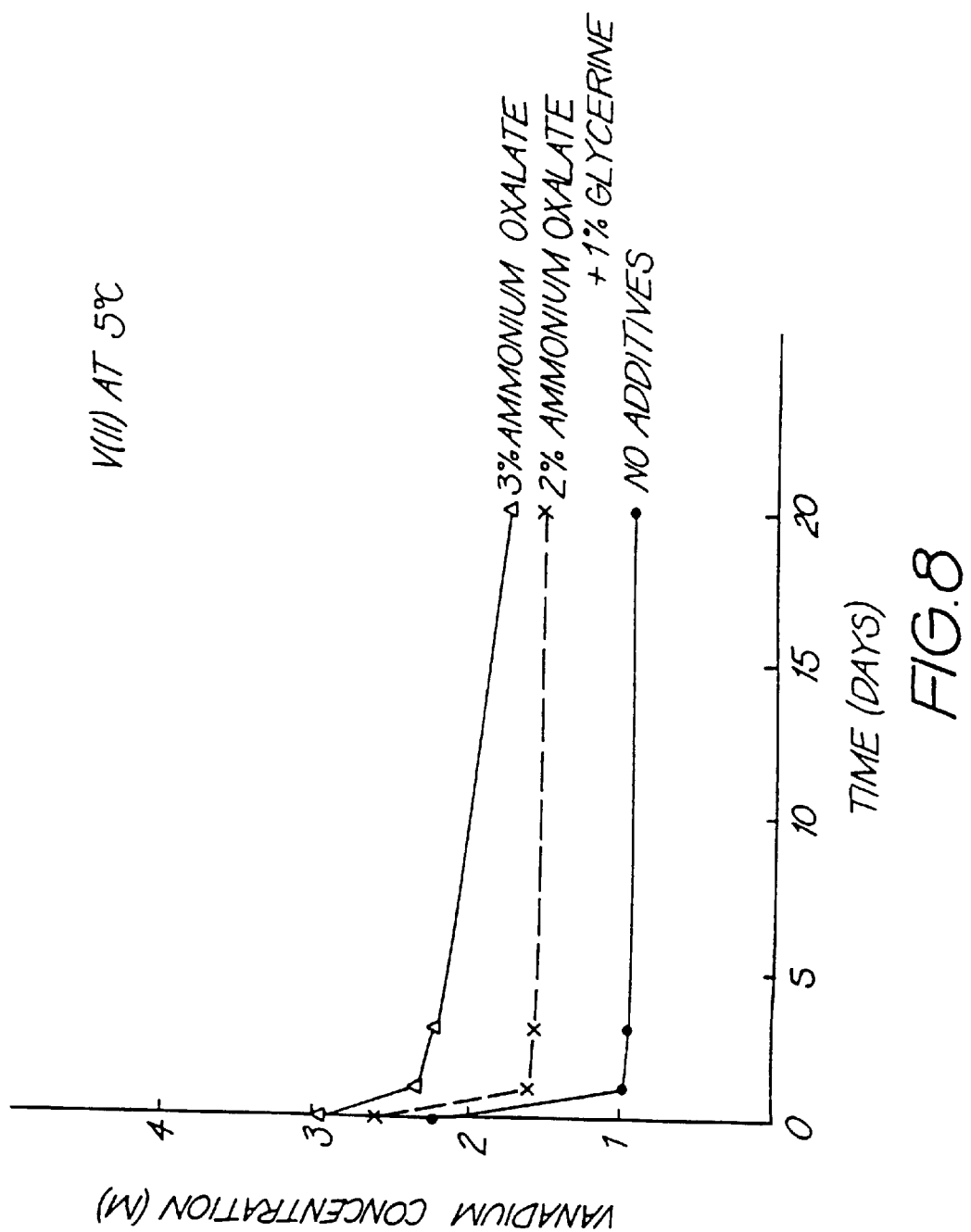
FIG. 8 depicts the concentration of V(II) in sulphuric acid as a function of time at 5° C. with 2% ammonium oxalate+1% glycerine, 3% ammonium oxalate, as well as without any additive in the electrolyte.
Figure 9:
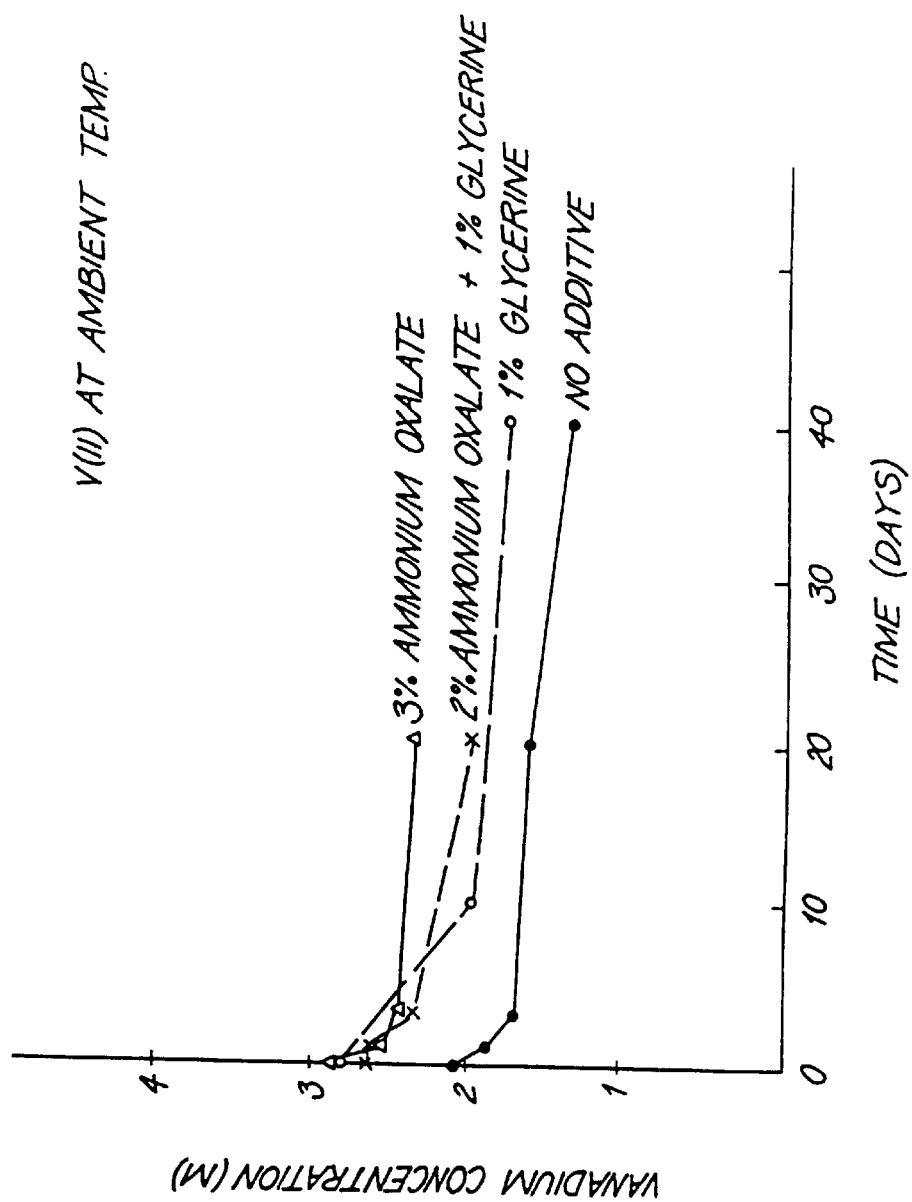
FIG. 9 depicts the concentration of V(II) in sulphuric acid as a function of time at room temperature with 2% ammonium oxalate+1% glycerine, 3% ammonium oxalate, 1% glycerine, as well as without any additive in the electrolyte.
Figure 10:
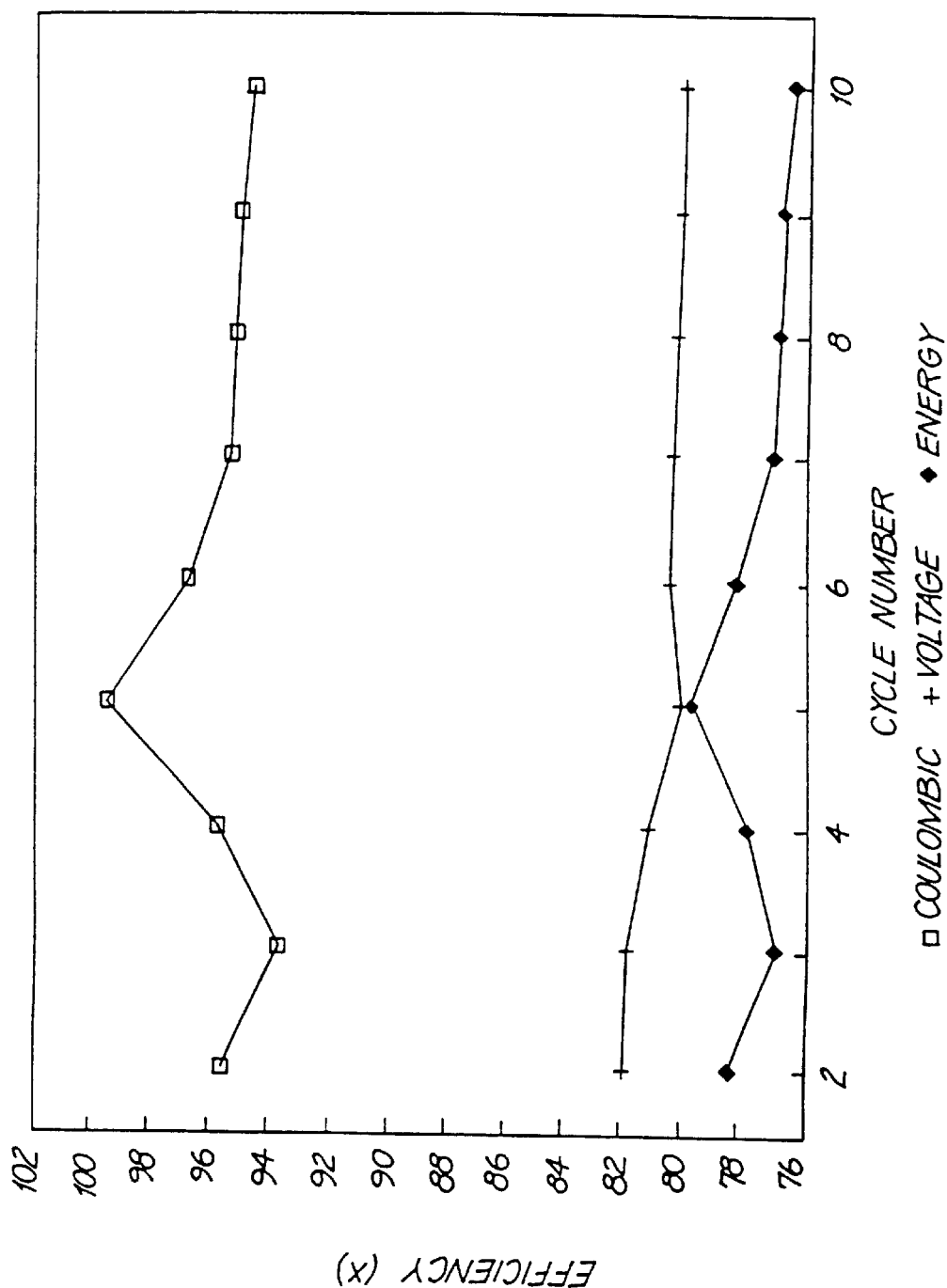
FIG. 10 an all vanadium cell performance for a 3M vanadium electrolyte tested in a small cell consisting of Thai Gypsum conducting plastic and Toray felt electrodes and Flemion membrane at an applied current of 20 mA/cm². The anolyte and catholyte were about 3M vanadium ions in 3M sulphuric acid with 1 wt % glycerine and 2 wt % ammonium oxalate as stabilising agent.
Figure 11:
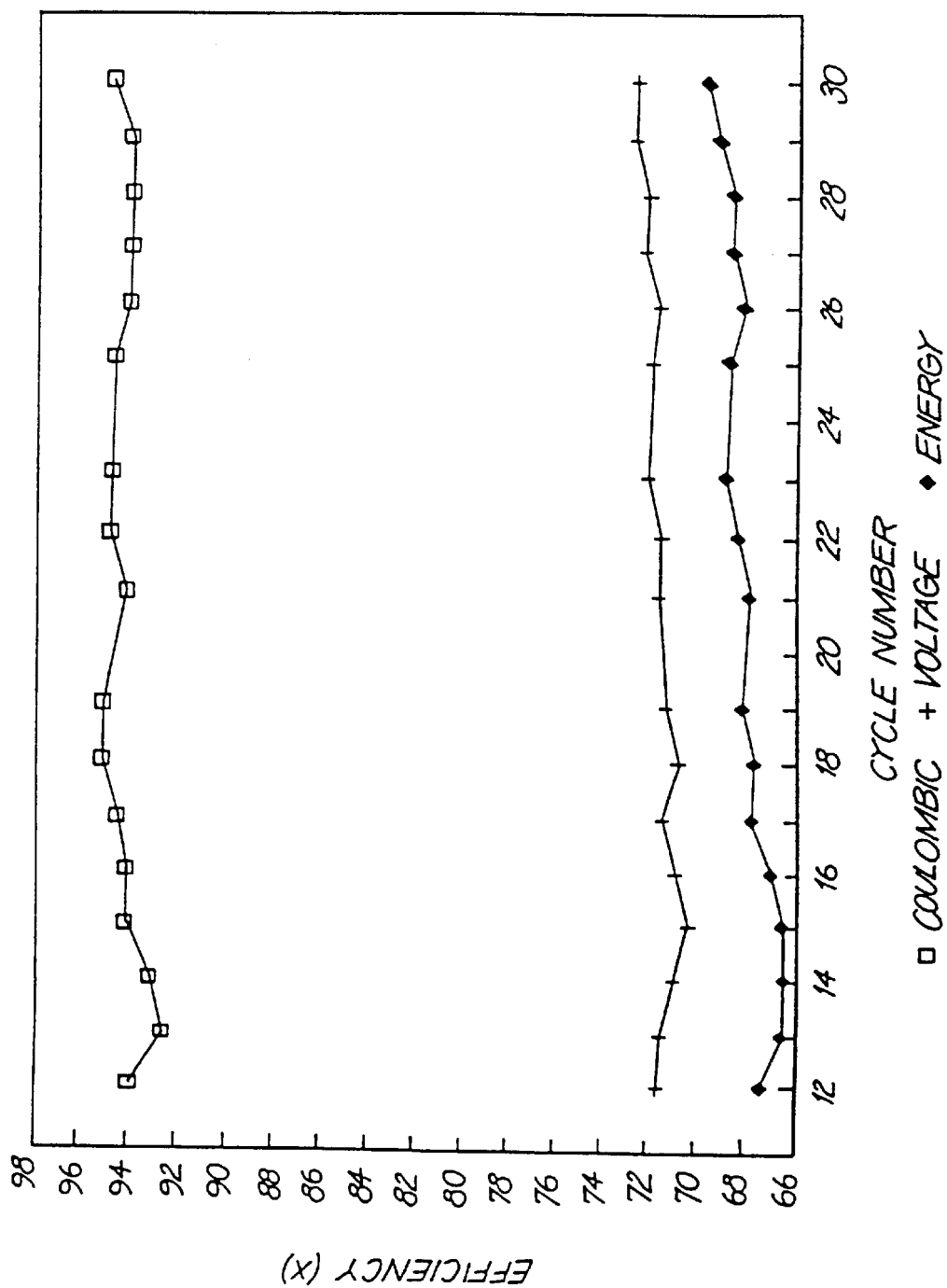
FIG. 11 an all vanadium cell performance for a 3M vanadium electrolyte tested in a small cell consisting of Thai Gypsum conducting plastic and Toray felt electrodes and Flemion membrane at an applied current of 30 mA/cm². The anolyte and catholyte were about 3M vanadium ions in 3M sulphuric acid with 1 wt % glycerine and 2 wt % ammonium oxalate as stabilising agent.

Using the same system with Flemion membrane, better energy efficiency was obtained than using CMV or AMV membrane. The results are summarised in the following Table. FIG. 4 depicts the cell performance for a cell with applied current 20 $mA/cm^2$ and having a Flemion membrane.

TABLE

| Applied current (mA/cm$^2$) | 20 | 30 | 40 |
|---|---|---|---|
| Coulombic efficiency (%) | 95 | 95 | 96 |
| Voltage efficiency (%) | 81 | 68 | 64 |
| Energy efficiency (%) | 77 | 64.5 | 61.4 |

Example 12

Stabilising agents and their effect are described in Table 1.

TABLE 1

Investigation of the stabilizing agents in 2M V(V) solution*

| Stabilising agent | Percentage used | Effect |
|---|---|---|
| Thiourea H$_2$NCSHN$_2$ | 0.1–20% (by wt./vol.) | Complexed by reducing |
| Ammonium oxalate (NH4)$_2$C$_2$O$_4$.H$_2$O | 1–30% (by wt./vol.) | Slightly reducing |
| Glycerine C$_3$H$_8$O$_3$ | 0.1–20% | Complexed by reducing |
| Diphenyl-thiocarbazone C$_{13}$H$_{12}$SN$_4$ | 0.01–1% (by wt./vol.) | Form solid product |
| Tri-n-butyl phosphate [CH$_3$(CH$_2$)$_3$PO$_4$ | 1–5% | Form solid product |
| EDTA disodium salt [CH$_2$.(CH$_2$COOH).CH$_2$COO Na]$_2$.2H$_2$O | 0.5–5% | Reducing and form solid product |
| Tri-sodium citrate Na$_3$C$_6$H$_5$O$_7$.2H$_2$O | 1–5% (by wt./vol.) | Slightly reducing** |
| Ascorbic acid C$_6$H$_8$O$_6$ | 1–5% (by wt./vol.) | Slightly reducing** |
| Malic acid HO$_2$CCH$_2$CH(OH)COOH | 1–5% (by wt./vol.) | Reducing and form gasses |
| Succinic acid HO$_2$CCH$_2$CH$_2$COOH | 1–5% (by wt./vol.) | Unreacted |
| Salicylic acid OHC$_6$H$_4$COOH | 1–5% (by wt./vol.) | Form solid product |

*By wt./vol in case of solids and % by vol./vol in case of liquids) and observed periodically in ambient conditions
**Potential Additives Preparation of the Electrolytes of Higher Concentration The complex forming properties of the stabilising agent were observed from the preliminary test and then further applied for the increase of vanadium concentration in the electrolyte solution. For all investigations the same method was applied and the results show the increase in the concentration of vanadium in solution. The concentration and state of charge of the electrolyte solution were determined by potentiometric titration. A comparison of the preparation of electrolyte with and without stabilising agents is presented in Table 2.

The specified amount of additive was added to the V$_2$O$_5$ powder and H$_2$SO$_4$ suspension in the negative half of an electrolysis cell and a constant current of 20 mA/M$^2$ applied for the appropriate time required to reduce the V(V) to V(III.5+) V$^{III}$/V$^{IV}$state, This solution was then used in a redox cell to prepare each oxidant state,

TABLE 2

Comparison of the production of electrolyte of higher concentration from V$_2$O$_5$ and NH$_4$VO$_3$ in water and sulphuric acid with and without the presence of stabilising agent.

| Stabilising agent with V$_2$O$_5$ & NH$_4$VO$_3$ in H$_2$O/3M H$_2$SO$_4$ | Without stabilising agent (M) | With ammonium oxalate (2-3% by wt./volume) (M) | Without stabilising agent and electrolysis | With 3% ammonium oxalate and electrolysis (M) |
|---|---|---|---|---|
| H$_2$O & V$_2$O$_5$ | 0.046 | 0.5 | not applicable | not applicable |
| 3M H$_2$SO$_4$ & V$_2$O$_5$ | 0.487 | 1.028 | 2.47 75% V(III) + 25% V(IV) | 4.21 35% V(III) + 65% V(IV) |
| H$_2$O & NH$_4$VO$_3$ | slightly soluble | 1.2 | not applicable | not applicable |
| 3M H$_2$SO$_4$ & NH$_4$ VO$_3$ | 1.4 | 2.46 | not available | not available |

The results show that a small amount (2–3% wt./vol) of ammonium oxalate increased the vanadium concentration in electrolytic solutions, By using V$_2$O$_5$ in H$_2$O without any stabilising agents a maximum 0.046M vanadium concentration can be obtained, but with stabilising agent a solution of 0.5M can easily be produced. With 3M H$_2$SO$_4$ a solution of 0.487M vanadium concentration can be produced after boiling. However in 3M H$_2$SO$_4$ with a stabilising agent the vanadium concentration was increased up to 1.2M and a greater increase in the concentration of vanadium up to 4.21M was obtained by electrolysis in the same solution containing stabilising agent. From NH$_4$VO$_3$ with stabilising agent in 3M H$_2$SO$_4$ a solution of 2.46M vanadium concentration was produced after boiling, whereas NH$_4$VO$_3$ is soluble up to 1.4M in the same solution without any stabilising agent.

Analysis of Vanadium Complexes and Ions

The analytical methods are considered for analysing the electrolytes and the vanadium compounds are described below:

The potentiometric method of electroanalytical chemistry is used for the determination of total vanadium concentration of the electrolyte of the vanadium redox cell. The concentration of vanadium ions can also be readily determined by using Inductively Coupled Plasma Emission Spectrometry (ICPES), but has proven to be more complex and is suitable only for a very dilute solution due to low sensitivity range and may introduce sufficient errors that the analysis of the solution at higher concentration can be impeded.

Stabilisation of the Electrolyte of V(II) and V(V) Oxidation States at Varied Temperatures The V(V) is the most complicated species of the electrolyte of vanadium redox cell. In ambient conditions and low temperature it is quite stable, but with increasing temperatures it has the tendency to precipitate very rapidly.

A wide range of stabilising agents and varying proportions were used for the present study. Some of the stabilising agents at lower concentration have proven to have promising characteristics for stabilising the V(V) solutions, It was found that a greater vanadium concentration can be obtained with 1% glycerine as a stabilising agent in ambient conditions and at increased temperature. In ordinary conditions V(V) is stable upto 2.24M but this decreases when the solution is stored for a time. A 2.03M solution of V(V) was obtained after 20 days of storage at room temperature. However with 1% glycerine a solution of 2.96M vanadium concentration was prepared and was stable for a long time in ambient conditions.

The results obtained from the stability test of V(II) solutions with stabilising agents at ambient conditions are significantly higher as compared with the solutions without stabilising agent. The initial V(II) solution concentration was 2.07M, after 10 days it was 1.68M and after 40 days, 1.42M vanadium concentration was found. However with 1% glycerine as a stabilising agent the initial V(II) concentration was 2.82M. After 10 days it was 2.00M and after 40 days it was stable in 1.86M. The V(III) solution containing 2.46M vanadium concentration was found to be 2.30M after 10 days and it was stable at 2.23M after 40 days whereas the V(III) solution containing 1% glycerine had the initial concentration of 3.21M, which became 2.96M after 10 days and stable at 2.43M after 40 days.

Considering the relative reverse properties of glycerine and ammonium oxalate towards V(V) and V(II) a mixture of 1% glycerine and 2% ammonium oxalate was used for further investigations, The stabilising agents have reducing properties when used in excess, so small additions avoided the situation of reducing the electrolyte. The combination of two stabilising agents was able to provide excellent results. An electrolyte solution of 2.66M vanadium concentration was prepared with these two combined stabilising agents, which was stable for a long time in ambient conditions and also showed better stabilising properties than the V(V) without stabilising agent at varied temperatures.

TABLE 3

Comparison of the stability of the electrolyte solutions with and without the presence of any stabilising agent in ambient conditions.

| Solution composition | Vanadium concentration of the solution (M) | | |
|---|---|---|---|
| | After preparation | After 10 days | After 40 days |
| V(II) without stabilising agent | 2.07 | 1.68 | 1.42 |
| V(II) with 1% glycerine | 2.82 | 2.00 | 1.86 |
| V(III) without stabilising agent | 2.46 | 2.30 | 2.23 |
| V(III) with 1% glycerine | 3.21 | 2.96 | 2.43 |

TABLE 4

Comparison of the stability of V(II) solutions prepared with and without stabilising agent at lower temperature (5° C.) and in ambient temperature.

| Solution composition | Vanadium concentration of the solution (M) | | | |
|---|---|---|---|---|
| | Initial | After 1 day | After 3 days | After 20 Days |
| V(II) at room temp. | 2.07 | 1.87 | 1.7 | 1.68 |
| V(II) with 3% ammonium oxalate at room temp. | 2.98 | 2.58 | 2.42 | 2.24 |
| V(II) at 5° C. | 2.08 | 0.98 | 0.97 | 1.00 |

TABLE 4-continued

Comparison of the stability of V(II) solutions prepared with and without stabilising agent at lower temperature (5° C.) and in ambient temperature.

| Solution composition | Vanadium concentration of the solution (M) | | | |
|---|---|---|---|---|
| | Initial | After 1 day | After 3 days | After 20 Days |
| V(II) with 3% ammonium oxalate at 5° C. | 2.98 | 2.32 | 2.24 | 1.8 |

TABLE 5

Comparison of the stability of V(II) solutions prepared with and without the presence of stabilising agent at lower temperature (5° C.) and in ambient temperature.

| Solution composition | Vanadium concentration of the solution (M) | | | |
|---|---|---|---|---|
| | Initial | After 1 day | After 3 days | After 20 Days |
| V(II) at room temp. | 2.07 | 1.87 | 1.7 | 1.68 |
| V(II) with 3% ammonium oxalate at room temp. | 2.98 | 2.58 | 2.42 | 2.42 |
| V(II) with 2% ammonium oxalate and 1% glycerine at room temp. | 2.66 | 2.57 | 2.38 | 2.06 |
| V(II) at 5° C. | 2.24 | 0.98 | 0.97 | 1.00 |
| V(II) with 3% ammonium oxalate at 5° C. | 2.98 | 2.32 | 2.24 | 1.80 |
| V(II) with 2% ammonium oxalate and 1% glycerine at 5° C. | 2.66 | 1.6 | 1.59 | 1.59 |

TABLE 6

Comparison of the stability of V(V) solutions prepared with and without the presence of stabilising agent at higher temperature (48° C.) and in ambient temperature.

| Solution composition | Vanadium concentration of the solution (M) | | | |
|---|---|---|---|---|
| | Initial | After 1 day | After 3 days | After 20 Days |
| V(V) at room temp. | 2.24 | 2.23 | 2.23 | 2.03 |
| V(V) with 2% ammonium oxalate and 1% glycerine at room temp. | 2.66 | 2.66 | 2.66 | 2.66 |
| V(V) at 48° C. | 2.24 | 1.36 | N/A | N/A |
| V(V) with 2% ammonium oxalate and 1% glycerine at 48° C. | 2.66 | 1.65 | 1.6 | 1.59 |

TABLE 7

Comparison of the stability of V(V) solutions prepared with
and without stabilising agent at higher temperature
(48° C.) and in ambient temperature.

| Solution composition | Vanadium concentration of the solution (M) | | | |
|---|---|---|---|---|
| | Initial | After 1 day | After 3 days | After 20 Days |
| V(V) at room temp. | 2.24 | 2.23 | 2.23 | 2.03 |
| V(V) with 1% glycerine at room temp. | 2.96 | 2.96 | 2.96 | 2.96 |
| V(V) at 48° C. | 2.24 | 1.36 | N/A | N/A |
| V(V) with 1% glycerine at 48% | 2.96 | 2.64 | 2.46 | 1.80 |

Results of various experiments described in this example are shown graphed in FIGS. 5–11.

Example 13

The electrolyte was prepared by a method in which the $V_2O_5$ electrolysis process was separated into two different steps. The solution electrolysis step involved the electrolytic reduction of a solution of vanadium ions to a 100% $V^{3+}$ oxidation state, $V_2O_5$ is induced to dissolve in the $V^{3+}$ solution by the $V^{3+}$ ions which acts as a leaching agent for the $V_2O_5$.

Figure 22:
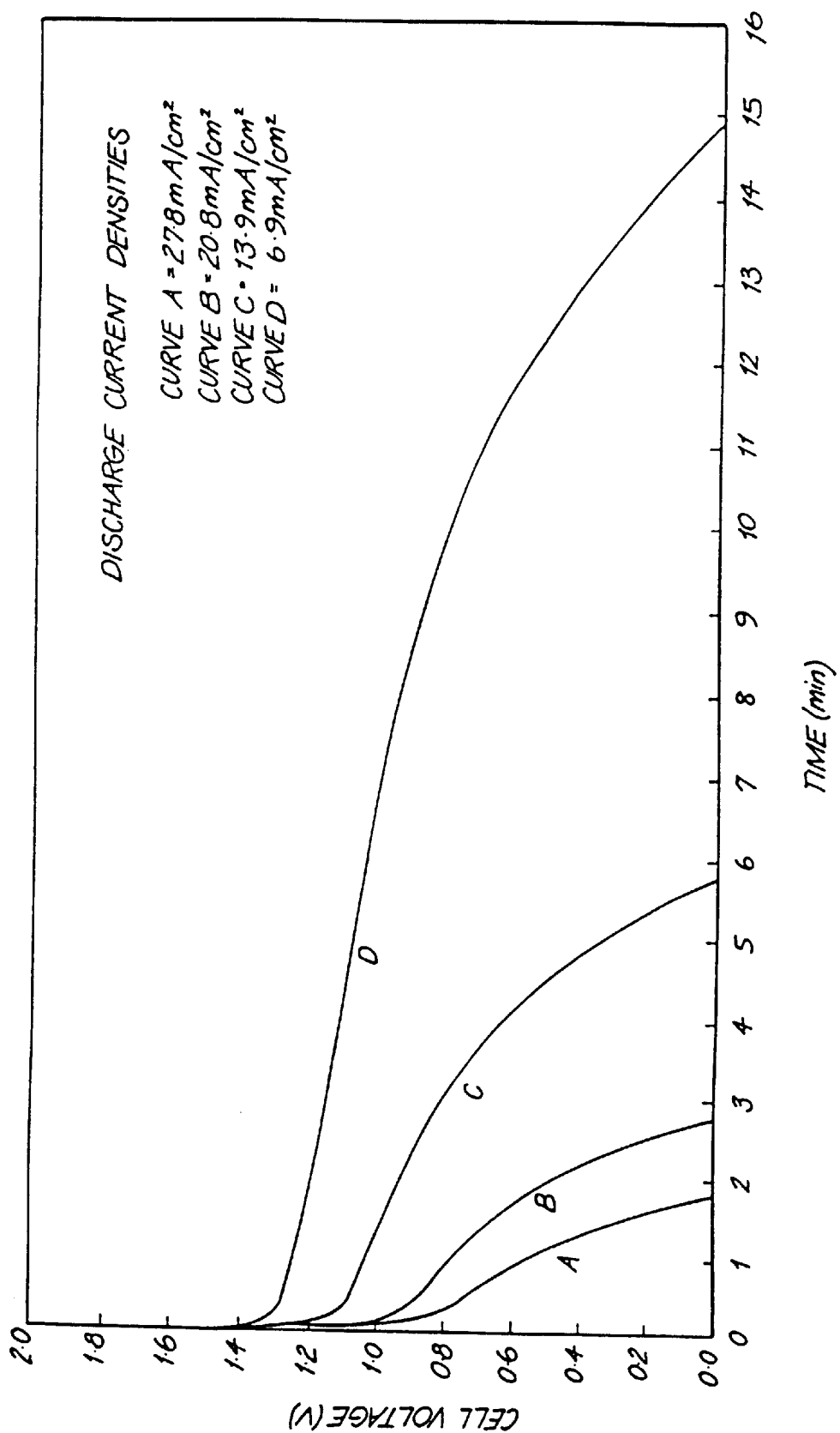
FIG. 22 are discharge current density curves as a function of time for an all-vanadium redox battery.

A 5.1M vanadium solution was prepared by taking 200 ml of 1.87M $V^{3+}$ solution in about 3M sulphuric acid and adding 35 g of $V_2O_5$ powder plus 0.6 g of D-fructose, The powder dissolved after about 10 minutes and the resulting solution was 3.3M V(IV) in 5.35M sulphate, This solution was then placed in an electrolysis cell and reduced to $V^{3.5+}$. A 160 ml portion of the $V^{3.5+}$ solution, 48 g of $V_2O_5$ powder and 0.1 g of D-fructose was mixed by mechanical stirring. The dissolution reaction again proceeded quickly (within about 10 min) and after reaction the mixture was taken and filtered. The filtered solution was titrated with 0.2M $KMnO_4$ and the resulting concentration of vanadium obtained was 5.1M. The oxidation state of the solution obtained was close to 100% $V^{4+}$ with a sulphate concentration of 5.35M. The 5.1M V(IV) electrolyte was then placed into both the positive and negative compartments of a small redox battery with an ionically conducting separator therebetween and charged up to the $V^{2+}$ and V(V) states in the positive and negative half cells respectively using a current of approximately 10 mA/cm$^2$. The battery was discharged at various current densities and the resultant cell voltage vs time curves as shown in FIG. 22.

Example 14

A 7.1M vanadium solution was prepared by taking 400 ml of 1.87M $V^{3+}$ solution in about 3M sulphuric acid and adding 68 g of $V_2O_5$ powder plus 44 ml of 18M $H_2SO_4$. To this was added 6.9 g of D-fructose which was 1% w/w. The powder was stirred until fully dissolved and the final solution was 3.4M V(IV). From this solution a volume of 350 ml was placed in the negative compartment of an electrolysis cell and reduced to $V^{3+}$. To this solution 120 g of $V_2O_5$ powder was added and 1.2 g of D-fructose was also added to produce a final V(II) solution containing 1% w/w D-fructose, The concentration of the final solution was determined as 7.1M $V^{4+}$. This solution was stable at room temperature for 6 days before a slight precipitate started to appear.

What is claimed is:

1. A stabilized vanadium electrolyte solution for use in all-vanadium redox cell or battery, the stabilized electrolyte solution comprising vanadium redox ions, an electrolyte and a stabilizing agent wherein precipitation of vanadium compounds from the electrode solution is prevented or reduced by the stabilizing agent when precipitation of the vanadium compounds would otherwise occur and the stabilizing agent is present in the electrolyte solution at a concentration of from 0.05 to 20% mol/mol of the stabilizing agent to the vanadium redox ions.

2. The stabilized electrolyte solution as claimed in claim 1 wherein the electrolyte solution is aqueous and the electrolyte is selected from the group consisting of $H_2SO_4$, trifluoromethanesulphonic acid, $Na_2SO_4$, $K_2SO_4$, $H_3PO_4$, $Na_3PO_4$, $K_3PO_4$, $KNO_3$, $NaNO_3$, sulphonic acid, $C_6$–$C_{14}$ arylsulphonic acid, $C_1$–$C_6$ alkylsulphonic acid, acetic acid and mixtures thereof.

3. The stabilized electrolyte solution as claimed in claim 2 wherein the electrolyte is $H_2SO_4$.

4. The stabilized electrolyte solution as claimed in claim 3 wherein the $H_2SO_4$ is present in a concentration range of 4M to 6.5M.

5. The stabilized electrolyte solution as claimed in claim 1 wherein the electrolyte solution is aqueous and the vanadium redox ions are present in a concentration of 0.1M to 15M.

6. The stabilized electrolyte solution as claimed in claim 5 wherein the vanadium redox ions are present in a concentration of 2M to 4M.

7. The stabilized electrolyte solution as claimed in claim 1 therein the redox ions are selected from the group consisting of pentavalent vanadium ions, tetravalent vanadium ions, trivalent vanadium ions, divalent vanadium ions, a mixture of divalent and trivalent vanadium ions, a mixture of divalent and tetravalent vanadium ions, a mixture of trivalent and tetravalent vanadium ions, a mixture of divalent, trivalent and tetravalent vanadium ions, a mixture of divalent, trivalent, tetravalent and pentavalent vanadium ions, a mixture of trivalent, tetravalent and pentavalent vanadium ions and a mixture of tetravalent and pentavalent vanadium ions.

8. The stabilized electrolyte solution according to claim 7 wherein the stabilizing agent is selected from the group consisting of:
 (a) surfactants selected from the group consisting of anionic, cationic, amphoteric, and non-ionic surfactants;
 (b) straight chain, branched chain or cyclic compounds with polyfunctional groups selected from the group consisting of polyhydric alcohols, polyamines, polymercapto compounds, and organic compounds containing at least two moieties, each selected from the group consisting of —OH, —NH$_2$ and —SH;
 (c) phosphoric acids selected from the group consisting of inorganic phosphoric acids organic polyphosphoric acids, and inorganic polyphosphoric acids;
 (d) ammonium compounds;
 (e) phosphonates, and phosphonic acids compounds;
 (f) carbohydrates selected from the group consisting of saccharides, polysaccharides and starches;
 (g) carboxylic acids selected from the group consisting of polyaminocarboxylic acids, and polyhydroxy-polycarboxylic acids; and
 (h) oxo-acids.

9. The stabilized electrolyte solution according to claim 8 wherein the stabilizing agent is selected from the group consisting of ammonium compounds, inorganic phosphoric acids, inorganic polyphosphoric acid compounds and mixtures of two or more thereof.

10. The stabilized electrolyte solution according to claim 9 wherein the stabilizing agent is selected from the group consisting of:
   (a) ammonium compounds selected from the group consisting of ammonium sulphate, ammonium phosphate, ammonium oxalate, ammonium hypophosphate, ammonium phosphate, ammonium aspartate, ammonium hydrogen sulphate, ammonium acetate, ammonium nitrate, ammonium tartar and the sodium and potassium salts thereof,
   (b) phosphate compounds selected from the group consisting of monosodium phosphate, sodium pyrophosphate, sodium tetrapolyphosphate, sodium hexametaphosphate, orthophosphoric acid, polyphosphoric acid, phosphoric acid, sodium acid, pyrophosphate and mono- and di-hydrogen phosphoric acid,
   (c) compounds in the Briquest range, and
   (d) compounds selected from the group consisting of glycerine, glucose, fructose, sorbitol, ascorbic acid, saccharide, starch, lactose, tartaric acid, L-cystine, glutamic acid, urea, EDTA, thiourea, inositol and citric acid.

11. The stabilized electrolyte solution according to claim 10 wherein the stabilizing agent is elected from the group consisting of phosphoric acid, ammonium sulphate, ammonium phosphate and mixtures of two or more thereof.

12. The stabilized electrolyte solution according to claim 11 wherein the stabilizing agent is present in a concentration of 0.1% to 10% mole/mole of stabilizing agent to vanadium redox ions.

13. The stabilized electrolyte solution as claimed in claim 12 wherein the stabilizing agent is present in a concentration of 0.5% to 8% mole/mole % of stabilizing agent to vanadium redox ions.

14. The stabilized electrolyte solution as claimed in claim 13 wherein the stabilizing agent is present in a concentration of 0.5% to 5% mole/mole % of stabilizing agent to vanadium redox ions.

15. The stabilized electrolyte solution according to claim 14 wherein the vanadium redox ions are present at a concentration of 3M, the electrolyte is present at a concentration of 5M total sulphates and said stabilizing agent comprises a mixture of 2% ammonium sulphate and 1% phosphoric acid, wherein % is mole/mole % of stabilizing agent to vanadium redox ions.

16. The stabilized electrolyte solution according to claim 15 wherein the vanadium redox ions are present in a concentration of 1M to 4M.

17. The stabilized electrolyte solution according to claim 15 wherein the vanadium redox ions are present in a concentration of 1.5M to 4M. wherein the vanadium redox ions are present in a concentration of 1.8M to 4M.

18. The stabilized electrolyte solution according to claim 15 wherein the vanadium redox ions are present in a concentration of 1.5M to 4M.

19. The stabilized electrolyte solution according to claim 15 wherein the vanadium redox ions are present in a concentration of 1.5M to 3M.

20. The stabilized electrolyte solution according to claim 15 wherein the vanadium redox ions are present in a concentration of 1.8M to 3M.

21. The stabilized electrolyte solution according to claim 15 wherein the vanadium redox ions are present in a concentration of 1.5M to 2M.

* * * * *

UNITED STATES PATENT AND TRADEMARK OFFICE
CERTIFICATE OF CORRECTION

PATENT NO. : 6,562,514 B1  Page 1 of 1
DATED : May 13, 2003
INVENTOR(S) : Maria Kazacos et al.

It is certified that error appears in the above-identified patent and that said Letters Patent is hereby corrected as shown below:

Column 122,
Line 6, delete "electrode solution" and insert -- electrolyte solution --.
Line 31, delete "therein" and insert -- wherein --.

Column 123,
Line 28, delete "elected" and insert -- selected --.

Column 124,
Lines 20-21, delete "wherein the vanadium redox ions are present in a concentration of 1.8M to 4M".
Line 24, delete "1.5M to 4M" and insert -- 1.8M to 4M --.

Signed and Sealed this

Fifteenth Day of June, 2004

JON W. DUDAS
*Acting Director of the United States Patent and Trademark Office*